COMPUTING DEVICE

Filed Sept. 26, 1956 62 Sheets-Sheet 1

INVENTOR
WALKER H. THOMAS

BY Theodore C. Wood
AGENT

Jan. 30, 1962 W. H. THOMAS 3,018,959

COMPUTING DEVICE

Filed Sept. 26, 1956 62 Sheets-Sheet 3

Jan. 30, 1962 W. H. THOMAS 3,018,959

COMPUTING DEVICE

Filed Sept. 26, 1956 62 Sheets-Sheet 5

Jan. 30, 1962 W. H. THOMAS 3,018,959

COMPUTING DEVICE

Filed Sept. 26, 1956 62 Sheets-Sheet 9

Jan. 30, 1962 W. H. THOMAS 3,018,959

COMPUTING DEVICE

Filed Sept. 26, 1956 62 Sheets-Sheet 10

Jan. 30, 1962 W. H. THOMAS 3,018,959

COMPUTING DEVICE

Filed Sept. 26, 1956 62 Sheets-Sheet 15

Jan. 30, 1962 W. H. THOMAS 3,018,959

COMPUTING DEVICE

Filed Sept. 26, 1956 62 Sheets-Sheet 16

Jan. 30, 1962 W. H. THOMAS 3,018,959

COMPUTING DEVICE

Filed Sept. 26, 1956 62 Sheets-Sheet 17

Jan. 30, 1962 W. H. THOMAS 3,018,959

COMPUTING DEVICE

Filed Sept. 26, 1956 62 Sheets-Sheet 18

Jan. 30, 1962 W. H. THOMAS 3,018,959

COMPUTING DEVICE

Filed Sept. 26, 1956 62 Sheets-Sheet 19

Jan. 30, 1962 W. H. THOMAS 3,018,959

COMPUTING DEVICE

Filed Sept. 26, 1956 62 Sheets-Sheet 20

Jan. 30, 1962 W. H. THOMAS 3,018,959

COMPUTING DEVICE

Filed Sept. 26, 1956 62 Sheets-Sheet 23

Jan. 30, 1962 W. H. THOMAS 3,018,959

COMPUTING DEVICE

Filed Sept. 26, 1956 62 Sheets-Sheet 33

Jan. 30, 1962 W. H. THOMAS 3,018,959

COMPUTING DEVICE

Filed Sept. 26, 1956 62 Sheets-Sheet 41

LEFT MEMORY BUFFER REGISTER

RIGHT MEMORY BUFFER REGISTER

Jan. 30, 1962 W. H. THOMAS 3,018,959

COMPUTING DEVICE

Filed Sept. 26, 1956 62 Sheets-Sheet 47

Jan. 30, 1962

W. H. THOMAS 3,018,959

COMPUTING DEVICE

Filed Sept. 26, 1956

62 Sheets-Sheet 49

Jan. 30, 1962 W. H. THOMAS 3,018,959

COMPUTING DEVICE

Filed Sept. 26, 1956 62 Sheets-Sheet 50

Jan. 30, 1962 W. H. THOMAS 3,018,959

COMPUTING DEVICE

Filed Sept. 26, 1956

62 Sheets-Sheet 52

Jan. 30, 1962 W. H. THOMAS 3,018,959

COMPUTING DEVICE

Filed Sept. 26, 1956 62 Sheets-Sheet 54

CYCLE CONTROL CIRCUIT

MEMORY UNIT SELECTION

Jan. 30, 1962 W. H. THOMAS 3,018,959

COMPUTING DEVICE

Filed Sept. 26, 1956 62 Sheets-Sheet 58

Jan. 30, 1962 W. H. THOMAS 3,018,959

COMPUTING DEVICE

Filed Sept. 26, 1956 62 Sheets-Sheet 59

United States Patent Office 3,018,959

Patented Jan. 30, 1962

3,018,959

COMPUTING DEVICE

Walker H. Thomas, Poughkeepsie, N.Y., assignor to International Business Machines Corporation, New York, N.Y., a corporation of New York Filed Sept. 26, 1956, Ser. No. 612,267
7 Claims. (Cl. 235—167)

This invention relates to computing devices and more particularly to computing devices of the stored program type.

Various copending patent applications will be referred to in the following specification. Those applications are incorporated herein by reference and will be referred to as copending application "A," "B," etc. as follows:

| Reference | Copending application | | | | |
|---|---|---|---|---|---|
| | Application Serial No. | Now Patent No. | Title | Inventors | Filing date |
| A | 494,982 | | Magnetic data storage | R. Everett et al. | Mar. 17, 1955 |
| B | 582,578 | | Data storage system | J. Crosby et al. | May 3, 1956 |
| C | 597,612 | | Digital data transmission system | R. Cypser et al. | July 13, 1956 |
| D | 570,199 | 2,914,248, issued Nov. 24, 1959 | Electronic data processing machine | H. Ross et al. | Mar. 7, 1956 |
| E | 576,976 | 2,887,394, issued May 19, 1959 | Magnetic memory | R. Counihan et al. | Apr. 9, 1956 |
| F | 586,247 | 2,968,791, issued Jan. 17, 1961 | Buffer storage system | E. Johnson et al. | May 21, 1956 |
| G | 582,576 | 2,932,010, issued Apr. 5, 1960 | Data storage system | R. Mayer et al. | May 3, 1956 |
| H | 414,459 | | Electronic digital computer | B. Sarahan et al. | Mar. 5, 1954 |
| I | 612,266 | | Control equipment | R. Cypser et al. | Sept. 26, 1956 |
| J | 484,677 | 2,846,669, issued July 5, 1958 | Magnetic core circuit | W. McMillan et al. | Jan. 28, 1955 |

In certain computer applications it is necessary to cause one operand to mathematically operate upon each of two other operands. These operations are referred to as "twin" operations. In conversion from polar to rectangular coordinates, for example, it is necessary to cause the *r* coordinate to be multiplied by the sine function of the $\theta$ coordinate as well as the cosine function of the $\theta$ coordinate in order to obtain the X and Y rectangular coordinates.

In accordance with the principles of this invention, two distinct arithmetic elements (called the Left Arithmetic Element and the Right Arithmetic Element) are provided. Each element includes an A register, an adder, an accumulator and a B register. The operand which is to operate on each of two other operands is placed in the A register of both arithmetic elements. One of the two other operands is delivered to the Left Arithmetic Element and the other of the two operands is delivered to the Right Arithmetic Element. If a twin multiplication or division operation is to take place, one of the two other operands is stored in the B register of the Left Arithmetic Element while the other of the two operands is stored in the B register of the Right Arithmetic Element and those two Arithmetic Elements are caused to simultaneously perform multiplication or division operations, the two products or quotients appearing in the separate accumulators. If a twin add or subtract operation is to take place, one of the two other operands is placed in the accumulator of the Left Arithmetic Element while the other of the two operands is placed in the accumulator of the Right Arithmetic Element and those elements are caused to simultaneously perform either an add operation or a subtract operation, the sum or the difference appearing in the separate accumulators.

It is an object of this invention to provide an improved computer wherein one operand can mathematically operate on each of two other operands simultaneously.

It is a further object of this invention to provide an improved electronic computer of the stored program type wherein two arithmetic circuits, an instruction decoder and command generator are provided that are so constructed as to execute an instruction to perform two identical mathematical operations simultaneously on two sets of operands, the two sets having one operand in common.

It is another object of this invention to provide an improved electronic computer of the stored program type having a memory device, two separate arithmetic elements, and an instruction decoder with command generators wherein in response to certain instructions the command generators cause a given operand to be delivered from the memory device to each of the arithmetic elements and those elements employ that operand to produce two mathematical results, one result being a function of the given operand and a second operand and the other result being a function of the given operand and a third operand.

It is still another object of this invention to provide an improved electronic calculator of the stored program type having a memory device, two separate arithmetic elements, a program counter, and an instruction decoder with command generators wherein the command generators cause signals representative of an instruction specified by signals produced by the program counter to be delivered from the memory device to the instruction decoder, and in response to those instruction signals the signals representative of a first operand are caused to be delivered from the memory device to each of the arithmetic elements where the signals representative of the first operand are caused to produce a first result signal in one of the arithmetic elements which is a function of the signals representative of the first operand and signals representative of a second operand and furthermore the signals representative of the first operand are caused to produce a second result signal in the other arithmetic element which is a function of the signals representative of the first operand and signals representative of a third operand.

Other objects of the invention will be pointed in the following description and claims and illustrated in the accompanying drawings, which disclose, by way of example, the principle of the invention and the best mode, which has been contemplated, of applying that principle.

In the drawings:

FIG. 1 is a simplified block diagram of a control equipment constructed in accordance with the principle of this invention.

FIG. 1*a* is a simplified block diagram of a computing device constructed in accordance with the principle of this invention.

Figure 1:
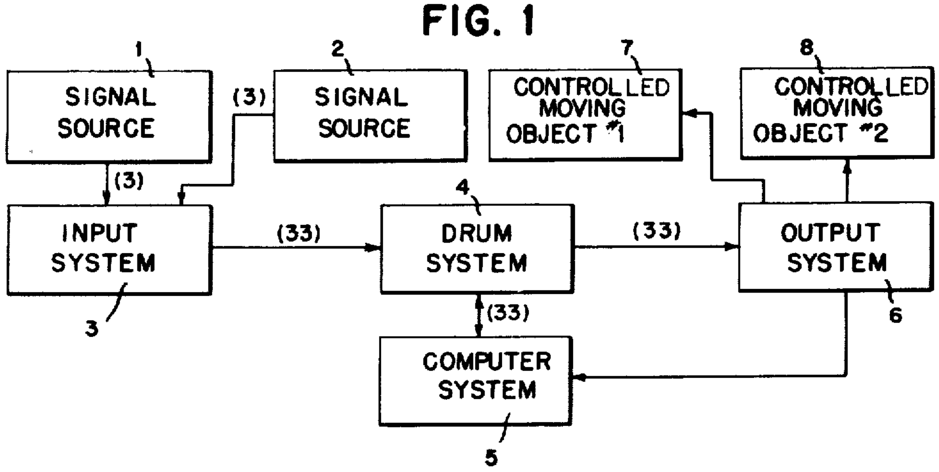
Figure 3:
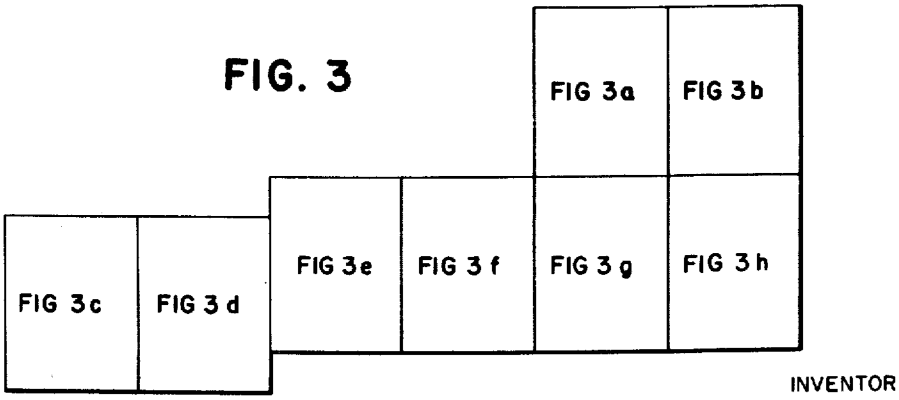
FIG. 3 is a diagram which illustrates the manner in which FIGS. 3*a* through 3*h* should be arranged to effect interconnection of the circuits in those figures.

FIGS. 3*a* through 3*h*, when arranged according to FIG. 3, are a simplified block diagram of parts of FIG. 1 identified as the input system, output system, drum system and computer system.

Figure 4:
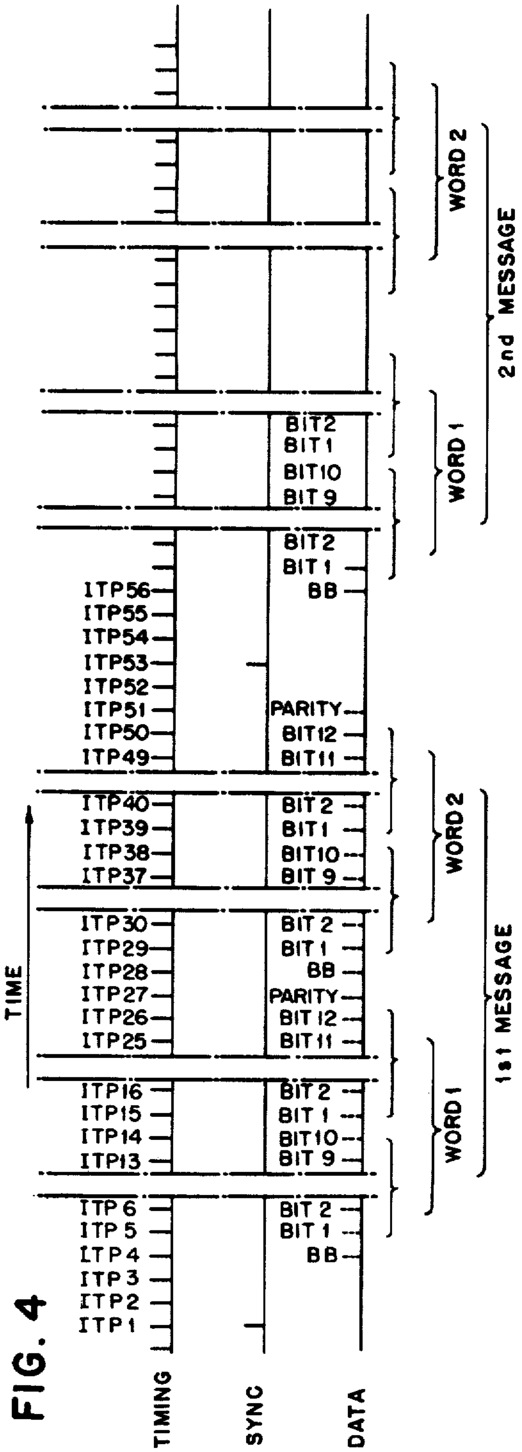

FIG. 4 is a timing diagram illustrating the timing relationship between timing, sync. and data signals received by the input system.

Figure 5:
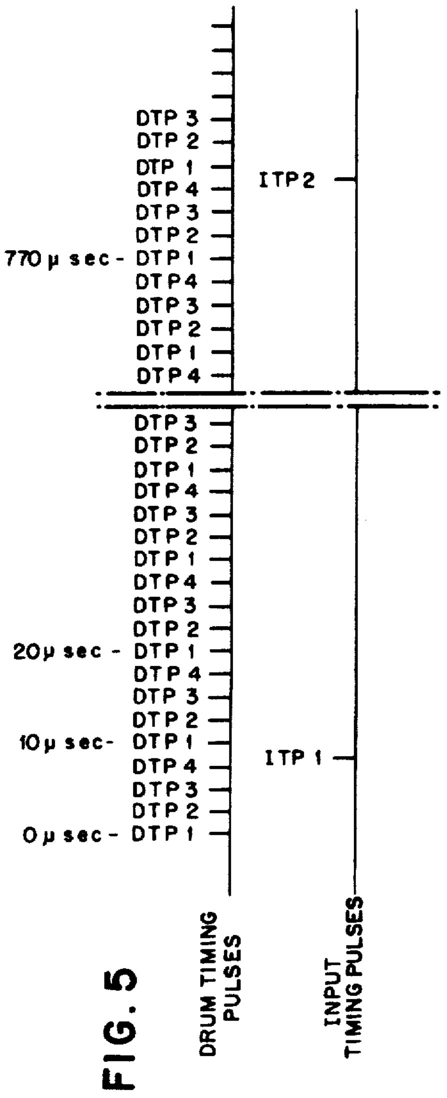

FIG. 5 is a timing diagram illustrating the timing relationship between the input timing signals and the drum timing signals.

Figure 6:
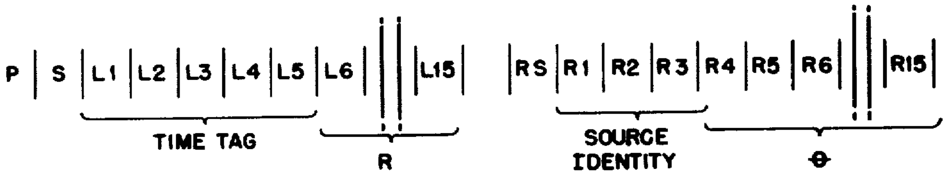

FIG. 6 is a diagram illustrating the drum word layout of signals delivered by the input system to the drum system.

Figure 7:
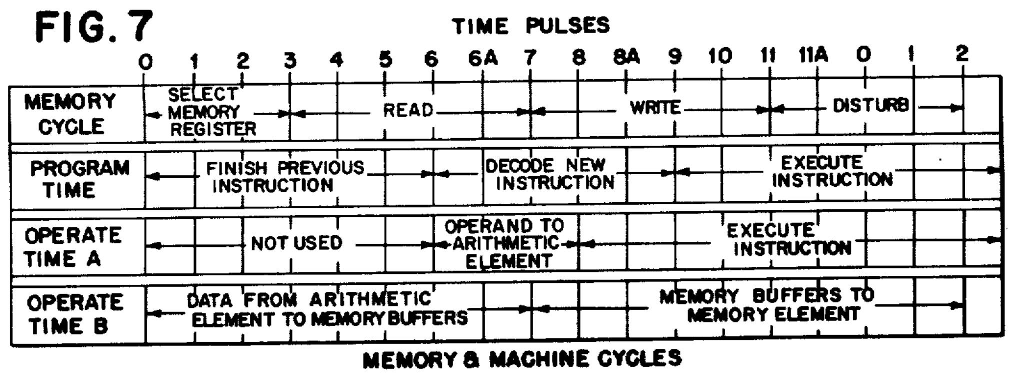

FIG. 7 is a timing chart which illustrates timing relationship between various cycyles of operation in the computer system.

Figure 8:
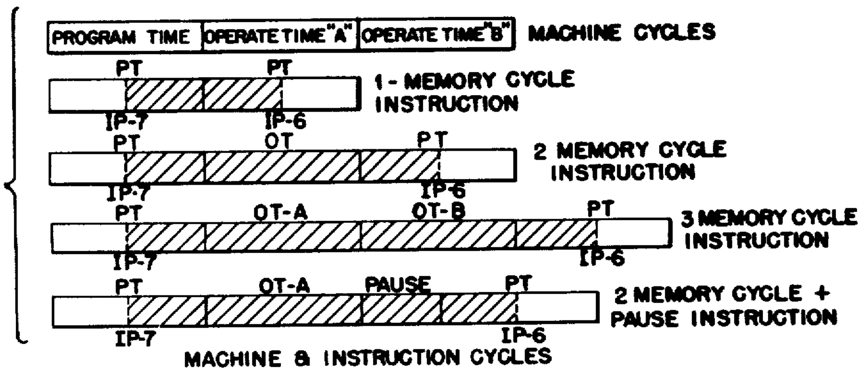

FIG. 8 is a timing chart which illustrates the timing relationship between computer system machine cycles and the different length instruction cycles.

Figure 9:
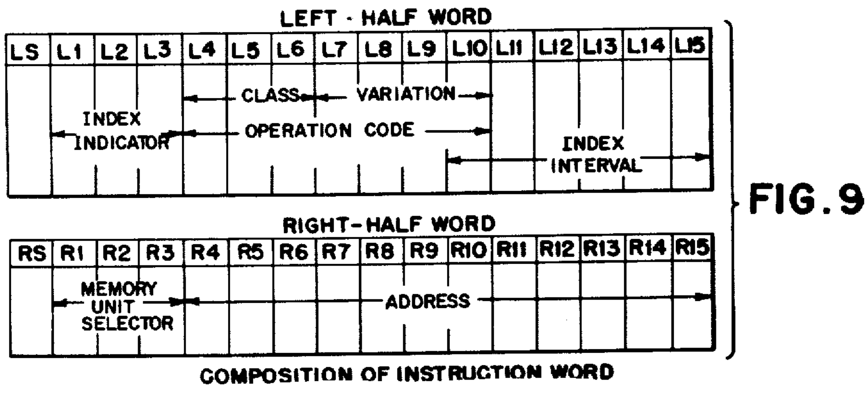

FIG. 9 is a diagram which illustrates word lay-out and bit assignments of computer system instruction words.

Figure 10A:
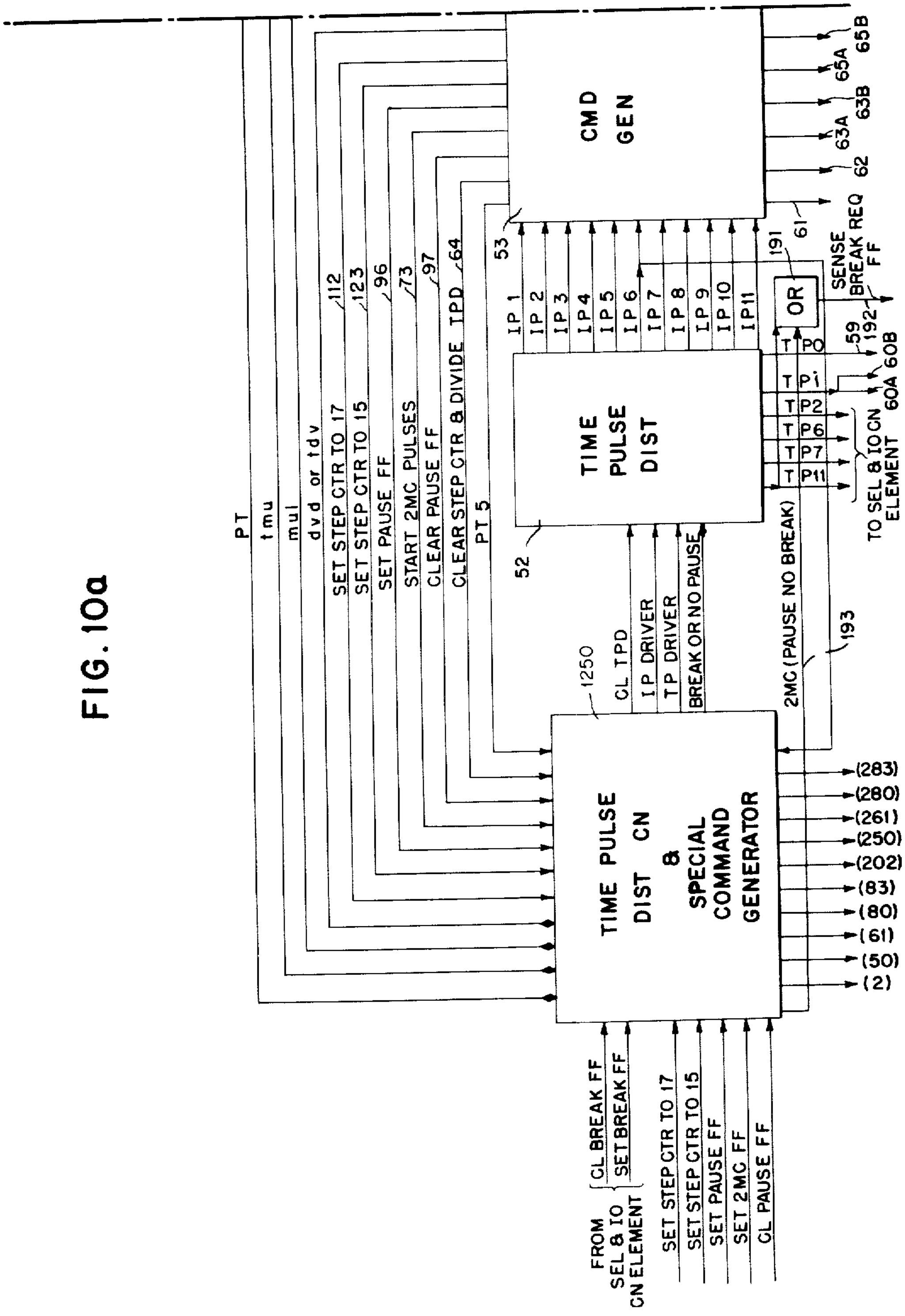
Figure 10B:
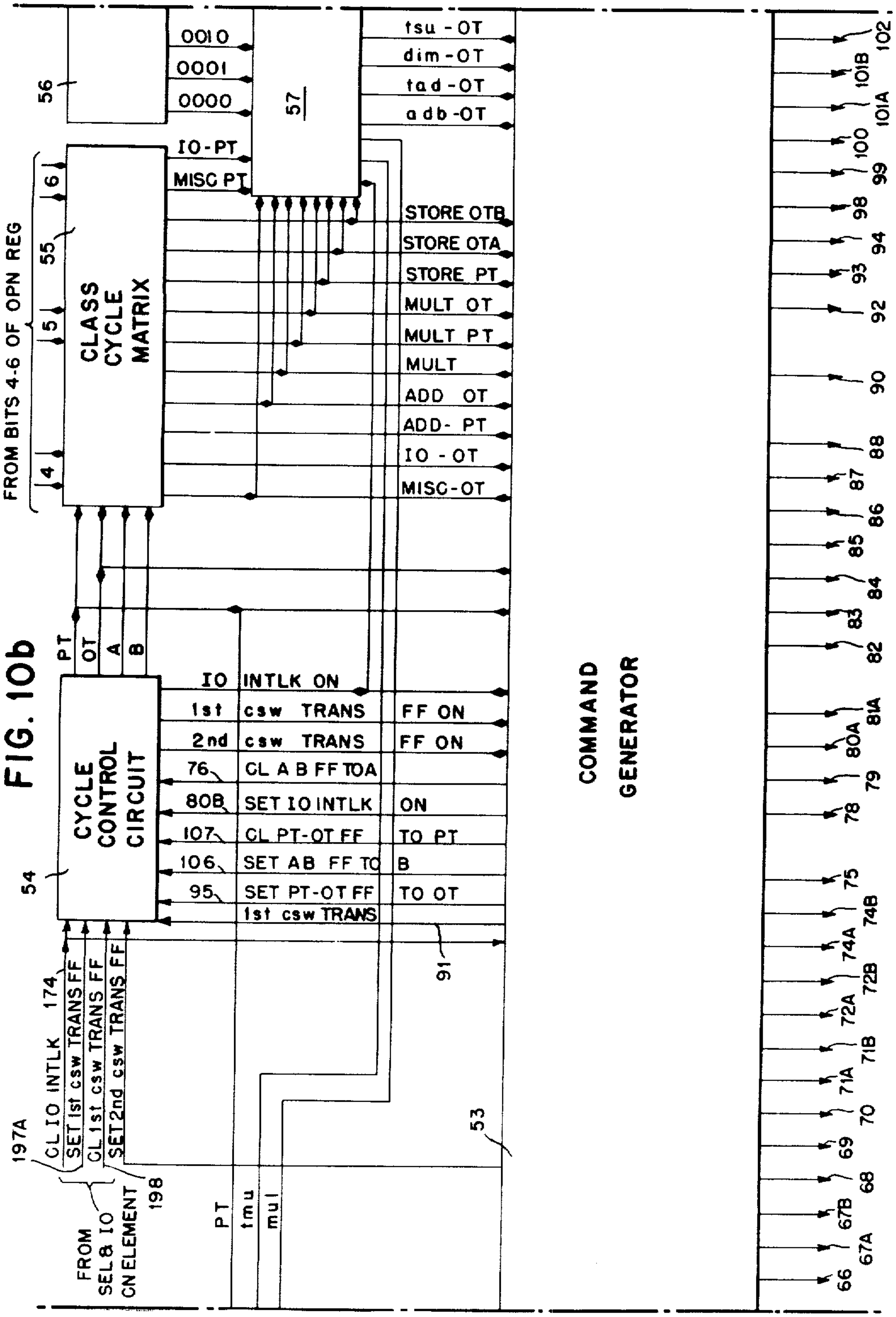
Figure 10C:
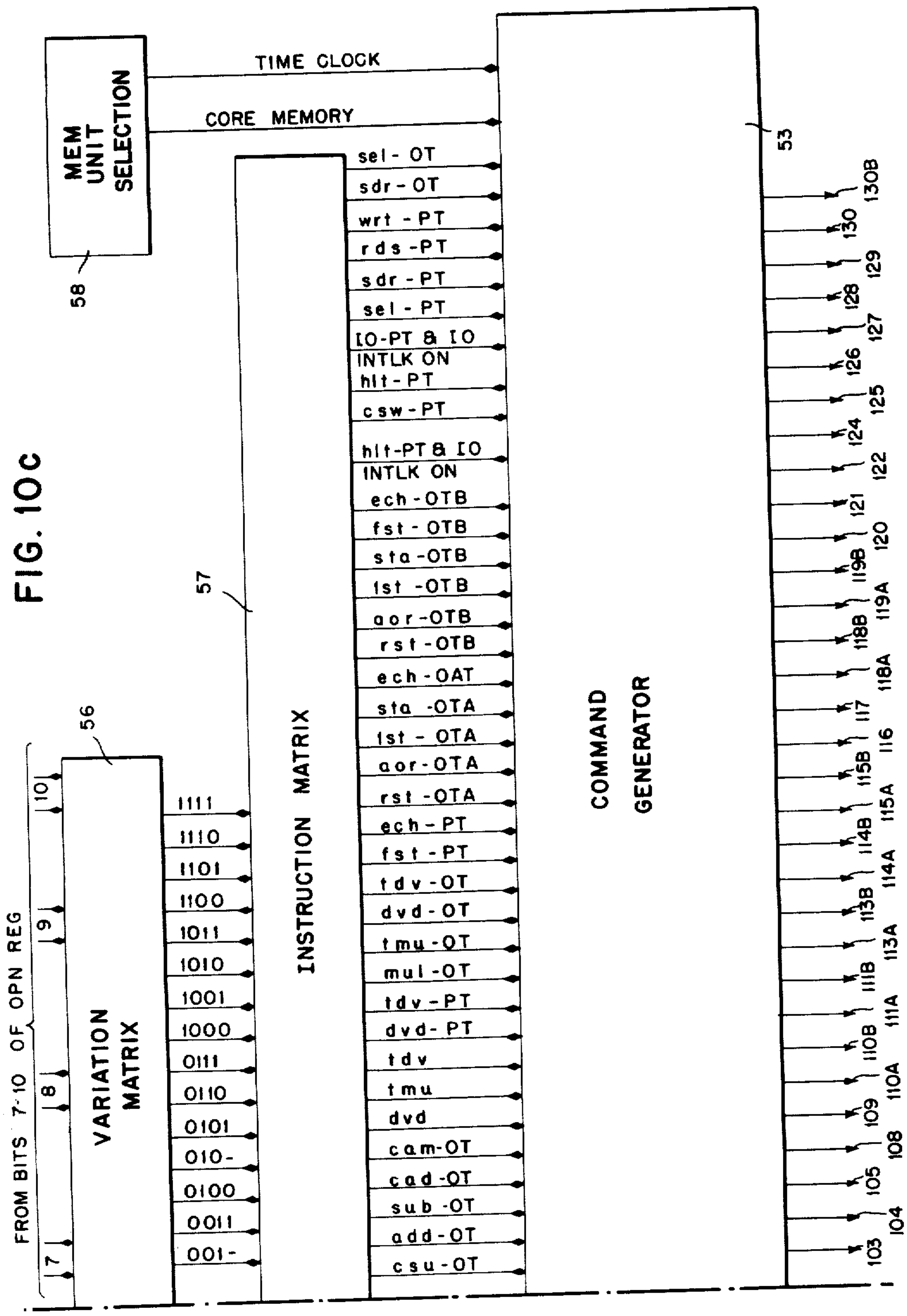

FIGS. 10*a*, 10*b* and 10*c*, when arranged end to end in that order from left to right, is an interconnected block diagram of the Instruction Control Element shown as block 51 in FIGS. 3*a*, 3*b*, 3*g* and 3*h*.

Figure 11A:
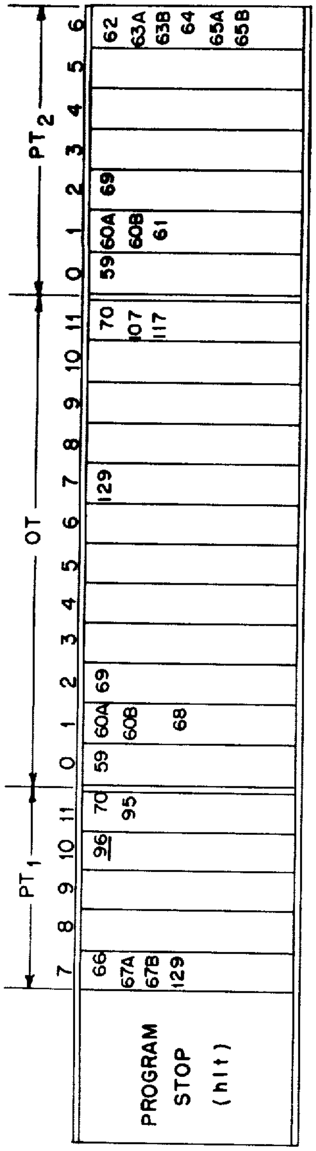
Figure 11B:
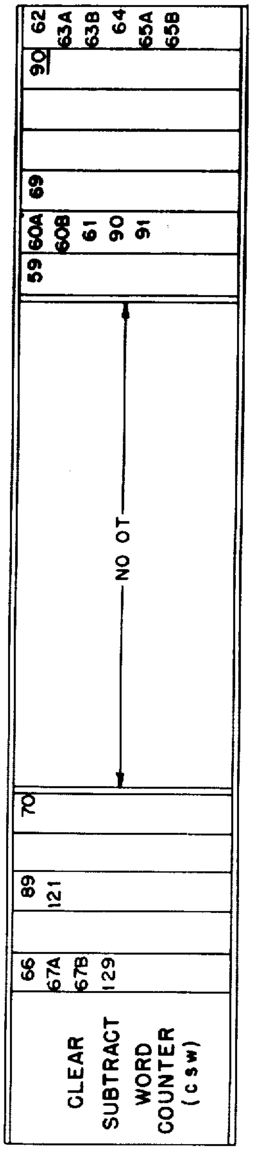
Figure 11C:
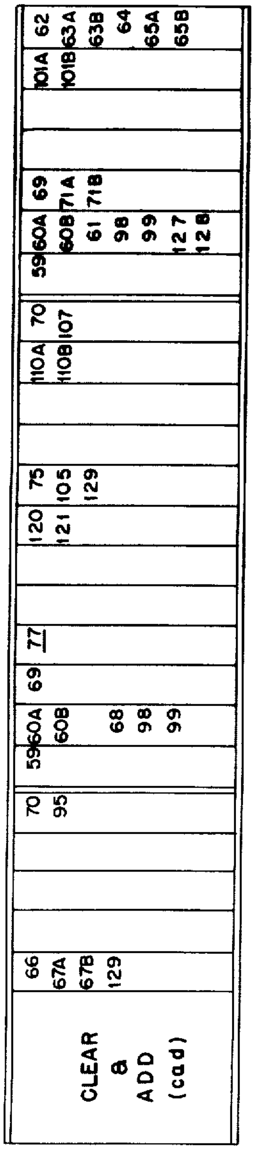
Figure 11D:
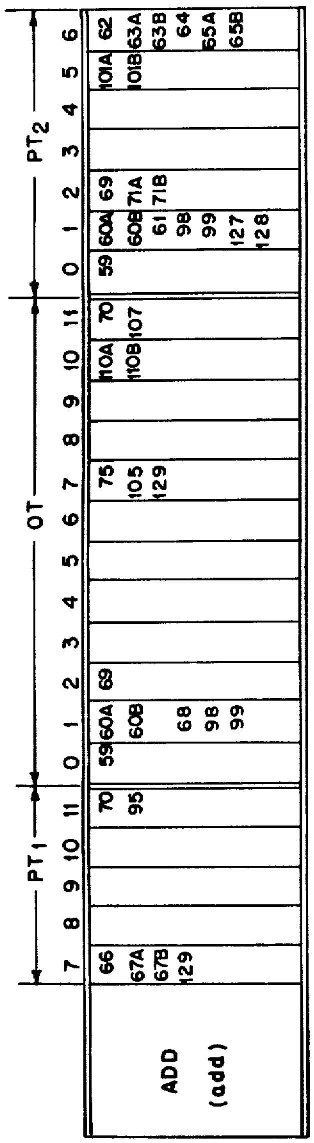
Figure 11E:
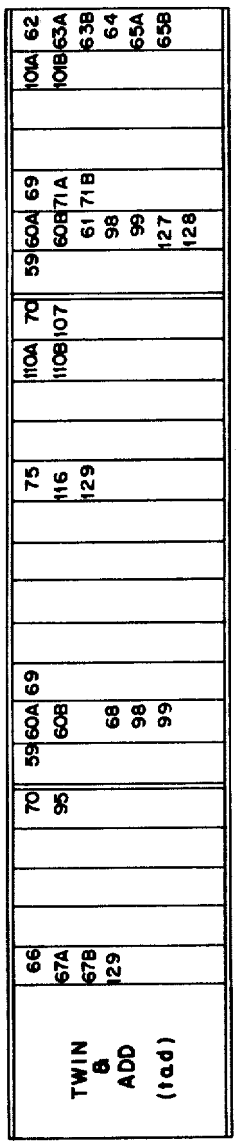
Figure 11F:
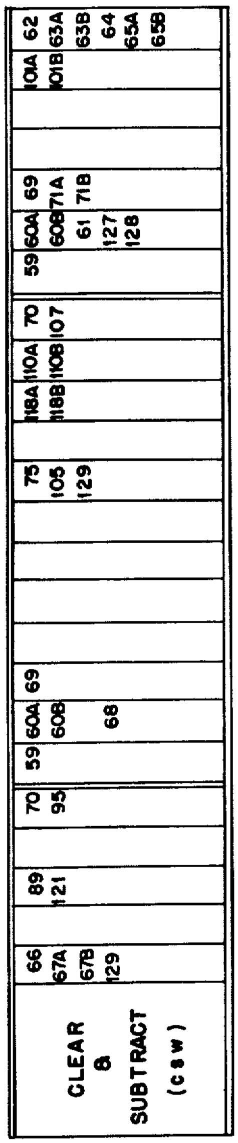
Figure 11G:
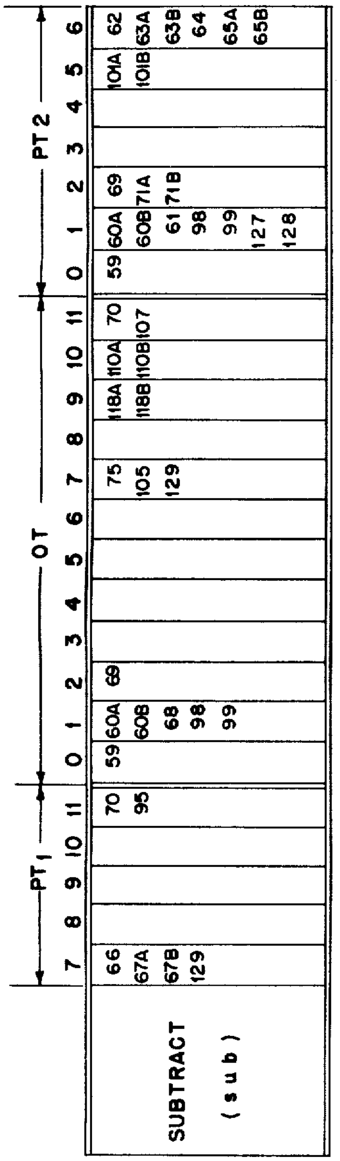
Figure 11H:
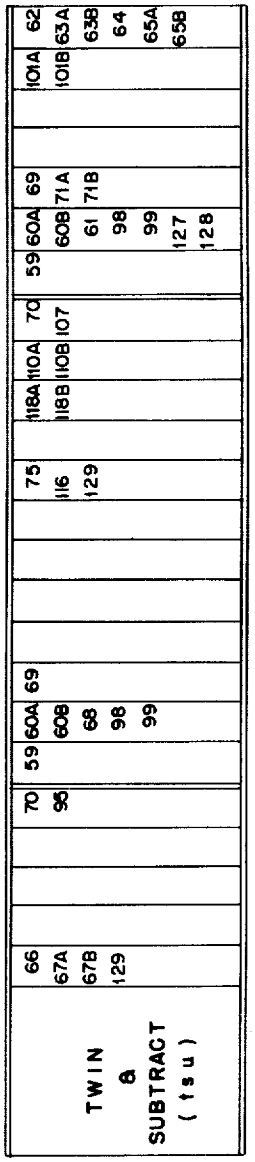
Figure 11I:
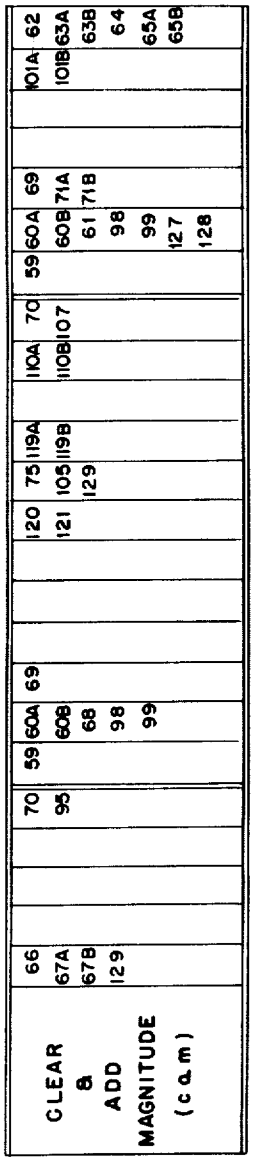
Figure 11J:
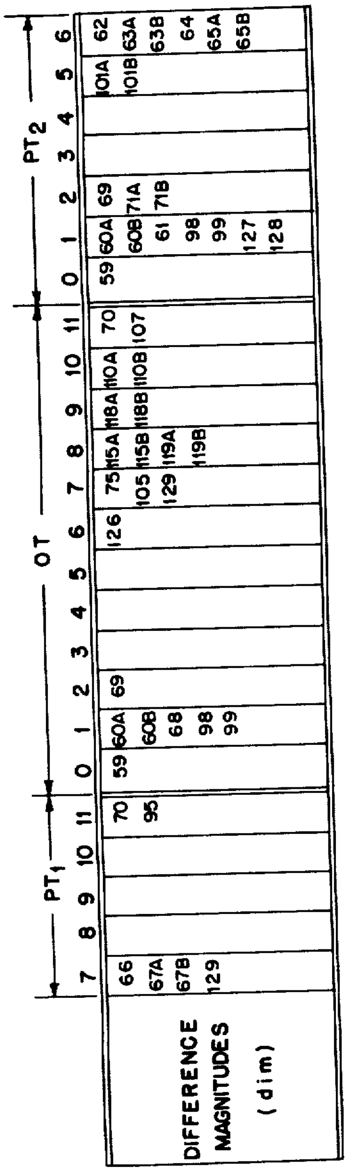
Figure 11K:
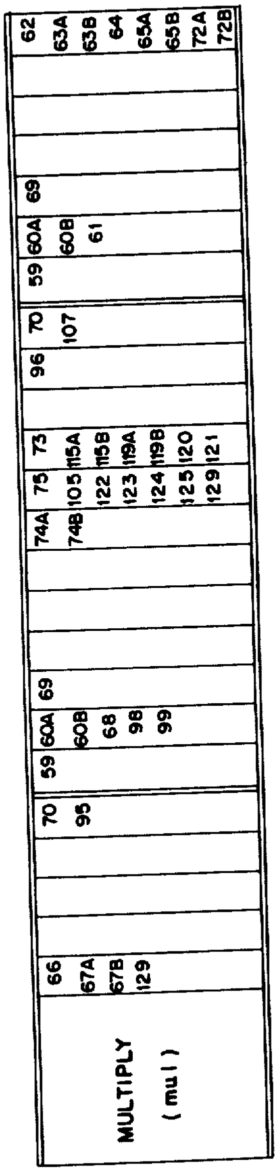
Figure 11L:
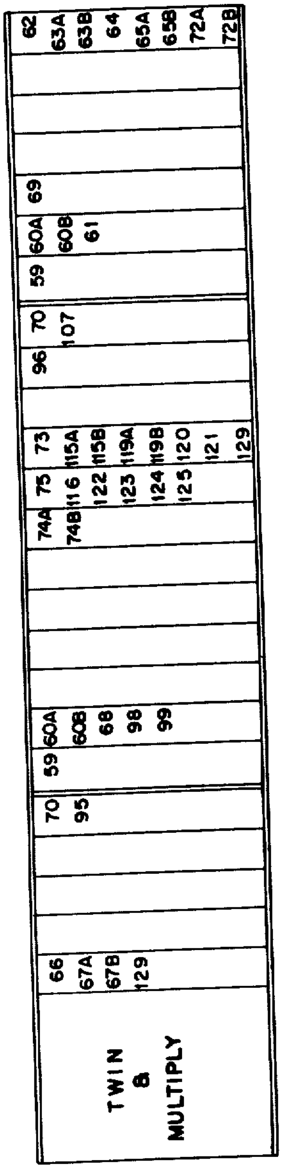
Figure 11M:
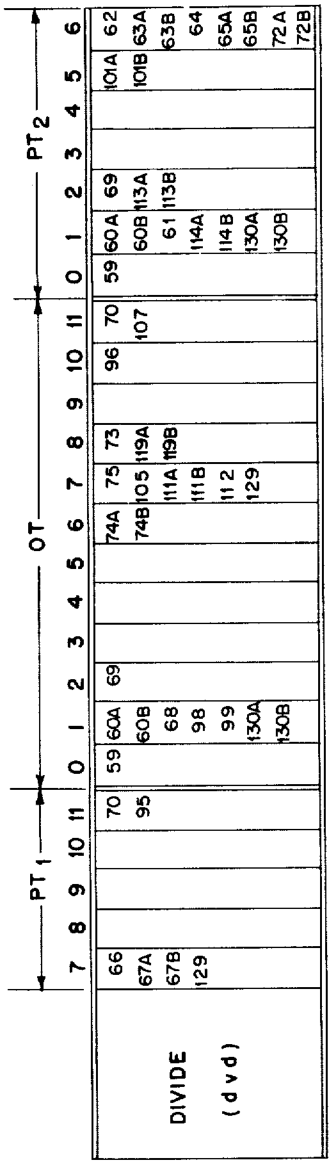
Figure 11N:
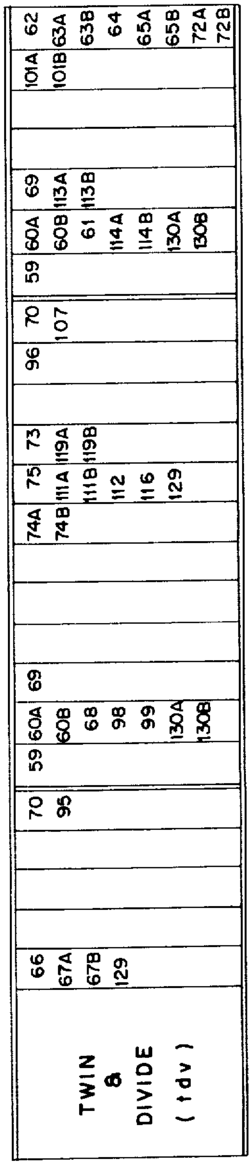
Figure 11O:
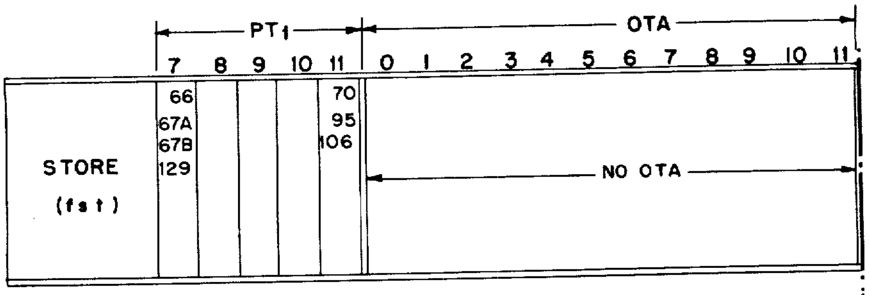
Figure 11P:
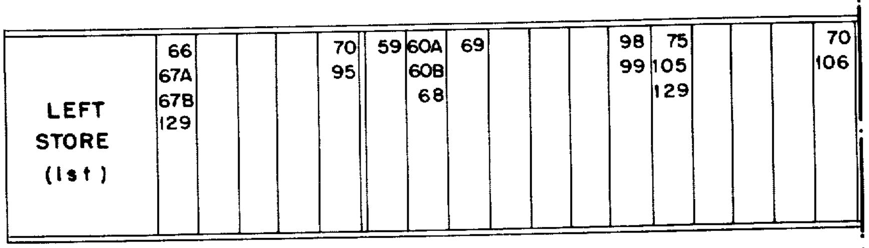
Figure 11Q:
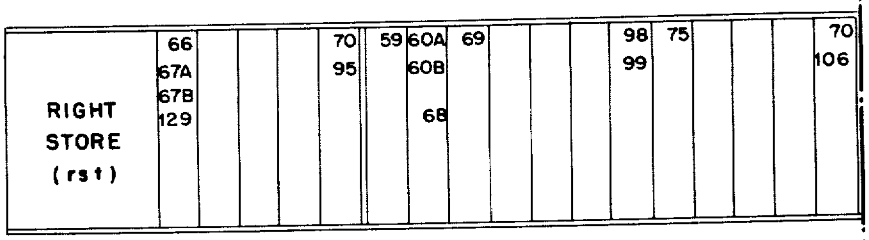
Figure 11R:
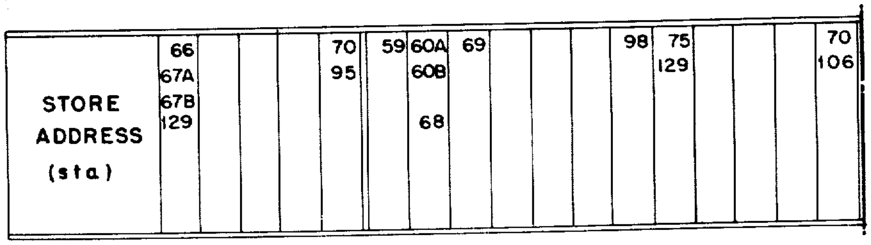
Figure 11S:
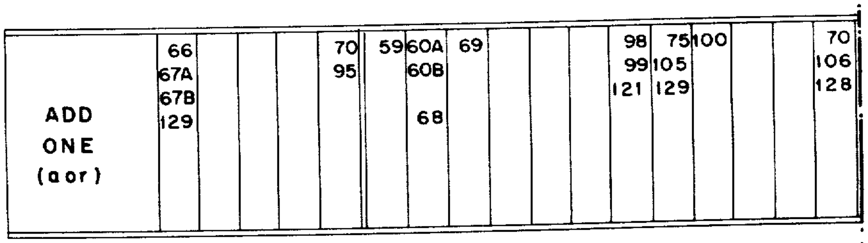
Figure 11T:
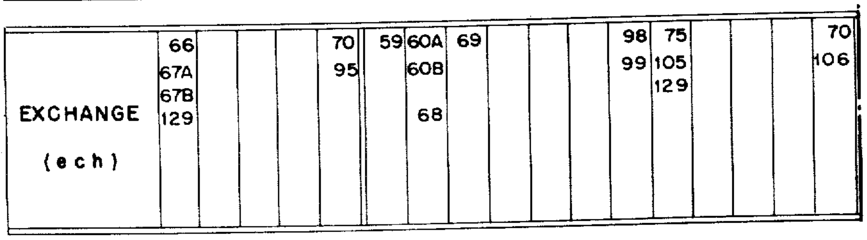
Figure 11O:
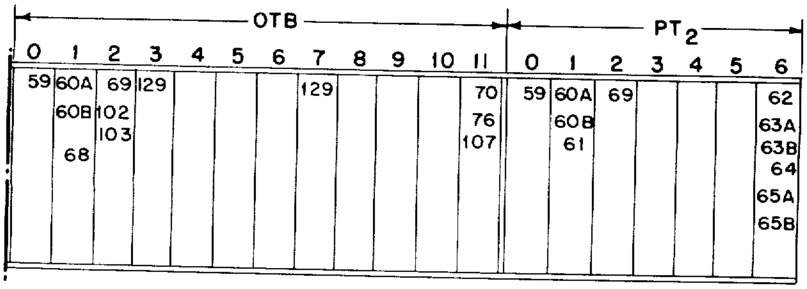
Figure 11P:
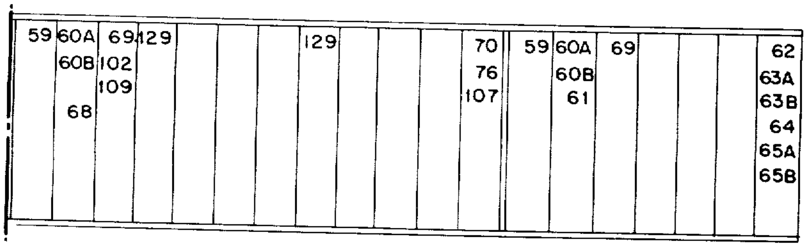
Figure 11Q:
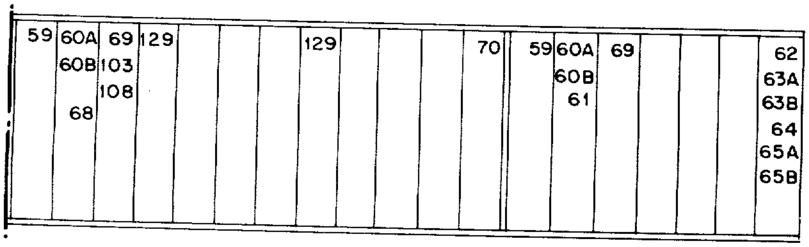
Figure 11R:
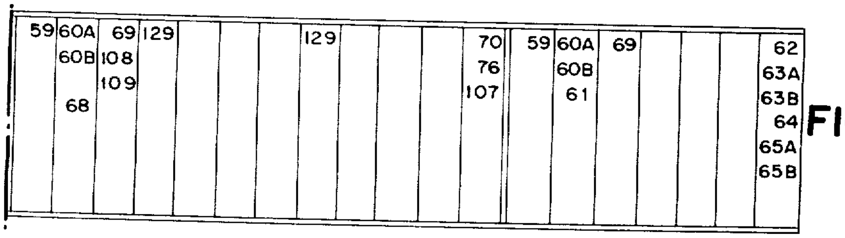
Figure 11S:
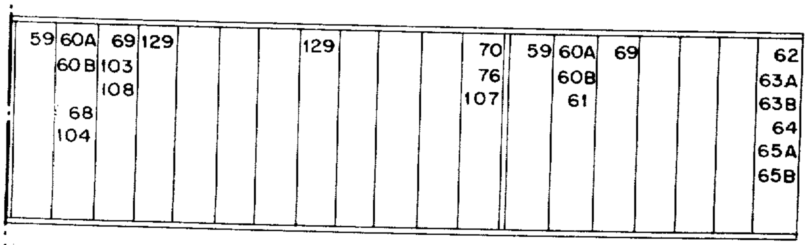
Figure 11T:
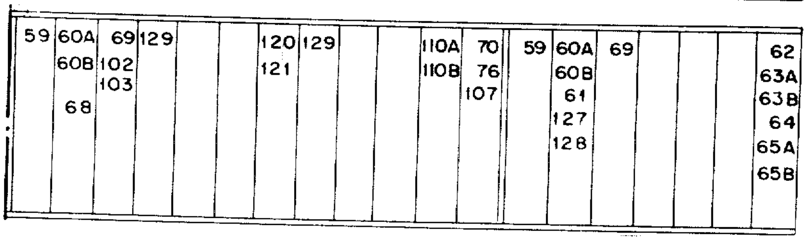
Figure 11U:
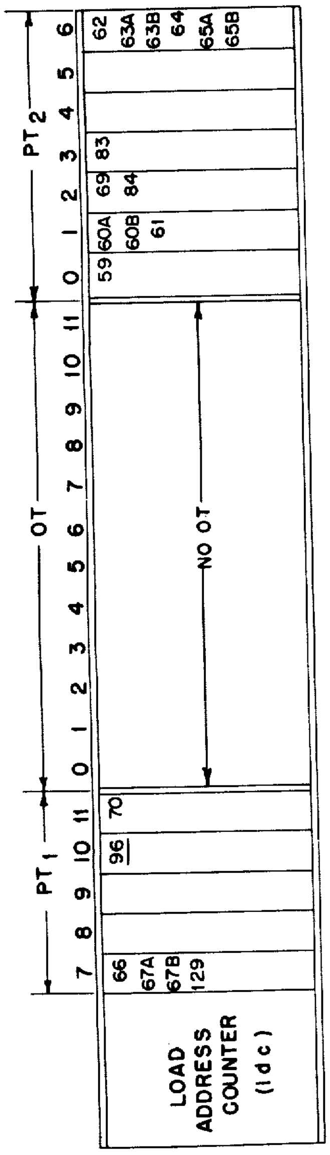
Figure 11V:
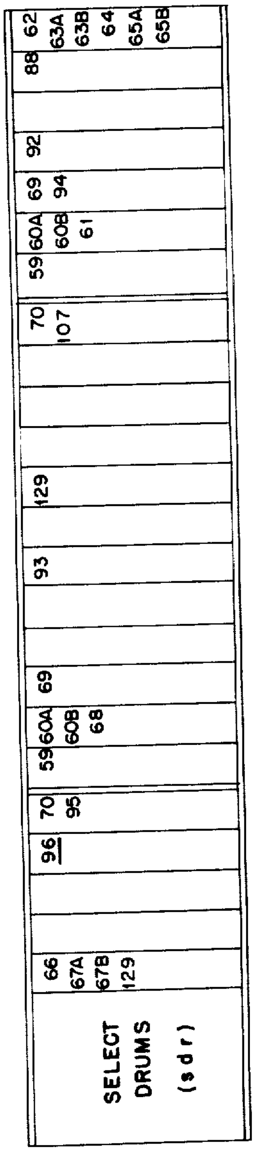
Figure 11W:
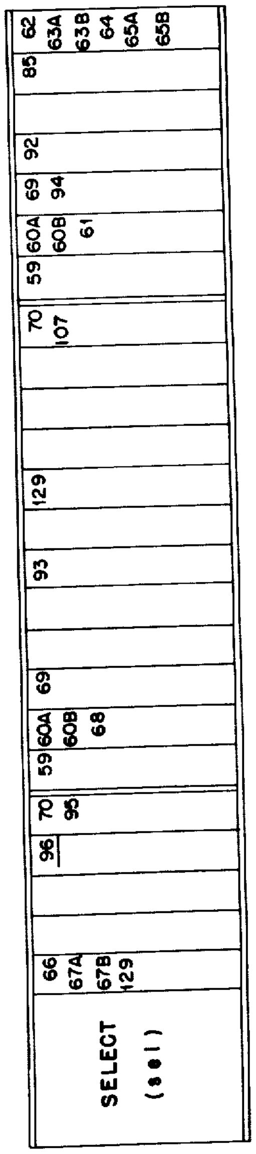
Figure 11X:
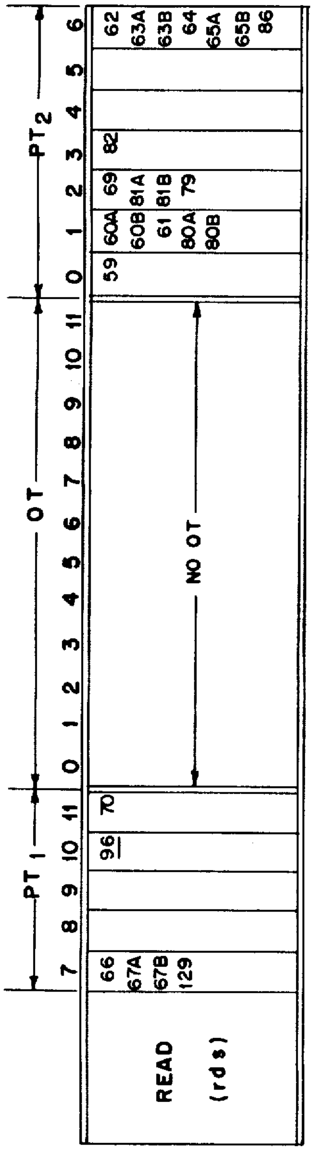
Figure 11Y:
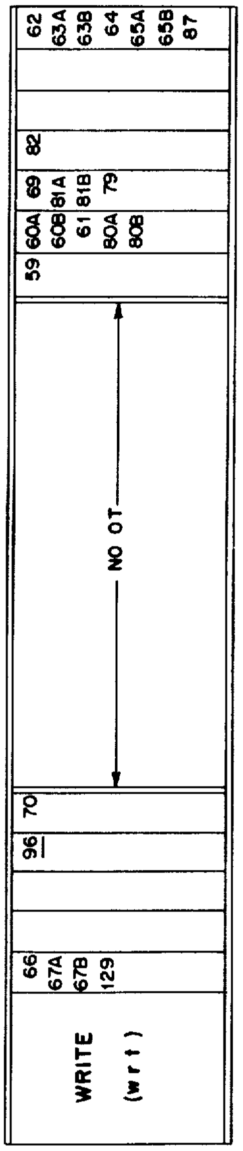

FIGS. 11*a* through 11*y*, including FIGS. 11*oo* through 11*tt* are timing charts which illustrate the commands which are generated and the time of those commands for each of several instructions that the computer system may perform.

Figure 12:
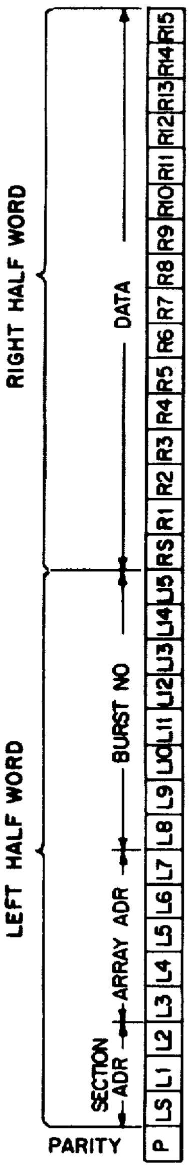

FIG. 12 is a chart which illustrates the functions of the various bits of the words read from the drum and delivered to the output system.

Figure 3A:
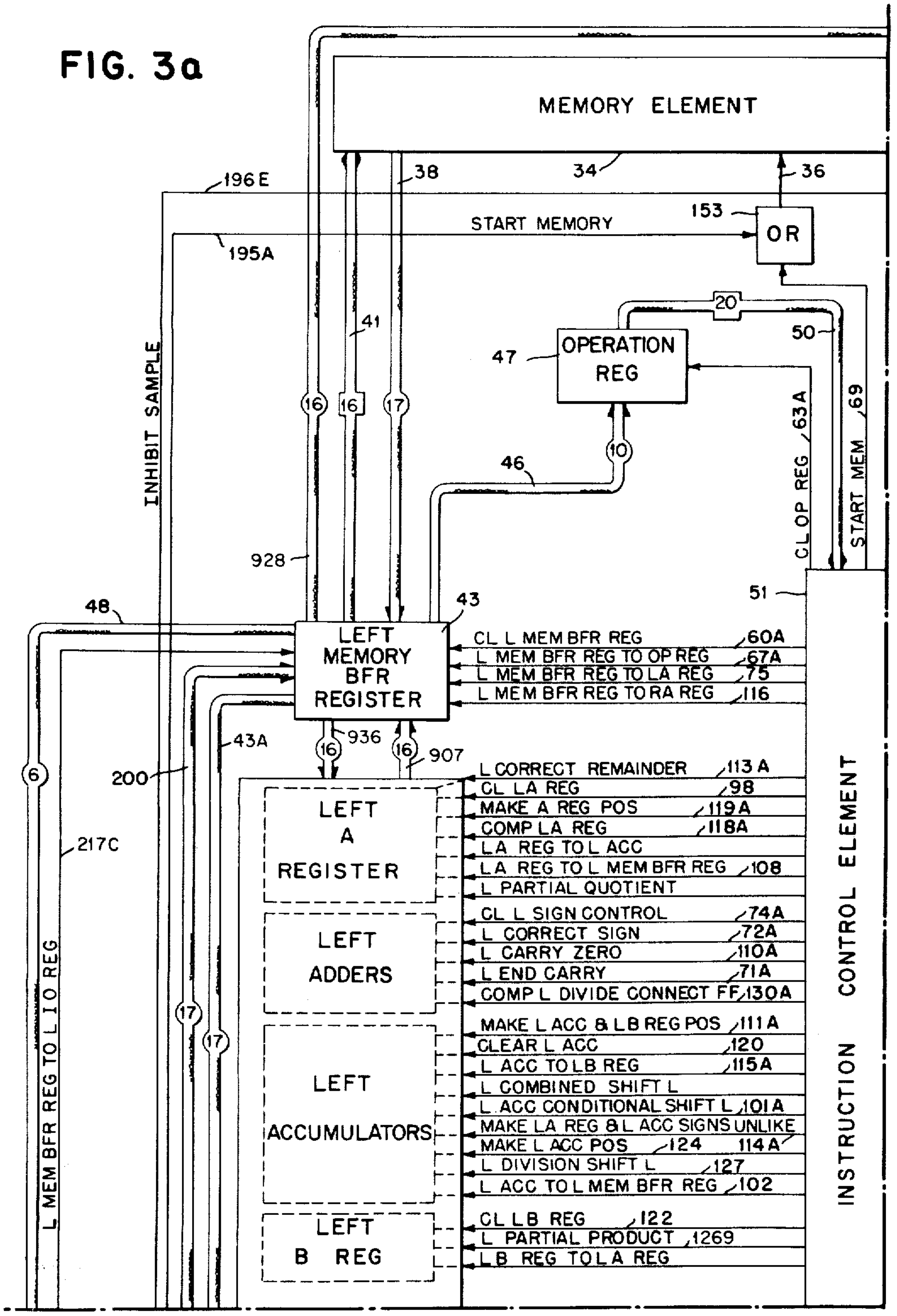
Figure 3B:
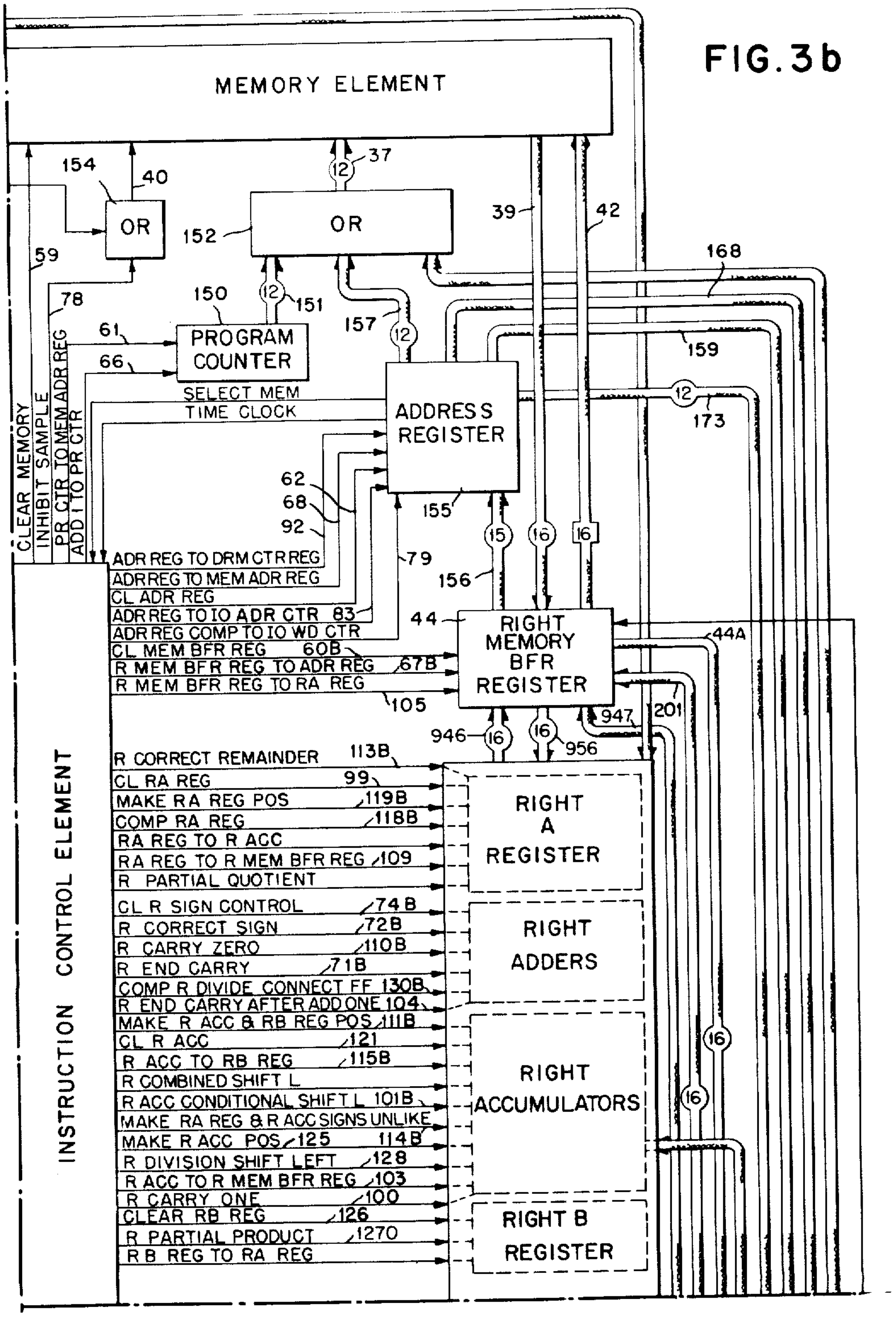
Figure 3C:
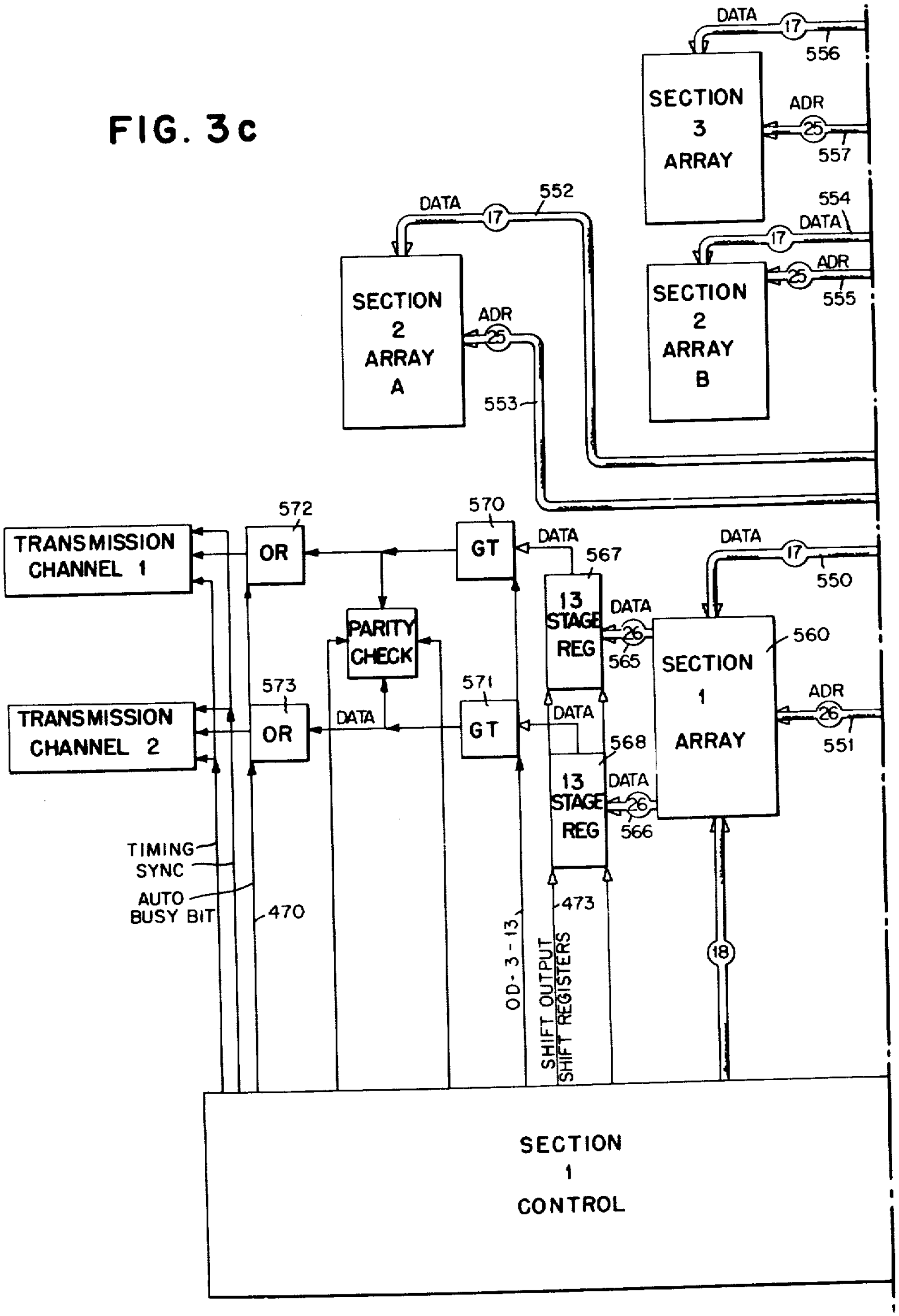
Figure 3D:
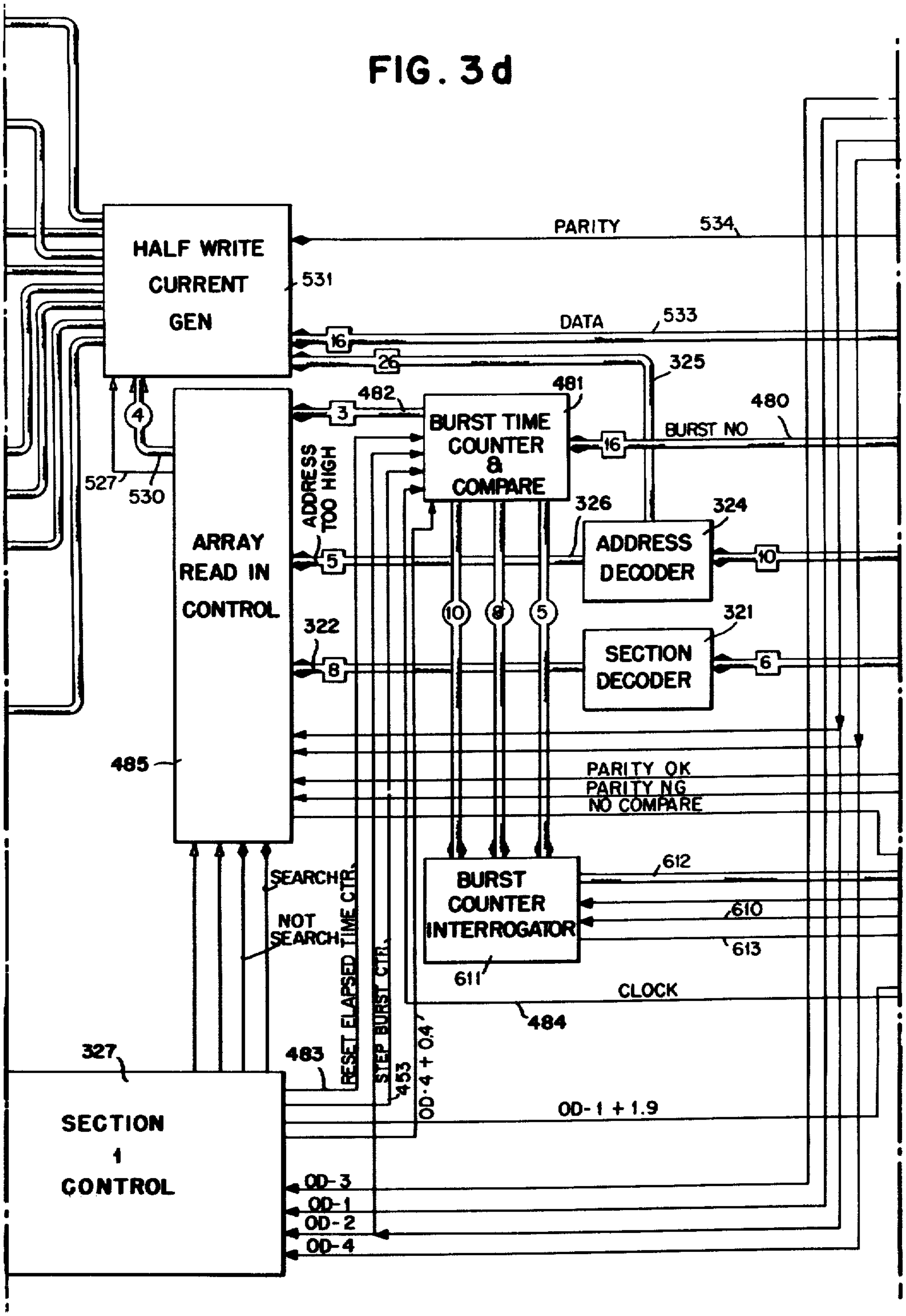
Figure 13A:
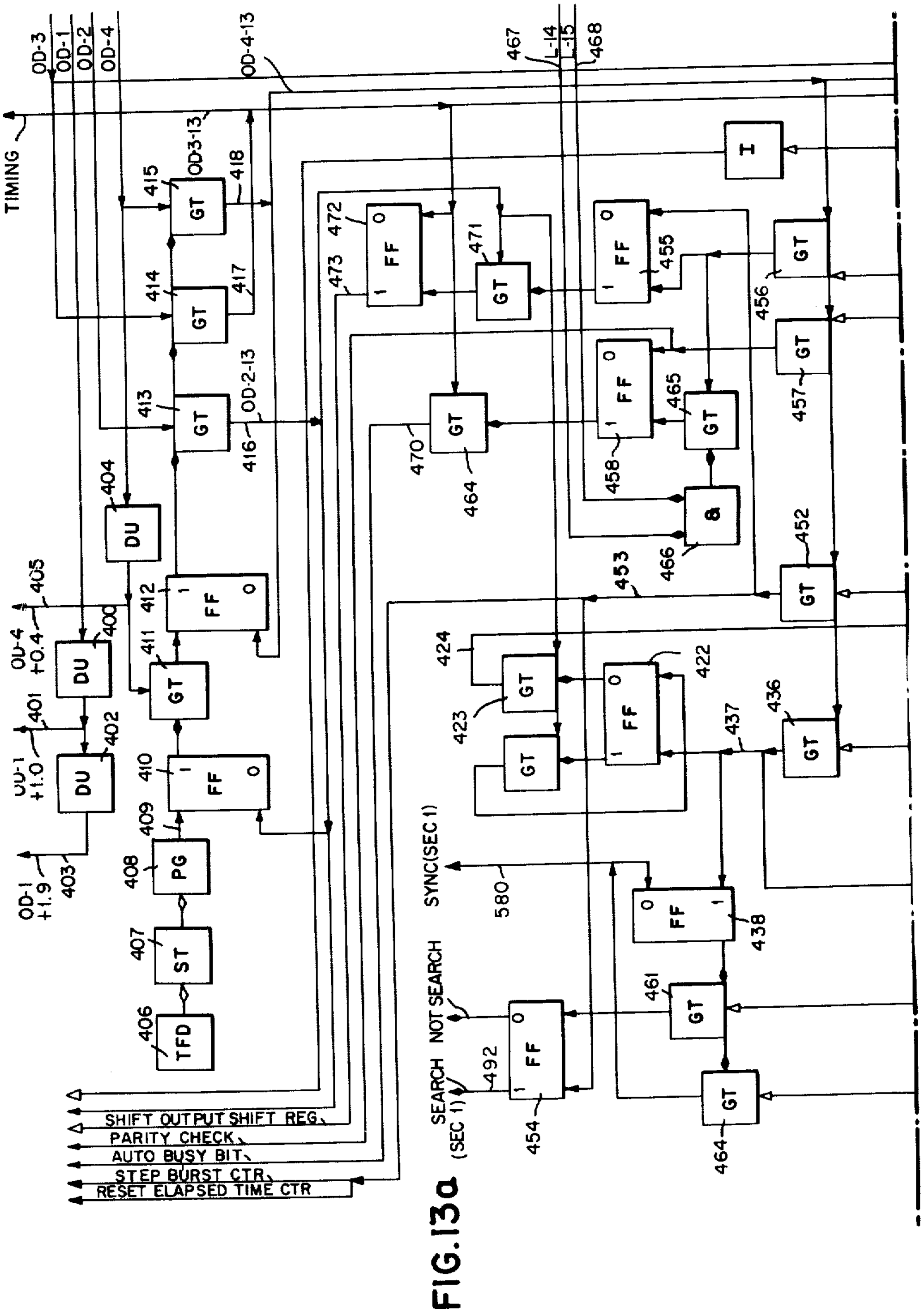
Figure 13B:
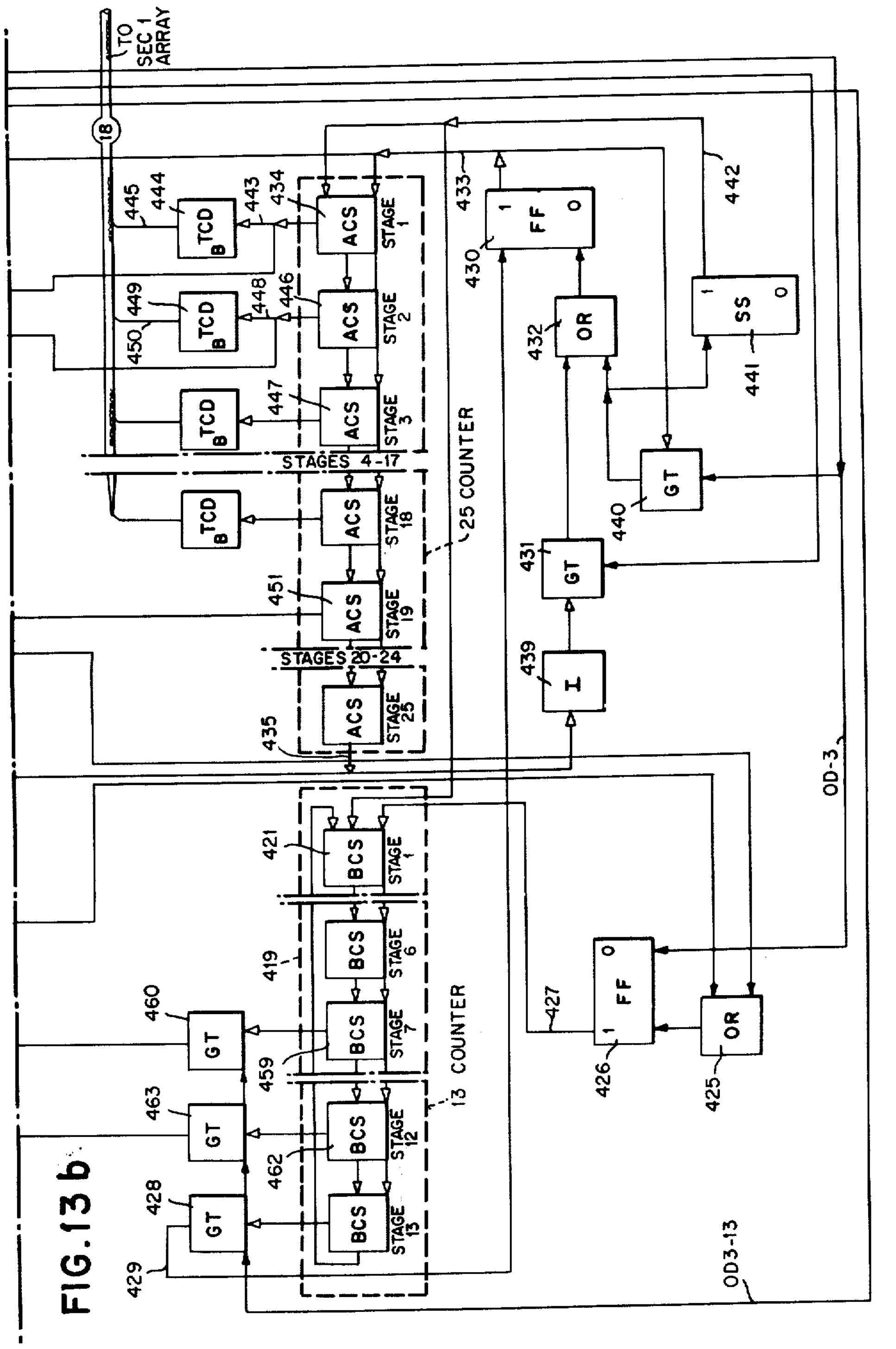

FIGS. 13*a* and 13*b*, which arranged one above the other, form a logical block diagram which illustrates in detail the Section 1 Control shown as block 327 in FIG. 3*d*.

Figure 14A:
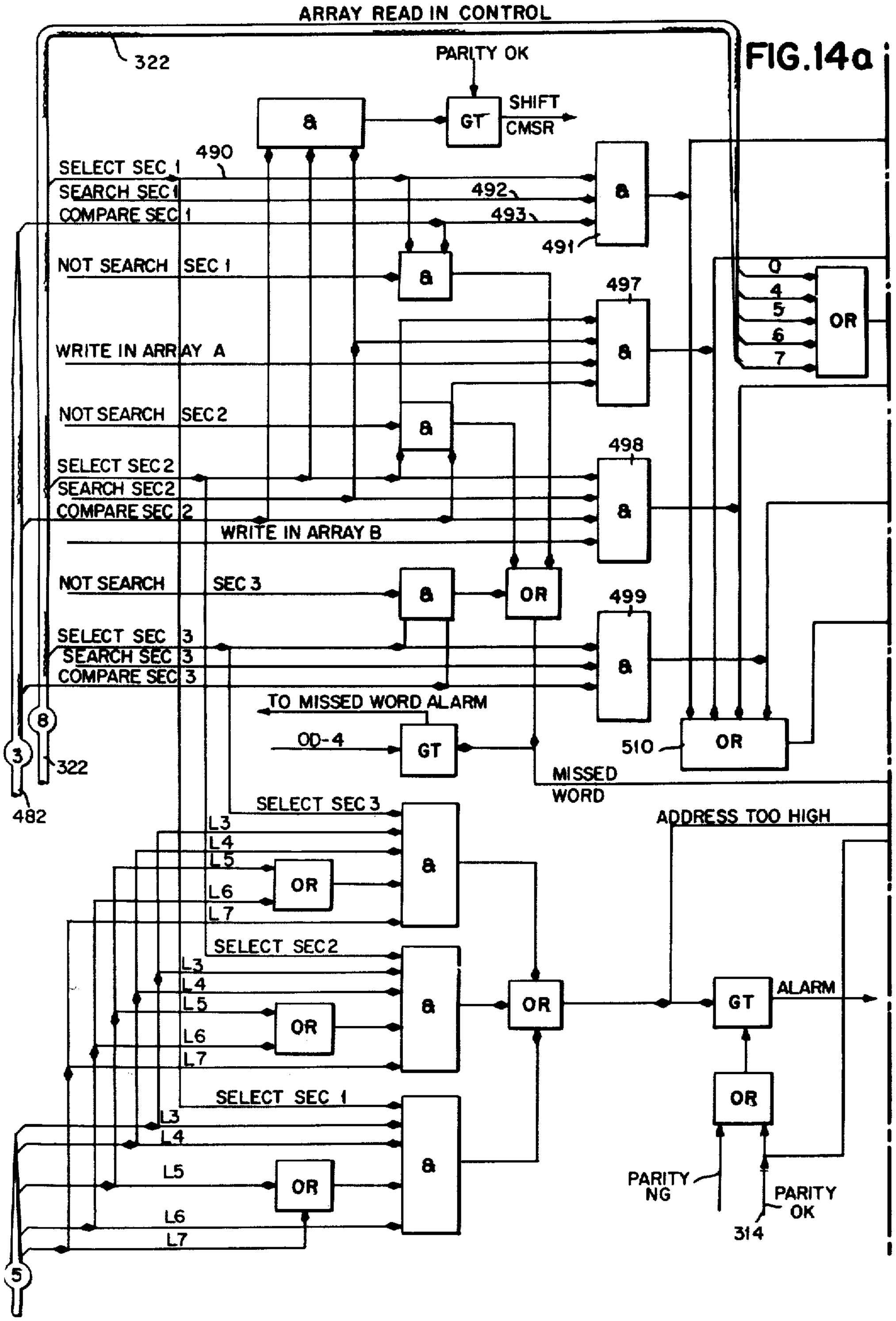
Figures 14B, 15:
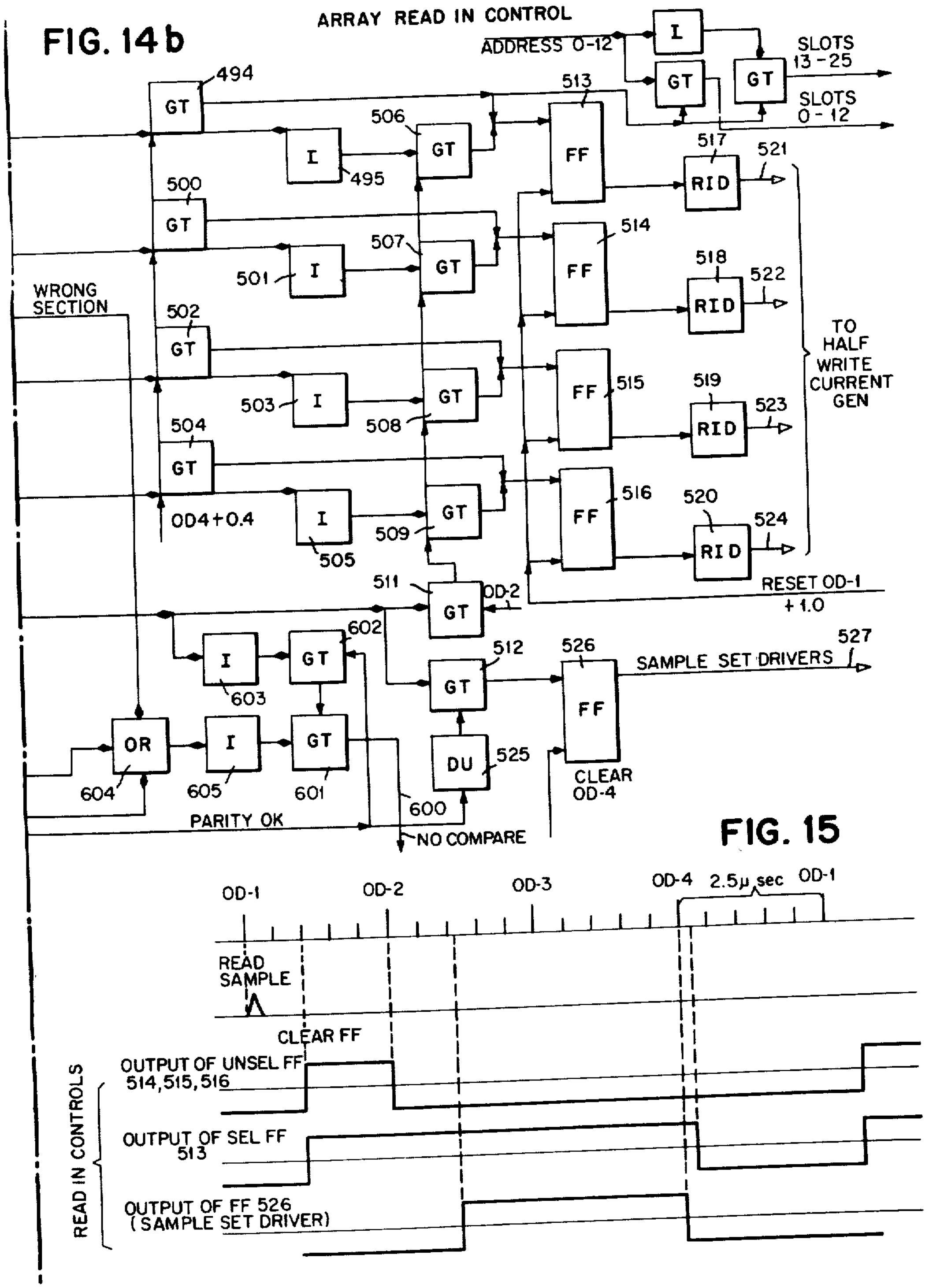

FIGS. 14*a* and 14*b*, when arranged side by side in that order, form a logical block diagram of the Array Read In Control which is shown as block 485 in FIG. 3*d*.

FIG. 15 is a family of curves illustrating in idealized form the potential at various points in the circuit of FIGS. 14*a* and 14*b*.

Figure 16A:
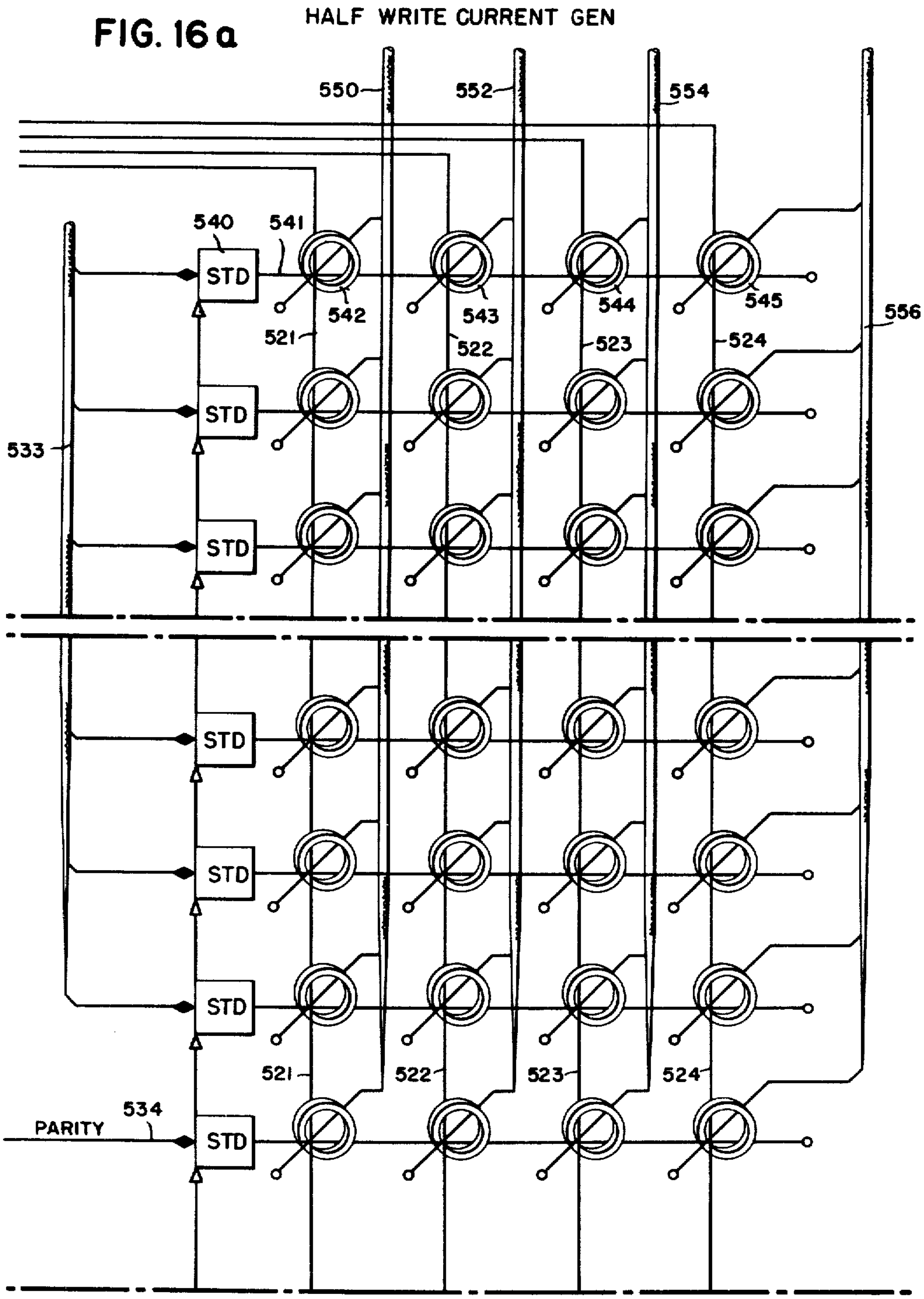
Figure 16B:
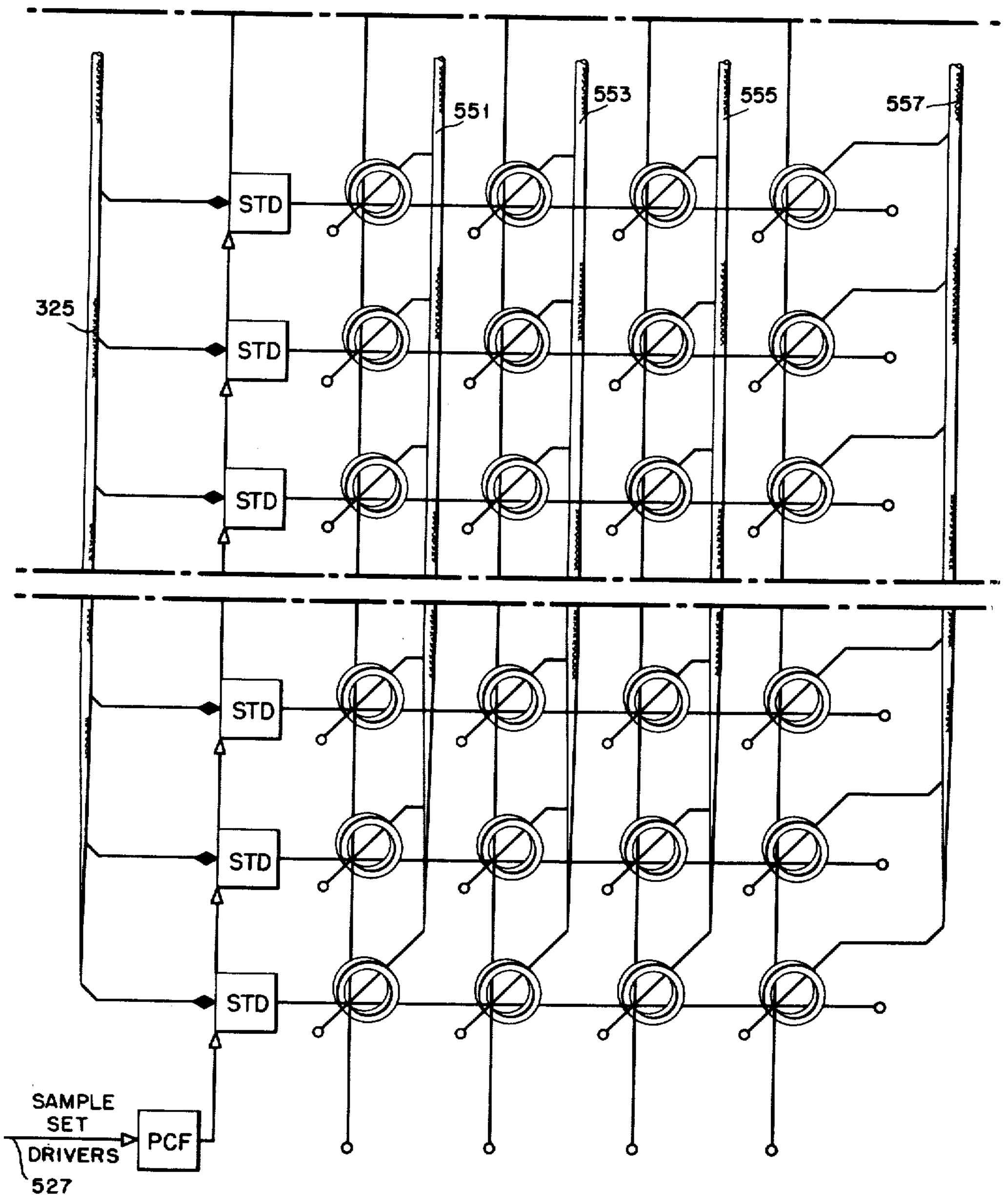

FIGS. 16*a* and 16*b*, when arranged one above the other, form a simplified schematic diagram of the Half-Write Current Generator shown as block 531 in FIG. 3*d*.

Figure 17:
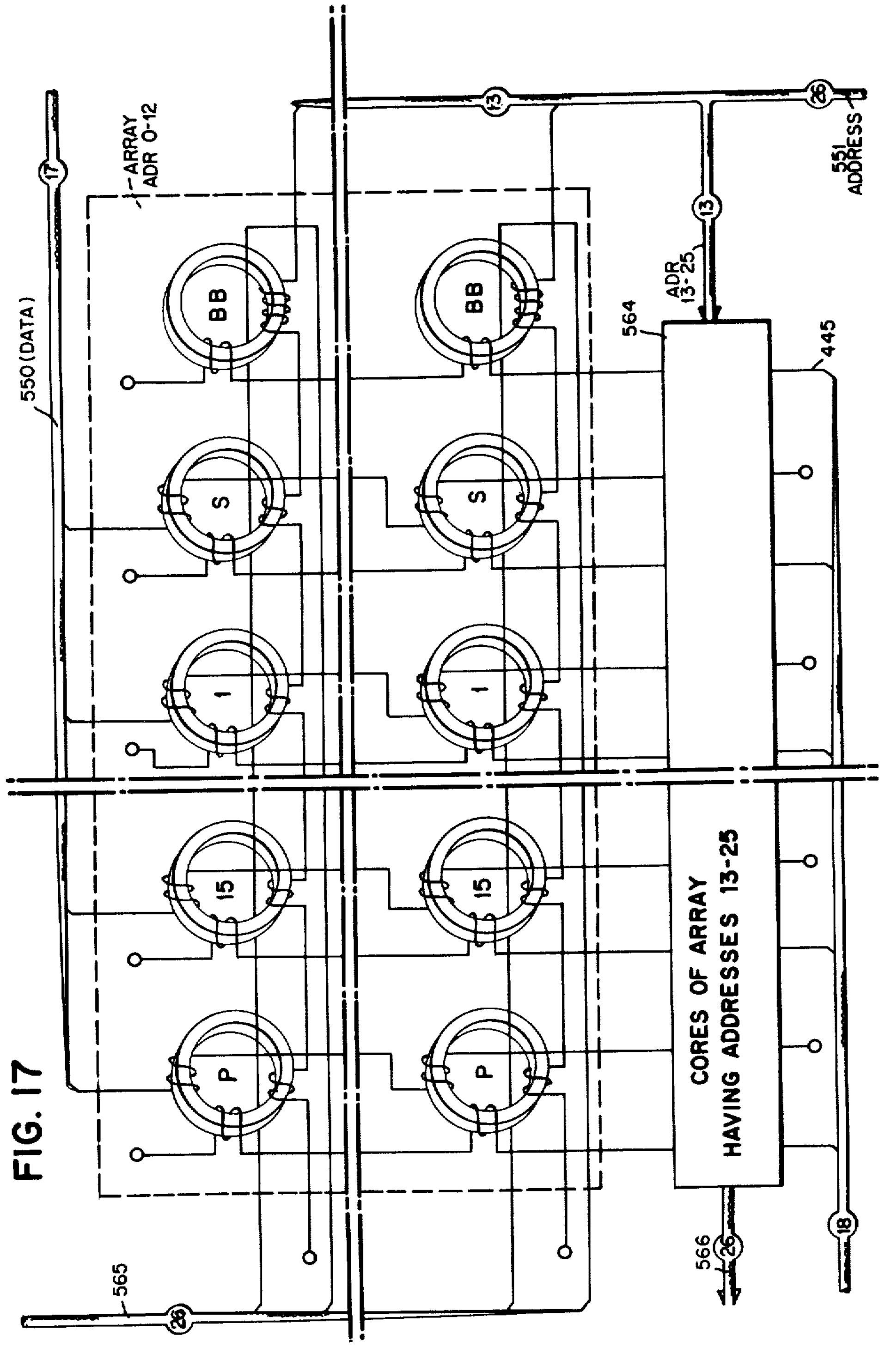

FIG. 17 is a simplified schematic diagram, partly in block form, of the Section 1 Array shown as block 560 in FIG. 3*c*.

Figure 18:
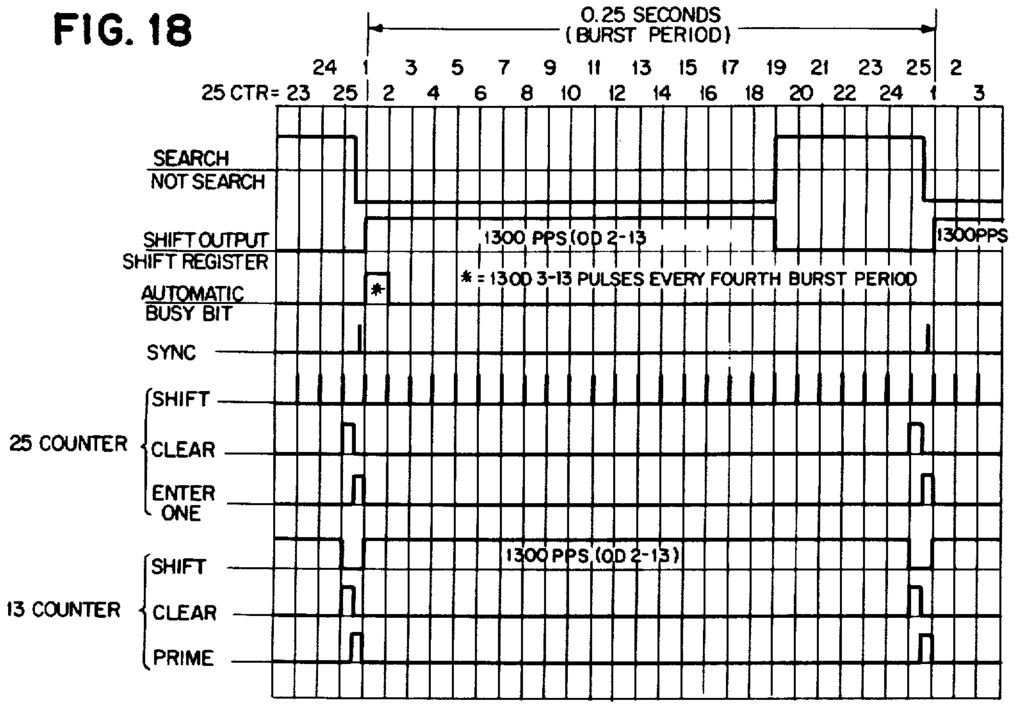

FIG. 18 is a family of curves which illustrates relative timing of operation in the Output System.

Figure 19:
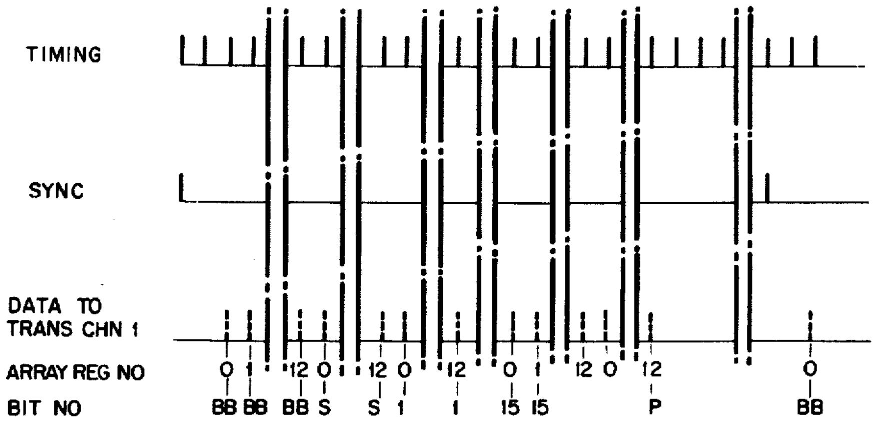

FIG. 19 is a family of curves illustrating the timing relationship of the Timing, Sync. and data signals which are delivered to the Transmission Channels.

Figure 20:
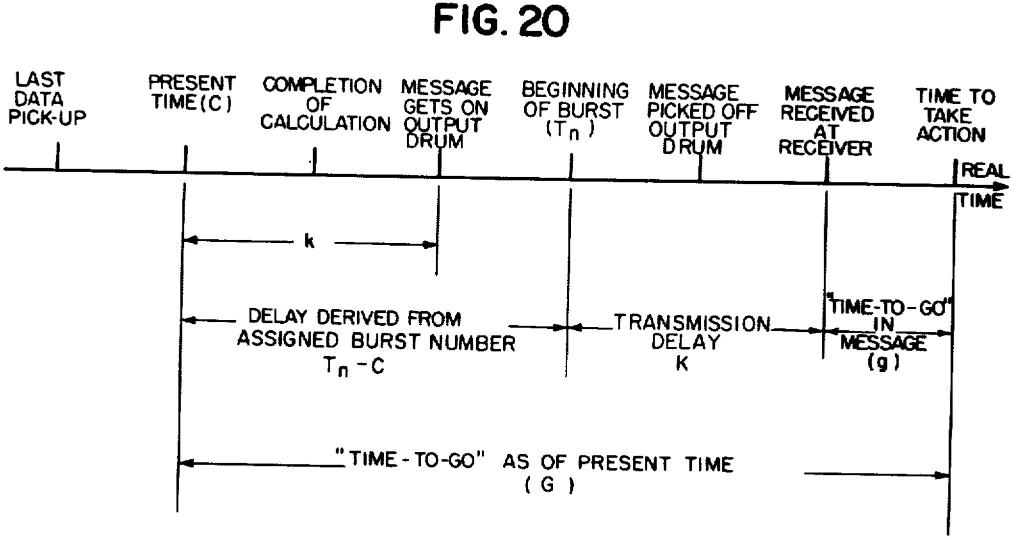

FIG. 20 is a timing chart (not to scale) that illustrates the various delays in the control system.

Figure 21:
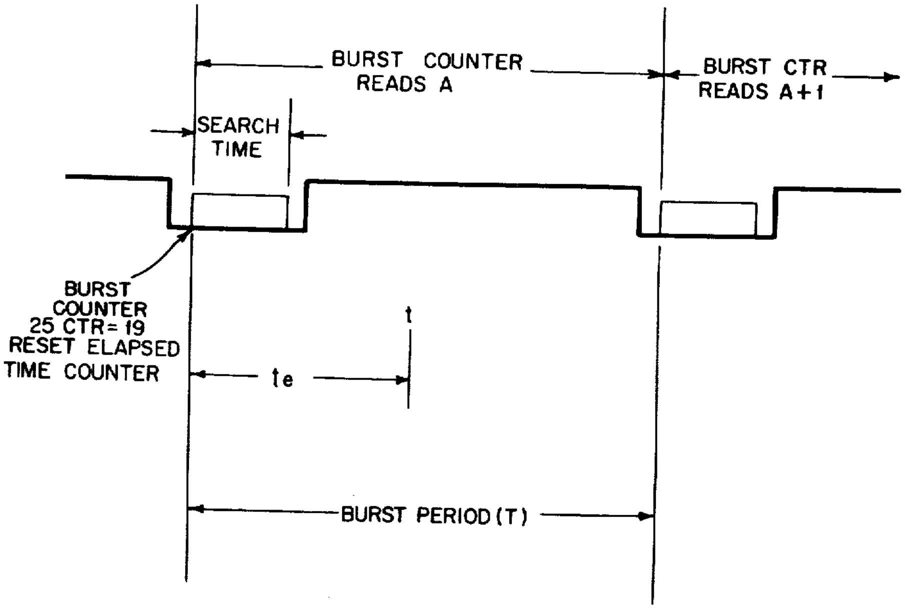

FIG. 21 is a chart which illustrates the significance of the number contained in the Burst Counter 481 (FIG. 3*d*) at various times during an Output System cycle.

Figure 22:
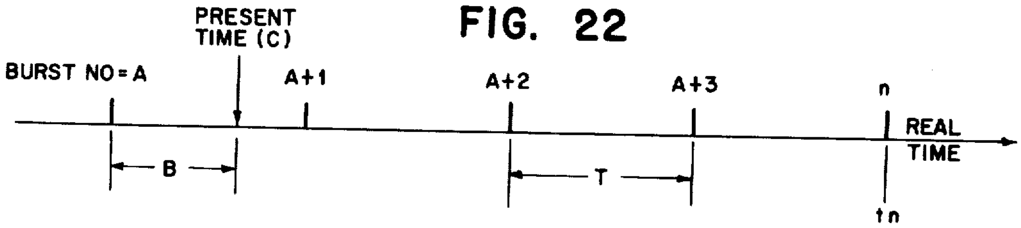

FIG. 22 is a timing chart which illustrates the computation of time delay before a given burst will be transmitted.

Figure 23:
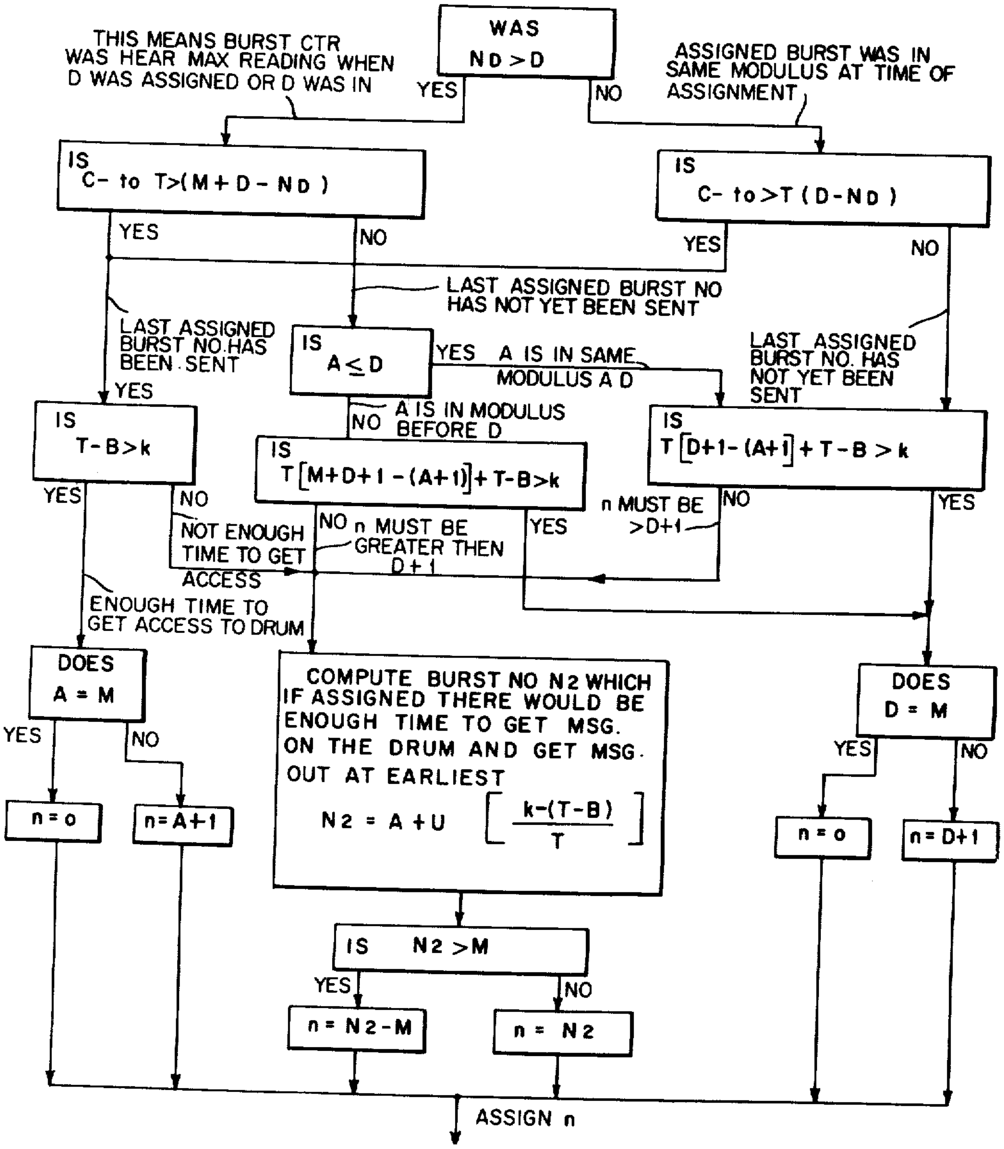

FIG. 23 is a flow chart which illustrates a possible way in which the calculation of the burst number to be assigned to an output message might be programmed.

Figure 3E:
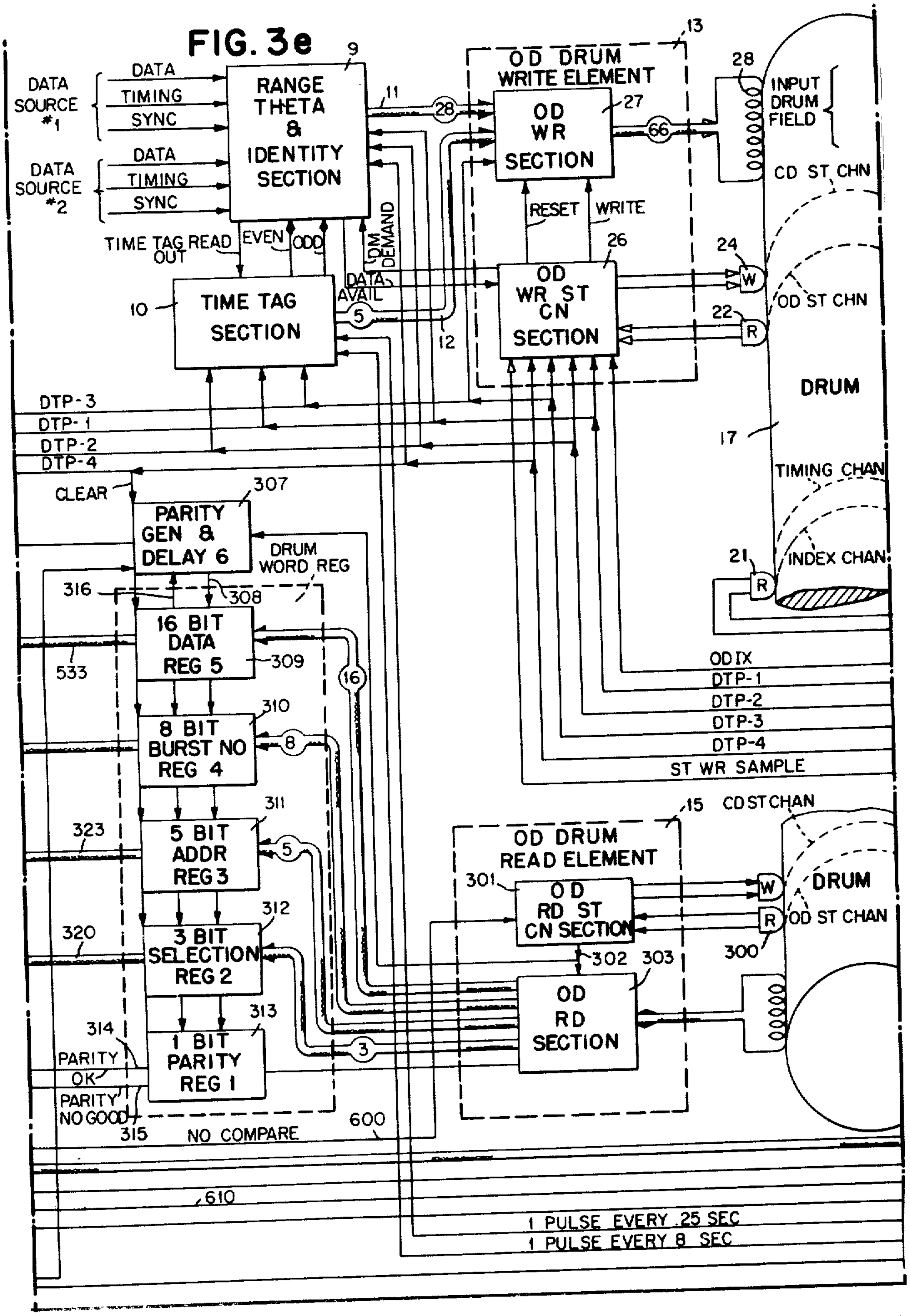
Figure 3F:
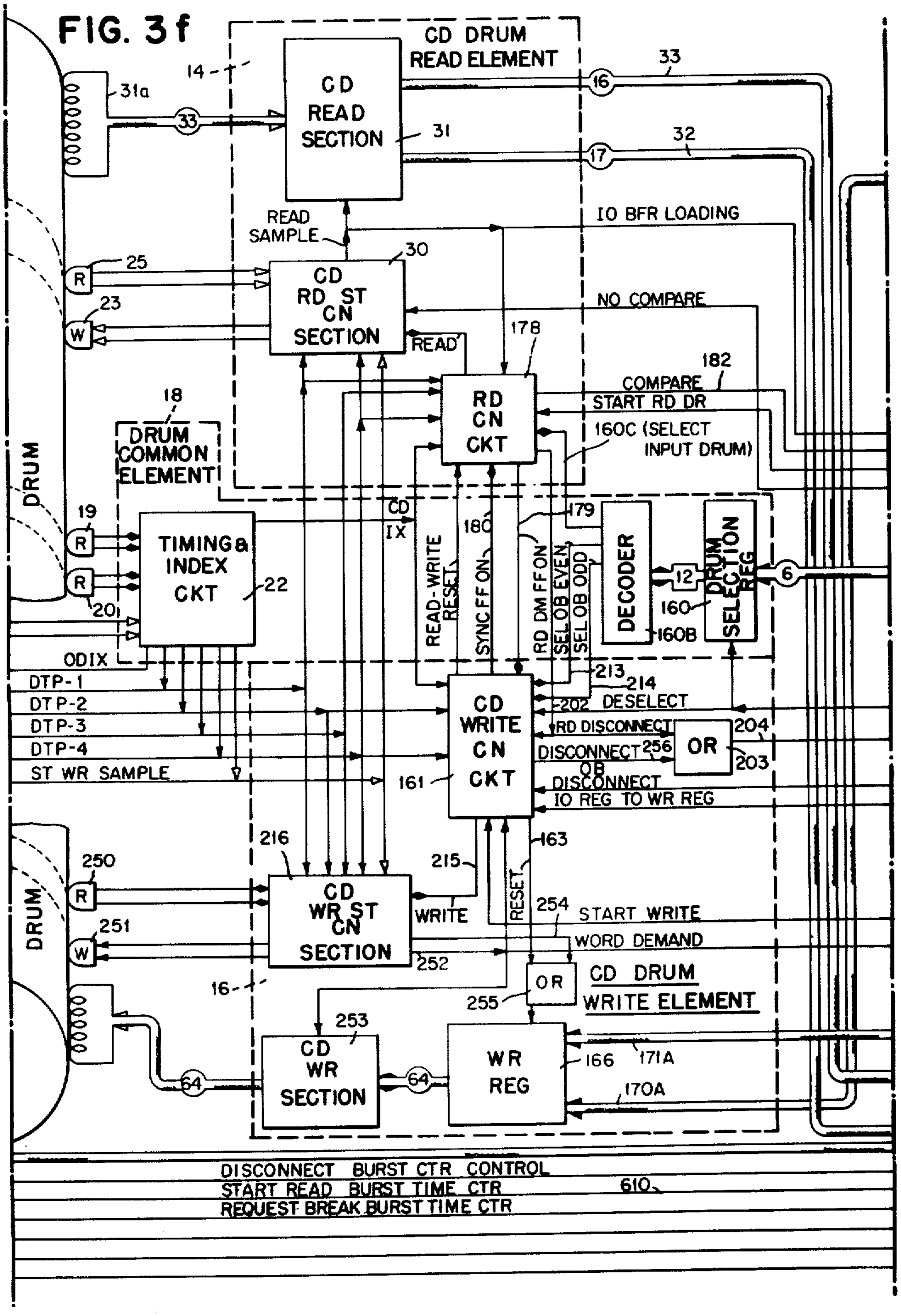
Figure 24:
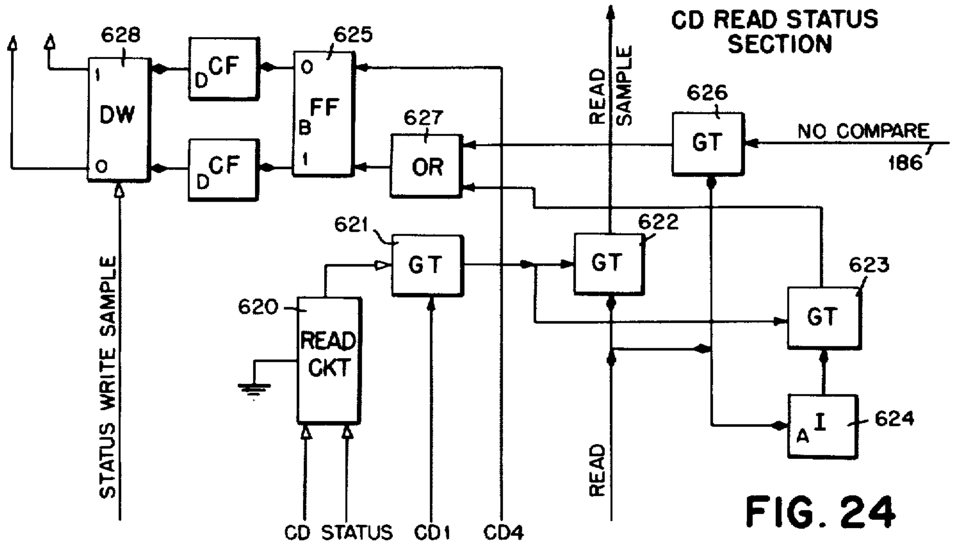

FIG. 24 is a logical block diagram of the Read Status Control Section shown as blocks 30 and 301 in FIGS. 3*f* and 3*e*, respectively.

Figure 25:
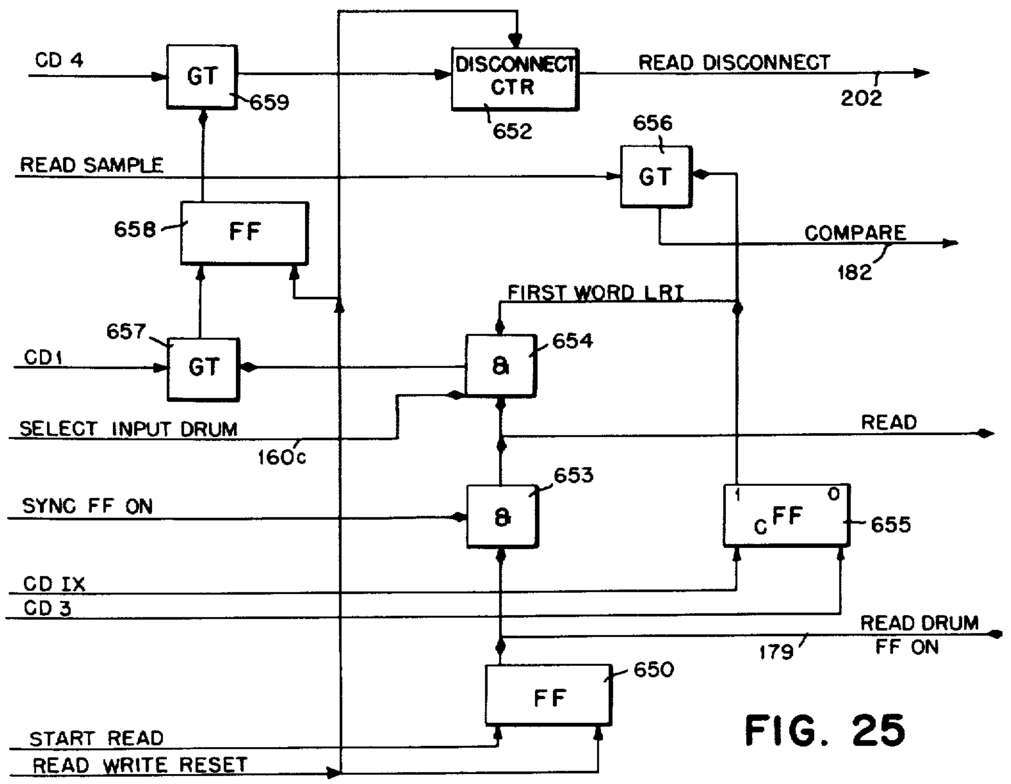

FIG. 25 is a logical block diagram of the Read Control Circuit shown as block 178 in FIG. 3*f*.

Figure 26:
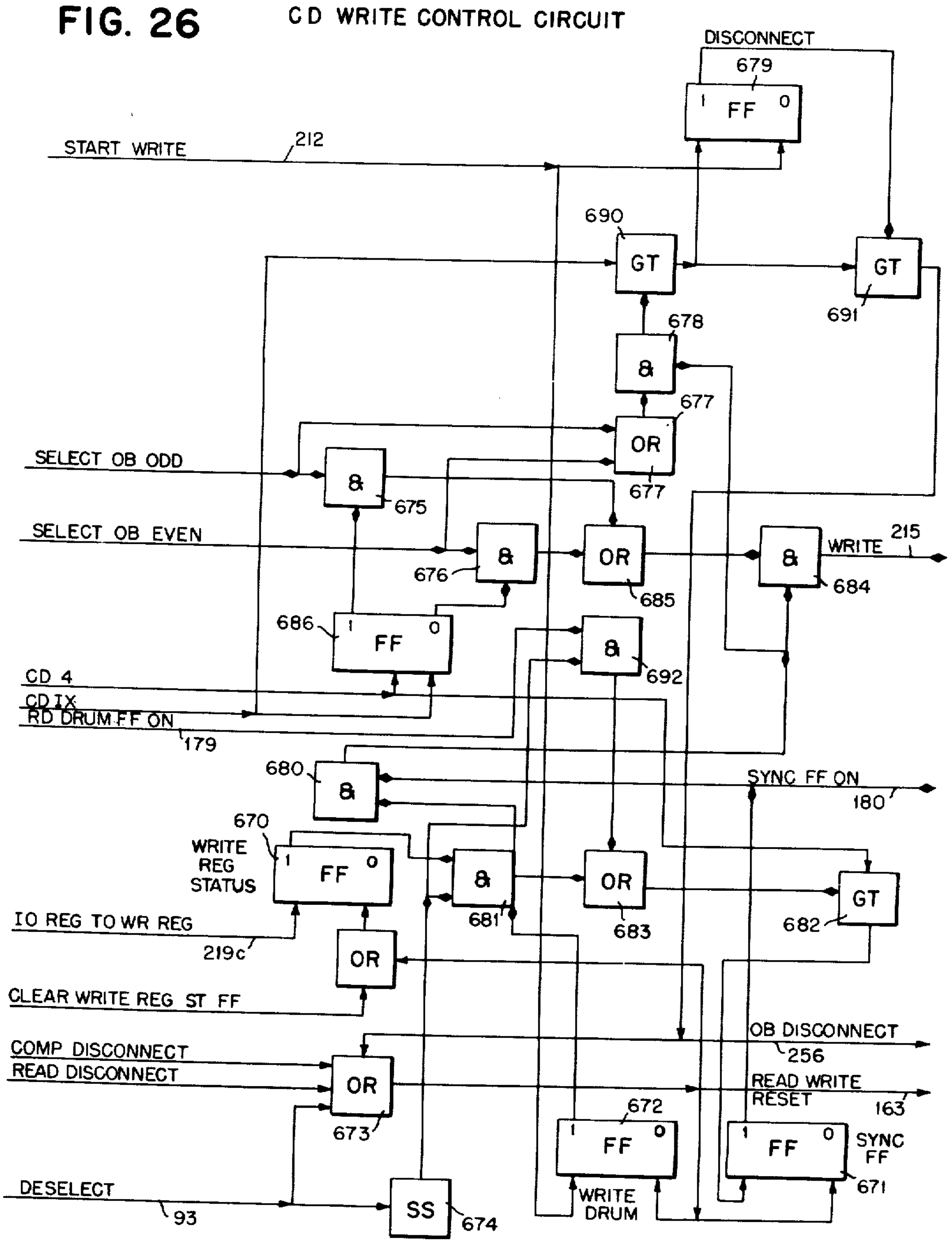

FIG. 26 is a logical block diagram of the CD Write Control Circuit shown as block 161 in FIG. 3*f*.

Figure 27:
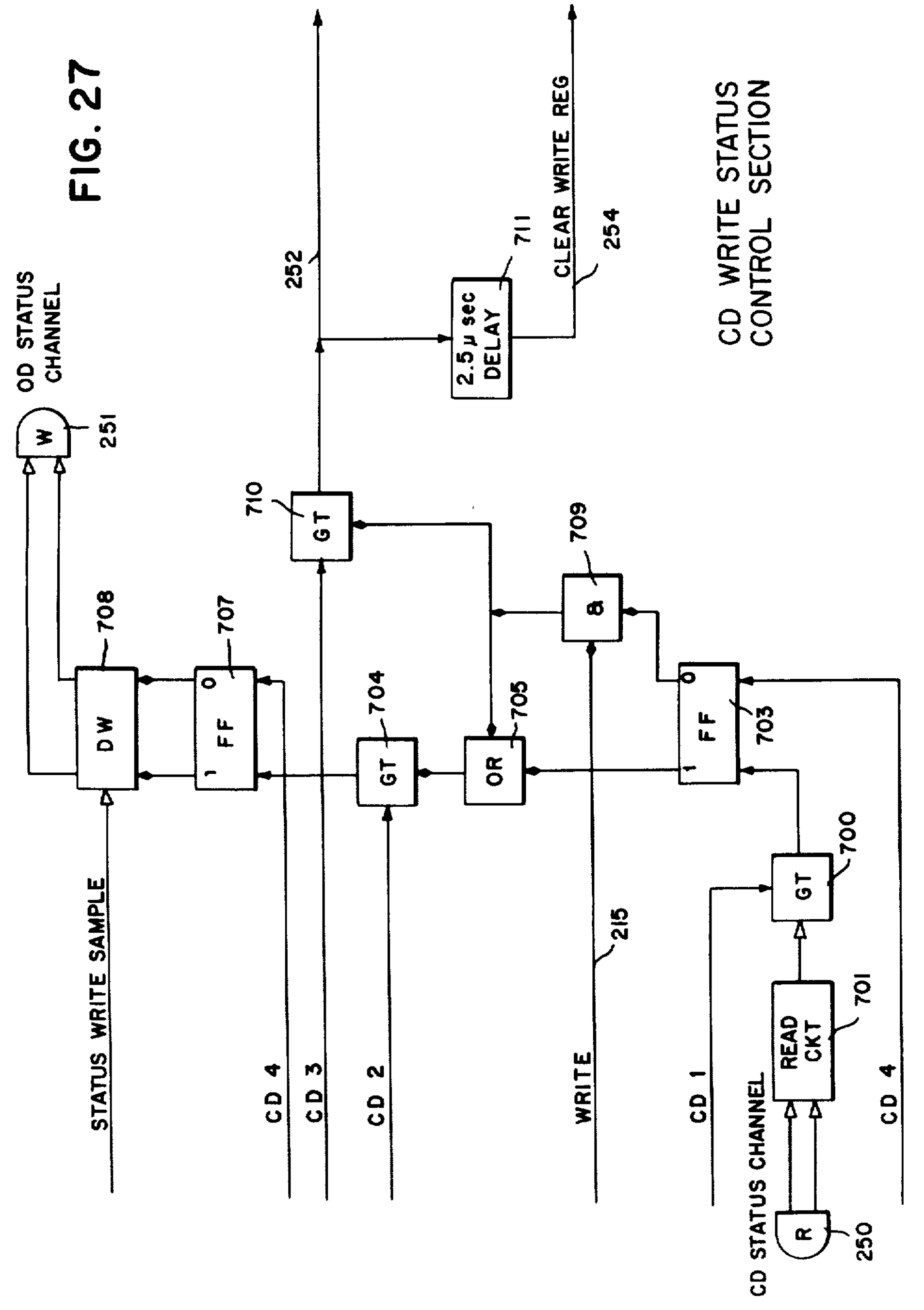

FIG. 27 is a logical block diagram of the CD Write Status Control Section shown as block 216 in FIG. 3*f*.

Figure 3G:
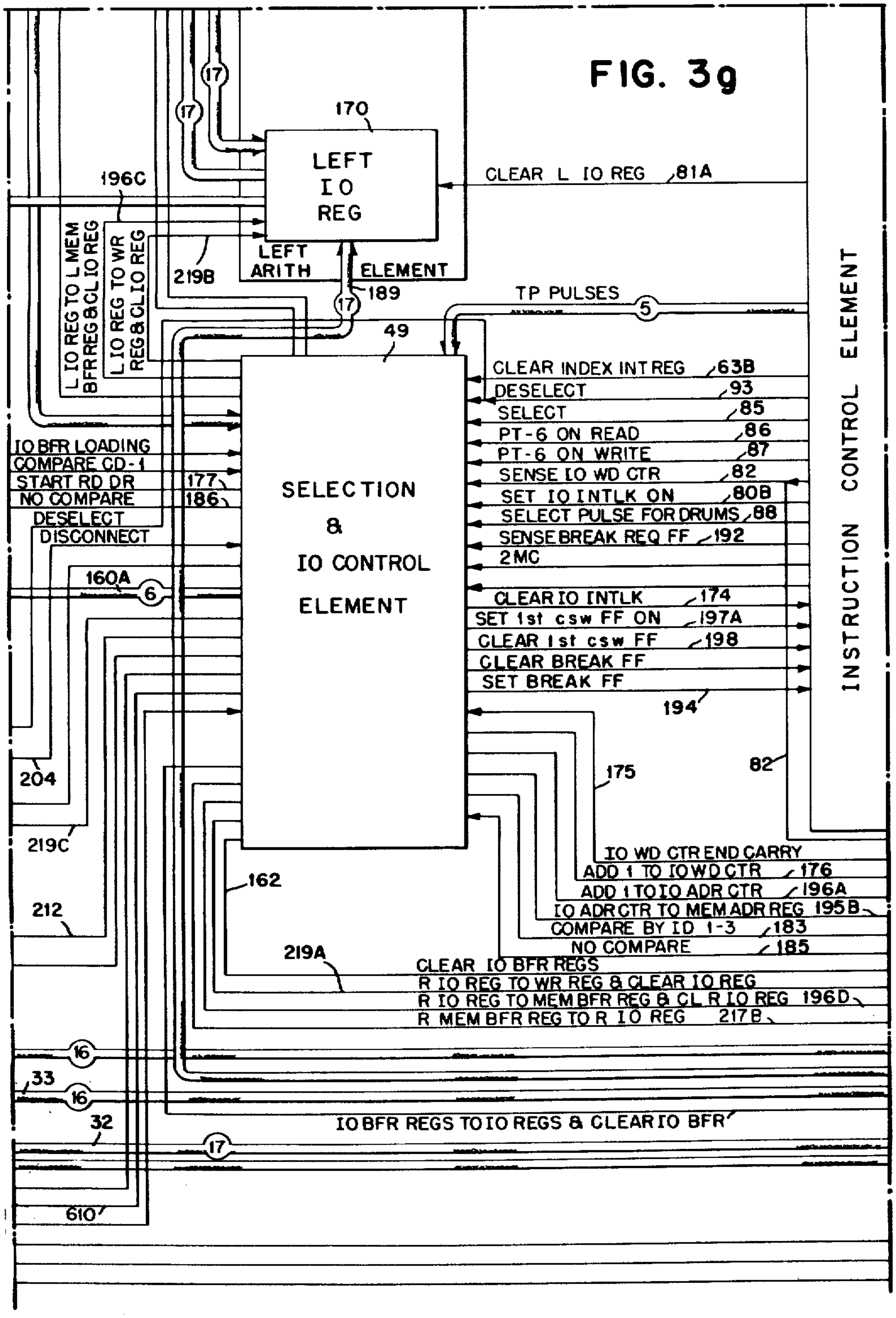
Figure 3H:
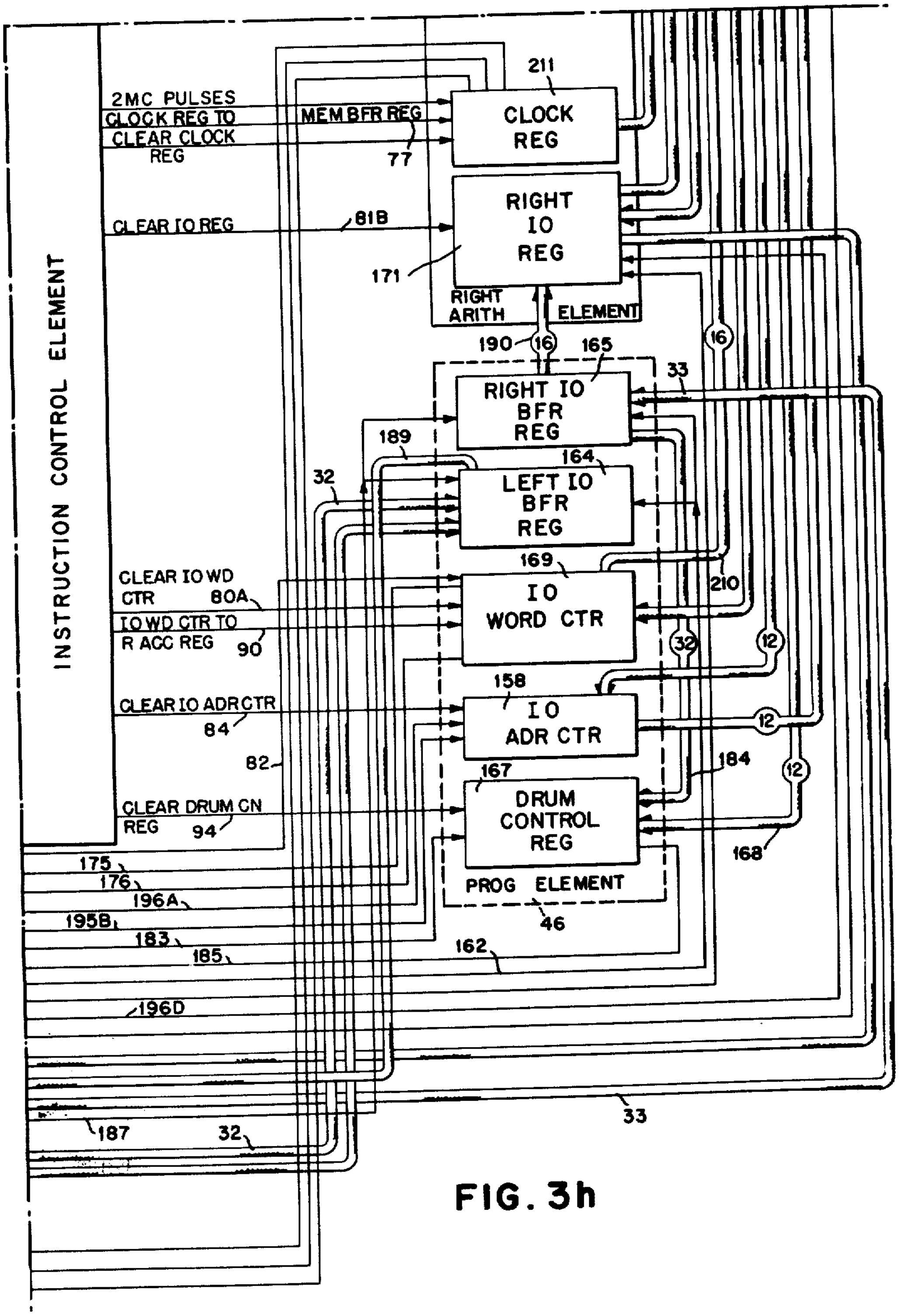
Figure 28:
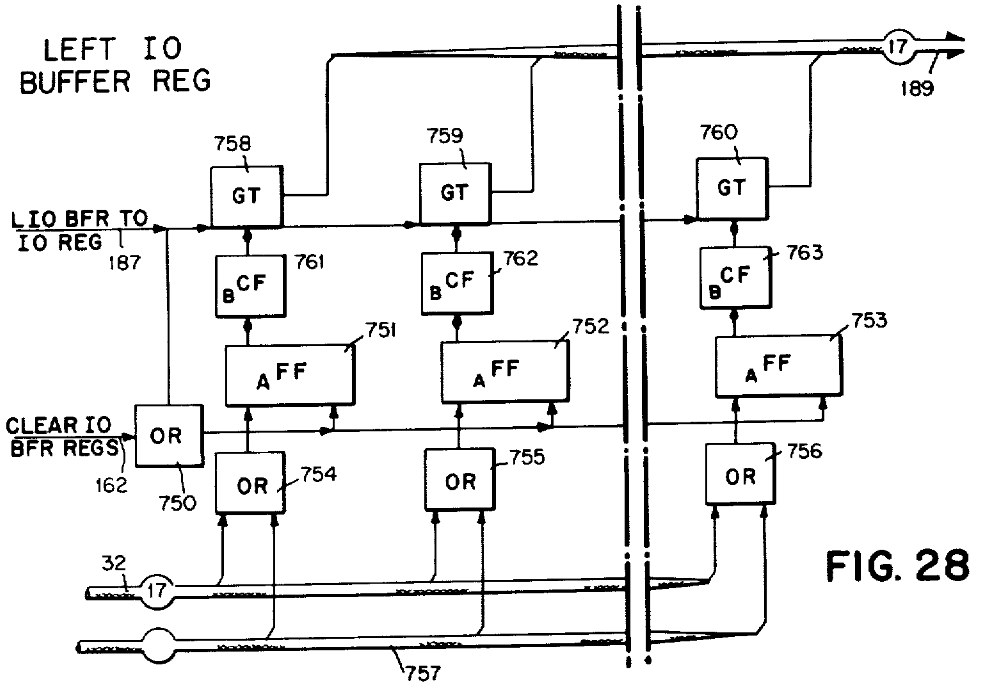

FIG. 28 is a logical block diagram of the Left IO Buffer Register shown as block 164 in FIG. 3*h*.

Figure 29:
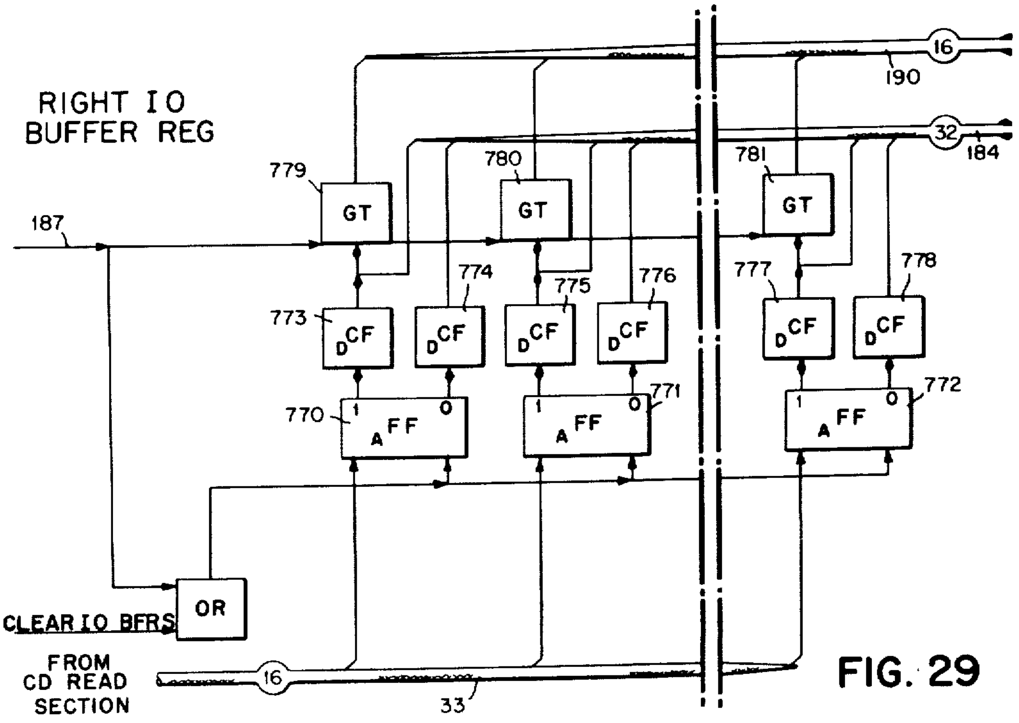

FIG. 29 is a logical block diagram of the Right IO Buffer Register shown as block 165 in FIG. 3*h*.

Figure 30:
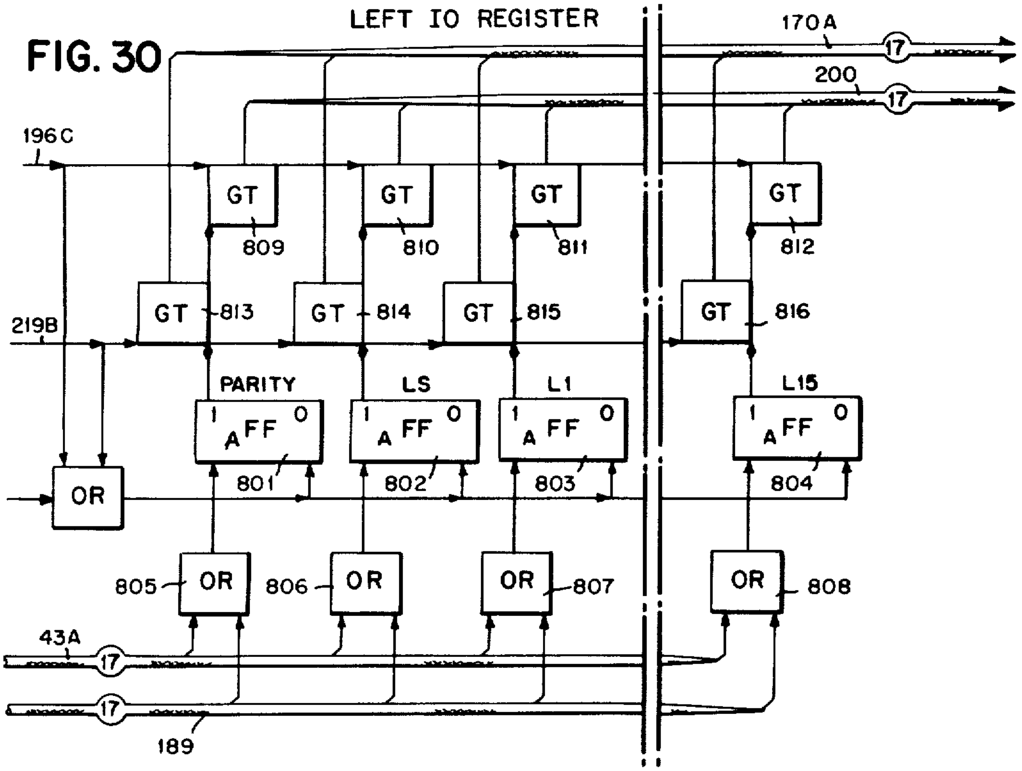

FIG. 30 is a logical block diagram of the Left IO Register shown as block 170 in FIG. 3*g*.

Figure 31:
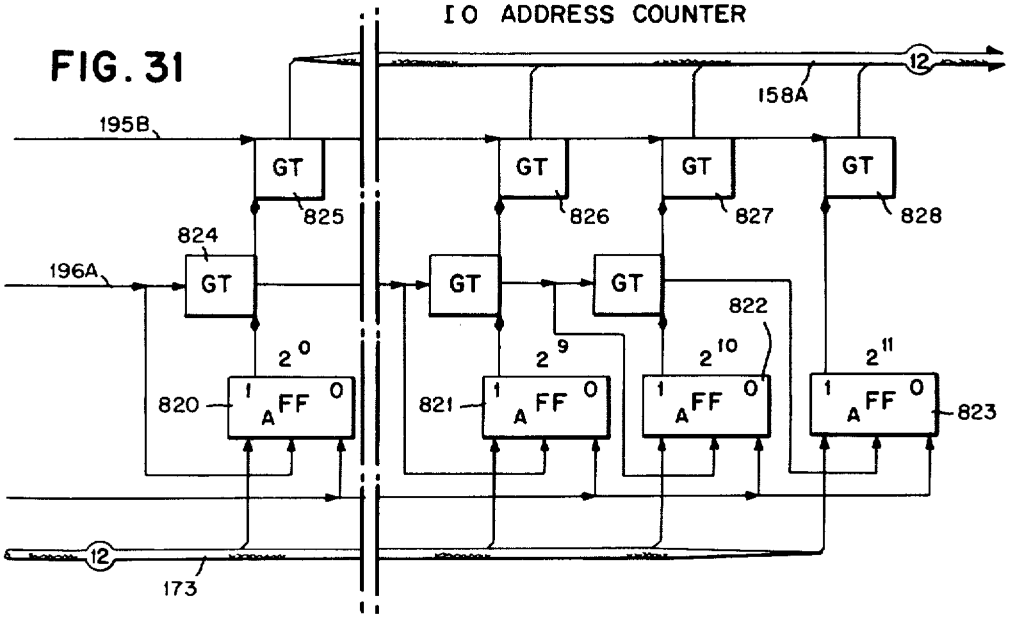

FIG. 31 is a logical block diagram of the IO Address Counter shown as block 158 in FIG. 3*h*.

Figure 32:
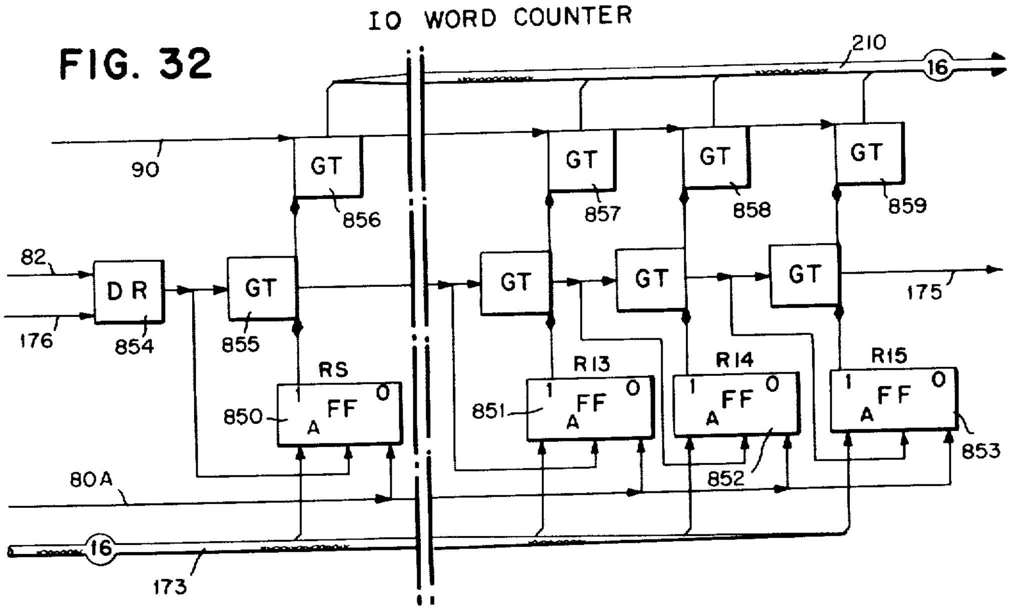

FIG. 32 is a logical block diagram of the IO Word Counter which is shown as block 169 in FIG. 3*h*.

Figure 33:
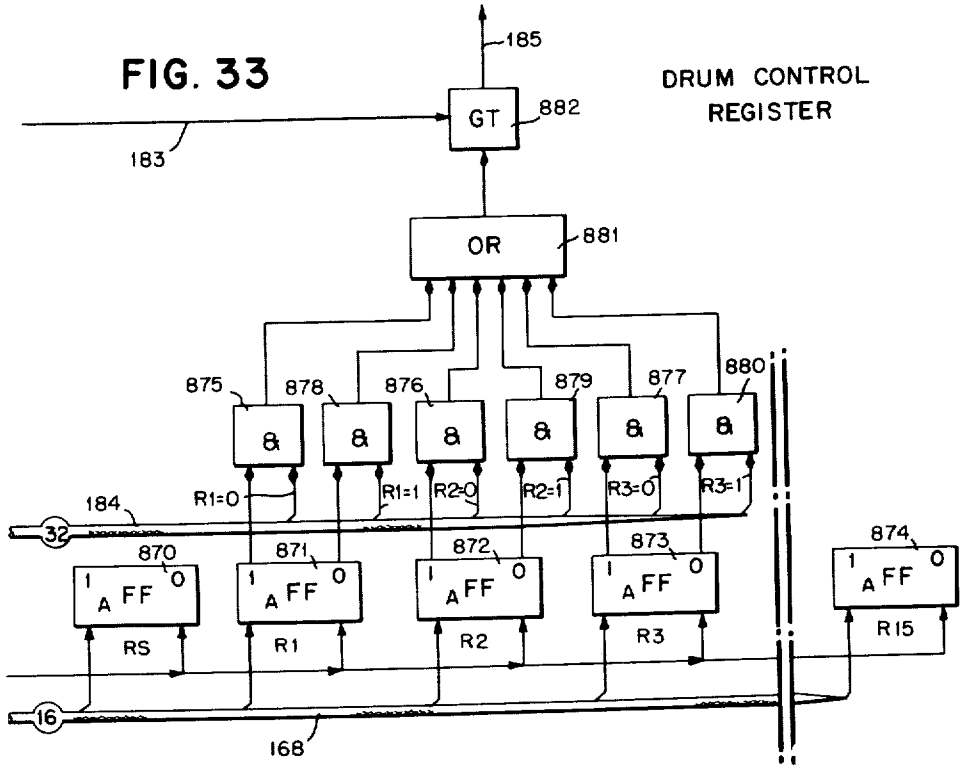
Figure 34A:
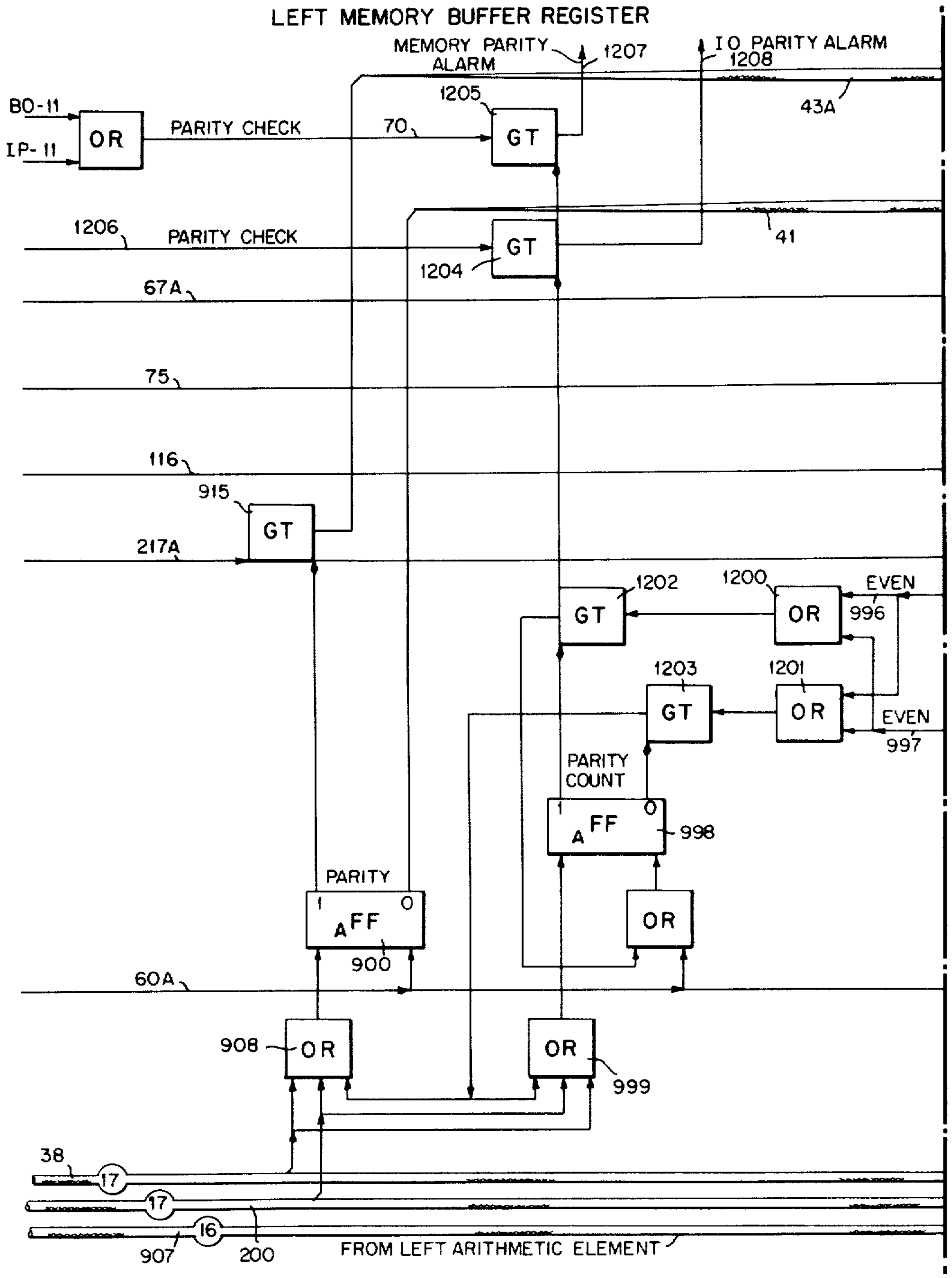
Figure 34B:
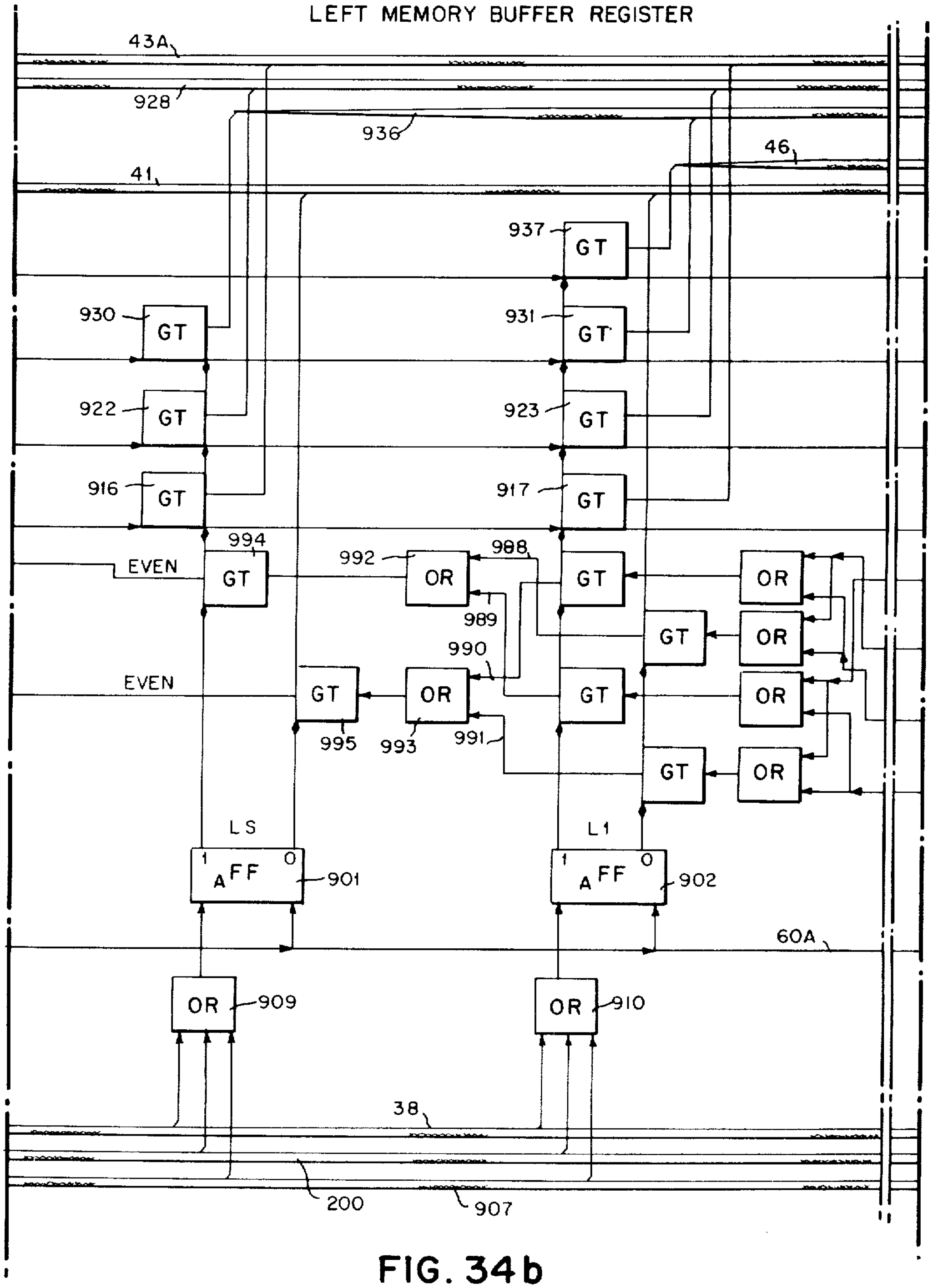
Figure 34C:
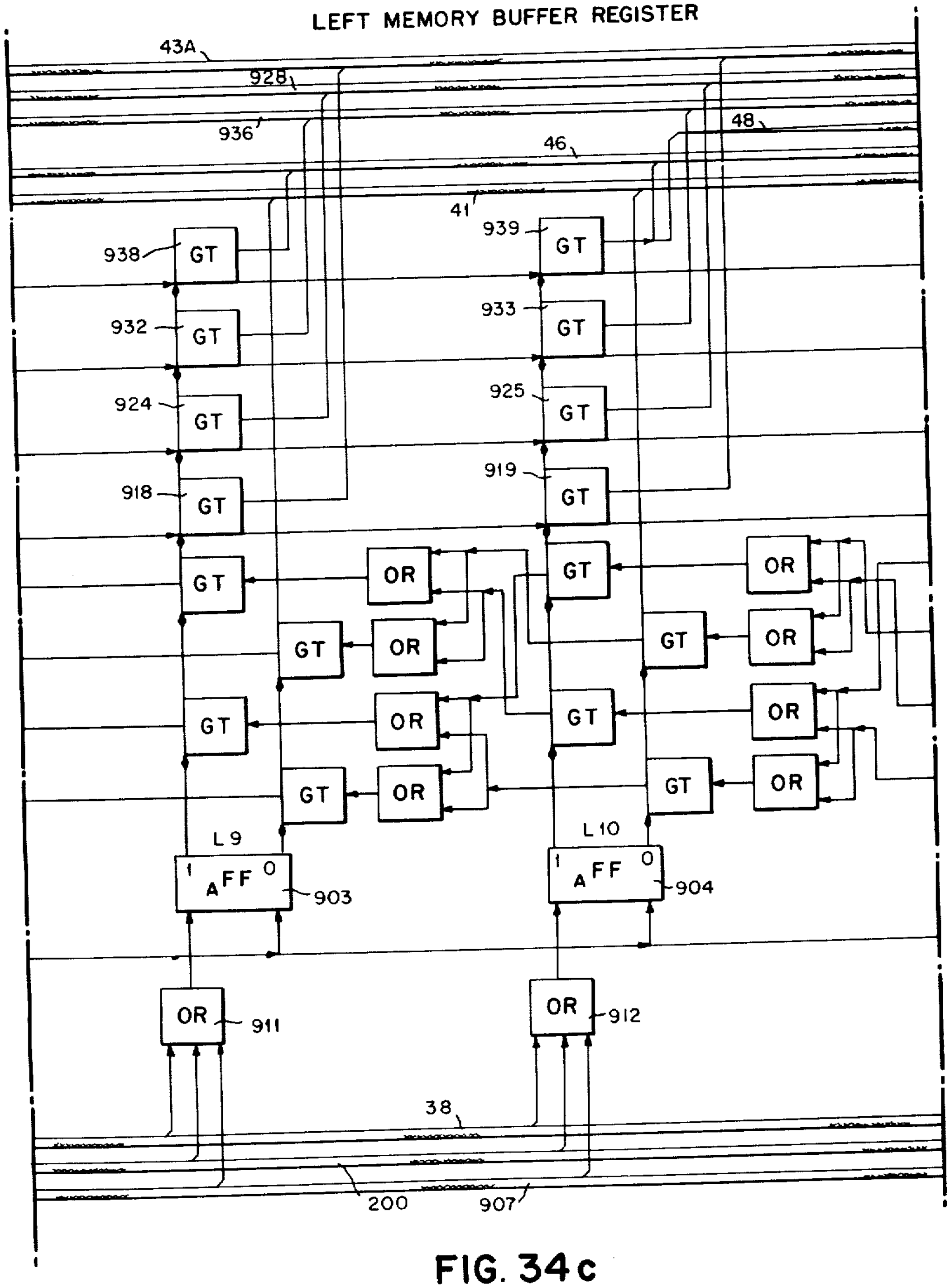
Figure 34D:
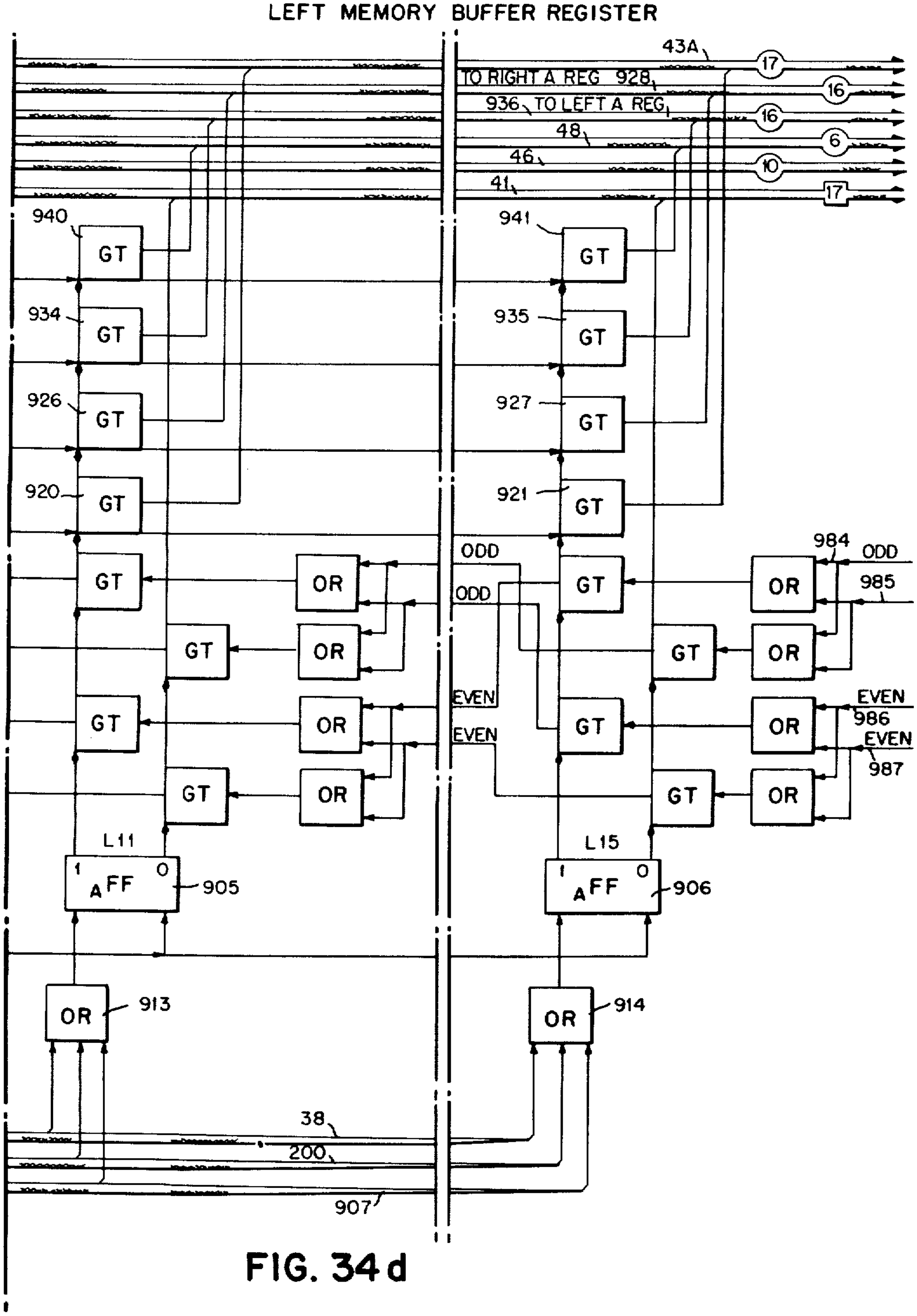

FIG. 33 is a logical block diagram of the Drum Control Register which is shown as block 167 in FIG. 3*h*.

FIG. 34 consisting of FIGS. 34*a* through 34*d* is a logical block diagram of the Left Memory Buffer Register which is shown as block 43 in FIG. 3*a*.

Figures 35A, 36:
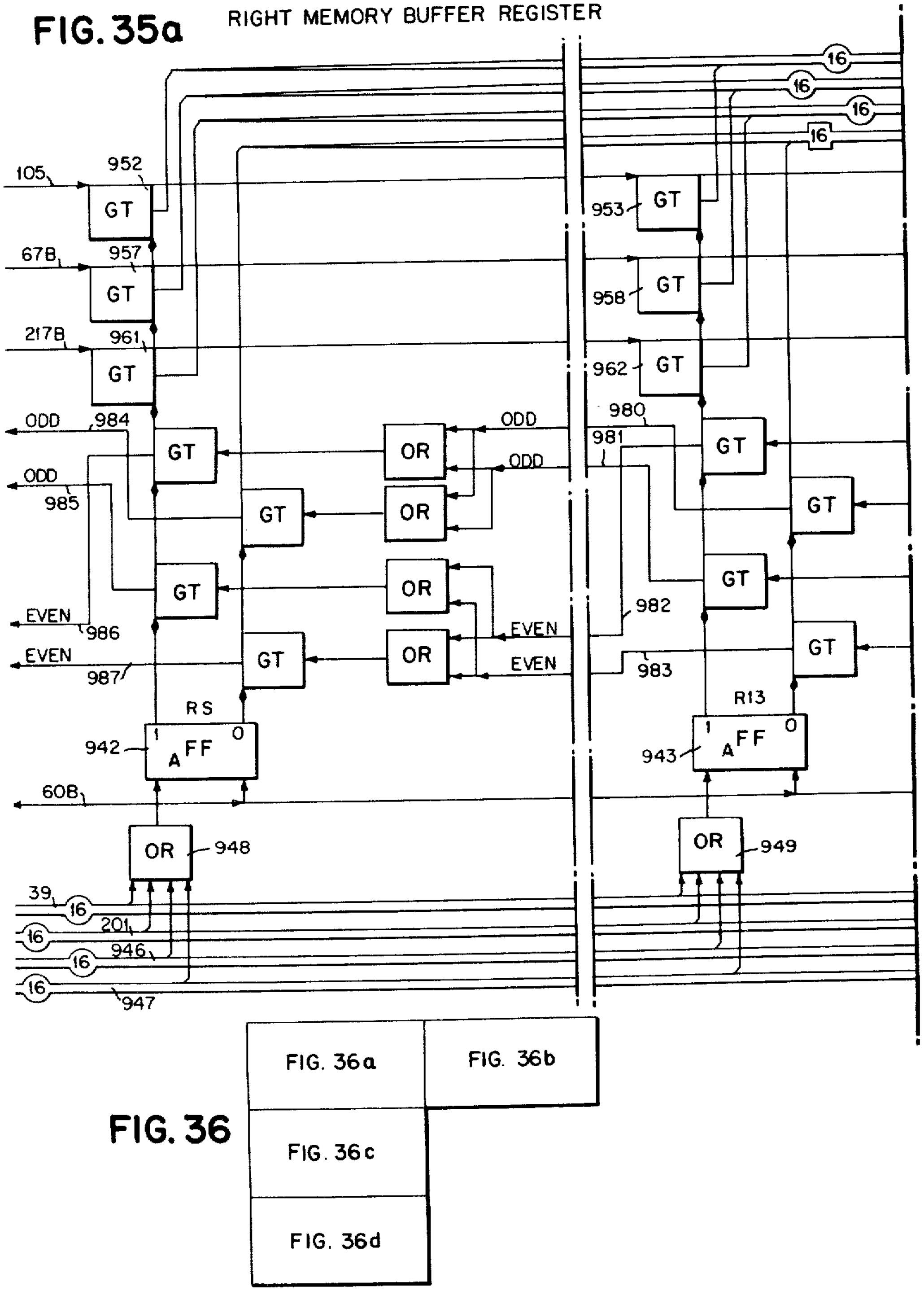
Figure 35B:
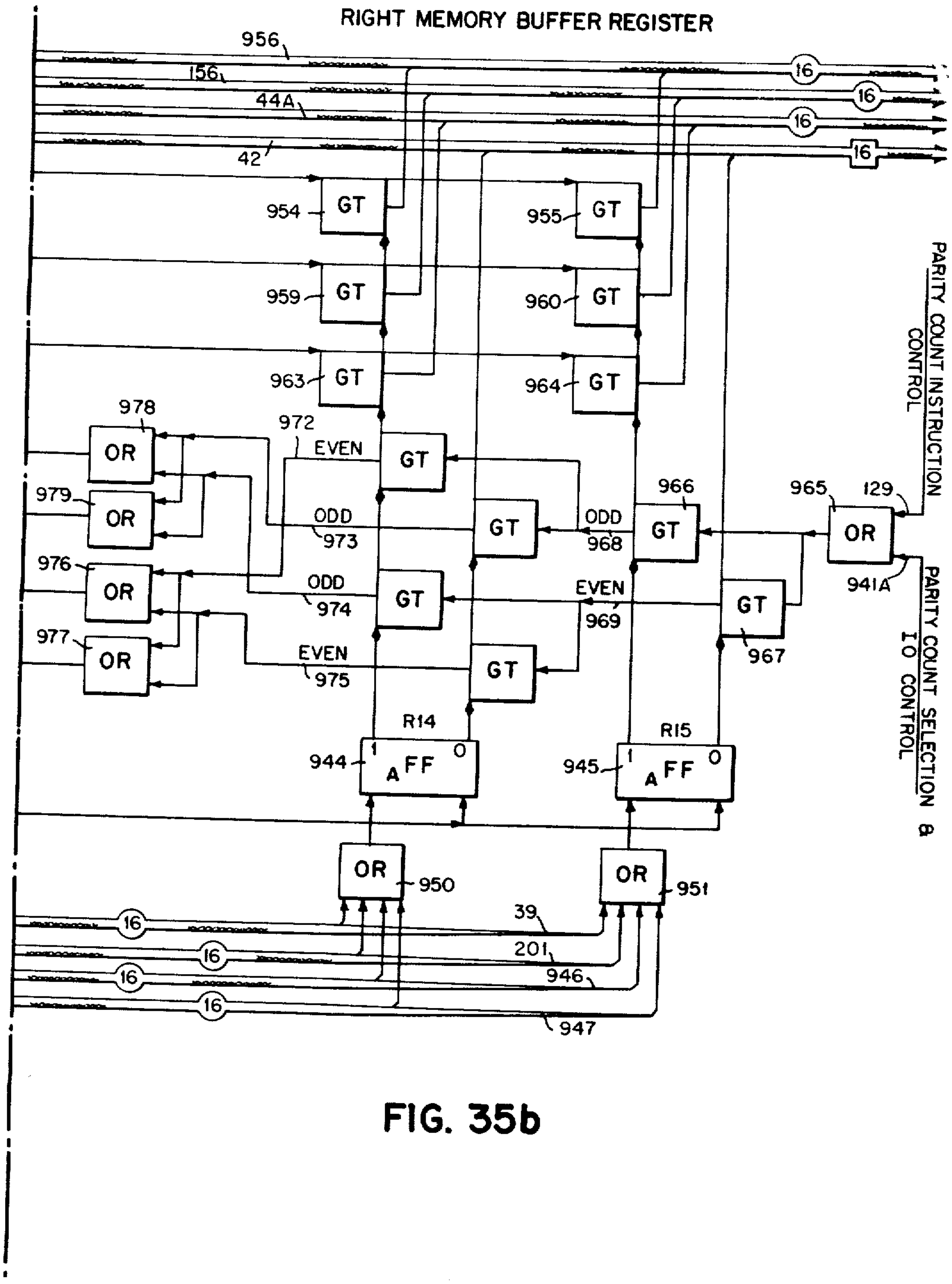

FIG. 35 consisting of FIGS. 35*a* and 35*b* is a logical block diagram of the Right Memory Buffer Register which is shown as block 44 in FIG. 3*b*.

FIG. 36 consisting of FIGS. 36*a* through 36*d*, when arranged according to FIG. 36, illustrate in logical block form those circuits of the Selection and IO Control Element identified by block 49 in FIG. 3*g*.

Figure 37:
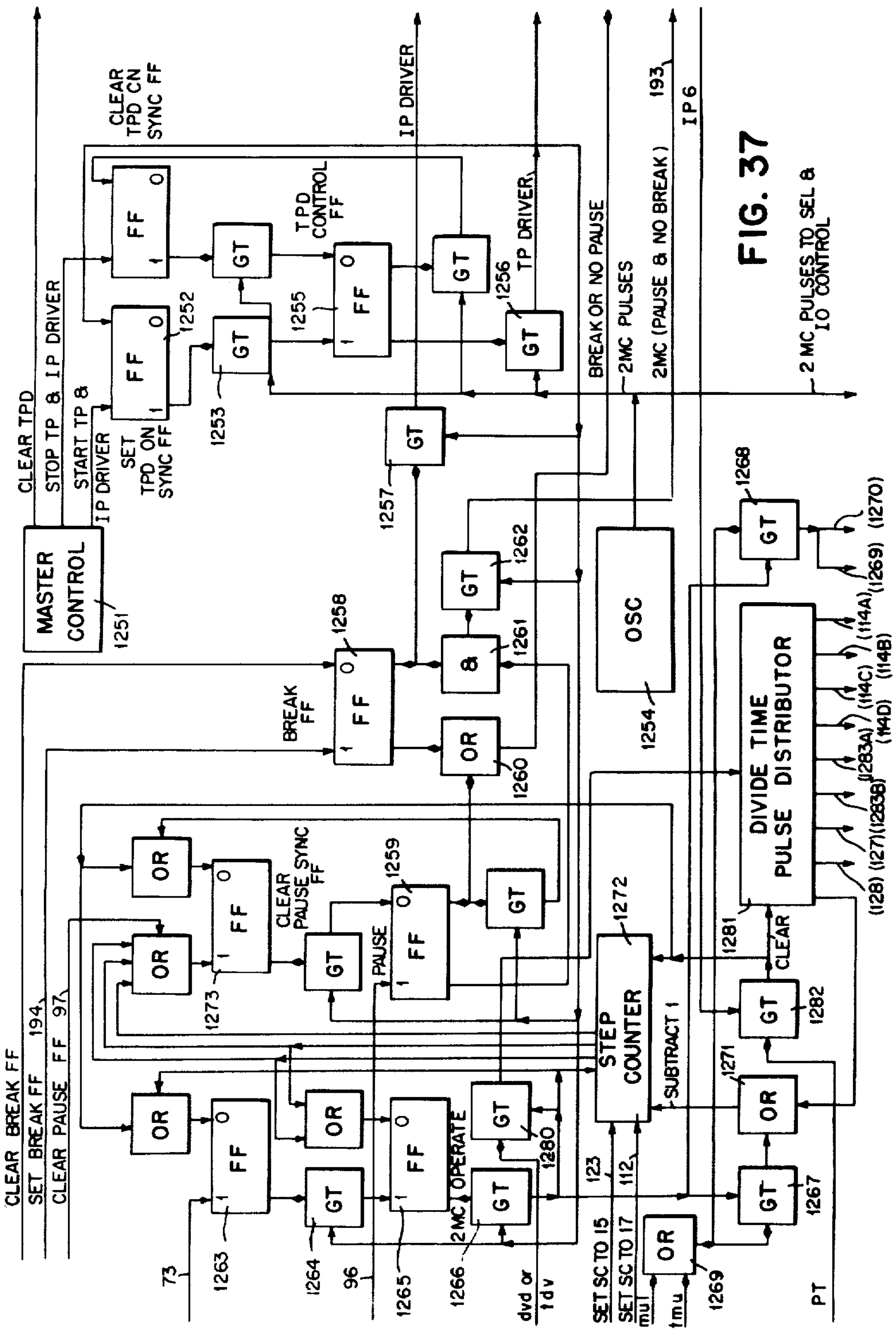
Figure 38A:
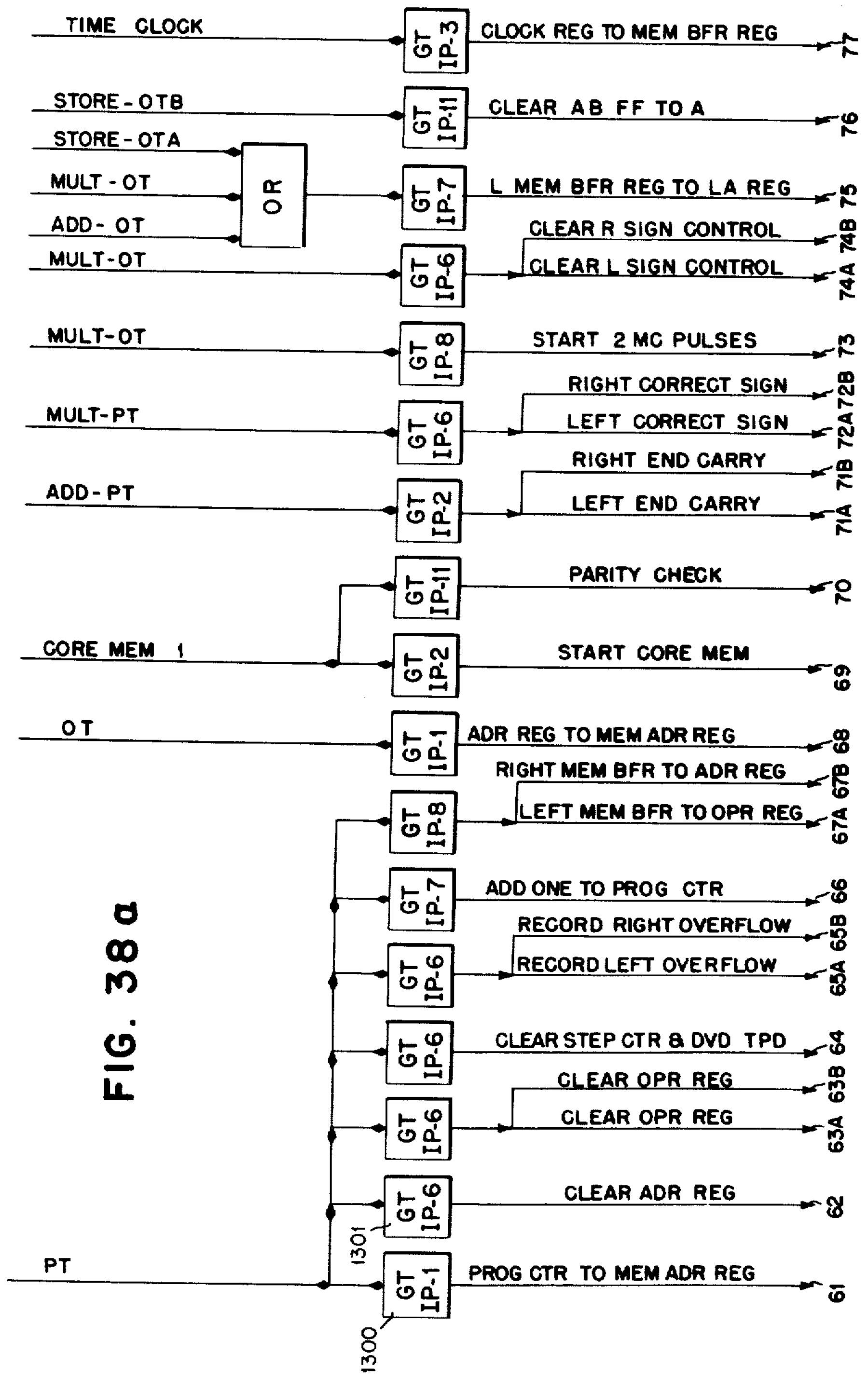
Figure 38B:
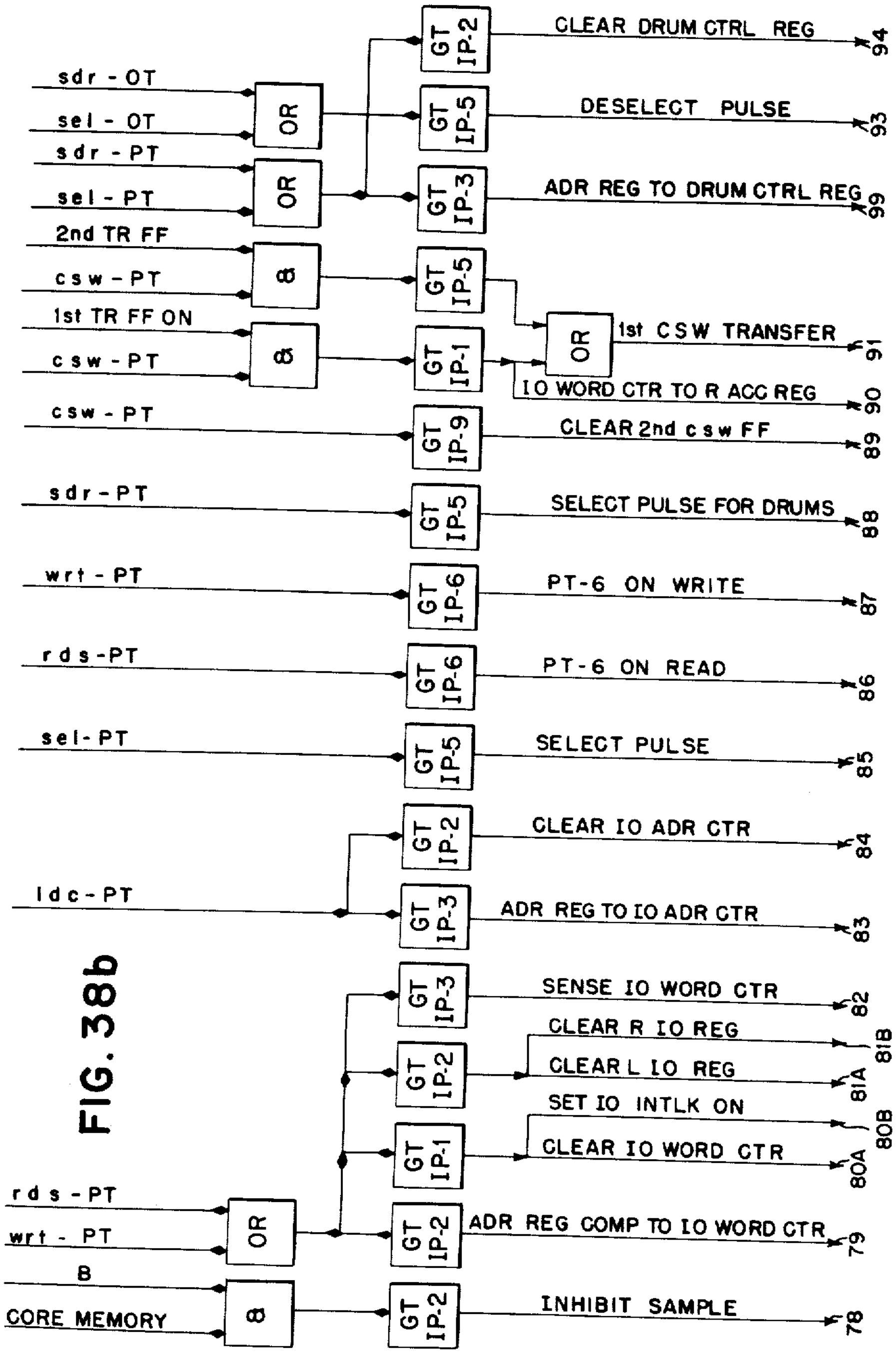
Figure 38C:
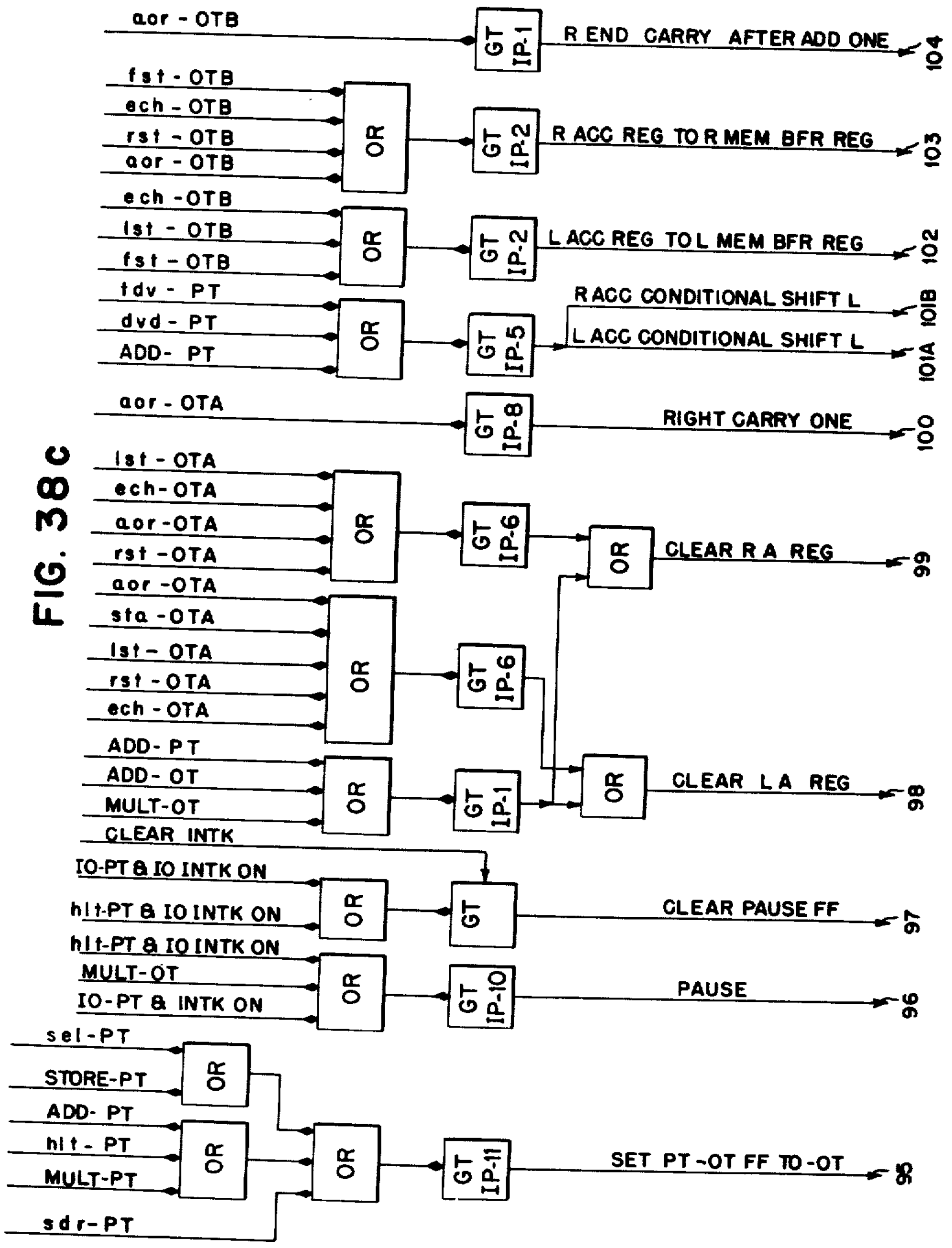
Figure 38D:
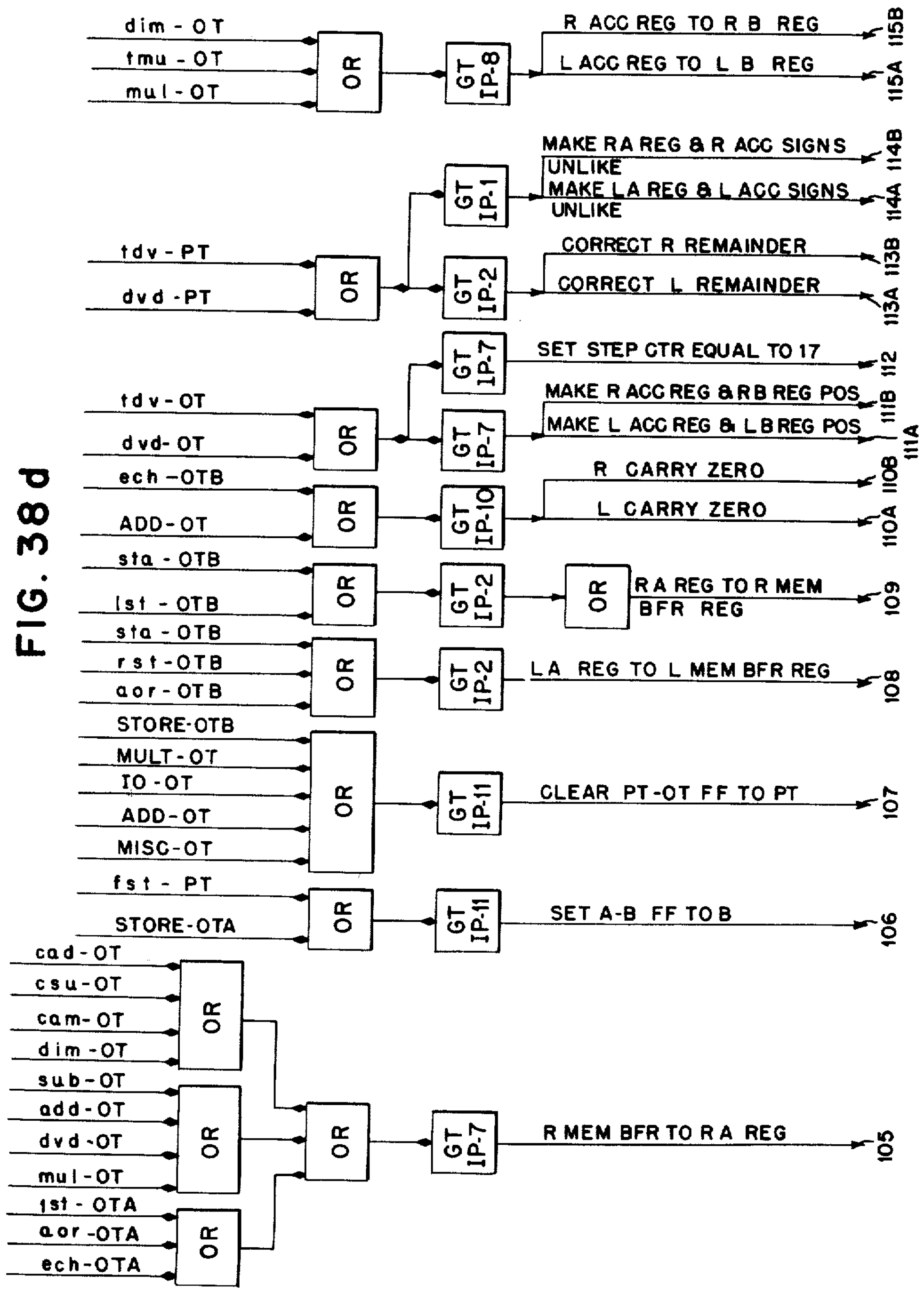
Figure 38E:
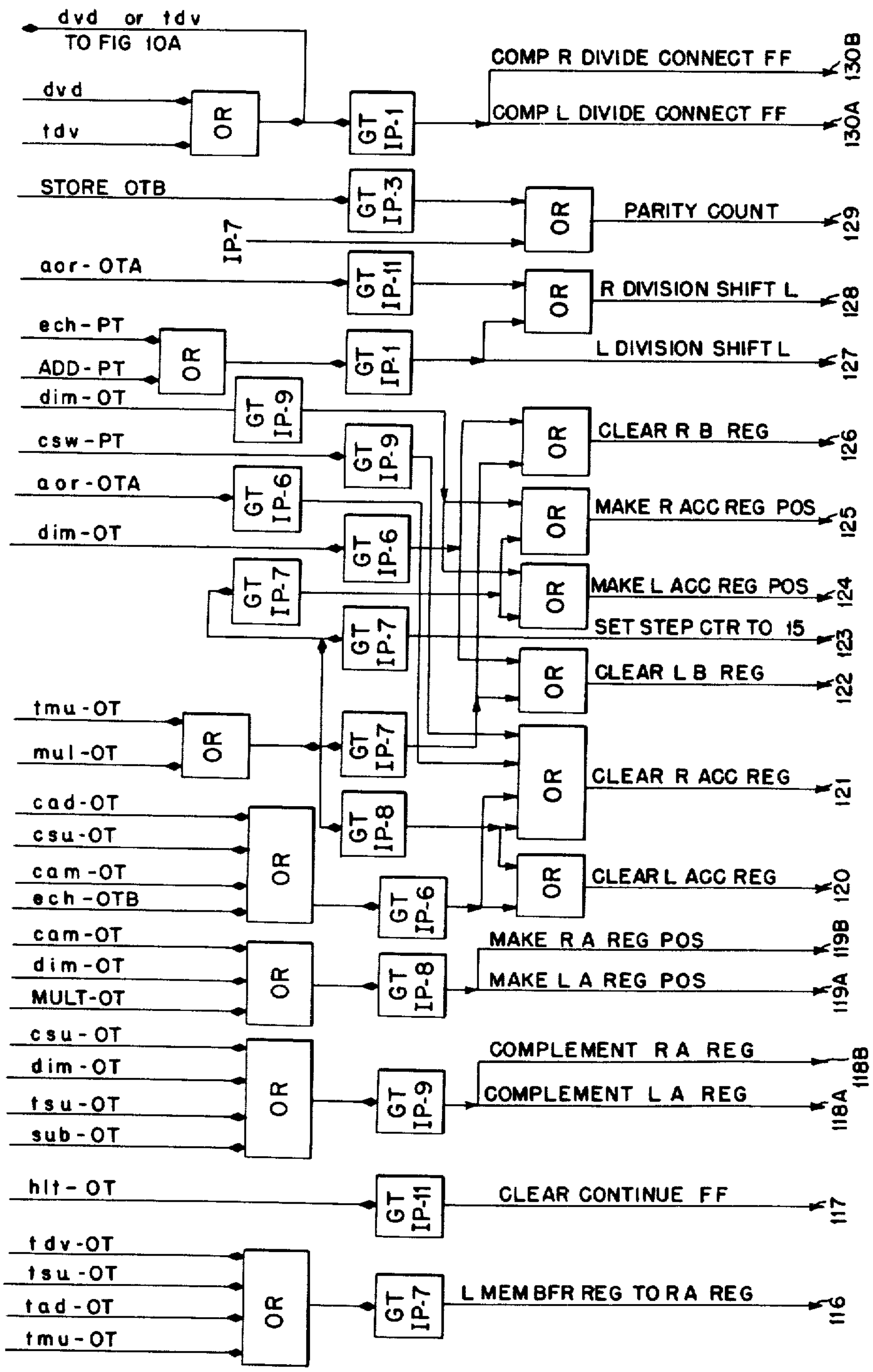

FIG. 37 is a logical block diagram of the Time Pulse Distributor Control and Special Command Generator shown as block 1250 in FIG. 10*a*.

FIGS. 38*a* through 38*e* when arranged end to end in that order, are a logical block diagram of the Command Generator shown as block 53 in FIGS. 10*a* through 10*c*.

Figure 39:
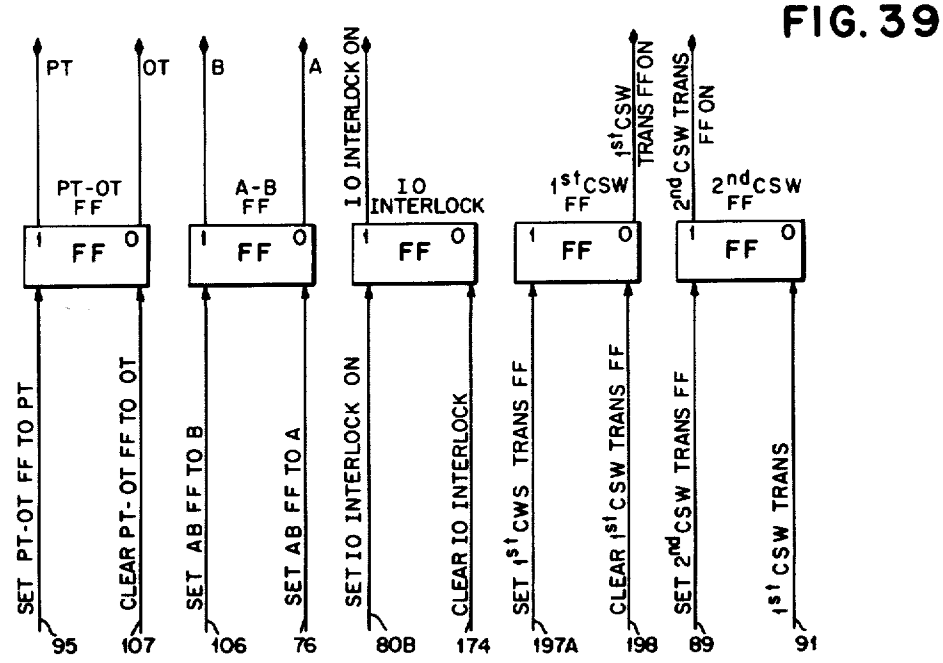

FIG. 39 is a logical block diagram of the Cycle Control circuits shown as block 54 in FIG. 10*b*.

Figure 40:
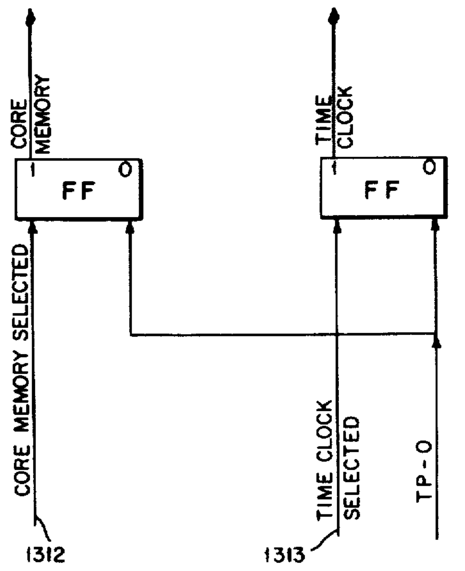

FIG. 40 is a logical block diagram of the Memory Unit Selection Circuits shown as block 58 in FIG. 10*c*.

Figure 41:
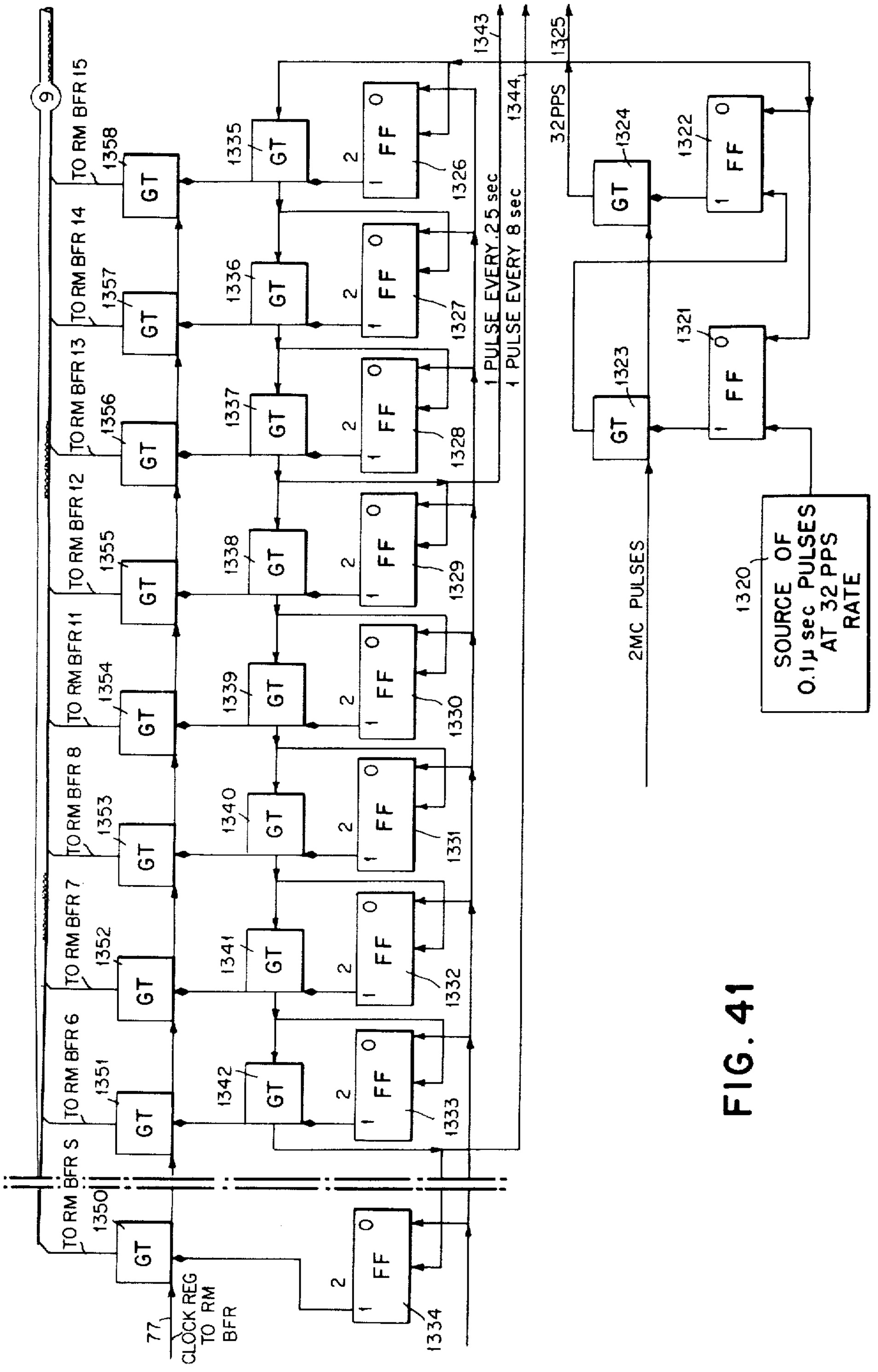

FIG. 41 is a logical block diagram of the Clock Register shown as block 211 in FIG. 3*h*.

Figure 42:
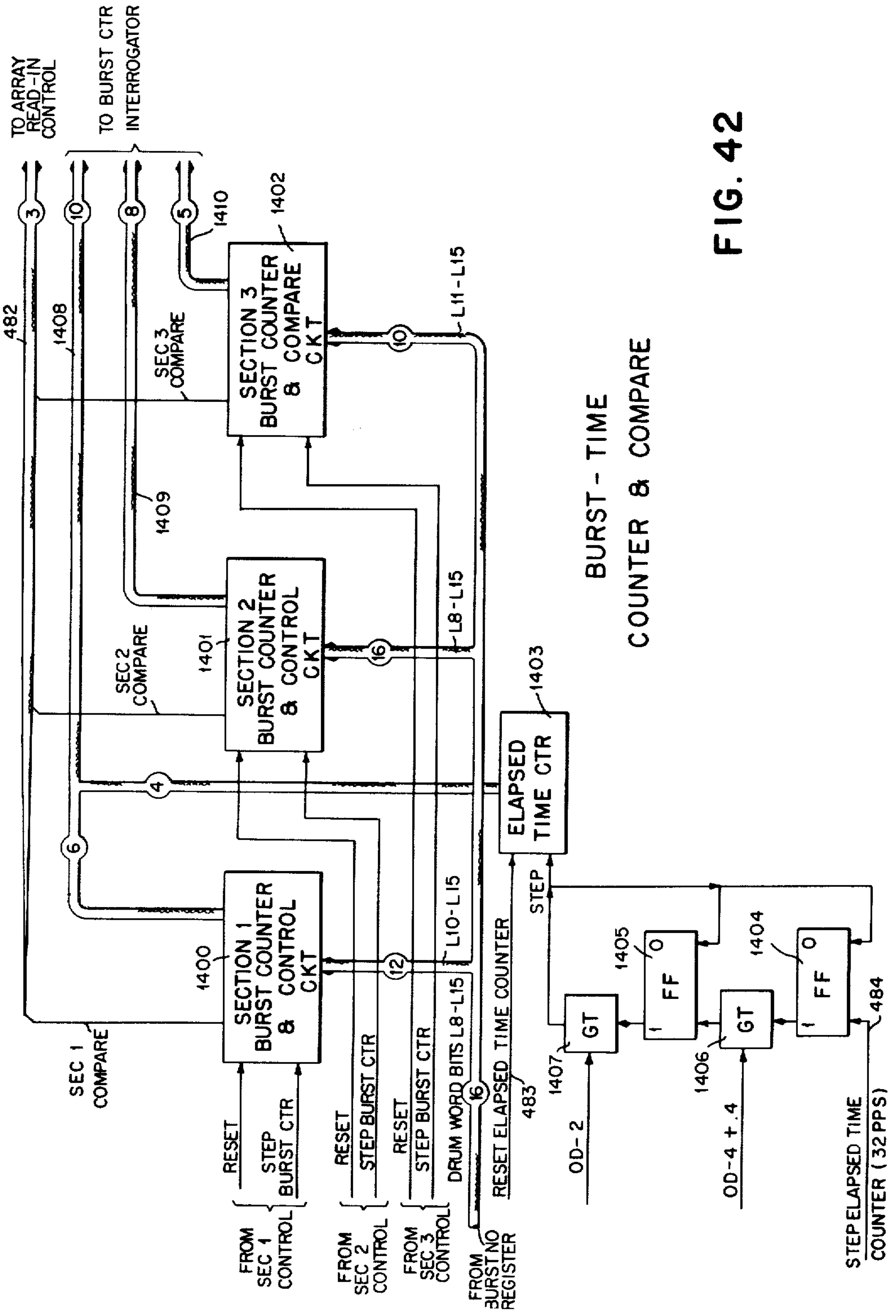

FIG. 42 is a functional block diagram of the Burst Time Counter and Compare Element shown as block 481 in FIG. 3*d*.

Figure 43:
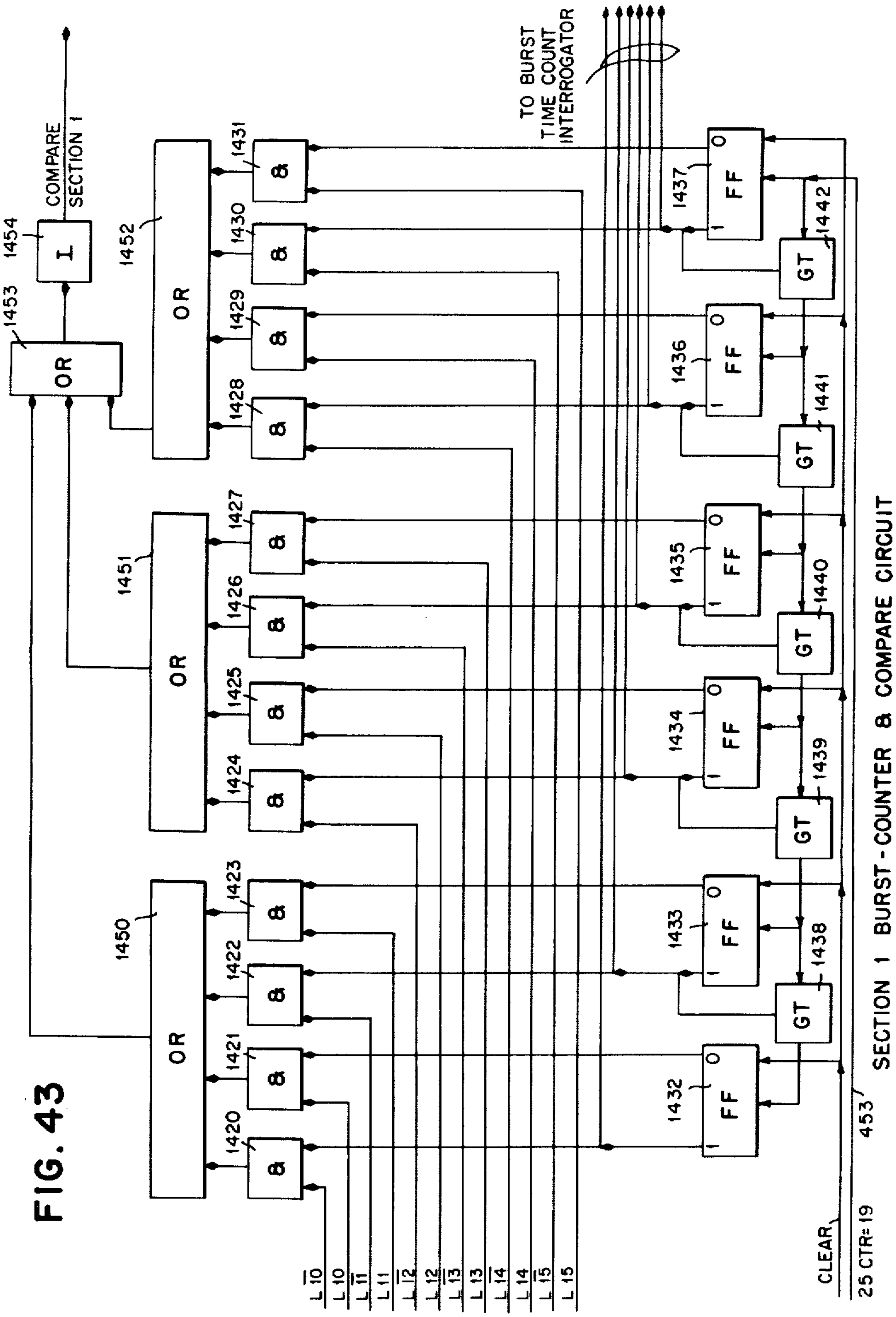

FIG. 43 is a logical block diagram of the Section 1 Burst Counter and Compare Circuit shown as block 1400 in FIG. 42.

Figure 44:
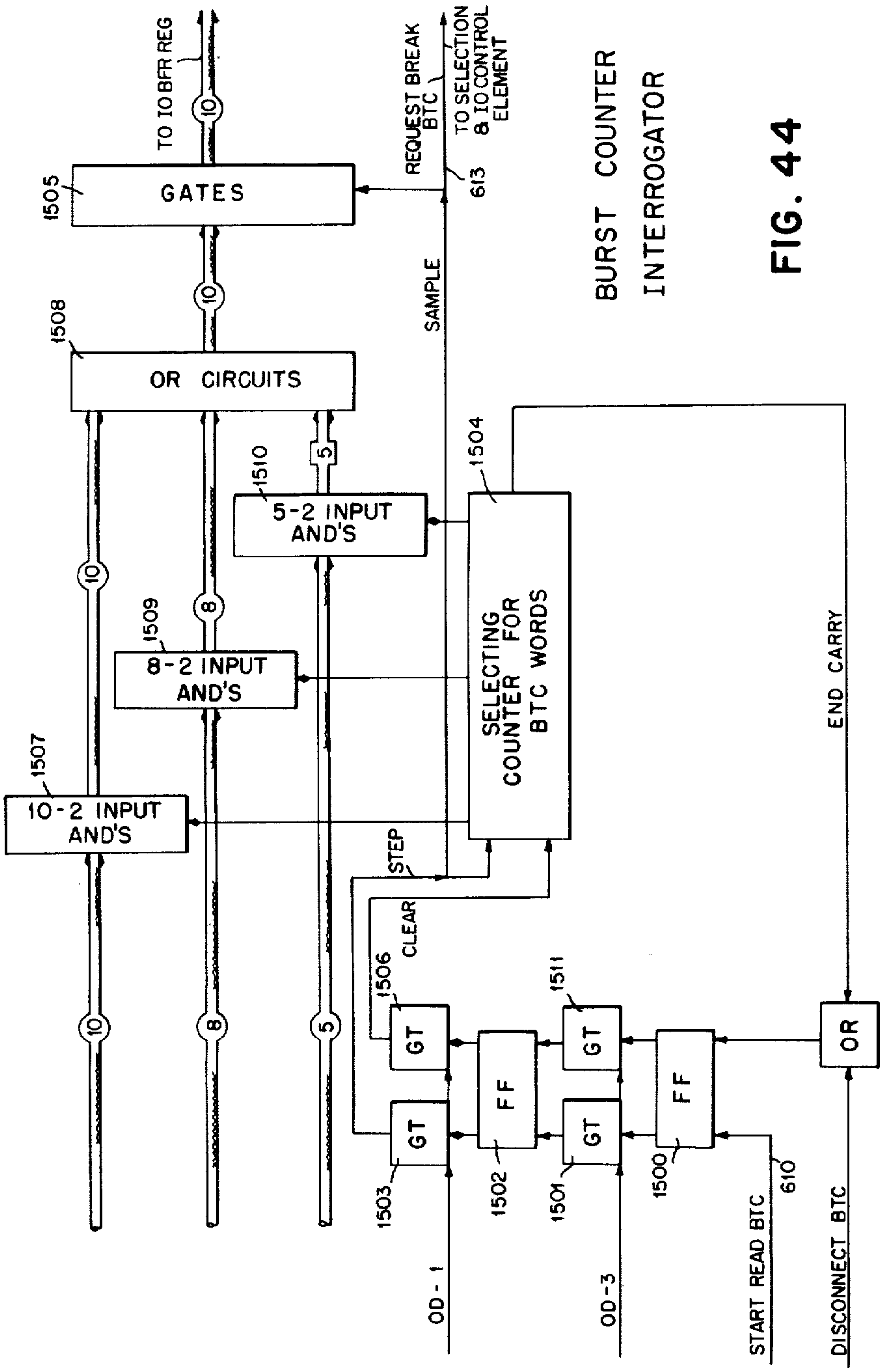

FIG. 44 is a diagram partly in logical block form and partly in functional block form of the Burst Counter Interrogator indicated as block 611 in FIG. 3*d*.

Figure 45:
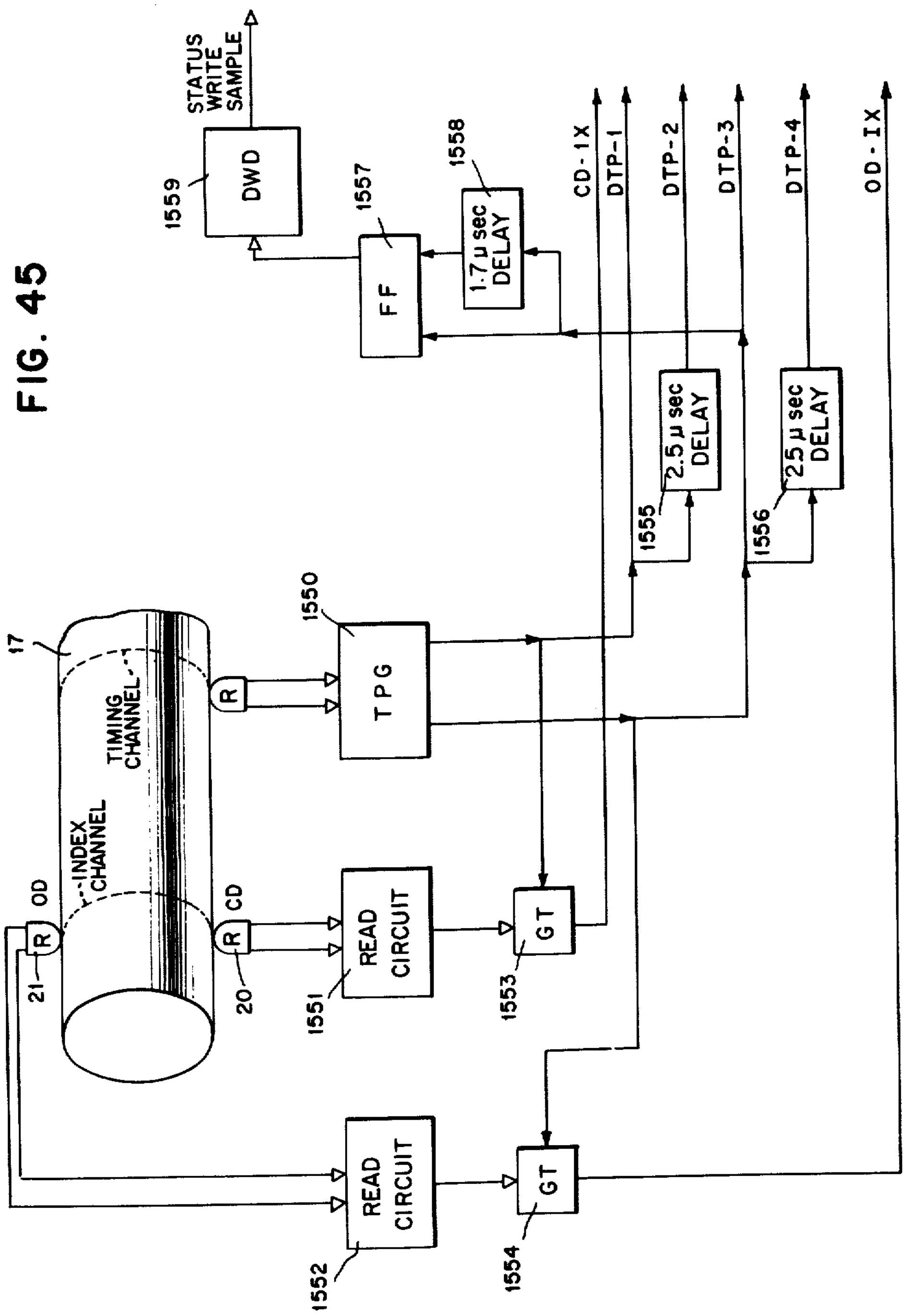

FIG. 45 is a block schematic diagram of the Timing and Index Circuit shown as a block and accordingly labeled in FIG. 3*f*.

CONVENTIONS EMPLOYED

Throughout the following description and in the accompanying drawings there are certain conventions employed which are familiar to certain of those skilled in the art. Additional information concerning those conventions is as follows:

In FIG. 1 of the drawings, each major part of the apparatus is shown as a block and data transfer and control between major parts is shown by single lines which interconnect those parts. Arrows on the lines of FIG. 1 indicate the direction of data transfer or control.

In the block diagram figures of the drawing subsequent to FIG. 1, a conventional filled-in arrowhead is employed on lines throughout the drawing to indicate (1) a circuit connection, (2) energization with standard positive pulses and (3) the direction of pulse travel which is also the direction of control. A conventional un-filled-in arrowhead is employed on lines throughout the drawing to indicate the same things indicated by a conventional filled-in arorwhead except that the un-filled-in arrowhead illustrates a non-standard pulse generally having a duration considerably longer than the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the line of that cable convey information at different times or (2) that those lines are D.C. level conductors. The numbers appearing within the circle or the rectangular box of a cable indicate the numbers of conductors within the cable. The D.C. levels are on the order of 10 volts when positive and 30 volts when negative, whereas pulses indicated by conventional filled-in arrowheads are positive-going 1/10 microsecond, half-sine 20 to 40 volts in amplitude. Pulses indicated by conventional un-filled-in arrowheads are not necessarily sinusoidal, are usually pulses considerably longer than 1/10 microsecond in duration and those referred to hereinafter are in general on the order of 1 to 10 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

Bold face character symbols appearing within a block symbol identify the common name for the circuit represented, that is, FF identifies a flip-flop, GT a gate circuit, OR a logical OR circuit, and so forth. The character subscripts preceding bold face characters identify the model of the circuit identified by the fold face character, that is, $_A$FF identifies the model A flip-flop, $_C$FF identifies the model C flip-flop and so forth.

In the description the general arrangement of the apparatus of a preferred embodiment of this invention will first be described with respect both to the manner in which the various circuit components and apparatus are interconnected and in respect to the general over-all operation which is performed by these components and apparatus. The description of the general arrangement will be followed by separate and detailed descriptions of the various components and apparatus, which so require it, and each section of the description will have a heading which indicates the apparatus about to be described. The following is an Index or Table of Contents of the description.

TABLE OF CONTENTS

| | Column |
|---|---|
| Introduction to Control Equipment | 7 |
| Functional Description of Control Equipment | 8 |
| Input System | 8 |
| Drum System | 11 |
| Computer System | 13 |
| Memory Element | 13 |
| Computer System Timing | 14 |
| Table 1 (Machine and Memory Cycles) | 15 |
| Table 2 (Instructions) | 17 |
| Instruction Control Element | 17 |
| Table 3 (Class Cycle Matrix Codes) | 18 |
| Table 4 (Instruction Matrix Codes) | 18 |
| Command Generation | 19 |
| Table 5 (Commands Directly Generated by Time Pulse Distributor) | 19 |
| Table 6 (Commands Generated by PT Condition) | 20 |
| Table 7 (Core Memory Commands) | 20 |
| Table 8 (Commands Generated by Mult-OT Condition) | 20 |
| Table 9 (Commands Generated by wrt-PT or rds-PT Condition) | 21 |
| Table 10 (Commands Generated by Set PT or Set OT Condition) | 21 |
| Table 11 (Commands Generated by dvd-PT or tdv-PT Condition) | 23 |
| Table 12 (Commands Generated by mul-OT or tmu-OT Condition) | 24 |
| Table 13 (Consolidated List of Commands) | 24–25 |
| Table 14 (Commands Common to All PT Cycles) | 25 |
| Table 15 (Commands Common to All OT Cycles) | 26 |

TABLE OF CONTENTS—Continued

| | Column |
|---|---|
| Read Operation from Input Drum | 27 |
| Load Address Counter Instruction | 27 |
| Table 16 (Unique Commands of ldc) | 27 |
| Select Drums Instruction | 27 |
| Table 17 (Unique Commands of sdr) | 27 |
| Read Instruction | 27–29 |
| Table 18 (Unique Commands of rds) | 29 |
| Table 19 (Break-In Commands) | 33 |
| Clear and Subtract Word Counter Instruction | 33–34 |
| Table 20 (Unique Commands of csw) | 34 |
| Determining Age of Input Words | 35 |
| Generation of Moving Object Control Signals | 36 |
| Writing Operation on the Output Drum | 36 |
| Table 21 (Unique Commands of wrt) | 37 |
| Table 22 (Break-Out Commands) | 38 |
| Reading from the Output Drum | 39 |
| Section 1 Control | 40 |
| Array Read-In Control | 44 |
| Half-Write Current Generator | 45 |
| Section 1 Array | 47 |
| Reading Words from Section 1 Array | 48 |
| Summary of Output System Operation | 48 |
| Retaining "Full" Status of Drum Registers | 49 |
| Reading the Burst Counter and Elapsed Time Counter | 50 |
| Table 23 (Unique Commands of Select Instruction) | 50 |
| Calculation of Burst Number and Delay for Output Messages | 51 |
| Computer Instructions for Data Processing | 53 |
| Table 24 | 53 |
| Table 25 | 57 |
| Detailed Description of Components | 57 |
| Read Status Control Circuits | 57 |
| Read Control Circuit | 58 |
| CD Write Control Circuit | 59 |
| CD Write Status Control Section | 60 |
| IO Buffer Registers | 61 |
| IO Registers | 62 |
| IO Address Counter | 62 |
| IO Word Counter | 63 |
| Drum Control Register | 63 |
| Memory Buffer Registers | 64 |
| Parity Count and Parity Check | 65 |
| Selection and IO Control Element | 67 |
| Table 26 | 67 |
| Table 27 | 68 |
| Word Transfers from Drum to Memory | 68 |
| Parity Check Control of Words Read from Drum | 71 |
| Initiation of Drum Writing Operations | 71 |
| Read Operation with IO Register Selected | 73 |
| Read Operation with Burst Time Counters (BTC) Selected | 74 |
| Instruction Control Element | 74 |
| Time Pulse Distributor Control and Special Command Generator, etc | 74 |
| Command Generators | 77 |
| Table 28 | 77 |
| Cycle Control Circuit | 77 |
| Memory Unit Selection | 78 |
| Clock Register | 78 |
| Burst Time Counter and Compare | 78 |
| Section 1 Burst Counter and Compare Circuit | 79 |
| Burst Counter Interrogator | 80 |
| Table 29 | 81 |
| Timing and Index Circuit | 81 |

In the interest of illustrating this invention and the manner in which the invention may be used, a particular preferred embodiment and the manner in which that embodiment may be employed in a Control Equipment is illustrated in the drawings and will be described subsequently. It will be understood however, that the invention may take many forms and may be used in places other than in a control equipment.

INTRODUCTION TO CONTROL EQUIPMENT

Reference is made to FIG. 1 which shows in simplified block form the equipment comprising the invention. The Control Equipment may be considered as having four major systems, each system, each signal source and each controlled object being shown by a block symbol in FIG. 1.

FIG. 1 shows a Signal Source 1 and a Signal Source 2. There may be as many signal sources as required, that is, there may be a signal source for each object to be controlled, there may be several signal sources for any one object to be controlled or there may be one signal source for several objects to be controlled. The signal sources may be of any suitable form and their characteristics will be largely determined by the device or devices which are to be controlled. In the case that the controlled object is a moving object, such as an aircraft, and the control equipment is so constructed as to automatically deliver signals which indicate the degree of control to be effected upon the moving object, the signal sources may be suitable radar equipment so constructed as to produce signals representative of the instantaneous position or positions of the object or objects to be controlled.

The signals produced by the signal sources may be in serial digital data form and are transmitted to an Input System 3 where, if in serial form, they are converted into parallel form and stored for subsequent delivery to a Drum System 4. Signals stored in the Input System 3 are delivered to the Drum System 4 and written in parallel form into the first available empty drum register. These stored signals are processed by a Computer System 5 in accordance with a stored program and results of the computation (signals in parallel form) are delivered to the Drum System 4 where they are stored in the first available empty register. These signals representative of computations are read from the Drum System 4 to an Output System 6 where the parallel signals are converted into serial signals and delivered to controlled moving objects 7 and 8.

As so far described, it will be apparent that the signals stored in the Input System 3 will be delivered to the Computer System 5 with a variable time delay which is primarily a function of the rate at which reading operations of the Computer System take place, which are in turn controlled by the stored program.

Figure 2:
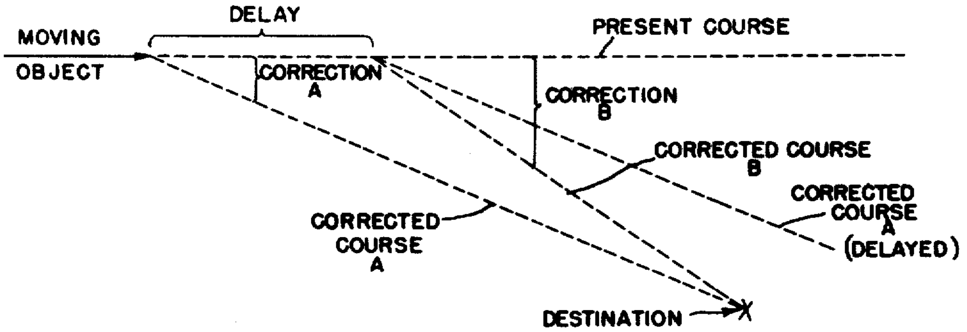
FIG. 2 is a diagram illustrating the effects of delays encountered in the transmission of signals in the equipment of FIG. 1.

Reference is now made to FIG. 1 and FIG. 2. It will be assumed that the Signal Source 1 produces signals indicating the successive instantaneous positions of the moving object, the last of which is shown by the head of the arrow in FIG. 2. If these instantaneous positions are delivered to the Computer System 5 without delay, the computer can generate a control signal having a magnitude indicated as Correction A in FIG. 2. This Correction Signal A if immediately received by the moving object will cause the moving object to move in a direction indicated in FIG. 2 as Corrected Course A and the moving object would arrive at the point marked Destination. However, if the instantaneous position of the moving object was delayed in transmission through the Input System 3 and the Drum System 4, and the Computer System 5 generated the signal Correction A and immediately delivered that Correction A signal to the moving object, the moving object would move in the direction marked Corrected Course A Delayed and the moving object would not arrive at the destination.

Each signal delivered from the Input System 3 through the Drum System 4 to the computer has a time tag which accompanies it. With this time tag the Computer System 5 can detect the amount of delay which the input signal has had and generate a control signal (based upon predictions) having a magnitude indicated in FIG. 2 as Correction B and therefore the moving object will arrive at the destination by way of Corrected Course B.

From the above description with reference to FIG. 1 it will also be noted that signals produced by the Computer System 5, which are representative of final computations, are delayed in the Drum System 4 by an amount of time which is primarily a function of the rate at which the Output System 6 accepts signals from the Drum System 4. These signals are also delayed by an amount of time determined by the empty and full status of the registers of the Drum System 4.

Referring again to FIG. 2 and assuming that the instantaneous position of the moving object is as shown by the arrow in FIG. 2 and the Computer System 5 generates a control signal having a magnitude indicated in FIG. 2 as Correction A, if this Correction A signal is immediately effective upon the moving object it will arrive at the destination as indicated by Corrected Course A in FIG. 2. However, if this Correction A signal is delayed in the Drum System 4 by the amount indicated in FIG. 2 then the path of the moving object would be as indicated in the drawing Corrected Course A Delayed, and the moving object would not arrive at the destination.

The Computer System 5 receives signals from the Output System 6 which indicate the amount of delay which a signal now generated by the Computer System 5 will encounter. The Computer System 5 uses these signals from the Output System 6 to make the necessary computations so that when generated control signals are effective upon the moving object, it will move in the direction marked Corrected Course B in FIG. 2 and the moving object will arrive at the destination.

Figure 1A:
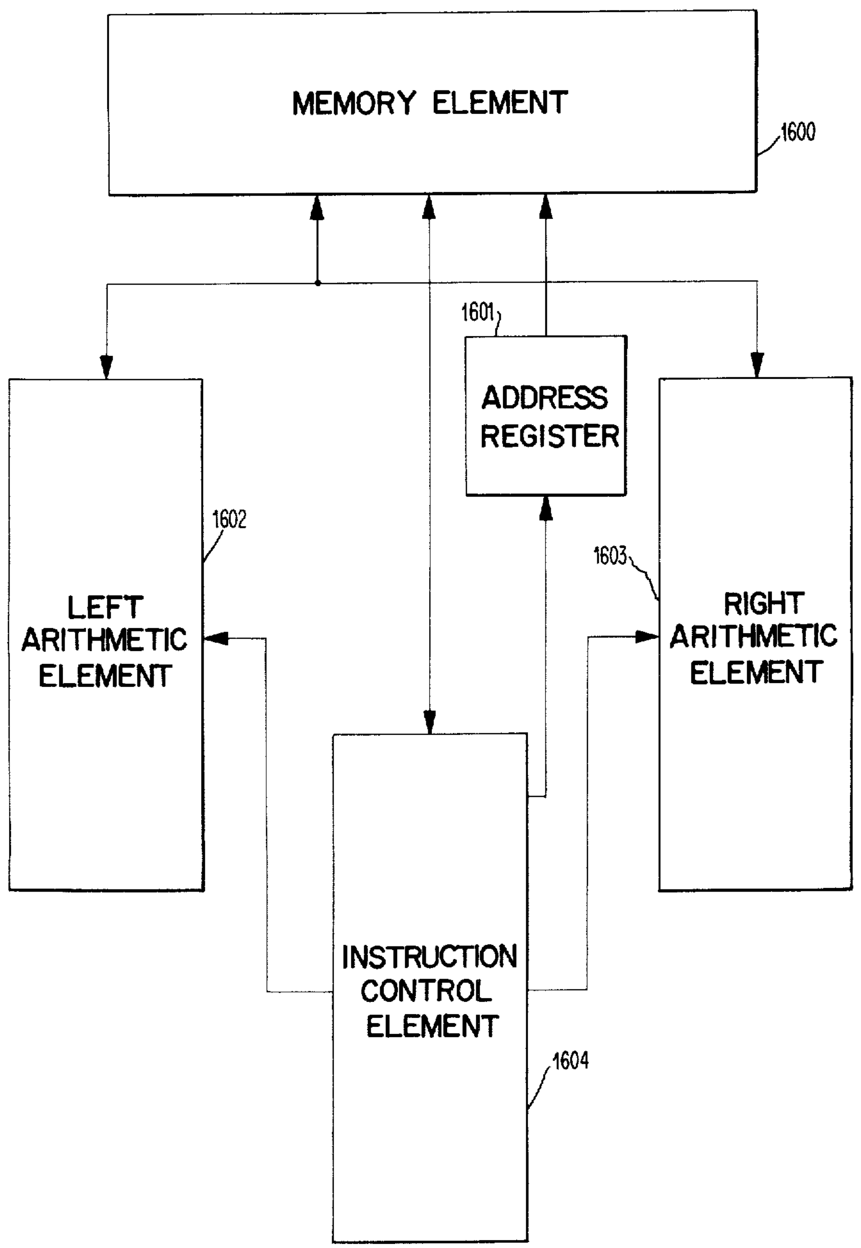

Reference is now made to FIG. 1*a* which shows a simplified block diagram directed to the invention. FIG. 1*a* shows by block symbols a memory element 1600, a right arithmetic element 1603, a left arithmetic element 1602, an address register 1601, and an instruction control element 1604. Instruction signals from the memory element 1600 indicating that a twin operation is to be accomplished are delivered to the instruction control element 1604. Responsive to such instruction signals memory address signals are caused to be delivered from the address register 1601 to the memory element 1600 to specify the operand which is to be obtained from the memory element 1600. Memory control signals produced by the instruction control element 1604 in response to the instruction signals are delivered to the memory element 1600 to deliver the operand selected by the memory address signals. The instruction control element 1604 in response to the instruction signals causes a first and second operand to be delivered to the left and right arithmetic elements respectively. The third operand which is to operate on the first and second operand is delivered to both arithmetic elements where the desired arithmetic operation is performed. One operand can thus mathematically operate on each of two other operands simultaneously in accordance with the principles of this invention.

FIG. 1*a* is a simplified block diagram of equipment constructed in accordance with the principles of the invention. More detailed information will be found in the following description and accompanying drawings.

FUNCTIONAL DESCRIPTION OF THE CONTROL EQUIPMENT

Reference is now made to FIGS. 3*a* through 3*h* which when arranged in accordance with FIG. 3 illustrate in block form the Control Equipment comprising this invention.

*Input system*

The Input System referred to in FIG. 1 is shown in

FIG. 3*e* to include a Range, Theta and Identity Section 9 and a Time Tag Section 10. The Range, Theta and Identity Section 9 receives signals from each of the Signal Sources 1 and 2 (FIG. 1) by way of their corresponding group of three conductors, labeled Timing, Sync and Data.

Reference is now made to FIG. 4 which is a timing chart which shows the timing relationship between timing, sync and data signals. The input signals are in the form of pulses, the pulses appearing on the three separate input conductors. The first input conductor is called the timing input, the second input conductor is called the sync input and the third input conductor is called the data input. As shown in FIG. 4, successive pulses are received on the timing conductor. Coincident in time with one of the timing pulses, a sync pulse may occur on the sync input. In FIG. 4 the sync pulse is assumed to occur coincident in time with the timing pulse labeled ITP–1. Beginning with the third timing pulse following the sync pulse, a pulse or no pulse coincident in time with corresponding timing pulses will be received on the data input, the presence of a pulse indicating a binary One and the absence of a pulse indicating a binary Zero. In FIG. 4 the data signals are shown as dotted lines to emphasize that there may or may not be a pulse at any of those indicated times. The bit coincident in time with timing pulse ITP–4 is called a "busy" bit and if there is a pulse in the busy bit, this pulse indicates that a message follows. A message is in digital form having two words and each word could be said to have two half-words. Bits 1 through 10, which are coincident in time with timing pulses ITP–5 through ITP–14, could be said to be the first half-word or left half-word and may be binary signals representing the R coordinate of the instantaneous position of the moving object. Bits 1 through 12, which are coincident in time with timing pulses ITP–15 through ITP–26, could be said to be the second half-word or right half-word and may be binary signals representing the theta coordinate of the instantaneous position of the moving object. In order to simplify the operational description, it will be assumed that the position of an object is defined in a plane. It will be understood however that in many applications the position will be in 3 dimensions. The bit coincident in time with ITP–27 is called a parity bit and is either a pulse or no pulse dependent upon the number of binary ones in the R data and theta data, that is, the sum of binary ones in R and theta and the parity bit is an even number. The presence of a pulse on the data conductor coincident with ITP–28 indicates that a second word occurs in the message. The second word may be representative of any desired information.

The second sync pulse occurs at ITP–53 time and the busy bit for the next message occurs at ITP–56 time. The second message, like the first message, could be said to have two words, each word having two half-words.

Referring back to FIGS. 3*a* through 3*h*, and particularly to FIG. 3*e*, the busy bits as well as the sync pulses and timing pulses are used in the Range, Theta and Identity Data Section for control purposes. This section of the Input System also receives timing pulses (DTP pulses) and Demand pulses from the Drum System 4.

As will be described in greater detail hereinafter, as the magnetic drum of the Drum System 4 rotates, successive drum registers pass beneath the data writing heads and data reading heads. Each drum register occupies a space such that the register takes approximately 10 microseconds to pass beneath those reading and writing heads. During each of these 10 microsecond intervals four timing pulses (DTP1, DTP2, DTP3 and DTP4) are generated which are approximately 2.5 microseconds apart and appear on separate conductors. Of these drum timing pulses DTP1, DTP2 and DTP4 are delivered to the Range, Theta and Identity Section 9 for synchronizing operations therein. Each pulse received from the conductor labeled Drum Demand effectively requests the Input System to deliver two successive 33 bit parallel words spaced 10 microseconds apart. The Range, Theta and Identity Section 9 also receives D.C. level signals from the Time Tag Section by way of conductors labeled Odd and Even. The Time Tag Section receives pulses from each of the conductors labeled One Pulse Every 8 Seconds and One Pulse Every .25 Second. This section is basically a binary counter which is reset to Zero in response to a pulse on the conductor labeled One Pulse Every 8 Seconds and counts the pulses received from the conductor labeled One Pulse Every .25 Second. If the total number of binary Ones of the count is an even number, a positive D.C. level is delivered to the conductor labeled Even whereas if the total number of binary Ones in the count is an odd number, a positive D.C. level is delivered to the conductor labeled Odd. The Time Tag Section also receives Drum Timing pulses DTP1, DTP2 and DTP3 in order to synchronize the operation of that section with respect to the Drum System.

The Input System functions as follows:

(1) The input data bits of a message which are received in serial form and are stored in the Range, Theta and Identity Section for delivery in parallel form provided that the data bits are preceded by a busy bit pulse and the total number of binary Ones in the message is an even number.

(2) Provided that (*a*) data bits of a message have been stored and (*b*) a Drum Demand pulse is received, pulses representative of the Range and Theta data of the first word of the message are delivered to 22 of the conductors of cable 11 and 10 microseconds thereafter, pulses representative of the second word of the message are delivered to those conductors of cable 11.

(3) When pulses representative of the first or second word of a message are delivered to those 22 conductors of cable 11, pulses identifying which source that message came from are delivered to three of the other conductors of cable 11.

(4) Each time that pulses are delivered to the above mentioned 22 conductors of cable 11, a parity signal is delivered to still another conductor of cable 11. This parity signal will be a pulse if an odd signal is received from the Time Tag Section and the total number of pulses delivered to the 22 conductors of cable 11 is an even number or if an even signal is received from the Time Tag Data Section and the total number of pulses delivered to the 22 conductors of cable 11 is an odd number. The parity signal will be a no pulse if an even signal is received from the Time Tag Data Section and the total number of pulses delivered to the conductors of cable 11 is an even number or if an odd signal is received from the Time Tag Data Section and the total number of pulses delivered to the 22 conductors of cable 11 is an odd number.

(5) Each time that pulses are delivered to the conductors of cable 11; (*a*) a pulse is delivered to the conductor labeled Data Available and (*b*) a pulse is delivered to the conductor labeled Time Tag Read-Out.

(6) In response to a pulse on the conductor labeled Time Tag Read-Out, the Time Tag Data Section delivers signals to the conductors of a cable 12 representative of the instantaneous count of One Pulse Every .25 Second pulses which have been received subsequent to the last pulse received from the conductor labeled One Pulse Every 8 Seconds.

Summarizing the operation of the Input System, if the message has been received and checked for parity, and subsequent thereto a Drum Demand pulse is received, two 33 bit words are produced with a Data Available pulse accompanying each word. The bit assignments of the first word of each message produced by the Input System are shown in FIG. 6.

Referring now to FIG. 6, starting from the left, the first bit (called the parity bit) is either a pulse or no pulse (binary One or Zero) dependent upon the number of binary Ones in the remaining 32 bits of the word. The parity bit makes the total number of binary Ones in the 33 bit word an odd number. The left sign bit is meaningless while the L1 through L5 bits represent the binary count of the number of 1 pulses per .25 second pulses which have been received since the last received pulse of the 1 pulse per 8 second pulses. This count of the number of 1 pulse per .25 second pulses is called a "time tag" and as will be explained in greater detail hereinafter, this count can be used to determine the age of a word of data at the time that the word is used by the Computer System 5. The L6 through L15 bits are the bits of the left half-word of the first word of the message received by the Input System. As noted with respect to FIG. 4, this half-word represents the R coordinate of the position of the moving object. The right sign bit is meaningless while the R1 through R3 bits are a binary code that indicates which one of the several Signal Sources that particular word was received from. The R4 through R15 bits are the bits of the right half-word of the first word of the message received from the Input Channel Section and may represent the $\theta$ coordinate of the position of the moving object.

The bit assignments of the second word of each message may be identical to the bit assignments of the first word. However, bits of the second word which correspond to the R and theta bits of the first word may be representative of information other than Range and theta, such as, for example, the amount of delay which this message has received prior to having been delivered to the Input System. Although the time tag and the source identity information accompanies both the first word and the second word of the message, it will be understood that in certain applications the time tag and the source identity information need be sent with only one word of the message.

More detailed information concerning the Input System and a preferred embodiment of the Input System will be found in the above noted copending application "B."

*Drum system*

As previously noted with respect to FIG. 1, signals from the Input System 3 are delivered to the Drum System 4. Those circuits of the Drum System which deliver signals to or receive signals from the Computer System are designated CD (Computer and Drum Interchange) whereas those circuits of the Drum System which deliver signals to or receive signals from systems other than the Computer System are designated OD (Outside and Drum Interchange). As illustrated in FIGS. 3*e* and 3*f*, the Drum System 4 may be considered as including (1) an OD Drum Write Element 13, (2) a CD Drum Read Element 14, (3) an OD Drum Read Element 15, (4) a CD Drum Write Element 16, (5) a Drum and Head Assembly 17 and (6) a Drum Common Element 18.

As the drum rotates, a portion of the drum surface (known in the art as a timing channel) passes beneath a reading head 19. This timing channel is indicated in FIG. 3 as a dotted line, labeled accordingly, and is in reality merely a succession of magnetized spots. These spots are recorded on the drum surface in such a manner that when the drum rotates a sine wave signal is induced in the read head 19. Each magnetized spot of the timing channel occupies a space indicating a drum register. As a magnetized spot passes underneath the read head 19 one sine wave cycle of voltage is induced in the winding of that read head. Assuming that there are 2,048 equidistantly spaced spots in the timing channel, the drum is said to have a closed timing channel and 2,048 registers. As the drum rotates, another portion of the drum surface (designated as an index channel) passes underneath another read head 20 and still another read head 21. This index channel is indicated in FIG. 3 as a dotted line, labeled accordingly, and is in reality merely a succession of equidistantly spaced magnetized spots with one of those spots being magnetized in the opposite direction with respect to all other spots. When this one magnetized spot passes underneath the read head 20 and read head 21, one sine wave of voltage of opposite phase with respect to the other cycles is induced in the windings of each of those read heads. These heads are circumferentially displaced so that this unique sine wave is induced in those heads at different times.

Since the timing channel effectively divides the drum surface into 2048 equidistantly spaced registers around the circumference of the drum, the oppositely polarized spot in the index channel when received by the read head 20 is arbitrarily said to be the zero register and the oppositely polarized spot when received by the read head 21 coincides in time with the last or 2047th register.

The signals induced in the read heads 19, 20 and 21 are delivered to a Timing and Index circuit 22. For the purposes of the immediate description this timing and index circuit is capable of performing the following functions:

(1) Upon receipt of each cycle of voltage from the read head 19, the previously noted DTP1 through DTP4 pulses are generated, and (2) In response to the cycle of voltage received from the read head 20 which is of opposite phase to all other cycles, the Timing and Index Circuit produces a pulse on the conductor labeled CD IX hereinafter referred to as the CD index pulse and this pulse occurs coincident in time with one of the DTP1 pulses, and (3) In response to the cycle of voltage induced in the read head 21, which is of opposite phase, the Timing and Index Circuit produces a pulse on the conductor labeled OD IX, hereinafter referred to as the OD index pulse and this pulse occurs coincident in time with one of the DTP3 pulses.

As the drum rotates still another portion of the drum surface (referred to hereinafter as OD Status Channel) passes beneath a read head 22 and a write head 23. The OD Status Channel is also a succession of magnetized spots representative of binary Ones and binary Zeros. A binary Zero recorded in the OD Status Channel indicates that the register of the drum which corresponds to that bit is empty whereas a binary One recorded in the OD Status Channel indicates that the register corresponding to that bit is full.

As the drum rotates still another portion of the drum surface (hereinafter referred to as the CD Status Channel) passes beneath a write head 24 and a read head 25. The CD Status Channel is also a succession of magnetized spots. A binary One recorded in the CD Status Channel indicates that the register corresponding to that bit is full, whereas a binary Zero recorded in the CD Status Channel indicates that the register corresponding to that bit is empty.

Signals from the read head 22 are delivered to an OD Write Status Control Section 26 of the Input Drum Write Element 13. The OD Write Status Control Section 26 in addition to receiving the signals from the OD Status Channel receives the previously mentioned Data Available signals from the Range, Theta and Identity Section 9 of the Input System 3 and also receives DTP and OD index pulses as well as Status Write Sample pulses.

The OD Write Status Control Section 26 functions as follows:

(1) If a Zero signal or no signal is received from the read head 22 (indicating that the next register which is available to be written into either contains no word or a word which has already been transferred from the drum) a Demand pulse at DTP3 time is applied to the conductor labeled Drum Demand provided that this next register is an even numbered register.

(2) If a binary One signal is received from the read head 22 (indicating that the next register which is available to be written into contains a word which has not yet been transferred from the drum) a Write a One signal at DTP3 time is applied to the write head 24.

(3) If a pulse is received from the conductor labeled Data Available, a write pulse at DTP3 time is applied to the conductor labeled Write followed by a reset pulse at DTP4 time being applied to the conductor labeled Reset, and a Write a One signal at DTP3 time is applied to the write head 24.

(4) If a Zero signal or no signal is received from the read head 22 and no Data Available pulse is received in response to the pulse on the conductor labeled Drum Demand, a Write a Zero signal beginning at DTP3 time is applied to the write head 24.

The OD Drum Write Element 13 also includes an OD Write Section 27 which receives 33 bit word signals from the Input System 3, stores those signals and in response to the Write pulse from the OD Write Status Control Section 26 it delivers signals representative of the 33 bit word to a set of write heads 28 which are positioned adjacent to an input drum field 29.

The circuits involved in the operation of writing two successive words in adjacent registers of the drum on a "Status" basis are described in detail in the above noted copending application "G."

Signals recorded in the CD Status Channel are delivered from the read head 25 to a CD Read Status Control Section 30 of the CD Drum Read Element 14. The CD Read Status Control Section 30 also receives timing pulses from the Timing and Index Circuit 22. The CD Read Status Control Section 30 performs the following functions:

(1) Provided that a read signal (positive 10 volts) is received from a conductor labeled Read, and a binary One signal (indicating a full register) is received from the read head 25, then a pulse is delivered to the conductor labeled Read Sample. If no pulse is received on the conductor labeled No Compare before the next DTP3 pulse following the Read Sample pulse, then a Write a Zero signal is delivered to the write head 23. If a pulse is received on the conductor labeled No Compare before the next DTP3 pulse following the Read Sample pulse, then a Write a One signal is delivered to the write head 23.

(2) Provided that a read signal is received from the conductor labeled Read, and a binary Zero signal (indicating an empty register) is received from the read head 25, then NO pulse is delivered to the conductor labeled Read Sample and a Write a Zero signal is delivered to the write head 23.

(3) Provided that a no read signal (−30 volts) is received from the conductor labeled Read than (*a*) if a binary One signal is received from the read head 25, a Write a One signal is delivered to the write head 23 and (*b*) if a binary Zero signal is received from the read head 25, a Write a Zero signal is delivered to the write head 23.

The CD Drum Read Element 14 also includes an Input Read Section 31 which receives signals from the read heads **31*a* and delivers those signals in the form of .1 microsecond pulses to the conductors of cables 32 and 33 provided that a Read Sample pulse is received from the CD Read Status Control Section 30**.

*Computer System*

As noted above, reading operations from the drum require control signals on the conductor labeled Read and No Compare. These control signals result from operations within the Computer System 5 of FIG. 1. The Computer System shown as block 5 in FIG. 1 is shown in more detail in FIGS. 3*a*, 3*b*, 3*g* and 3*h*.

*Memory element.*—The Computer System includes a Memory Element 34 which functions as follows:

(1) In response to a pulse on a conductor 59 followed by a pulse on the conductor 36, the signals, stored in the particular memory register defined by the signals on the conductors of a cable 37, are delivered to the conductors of a cable 38 and a cable 39. The signals delivered to the conductors of cable 38 represent the left half-word of the word stored in the particular memory register whereas the signals delivered to the conductors of cable 39 represent the right half-word. This operation will hereinafter be referred to as reading a word from memory. This operation does not take place if a pulse is received on the conductor 40.

(2) In response to a pulse on the conductor 59 followed by a pulse on each of the conductors 36 and 40, the signals received from the conductors of a cable 41 and a cable 42 are stored in the memory register defined by the signals on the conductors of cable 37. This operation will hereinafter be referred to as storing a word in memory.

More detailed information concerning the Memory Element 34 and a preferred embodiment will be found in the above noted copending application "D."

As a result of the operation of reading a word from memory, the left half-word and the right half-word are delivered by way of the conductors of cables 38 and 39 to a Left Memory Buffer Register 43 and a Right Memory Buffer Register 44, respectively. In response to a pulse on the conductor labeled Left Memory Buffer Register to Operation Register, bits 1 through 10 of the left half-word stored in the Left Memory Buffer Register 43 are delivered by way of the conductors of a cable 46 to an Operation Register 47 and bits 10 through 15 are delivered by way of the conductors of a cable 48 to a Selection and Input-Output Control Element 49.

*Computer system timing.*—Signals stored in the Operation Register 47 are delivered by way of the conductors of cable 50 to an Instruction Control Element 51. The Instruction Control Element generates various pulses dependent upon the signals received from the Operation Register 47. These pulses are delivered to units of the Computer System to cause various operations in a manner to be described in detail hereinafter. The relative occurrence times of these pulses with respect to other Computer System events are shown in FIG. 7. In FIG. 7 it will be seen that there are 15 time pulses in a machine cycle. Instruction pulses are numbered in the following manner: IP1, IP2, IP3, IP4, IP5, IP6, IP6A, IP7, IP8, IP8A, IP9, IP10, IP11 and IP11A. A similar method of numbering is utilized for the time pulses (TP's). A machine cycle begins with IP1 and ends with IP11A at which time the cycle is resequenced from 1 through 11A for the next machine cycle. TP and IP pulses are usually generated simultaneously.

The minimum time between successive words read from or written into the Memory Element 34 is called a memory cycle. As illustrated and described herein the time interval of a memory cycle is 7½ microseconds. The time pulses (shown as occurring at ½ microsecond intervals along the horizontal axis of FIG. 7) establish approximate relationships between events in the memory cycle and in the machine cycles. Except for those pulses which coordinate and synchronize the core memory with respect to the Computer System, the internal memory timing is independent of the time pulses. The machine cycle comprises an interval of time equal to the memory cycle and its events are controlled by the TP or IP pulses described above. Although the machine cycle is of the same duration as the memory cycle, the two should be distinguished since in certain program instructions, information from core memory is not used.

Operation of the Computer System may also be discussed in terms of an instruction cycle. An instruction cycle is defined as that time required for the Computer to execute one complete instruction and is usually composed of from one to three machine cycles. Of the many instructions which may be performed by the Computer System some involve simple operations such as setting up control circuits or transferring words between registers. Because of this simplicity of operation, these instructions are completed in one memory cycle, or less, and are called "one-memory-cycle instructions."

Some of the many instructions require two memory cycles for completion and these instructions are called "two-memory-cycle instructions." Before such instructions can be completed, an operand must be obtained from the Memory Element 34 and therefore a second memory cycle is provided and during this second memory cycle the operand is obtained and the instruction completed. Still other instructions require three memory cycles for completion; the instruction word is obtained and decoded during the first memory cycle; and operand is obtained and the required operation is performed during the second memory cycle; and the result of the operation is stored in the Memory Element during the third memory cycle. The memory or machine cycles which compose the instruction cycle, have been assigned distinctive names for easy reference. The names and characteristics of these are listed in Table 1 below:

TABLE 1.—NAMES AND CHARACTERISTICS OF MACHINE OR MEMORY CYCLES

| Memory or Machine Cycle | Name | Characteristic |
| --- | --- | --- |
| First | Program Time (PT) | Decodes instruction and initiates execution. |
| Second | Operate Time A (OTA) | Obtains operand and performs operation. If no operate time B follows, this cycle is called simply operate time. |
| Third | Operate Time B (OTB) | Stores result of operation in core memory. |

Although a machine cycle begins with TP–0, an instruction cycle starts with IP7 of a program time cycle which is denoted PT7. FIG. 8 shows the basic machine and instruction cycle timing relationships. In FIG. 8 the instruction cycles are shown as cross-hatched areas on the sequence of the machine cycles. Thus in a one-memory cycle instruction, the decoding process starts at PT7 and the instruction is completed by PT6 of the subsequent machine cycle and the decoding of the next instruction is initiated at this time. Similarly, a two-memory-cycle instruction starts at PT7, continues through the subsequent OTA cycle and is completed by PT6 of the next PT cycle, when the execution of the next instruction begins. As has been noted, the time from IP1 to IP6 of a program time cycle is used to complete an instruction previously begun and this time interval is also utilized to bring the new instruction out of the Memory Element 34.

An exception to the usual sequence of machine cycles as described above occurs in certain instructions performed by the Computer System. In these instructions additional time is required for the performance of a series of repetitious operations. Such operations are multiplication, which requires repeated addition; and division, which requires repeated subtraction. This additional time is supplied by stopping the generation of IP pulses thus stopping the operation of instruction and machine cycle sequences. This stoppage is known as "Pause" since the Computer System pauses in its usual sequential operation long enough to complete the repetitious operations. An example of an instruction cycle utilizing a pause is depicted in the last diagram of FIG. 8. In the illustration, the decoding of the instruction begins at PT7;

the operand (in this case either the multiplicand or the divisor) is obtained during the subsequent OTA cycle. At the end of the OTA cycle, the generation of instruction pulses is stopped and the Computer System goes into a pause, the duration of which is determined by the particular instruction being executed. The repetitious additions or subtractions composing the multiplication or division, for example, are executed during this period. The "pause" condition then ends and the program time cycle begins, completing the instruction by PT6.

An instruction word is read from the Memory Element 34 during each program time cycle. This word contains coded information which specifies the particular operations that the Central Computer is to perform during the ensuing cycle. As stated in the preceding paragraph this cycle normally begins at PT7, when decoding of the instruction word is just beginning. The decoding of the instruction word takes place principally in the Instruction Control Element 51. The 32 bits of the instruction word are given names to facilitate reference or discussion; these names are shown in FIG. 9.

Referring now to FIG. 9, the 32 bit instruction word is divided into two 16 bit half-words termed respectively the left and right half-words. Each half-word consists of the sign bit and 15 numerical bits which are designated LS, L1, L2, . . . L15 for the left half-word and RS, R1, R2 . . . R15 for the right half-word. The left half-word is sometimes called the operation part of the word and the right half-word the address part. Bits L1 through L3 are termed the "Index Indicator" since they are used to specify which one of several index registers is to be used during indexing. Indexing provides a means of altering or cycling the Computer System program for repetitive operation and is more fully described in the above referred to copending application "D."

Bits L4 through L10 are termed the "operation code." These bits determine which one of the many instructions is to be performed. Bits L4 through L6 specify one of 8 classes of instructions whereas L7 through L10 specify one of the variations of the basic instruction class. Bits L10 through L15 are termed the index interval and are used to provide additional information required by particular instructions as described in greater detail in the previously referred to copending application "D." Bits L10 through L15 are also used for selection of one of the several input or output devices as will be subsequently described. Bit 10 is utilized in both the operation code and the index interval. However this causes no ambiguity for whenever the index interval is used by an instruction, bit 10 is not used to identify the instruction involved. Thus when the whole index interval is utilized, the appropriate instruction is completely specified by only those bits of the operation code instead of the usual seven.

The right half-word of the instruction word usually denotes the location in the Memory Element 34 where data may be stored or from which additional pertinent data may be obtained. This additional data usually takes the form of an operand required in the execution of a mathematical operation. In certain instructions the right half-word is used to load some of the registers within a Program Element 46 (FIG. 3*h*). The address part of an instruction word is meaningless in certain instructions since no reference to a memory unit is required. An example of this is the Clear and Subtract Word Counter instruction. In this case no new information from memory is necessary and there is no new information to be stored in memory and therefore the address part is extraneous and meaningless.

For the purpose of illustrating and describing this invention, the following table lists by name and code number those instructions which will be specifically described subsequently. It is to be understood that in many practical embodiments of this invention, many other instruction operations may be performed by the Equipment.

TABLE 2

| Class | Binary code | Variation | Binary code | Abbrev. |
|---|---|---|---|---|
| Miscellaneous | 000 | Program Stop | 0000 | hlt. |
| | | Clear and Subtract Word Counter. | 0100 | csw. |
| Add | 001 | Clear and Add | 0000 | cad. |
| | | Add | 0001 | add. |
| | | Twin and Add | 0010 | tad. |
| | | Clear and Subtract | 0110 | csu. |
| | | Subtract | 0111 | sub. |
| | | Twin and Subtract | 1000 | tsu. |
| | | Clear and Add Magnitude | 1100 | cam. |
| | | Difference Magnitude | 1101 | dim. |
| Multiply | 010 | Multiply | 1010 | mul. |
| | | Twin and Multiply | 1011 | tmu. |
| | | Divide | 1100 | dvd. |
| | | Twin and Divide | 1101 | tdv. |
| Store | 011 | Store | 0101 | fst. |
| | | Left Store | 0110 | lst. |
| | | Right Store | 0111 | rst. |
| | | Store Address | 1000 | sta. |
| | | Right Add One | 1001 | adr. |
| | | Exchange | 1010 | ech. |
| Input-Output | 110 | Load IO Address Counter | 0000 | ldc. |
| | | Select Drum | 001- | sdr. |
| | | Select | 010- | sel. |
| | | Read | 1110 | rds. |
| | | Write | 1111 | wrt. |

*Instruction control element.*—As previously noted with respect to FIG. 3*a*, the signals stored in the Operation Register 47 are delivered to the Instruction Control Element 51. Although the One and Zero signals of each of the 10 bits stored in the Operation Register are delivered by way of the 20 conductors to the Instruction Control Element 51, bits 1 through 3 will receive no further consideration herein since their purpose is fully described in the previously mentioned copending application "D."

Reference is now made to FIGS. 10*a*, 10*b* and 10*c* which, when arranged end to end in that order, illustrate in logical block form the Instruction Control Element shown as block 51 in FIG. 3*a*.

A Time Pulse Distributor 52, in response to a positive D.C. level on the conductor labeled Break or No Pause and pulses on the conductors labeled IP Driver and TP Driver, causes the IP conductors as well as the TP conductors to be sequentially and cyclically pulsed. The IP pulses are delivered to a Command Generator 53 where they will cause various ones of its output conductors to be pulsed. The particular ones of those conductors which are pulsed is dependent upon which of the various output conductors from a Cycle Control Circuit 54, a Class Cycle Matrix 55 and a Variation Matrix 56 are positive. It should be noted that various output conductors of the Class Cycle Matrix 55 and the Variation Matrix are applied to the input of an Instruction Matrix 57 whose outputs are connected to the Command Generator 53. It should be further noted that a Memory Unit Selector 58 has its outputs also connected to the Command Generator 53.

The Class Cycle Matrix 55, which is essentially a decoder and preferably of the conventional diode type, receives bits 4 through 6 of the Left half-word of an instruction. As previously noted, these bits specify one of several classes of instruction. The Class Cycle Matrix also receives signals from the Cycle Control Circuit 54. The output conductors of the Class Cycle Matrix are appropriately labeled in accordance with the conditions under which those conductors will be positive.

The following table shows which combination of positive potentials on input conductors will produce a positive potential on a given output conductor of the Class Cycle Matrix 55:

TABLE 3

| Output conductor | Positive potentials on input conductors: Code from operation register | Positive potentials on input conductors: From cycle control circuit |
|---|---|---|
| MISC-OT | 000 | OT |
| IO-OT | 110 | OT |
| ADD-PT | 001 | PT |
| ADD-OT | 001 | OT |
| MULT | 010 | |
| MULT-PT | 010 | PT |
| MULT-OT | 010 | OT |
| STORE-PT | 011 | PT |
| STORE-OTA | 011 | OT and A |
| STORE-OTB | 011 | OT and B |
| MISC-PT | 000 | PT |
| IO-PT | 110 | PT |

The Variation Matrix 56, which is also a decoder of the diode type, receives bits 7 through 10 of the left halfword of an instruction. As previously noted, these bits specify a variation within a given class of instructions. The output conductors of the Variation Matrix 56 are appropriately labeled in accordance with the binary code which causes the conductor to be positive.

Certain of the output conductors from the Class Cycle Matrix 55 and the output conductors from the Variation Matrix 56 are applied to the Instruction Matrix 57. The output conductors of the Instruction Matrix 57 are appropriately labeled in accordance with the conditions under which those conductors will be positive.

The following table shows which combination of positive potentials on input conductors will produce a positive potential on a given output conductor of the Instruction Matrix 57:

TABLE 4

| Output conductor | Positive potentials on input conductors: From Class Cycle Matrix | Positive potentials on input conductors: From Variation Matrix | Positive potentials on input conductors: From Cycle Control Circuit |
|---|---|---|---|
| tmu | MULT | 1011 | |
| mul | MULT | 1010 | |
| tad-OT | ADD-OT | 0010 | |
| dim-OT | ADD-OT | 1101 | |
| tsu-OT | ADD-OT | 1000 | |
| csu-OT | ADD-OT | 0110 | |
| add-OT | ADD-OT | 0001 | |
| sub-OT | ADD-OT | 0111 | |
| cad-OT | ADD-OT | 0000 | |
| cam-OT | ADD-OT | 1100 | |
| dud | MULT | 1100 | |
| tmu | MULT | 1011 | |
| tdv | MULT | 1101 | |
| dvd-PT | MULT-PT | 1100 | |
| tdv-PT | MULT-PT | 1101 | |
| mult-OT | MULT-OT | 1010 | |
| tmu-OT | MULT-OT | 1011 | |
| dvd-OT | MULT-OT | 1100 | |
| tdv-OT | MULT-OT | 1101 | |
| fst-PT | STORE-PT | 0101 | |
| ech-PT | STORE-PT | 1010 | |
| rst-OTA | STORE-OTA | 0111 | |
| aor-OTA | STORE-OTA | 1001 | |
| lst-OTA | STORE-OTA | 0110 | |
| sta-OTA | STORE-OTA | 1000 | |
| ech-OTA | STORE-OTA | 1010 | |
| rst-OTB | STORE-OTB | 0111 | |
| aor-OTB | STORE-OTB | 1001 | |
| lst-OTB | STORE-OTB | 0110 | |
| sta-OTB | STORE-OTB | 1000 | |
| fst-OTB | STORE-OTB | 0101 | |
| ech-OTB | STORE-OTB | 1010 | |
| hlt-PT and IO Interlock ON. | MISC-PT | 0000 | IO Interlock ON. |
| csw-PT | MISC-PT | 0100 | |
| hlt-PT | MISC-PT | 0000 | |
| IO-PT and IO Interlock ON. | IO-PT | -------- | IO Interlock ON |
| sel-PT | IO-PT | 010- | |
| sdr-PT | IO-PT | 001- | |
| rds-PT | IO-PT | 1110 | |
| wrt-PT | IO-PT | 1111 | |
| sel-OT | IO-OT | 010- | |
| sdr-OT | IO-OT | 001- | |

The Class Cycle Matrix 55, the Variation Matrix 56 and the Instruction Matrix 57 may be of well known construction and require no further description as to their structure; however, to illustrate by way of example the manner in which those circuits operate it will be assumed that the binary code 000 0100 is received from bits 4 through 10 of the operation register.

As noted in Table 2 above, the binary code 000 identifies the Miscellaneous Class of Instruction and this class code in combination with the variation binary code 0100 identifies the Clear and Subtract Word Counter instruction. While the binary code 000 is received by the Class Cycle Matrix 55, either the conductor PT or the conductor OT will be positive; if the conductor PT is positive, then the output conductor labeled MISC PT will be positive. If the OT conductor is positive, then the output conductor labeled MISC OT will be positive. When the variation binary code 0100 is received by the Variation Matrix 56, its output conductor labeled 0100 will be positive. The conductors labeled MISC PT, MISC OT, and 0100 are applied to the Instruction Matrix 57. In response to a positive potential on the conductor labeled MISC PT and the conductor labeled 0100, a positive potential is applied to the conductor labeled csw-PT. As will become apparent from the subsequent description, the conductor MISC-OT will not be positive during the time that the Clear and Subtract Word Counter instruction is being performed.

Since the Command Generator 53 produces many command pulses which are generated in a particular order for various instructions and since an understanding of those command pulses will assist in an understanding of this invention, the commands will be discussed as to the conditions under which a given command is generated and these commands are also tabulated in FIGS. 11*a* through 11*y*. FIGS. 11*a* through 11*y* show for a given instruction, the commands which are generated during that instruction time and also show the time of the PT and OT cycles at which a given command occurs. While reading the following discussion as to under what circumstances a given command is generated it should be noted that the information is tabulated in FIGS. 11*a* through 11*y*.

In FIGS. 10*a*, 10*b* and 10*c* the commands produced by the Command Generator 53 and the Time Pulse Distributor 52 are identified by a particular reference number on each conductor. The reference numbers will not only serve to identify the conductors but also serve to identify the command number associated with a given conductor.

The following commands are generated at the indicated time directly from the output of the Time Pulse Distributor 52:

TABLE 5

| Command name | Conductor (Command) number | Time |
|---|---|---|
| Clear Memory Controls | 59 | TP-0 |
| Clear Left Memory Buffer Register | 60A | TP-1 |
| Clear Right Memory Buffer Register | 60B | TP-1 |

Each of the following commands is generated by the Command Generator 53 as a result of a positive potential received from the conductor labeled PT:

TABLE 6

| Conductor (Command) Number | Command name | Time |
|---|---|---|
| 61 | Program Counter to Memory Address Register | IP-1 |
| 62 | Clear Address Register | IP-6 |
| 63A | Clear Operation Register | IP-6 |
| 63B | Clear Index Interval Register | IP-6 |
| 64 | Clear Step Counter and Divide Time Pulse Distributor. | IP-6 |
| 65A | Record Left Overflow | IP-6 |
| 65B | Record Right Overflow | IP-6 |
| 66 | Add One to Program Counter | IP-7 |
| 67A | Left Memory Buffer to Operation Register | IP-7 |
| 67B | Right Memory Buffer to Address Register | IP-7 |

In response to a positive D.C. level on the conductor labeled OT, the Command Generator 53 produces a pulse on the conductor 68 and this command which occurs at IP–1 time is called Address Register to Memory Address Register.

In response to a positive potential on the conductor labeled Core Memory the following commands are generated at the times indicated:

TABLE 7

| Command name | Conductor (Command) number | Time |
|---|---|---|
| Start Memory | 69 | IP-2 |
| Parity Check | 70 | IP-11 |

In response to a positive potential on the conductor labeled ADD-PT the Command Generator 53 produces a pulse on the conductors 71A and 71B and these commands which occur at IP–2 time are called Left End Carry and Right End Carry, respectively. In response to a positive potential on the conductor labeled MULT-PT the Command Generator produces a pulse on the conductors 72A and 72B and these commands which occur at IP–6 time are called Left Correct Sign and Right Correct Sign, respectively.

In response to a positive potential on the conductor labeled MULT-OT, the following commands are generated at the times indicated:

TABLE 8

| Command name | Conductor (Command) number | Time |
|---|---|---|
| Start 2 mc. Pulses | 73 | IP-8 |
| Clear Left Sign Control | 74A | IP-6 |
| Clear Right Sign Control | 74B | IP-6 |

In response to a positive potential on the conductor labeled ADD-OT, the conductor MULT-OT or the conductor labeled STORE-OTA, a pulse is produced on the conductor 75 and this command which occurs at IP–7 time is called Left Memory Buffer Register to Left A Register.

In response to a positive potential on the conductor labeled STORE-OTB, a pulse is produced on the conductor 76 and this command which occurs at IP–11 time is called Clear A-B flip-flop to A. In response to a positive potential on the conductor labeled Time Clock, a pulse is produced on the conductor 77 and this command which occurs at TP–3 time is called Clock Register to Memory Buffer Register. Although this command may occur during various instructions, for the purpose of illustrating and describing this invention, it will be assumed that it occurs only in response to a specific Clear and Add (CAD) instruction and therefore this command has been tabulated only in FIG. 11*c* and is underlined therein.

In response to positive potentials on the conductor labeled Core Memory and the conductor labeled B, a pulse is produced on the conductor 78 and this command which occurs at IP–2 time is called Inhibit Sample.

In response to a positive potential on the conductor labeled wrt-PT or the conductor labeled rds-PT the following commands are generated at the times indicated:

TABLE 9

| Command name | Conductor (Command) number | Time |
|---|---|---|
| Address Register Complement to IO Word Counter. | 79 | IP-2 |
| Clear IO Word Counter | 80A | IP-1 |
| Set IO Interlock ON | 80B | IP-1 |
| Clear Left IO Register | 81A | IP-2 |
| Clear Right IO Register | 81B | IP-2 |
| Sense IO Word Counter | 82 | IP-3 |

In response to a positive potential on the conductor labeled ldc-PT a pulse is produced on the conductor 83 at IP–3 time, a pulse is produced on the conductor 84 at IP–2 and these commands are called Address Register to IO Address Counter and Clear IO Address Counter, respectively.

In response to a positive potential on the conductor labeled sel-PT, a pulse is produced on the conductor 85 and this command which occurs at IP–5 time is called Select Pulse.

In response to a positive potential on the conductor labeled rds-PT a pulse is produced on the conductor 86 and this command which occurs at IP–6 time is called PT–6 on Read.

In response to a positive potential on the conductor labeled wrt-PT, a pulse is produced on conductor 87 and this pulse which occurs at IP–6 time is called PT–6 on Write. In response to a positive potential on the conductor labeled sdr-PT a pulse is produced on conductor 88 and this pulse, which occurs at IP–5 time is called Selected Pulse for Drums.

In response to a positive potential on the conductor labeled csw-PT a pulse is produced on the conductor 89 and this pulse, which occurs at IP–9 time, is called Clear 2nd csw Flip-Flop.

In response to a positive potential on the conductor labeled csw-PT and the conductor labeled 1st Transfer Flip-Flop ON, a pulse is produced on the conductors 90 and 91 and these commands which occur at IP–1 time are called IO Word Counter to Right Accumulator Register and 1st or 2nd Transfer, respectively. The command 1st or 2nd Transfer is also produced at IP–5 time in in response to a positive potential on the conductor labeled csw-PT or 2nd Transfer Flip-Flop ON.

In response to a positive potential on the conductor sel-PT or the conductor sdr-PT, the following commands are generated at the times indicated:

TABLE 10

| Command name | Conductor (Command) number | Time |
|---|---|---|
| Address Register to Drum Control Register | 92 | IP-3 |
| Clear Drum Control Register | 94 | IP-2 |

In response to a positive potential on either conductor labeled sdr-OT or sel-OT a pulse is produced on conductor 93 at IP–5 time and this command is called Deselect pulse.

In response to a positive potential on any one of the conductors labelled hlt-PT and IO Interlock ON or IO-PT PT, STORE-PT or sel-PT, a pulse is produced on the conductor 95 and the command, which occurs at IP–11 time, is called Set PT-OT flip-flop to OT.

In response to a positive potential on any one of the conductors labeled IO-PT and IO Interlock ON, MULT-OT, or hlt-PT and IO Interlock ON, a pulse is produced on the conductor 96 and this command which occurs at IP–10 time is called Pause.

In response to a positive potential on either of the conductors labeled hlt-PT and IO Interlock ON or IO-PT and IO Interlock ON, a pulse is produced on the conductor 97 if a pulse is received on the conductor labeled Clear IO Interlock. A pulse on conductor 97 is called the command Clear Pause Flip-Flop. Since this pulse does not occur at any particular time of the Instruction, this command is not tabulated in FIGS. 11*a* through 11*s*.

In response to a positive potential on any one of the conductors MULT-OT, ADD-OT, or ADD-PT, a pulse is produced on conductor 98 and 99 and these commands, which occur at IP–1 time, are called Clear Left A Register and Clear Right A Register, respectively. Conductor 98 is also pulsed at IP–6 time in response to a positive potential on any one of the conductors labeled ech-OTA, rst-OTA, lst-OTA, sta-OTA, or aor-OTA. Conductor 99 is also pulsed at IP–6 time in response to a positive potential on any one of the conductors labeled rst-OTA, aor-OTA, ech-OTA, or lst-OTA.

In response to a positive potential on the conductor labeled aor-OTA a pulse is produced on the conductor 100 and this command which occurs at IP–8 time is called Right Carry One. In response to a positive potential on any one of the conductors labeled ADD-PT, dvd-PT, or tdv-PT, a pulse is produced on each of the conductors 101A and 101B and these pulses, which occur at IP–5 time, are called Left Accumulator Conditional Shift Left and Right Accumulator Conditional Shift Left.

In response to a positive potential on any one of the conductors labeled fst-OTB, lst-OTB or ech-OTB, a pulse is produced on conductor 102 and this command, which occurs at IP–2 time, is called Left Accumulator Register to Left Memory Buffer Register. In response to a positive potential on any one of the conductors labeled aor-OTB, fst-OTB, rst-OTB or ech-OTB, a pulse is produced on conductor 103 and this command which occurs at IP–2 time is called Right Accumulator Register to Right Memory Buffer Register.

In response to a positive potential on the conductor aor-OTB a pulse is produced on the conductor 104 and this command, which occurs at IP–1 time is called Right End Carry After Add One. In response to a positive potential on any one of the conductors labeled ech-OTA, aor-OTA, lst-OTA, mul-OT, dvd-OT, add-OT, sub-OT, dim-OT, cam-OT, csu-OT or cad-OT, a pulse is produced on conductor 105 and this pulse, which occurs at IP–7 time is called Right Memory Buffer Register to Right A Register.

In response to a positive potential on the conductor labeled STORE-OTA or the conductor labeled fst-PT, a pulse is produced on conductor 106 and this command, which occurs at IP–11 time, is called Set A-B Flip-Flop to B.

In response to a positive potential on any one of the conductors labeled MISC-OT, ADD-OT, IO-OT, MULT-OT, or STORE-OTB, a pulse is produced on the conductor 107 and this command, which occurs at IP–11 time is called Clear PT-OT Flip-Flop to PT.

In response to a positive potential on any one of the conductors labeled aor-OTB, rst-OTB, or sta-OTB, a pulse is produced on the conductor 118 and this command, which occurs at IP–2 time, is called Left A Register to Left Memory Buffer Register. In response to a positive potential on the conductor labeled lst-OTB or sta-OTB, a pulse is produced on the conductor 109 and this command, which occurs at IP–2 time, is called Right A Register to Right Memory Buffer Register.

In response to a positive potential on the conductor

ADD-OT or the conductor ech-OTB, a pulse is produced on conductors 110A and 110B and these commands, which occur at IP–10 time, are called Left Carry Zero and Right Carry Zero, respectively.

In response to a positive potential on the conductor labeled dvd-OT or the conductor labeled tdv-OT, a pulse is produced on each of the conductors 111A, 111B and 112. These commands, which occur at IP–7 time, are called Make Left Accumulator Register and Left B Register Positive, Make Right Accumulator and Right B Register Positive, and Set Step Counter equal to 17, respectively. In response to a positive potential on the conductor labeled dvd-PT or the conductor labeled dvt-PT, the following commands are generated at the times indicated:

TABLE 11

| Command name | Conductor (Command) number | Time |
|---|---|---|
| Correct Left Remainder | 113A | IP–2 |
| Correct Right Remainder | 113B | IP–2 |
| Make Left A Register and Left Accumulator Register signs unlike. | 114A | IP–1 |
| Make Right A Register and Right Accumulator Register signs unlike. | 114B | IP–1 |

In response to a positive potential on any one of the conductors labeled mul-OT, tmu-OT, or dim-OT, a pulse is produced on each of the conductors 115A and 115B and these pulses, which occur at IP–8 time, are called Left Accumulator Register to Left B Register and Right Accumulator Register to Right B Register, respectively.

In response to a positive potential on any one of the conductors labeled tmu-OT, tad-OT, tsu-OT, or tdv-OT, a pulse is produced on the conductor 116 and this command, which occurs at IP–7 time, is called Left Memory Buffer Register to Right A Register.

In response to a positive potential on the conductor labeled hlt-OT, a pulse is produced on the conductor 117 and this command, which occurs at IP–11 time, is called Clear Continue Flip-Flop. In response to a positive potential on any one of the conductors labeled sub-OT, tsu-OT, dim-OT, or csu-OT, a pulse is produced on the conductor 118A and the conductor 118B and these pulses, which occur at IP–9 time, are called Complement Left A Register and Complement Right A Register, respectively.

In response to a positive potential on any one of the conductors labeled MULT-OT, dim-OT, or cam-OT, a pulse is produced on the conductor 119A and the conductor 119B and these commands, which occur at IP–8 time, are called Make Left A Register Positive and Make Right A Register Positive, respectively.

In response to a positive potential on any one of the conductors labeled ech-OTB, cam-OT, csu-OT, or cad-OT, a pulse is produced on conductor 120 and conductor 121 and these pulses, which occur at IP–6 time, are called Clear Left Accumulator Register and Clear Right Accumulator Register, respectively. The commands 120 and 121 are also generated at IP–8 time in response to a positive potential on the conductor labeled mul-OT or the conductor labeled tmu-OT. The command 121 is also generated at IP–6 time in response to a positive potential on the conductor labeled aor-OTA and is generated at IP–9 time in response to a positive potential on the conductor labeled csw-PT.

In response to a positive potential on the conductor labeled mul-OT or the conductor labeled tmu-OT, the command generator, besides causing the previously indicated commands 120 and 121 to be produced, causes each of the following commands to be generated at the time indicated:

TABLE 12

| Command name | Conductor (Command) number | Time |
|---|---|---|
| Clear Left B Register | 122 | IP–7 |
| Set Step Counter to 15 | 123 | IP–7 |
| Make Left Accumulator Register positive | 124 | IP–7 |
| Make Right Accumulator Register positive | 125 | IP–7 |
| Clear Right B Register | 126 | IP–7 |

The command 126, Clear Right B Register, is also produced at IP–6 time in response to a positive potential on the conductor labeled dim-OT.

In response to a positive potential on the conductor labeled ADD-PT or the conductor labeled ech-PT, a pulse is produced on each of the conductors 127 and 128 and these commands, which occur at IP–1 time, are called Left Division Shift Left and Right Division Shift Left, respectively.

The command 128 is also produced at IP–11 time in response to a positive potential on the conductor labeled aor-OTA.

In response to a positive potential on the conductor labeled STORE-OTB, a pulse is produced on the conductor 129 and this command, which occurs at IP–3 time, is called Parity Count. This command 129 is also produced in response to each IP–7 pulse.

In response to a positive potential on the conductor labeled tdr or the conductor labeled dvd, a positive potential is produced on the conductor labeled dvd or tdv and also a pulse is produced on conductors 130A and 130B. These commands 130A and 130B, which occur at IP–1 time, are called Complement Left Divide Connect Flip-Flop and Complement Right Divide Connect Flip-Flop, respectively.

In order to clarify the commands which are tabulated by command number in FIGS. 11*a* through 11*y*, those command numbers and the command names which have been mentioned above are tabulated as follows:

TABLE 13

| Conductor (Command) number | Title |
|---|---|
| 59 | Clear Memory. |
| 60A | Clear Left Memory Buffer Register. |
| 60B | Clear Right Memory Buffer Register. |
| 61 | Program Counter to Memory. |
| 62 | Clear Address Register. |
| 63A | Clear Operation Register. |
| 63B | Clear Index Interval Register. |
| 64 | Clear Step Counter and dvd TPD. |
| 65A | Record Left Overflow. |
| 65B | Record Right Overflow. |
| 66 | Add One to Program Counter. |
| 67A | Left Memory Buffer to Operation Register. |
| 67B | Right Memory Buffer to Address Register. |
| 68 | Address Register to Memory Address. |
| 69 | Start Core Memory. |
| 70 | Parity Check. |
| 71A | Left End Carry. |
| 71B | Right End Carry. |
| 72A | Left Correct Sign. |
| 72B | Right Correct Sign. |
| 73 | Start 2 mc. Pulses. |
| 74A | Clear Left Sign Control. |
| 74B | Clear Right Sign Control. |
| 75 | Left Memory Buffer Register to Left A Register. |
| 76 | Clear AB Flip-Flop to A. |
| 77 | Clock Register to Memory Buffer Register. |
| 78 | Inhibit Sample. |
| 79 | Address Register Complement to IO Word Counter. |
| 80A | Clear IO Word Counter. |
| 80B | Set IO Interlock ON. |
| 81A | Clear Left IO Register. |
| 81B | Clear Right IO Register. |
| 82 | Sense IO Word Counter. |
| 83 | Address Register to IO Address Counter. |
| 84 | Clear IO Address Counter. |
| 85 | Select Pulse. |
| 86 | PT–6 on Read. |
| 87 | PT–6 on Write. |
| 88 | Select Pulse for Drums. |
| 89 | Set 2nd csw FF. |
| 90 | IO Word Counter to Right Accumulator Register. |
| 91 | 1st csw Transfer. |
| 92 | Address Register to Drum Control Register. |
| 93 | Deselect Pulse. |

TABLE 13—Continued

| Conductor (Command) number | Title |
|---|---|
| 94 | Clear Drum Control Register. |
| 95 | Set PT-OT Flip-Flop to OT. |
| 96 | Set Pause FF. |
| 97 | Clear Pause Flip-Flop. |
| 98 | Clear Left A Register. |
| 99 | Clear Right A Register. |
| 100 | Right Carry One. |
| 101A | Left Accumulator Conditional Shift Left. |
| 101B | Right Accumulator Conditional Shift Left. |
| 102 | Left Accumulator Register to Left Memory Buffer Register. |
| 103 | Right Accumulator Register to Right Memory Buffer Register. |
| 104 | Right End Carry After Add One. |
| 105 | Right Memory Buffer Register to Right A Register. |
| 106 | Set A-B Flip-Flop to B. |
| 107 | Clear PT-OT Flip-Flop to PT. |
| 108 | Left A Register to Left Memory Buffer Register. |
| 109 | Right A Register to Right Memory Buffer Register. |
| 110A | Left Carry Zero. |
| 110B | Right Carry Zero. |
| 111A | Make Left Accumulator Register and Left B Register Positive. |
| 111B | Make Right Accumulator Register and Right B Register Positive. |
| 112 | Set Step Counter Equal to 17. |
| 113A | Correct Left Remainder. |
| 113B | Correct Right Remainder. |
| 114A | Make Left A Register and Left Accumulator Signs Unlike. |
| 114B | Make Right A Register and Right Accumulator Signs Unlike. |
| 114C | Left Combined Shift Left. |
| 114D | Right Combined Shift Left. |
| 115A | Left Accumulator Register to Left B Register. |
| 115B | Right Accumulator Register to Right B Register. |
| 116 | Left Memory Buffer Register to Right A Register. |
| 117 | Clear Continue Flip-Flop. |
| 118A | Complement Left A Register. |
| 118B | Complement Right A Register. |
| 119A | Make Left A Register Positive. |
| 119B | Make Right A Register Positive. |
| 120 | Clear Left Accumulator Register. |
| 121 | Clear Right Accumulator Register. |
| 122 | Clear Left B Register. |
| 123 | Set Step Counter to 15. |
| 124 | Make Left Accumulator Register Positive. |
| 125 | Make Right Accumulator Register Positive. |
| 126 | Clear Right B Register. |
| 127 | Left Division Shift Left. |
| 128 | Right Division Shift Left. |
| 129 | Parity Count. |
| 130A | Complement Left Divide Connect Flip-Flop. |
| 130B | Complement Right Divide Connect Flip-Flop. |

*Common commands.*—Certain commands, called Commands, are generated during every instruction cycle.

From FIGS. 11*a* through 11*y* it will be noted that the following Common Commands are generated during the PT cycle of each instruction:

TABLE 14

| Command number | Name | Time |
|---|---|---|
| 59 | Clear Memory Controls | PT-0 |
| 60A | Clear Left Memory Buffer Register | PT-1 |
| 60B | Clear Right Memory Buffer Register | PT-1 |
| 61 | Program Counter to Memory Address Register | PT-1 |
| 69 | Start Memory | PT-2 |
| 62 | Clear Address Register | PT-6 |
| 63A | Clear Operation Register | PT-6 |
| 63B | Clear Index Interval Register | PT-6 |
| 64 | Clear Step Counter and Divide Time Pulse Distributor. | PT-6 |
| 65A | Record Left Overflow | PT-6 |
| 65B | Record Right Overflow | PT-6 |
| 66 | Add One to Program Counter | PT-7 |
| 67A | Left Memory Buffer to Operation Register | PT-7 |
| 67B | Right Memory Buffer to Address Register | PT-7 |
| 129 | Parity Count | PT-7 |
| 70 | Parity Check | PT-11 |

Referring now to FIGS. 3*a* through 3*h* and Table 6 above, the commands 60A and 60B, as their names imply, are delivered to the Left and Right Memory Buffer Registers 43 and 44 and cause those registers to have all of their stages cleared to the binary Zero state.

The commands 61 and 66 are delivered to a Program Counter 150. This counter is essentially a binary counter which may be initially set to any desired number; in response to the command 66 a binary One is added to that number and in response to the command 61 the Program Counter delivers the signals stored therein to the conductors of a cable 151. These signals are delivered through an OR circuit 152 to the previously mentioned conductors of the cable 37.

Pulses on the conductors 36 cause the Memory Element 34 to perform the previously described Read operation and the particular memory register, which is read during the PT cycle, is indicated by the signals delivered from the Program Counter 150. The memory registers whose locations are specified by the Program Counter are those registers containing instruction words.

The Read Memory operation performed during Program Time (PT) causes the binary signals representative of the left and right-half-words of the instruction to be delivered to the conductors of cables 38 and 39, respectively. Since the Left and Right Memory Buffer Registers 43 and 44 were cleared by commands 60A and 60B at PT–1 time and since the signals on the conductors of cables 38 and 39 occur at substantially PT–6 time, those signals are stored in those registers.

The commands 62, 63A and 63B are delivered to an Address Register 155, the Operation Register 47 and the Selection and IO Control Element 49, respectively. These commands, as their names imply, cause a conventional clearing operation of the registers that they are delivered to.

The commands 64, 65A, 65B, 129 and 70 perform operations not essential to the immediate description and therefore further discussion of them will be made only when required.

The commands 67A and 67B, as their names imply, are delivered to the Left and Right Memory Buffer Registers, respectively, where, in response to command 67A, the signals stored in the Left Memory Buffer Register are delivered to the Operation Register and, in response to 67B, the signals stored in the Right Memory Buffer Register are delivered by way of the conductors of a cable 156 to the Address Register 155.

Summarizing the operation described which occurs during each Program time cycle, left and right half-words of the instruction whose location is specified by the contents of the Program Counter are stored in the Operation Register and Address Register, respectively, at the end of the PT cycle and the contents of the Program Counter is increased by One.

From FIGS. 11*a* through 11*y* it will be noted that at PT–11 time of each instruction which requires an Operate Time, the command 95 (set PT-OT Flip-Flop to OT) is generated. In a manner to be described in detail hereinafter, this command essentially prevents the commands occurring from PT–0 through PT–7 of the instruction cycle from being generated until the operate time commands for that instruction have been generated.

It will be noted that during the OT cycle of those instructions the following common commands are generated:

TABLE 15

| Command number | Name | Time |
|---|---|---|
| 59 | Clear Memory Controls | OT-0 |
| 60A | Clear Left Memory Buffer Register | OT-1 |
| 60B | Clear Right Memory Buffer Register | OT-1 |
| 68 | Address Register to Memory Address Register | OT-1 |
| 69 | Start Memory | OT-2 |
| 129 | Parity Count | OT-7 |
| 70 | Parity Check | OT-11 |
| 107 | Clear PT-OT Flip-Flop to PT | OT-11 |

Command 68 is delivered to the Address Register 155 where, in response to this command, the signals stored therein are delivered to the conductors of a cable 157 and through OR circuit 152 to the conductors of cable 37.

Commands 129 and 70 perform operations an understanding of which is not essential to the immediate description and therefore will not be discussed further at this time.

The commands 59 and 69 cause the previously noted Read Memory operation; however, during the OT cycle, the particular memory register being read is specified by the contents of the Address Register since command 68 (Address Register to Memory Address Register) is generated.

The command 107 (Clear PT-OT Flip-Flop to PT) essentially results in the Program time being resumed, that is, the commands during PT–0 through PT–6 of the instruction cycle are generated subsequent to the OT cycle of the instruction.

*Read operation from input drum.*—In order to effect a reading operation from the Input Drum, the program must include a sequence of three instructions. Those three instructions, which are Load Address Counter (ldc), Select Drums (sdr) and Read (rds), are preferably performed in the order as stated.

Drum Reading as well as Drum Writing operations are normally performed on a block basis, that is, the sequence of three instructions merely establishes that a specified memory register (whose address is indicated by the Load Address Counter instruction) is the first register to be involved in a transfer, that words are to be transferred between the drum and Memory (the Select Drum Instruction) and that a specified maximum number of words are to be read from the drum or written on the drum (the maximum number being specified by a part of the Read or Write instruction word).

As indicated in FIG. 11*u*, the Load Address Counter instruction causes the following commands, besides the Common Commands described with reference to Table 14 above, to be generated:

TABLE 16

| Command number | Name | Time |
|---|---|---|
| 96 | Pause | PT-10 |
| 84 | Clear IO Address Counter | PT-2 |
| 83 | Address Register to IO Address Counter | PT-3 |

Command 96 is a conditional command (indicated by being underlined in FIG. 11*u*), that is, it is generated only if a certain condition is met. For the immediate description, it will be assumed that this condition is not met and therefore the command is not generated.

Referring back to FIGS. 3*a* through 3*h* and more particularly to FIGS. 3*a*, 3*b*, 3*g* and 3*h*, command 84 is delivered to an IO Address Counter 158 where it causes a conventional Clearing Operation. Command 83 is delivered to the Address Register 155 where in response to this command, the signals stored therein are delivered by way of the conductors of a cable 159 to the IO Address Counter 158 for storage therein.

As indicated in FIG. 11*v*, the Select Drums instruction, besides causing the common commands described with respect to Tables 14 and 15 above to be generated, causes generation of the following commands:

TABLE 17

| Command number | Name | Time |
|---|---|---|
| 96 | Pause | PT-10 |
| 95 | Set PT-OT Flip-Flop to OT | PT-11 |
| 93 | Deselect Pulse | OT-5 |
| 107 | Clear PT-OT Flip-Flop to PT | OT-11 |
| 94 | Clear Drum Control Register | PT-2 |
| 92 | Address Register to Drum Control Register | PT-3 |
| 88 | Select Pulse for Drums | PT-5 |

At PT–10 time of the Select Drums instructions, as during the Load Address Counter instruction, the command Pause (96) may be generated. Since this command is conditional and since an understanding of this operation is not essential to the immediate description, it will be assumed that the command is not generated. At PT–11 time of the Select Drums instruction the previously mentioned command Set PT–OT Flip-Flop to OT (95) is generated in order to provide an OT cycle.

At OT–5 time the command 93 (Deselect Pulse) is generated and this command (as shown in FIGS. 3*g* and 3*f*) is delivered to (1) the Selection and IO Control Element 49, (2) a Drum Selection Register 160 and (3) a CD Write Control Circuit 161. The Deselect Pulse received by the Selection and IO Control Element causes various control flip-flops therein to be set to their Zero state and further causes a pulse to be delivered to a conductor 162 (Clear IO Buffer Registers). The Deselect Pulse received by the Drum Selection Register 160 causes each stage of that register to be cleared to the Zero state. The Deselect Pulse received by the CD Write Control Circuit 161 causes various control flip-flops therein to be cleared to their Zero state, causes a pulse to be delivered to a conductor 163 (Write Register Reset) and further causes a negative D.C. level to be established for a predetermined length of time on a conductor 161A (Deselect SS output). The pulse on conductor 162, as its name implies, causes a conventional clearing operation of a Left IO Buffer Register 164 and a Right IO Buffer Register 165. The pulse on conductor 163, as its name implies, causes a conventional clearing operation of a Write Register 166. A preferred embodiment of this invention includes many physical drums, each having many fields (logical drums). In that preferred embodiment the CD Read Section 31 (FIG. 3*f*) and the CD Write Section 253 (FIG. 3*f*) have their inputs and outputs, respectively, switched by means of diode type switches to the drum heads selected by the Drum Selection Register 160 (FIG. 3*f*). In the interest of simplifying and thereby clarifying the description of this invention, no switching circuits of the CD Read Section or the CD Write Section have been shown; however, the Control circuits 161 and 178, to be described in detail hereinafter, include to a certain degree some of the logical circuits necessitated by the switching circuits. The negative D.C. level established on conductor 161A (Deselect SS output) has a duration sufficient to permit the switching operation to be completed before the read or write operation can be effective.

Although the common commands described with respect to Table 15 are generated during this OT cycle of the Select Drums instruction, they will have no effect on the overall result of the instruction as will be apparent hereinafter.

At PT–2 of the Select Drums Instruction, the command 94 (Clear Drum Control Register) is delivered to a Drum Control Register 167 (FIG. 3*h*) to effect a conventional clearing operation. At PT–3 time command 92 causes the signals stored in the Address Register 155 (FIG. 3*b*) to be delivered by way of the conductors of a cable 168 to the Drum Control Register 167 for storage therein. From the preceding description it will be seen that the signals delivered to the Drum Control Register are those signals of the right half word of the instruction. As will become more apparent hereinafter, the right half-word of a Select Drum instruction is used to determine which words read from the drum are to be accepted and delivered to the Memory Element 34.

As will be recalled from the description relating to the Input System, each word stored on the drum has source identification bits accompanying it. During normal operation, it is desirable, by means of the Select Drums instruction, to specify which words will be read from the drum, that is, words from only a specified source will be accepted.

The right half-word of the Select Drums instruction is therefore provided with a binary code in bit positions R1 through R3 which identifies the source from which words are to be accepted. It will be recalled with respect to the description of FIG. 6 that source identity bits are assigned to R1 through R3 of all input words.

Referring back to Table 9 above, at PT–5 time of the Select Drums instruction the command 88 (Select Pulse for Drums) is generated. This command is delivered to the Selection and IO Control Element 49 where it effects a Set operation of various control flip-flops and also causes the Index Interval Bits 10 through 15, which had previously been delivered to and stored in the Selection and IO Control Element 49, to be delivered by way of the conductors of a cable 160A to the Drum Selection Register 160 whose output is decoded by a suitable decoder 160B. When the index interval portion of the Select Drums instruction is the binary code 011 101, a positive D.C. level is established on conductor 160C (Select Input Drum) by the decoder 160B.

As indicated in FIG. 11x, the Read (rds) instruction, besides causing the common commands described with respect to Table 14 above to be generated, causes the following commands to be generated:

TABLE 18

| Command number | Name | Time |
|---|---|---|
| 96 | Pause | PT-10 |
| 80A | Clear IO Word Counter | PT-1 |
| 80B | Set IO Interlock ON | PT-1 |
| 79 | Address Register Complement to IO Word Counter | PT-2 |
| 81A | Clear Left IO Register | PT-2 |
| 81B | Clear Right IO Register | PT-2 |
| 82 | Sense IO Word Counter | PT-3 |
| 86 | PT-6 on Read | PT-6 |

At PT–10 time, the command 96 is generated provided that a certain condition is met, and it will be again assumed that this condition is not met and the command not generated.

At PT–1 time the command 80A (Clear IO Word Counter) is delivered to an IO Word Counter 169 where it effects a conventional clearing operation. The command 80B (Set IO Interlock ON) is generated and this command is delivered to the Cycle Control Circuit 54 (FIG. 10*b*) where it causes the output conductor labeled IO Interlock ON to be made positive. The primary purpose of this command is to prevent any further instruction of the Input-Output class or a Program Stop instruction from being executed until the present Input (or Output) operation has been completed. As will be more apparent subsequently, an input or output operation is not complete until the number of words involved in the transfer have actually been transferred or for some reason or other there can be no further transfers made.

At PT–2 time the commands 81A and 81B cause conventional clearing operations of a left IO Register 170 and a Right IO Register 171, respectively. At this same time, command 79 causes signals representative of the complement of the number stored in the Address Register 155 to be transferred by way of the conductors of a cable 173 to the IO Word Counter 169 for storage therein. The right half-word of the Read instruction is a binary number indicating the maximum number of words to be transferred, the actual number of words transferred during a read instruction will of course be determined by the actual number of words available for transfer provided that there are less than the number specified by the Read instruction.

The command 82 (Sense IO Word Counter) is delivered to the Selection and IO Control Element 49 as well as to the IO Word Counter 169. When this command is received by the IO Word Counter a binary One is added to the contents thereof. This command 82 (Sense IO Word Counter) which occurs at PT–3 time as well as the command 86 (PT–6 on Read) are delivered to the Selection and IO Control Element where if a pulse is received on a conductor 175 (IO Word Counter End Carry) between the time of command 82 and command 86, a pulse is delivered to the conductor 174 (Clear IO Interlock). The IO Word Counter is a binary counter which in response to a pulse on the conductor 82 (Sense IO Word Counter) or a pulse on a conductor 176 (Add One to IO Word Counter) a binary One is added to the number stored therein. The IO Word Counter produces a pulse on the conductor 175 (IO Word Counter End Carry) if, when a pulse is received on either the conductor 82 or the conductor 176, the counter has the binary number of all Ones stored therein. As noted above, the *complement* of the number specified by the right half-word of the Read instruction is transferred to the IO Word Counter. If the Read instruction specified zero number of words then, all stages of the IO Word Counter would be set to their One state and the command 82 (Sense IO Word Counter) of the Read instruction would cause an end carry pulse resulting in a pulse being delivered to the conductor Clear IO Interlock. This pulse, generated by the Selection and IO Control Element 49, is delivered to the Cycle Control Circuit 54 (FIG. 10*b*) where it causes a negative potential to be produced on the conductor labeled IO Interlock On. The use and importance of an instruction to read zero number of words will become apparent subsequently.

Assuming for the purpose of description that the Read instruction specifies a number of words greater than Zero, then no pulse will be delivered to the conductor 174 labeled Clear IO Interlock during the Read Instruction cycle. The subsequent instructions of the program will be executed provided that IP pulses are delivered to the Command Generator 53 (FIGS. 10*a* through 10*c*).

When a transfer of a word from the drum to Memory is actually ready to take place, controls are effected to interrupt the generation of IP pulses. It is to be understood that if any one of the instructions of the Input-Output class or the instruction Program Stop appears in the Program before the Clear IO Interlock pulse is delivered to the conductor 174, then at PT–10 time of that instruction the aforementioned conditional command 96 (Pause) will be generated which, as will be apparent from the subsequent description, effectively prevents further commands of that instruction from being generated until the Clear IO Interlock pulse has been received.

If, as previously assumed, the Read instruction specifies a number of words greater than Zero, the Selection and IO Control Element will generate a pulse on a conductor 177 (Start Read Drums) which is delivered to a Read Control Circuit 178. In response to this pulse, the Read Control Circuit 178 produces a positive potential on a conductor 179 (Read Drum Flip-Flop ON) which is delivered to the CD Write Control Circuit 161. The CD Write Control Circuit in response to this D.C. level and in response to a pulse on the conductor labeled DTP–4 causes a positive D.C. level to be established on a conductor 180 (Sync FF ON) which begins at substantially CD–4 time. It should be noted that time pulses (TP) and the Instruction Pulses (IP) are asynchronous with respect to the Drum Time Pulses (DTP). For this reason synchronizing circuits are employed in the CD Write Control Circuit 161 to synchronize control pulses from the Selection and IO Control Element 49 with respect to the Drum System timing.

The Read Control Circuit 178 in response to the previously mentioned pulse on conductor 177 (Start Read Drums) and in response to a positive potential on each of the conductors 180 and 161A causes a positive potential on a conductor 181 (Read).

As previously described with respect to the CD Read Status Control Section 30, a positive potential on the conductor labeled Read causes a drum register which is full to be read, the left half-word of the word read from the drum being delivered to the conductors of the cable 32 and the right half-word being delivered to the conductors of the cable 33.

These signals on the conductors of cables 32 and 33 are stored in the Left and Right IO Buffer Registers 164 and 165, respectively.

As was described in detail in the description of the CD Read Status Control Section 30, this reading a word from the drum resulted from a pulse on the conductor labeled Read Sample. As shown in FIGS. 3*f* and 3*g*, this Read Sample pulse is also delivered to the Selection and IO Control Element 49 and to Read Control Circuit 178.

If the CD Read Status Control receives a positive D.C. level from the conductor labeled Read at such a time that the first register which is sampled by the Read Sample pulse is the second register of a two-register slot, no signal will be delivered to a conductor 182 labeled Compare. This condition will be sensed by the Selection and IO Control which will generate a pulse on conductor 186 labeled No Compare. As previously described with reference to the operation of the CD Read Status Control Circuit, this no compare pulse will cause the status of the drum register to remain "full," that is, a Write a One signal is delivered to Write head 23. In response to a Read Sample pulse, the Read Control Circuit 178 generates a pulse on the conductor 182 (Compare) provided that the drum register which is being read is the first register of a two-register slot. This compare pulse on conductor 182 is delivered to the Selection and IO Control Element 49.

The Selection and IO Control Element 49, in response to this compare pulse, causes a pulse to be produced (after a suitable delay) on a conductor 183 (Compare by Identification 1–3) provided that the previously mentioned Select Drum instruction had the binary code 011 101 specified by its Index Interval bits 10 through 15.

The pulse on the conductor 183 (Compare by Identification 1–3) is delivered to the Drum Control Register 167 and it will also be noted that the right half-word of the word read from the drum (now stored in the Right IO Buffer Register 165) is also delivered by way of the conductors of a cable 184 to the Drum Control Register 167. As noted previously in the description relating to the Select Drum instruction, the drum control register has stored therein (at this time) the right half-word of that Select Drums instruction.

If, at the time that the pulse on conductor 183 (Compare by ID 1–3) is received, bits 1 through 3 of the right half-word read from the drum compare with bits 1 through 3 of the word stored in the Drum Control Register, no signal will be delivered to a conductor 185 (No Compare).

If the comparison is not successful, a pulse is delivered by way of the conductor 185 (No Compare) to the Selection and IO Control which in turn delivers a succession of pulses to a conductor 186 (No Compare). These pulses on conductor 186 are delivered to the CD Read Status Control Circuit 30 where they cause two successive Write a One signals to be delivered to the Write head 23 as described in detail in the above description relating to the CD Read Status Control Circuit 30.

If the comparison was successful, since no pulse is received from conductor 185, the Selection and IO Control Element delivers a pulse to a conductor 187 (IO Buffer Registers to IO Registers and Clear IO Buffer Registers), delivers a pulse to the conductor 176 (Add One to IO Word Counter) and stores the fact that the comparison was successful. The pulse on conductor 187, as its name implies, causes the signals stored in the Left and Right IO Buffer Registers 164 and 165 to be delivered by way of the conductors of cables 189 and 190 to the Left and Right IO Registers 170 and 171, respectively. This pulse on conductor 187 also causes the Left and Right IO Buffer Registers to be cleared. The pulse on conductor 188 causes a binary One to be added to the signals previously stored in the IO Word Counter 169.

It should be noted that this pulse on conductor 188 is asynchronous with respect to the operations controlled by the Instruction Control Element, that is, the Instruction Control Element may well be proceeding to perform subsequent instructions of the program and during such time an incoming word from the drum may have been accepted, transferred from the buffer registers to the IO registers and a binary One added to the IO Word Counter. In the event that the particular instruction being controlled by the Instruction Control Element at this instant is the instruction Clear and Subtract Word Counter, the contents of the IO Word Counter should not be transferred while it is in the act of being changed. For this reason, whenever a pulse is delivered to the conductor 188 to cause a binary One to be added to the IO Word Counter, a pulse is delivered to a conductor 197A labeled Set the 1st csw Flip-Flop ON and with a short and suitable delay thereafter a pulse is delivered to the conductor 198 labeled Clear the 1st csw Flip-Flop. The precise way in which pulses on the conductor 197A and the conductor 198 operate to insure that the contents of the IO Word Counter are not transferred while that counter is being stepped will become more apparent subsequently.

Since two-word messages are stored on the input drum, any set of instructions to read words from that drum should establish an even number of words to be read.

If as has been assumed, the first word read from the drum is accepted and transferred to the IO Registers, then the second one is bound to be accepted and for this reason when the CD Read Status Control Circuit 30 generates the Read Sample pulse for that second word, although the Read Control Circuit 178 receives this Read Sample pulse, it does not generate a pulse on the conductor 182 (Compare) in response thereto. The Read Sample pulse causes the signals stored in the drum register to be delivered to the IO Buffer Registers 164 and 165 and although the Read Sample pulse is delivered to the Selection and IO Control Element 49 and no pulse is received from the conductor 185 (No Compare) this second word might or might not be immediately transferred to the IO Registers 170 and 171 since those registers may still contain the first word read from the drum. The fact is stored in the Selection and IO Control Element 49 that the second accepted word is now stored in the IO Buffer Registers.

When the first word was transferred from the IO Buffer Registers to the IO registers (in response to the pulse on conductor 187) that fact (called a break request) was stored in the Selection and IO Control Element 49.

Referring back now to FIG. 10*a*, it will be noted that TP–11 pulses are delivered through an OR circuit 191 to a conductor 192 (Sense Break Request Flip-Flop). If IP pulses are being generated then at IP–11 time of each PT or OT cycle, a pulse will be delivered to the conductor 192 (Sense Break Request Flip-Flop). As will be described subsequently, IP pulses are generated except during the previously noted Pause operation and during a Break Operation. If a Pause operation is being performed and no Break operation is being performed, pulses at a 2 megacycle rate are produced on a conductor 193 labeled 2 mc. (Pause and No Break) and these pulses are delivered through OR circuit 191 to the conductor 192 (Sense Break Request Flip-Flop).

The Sense Break Request Flip-Flop pulses on conductor 192 are delivered to the Selection and IO Control Element 49, where in response to one of these pulses and if the previously noted fact (called Break Request) has been stored, an operation called "Break in" is initiated by the generation of a pulse on a conductor 194 (Set Break Flip-Flop). This command 194 (Set Break Flip-Flop) is delivered to the Instruction Control Element 51 where it causes the generation of IP pulses to cease and insures the generation of TP pulses.

This "Drum Break in" operation essentially starts a memory cycle and during that memory cycle the word stored in the Left and Right IO Registers 170 and 171 is delivered to the Memory Element 34 where it is stored at the location specified by the contents of the IO Address Counter 169. This Memory cycle, like any other, begins at TP–1 and ends at TP–11. In order to distinguish this type of memory cycle from other memory cycles the time periods from 1 through 11 are referred to as "break in" (BI) pulses BI–1, BI–2, etc. Since these BI time periods are controlled by TP pulses generated by the Time Pulse Distributor 52 (FIG. 10*a*), they are substantially coincident in time therewith.

As previously noted, the commands 59 (Clear Memory Controls), 60A (Clear Left Memory Buffer Registers) and 60B (Clear Right Memory Buffer Register) are generated directly from the output of the Time Pulse Distributor 52 (FIG. 10*a*). During the "Break in" operation of the Selection and IO Control Element 49 (FIG. 3*g*) the following commands are generated by the Selection and IO Control Element 49 at the times indicated:

TABLE 19

| Conductor (Command) number | Name | Time |
|---|---|---|
| 195A | Start Memory | BI-2 |
| 195B | IO Address Counter to Memory Address Register | BI-1 |
| 195C | Clear Break Request Flip-Flop | BI-1 |
| 196A | Add One to IO Address Counter | BI-2 |
| 196B | Clear IO Reg Status Flip-Flop | BI-2 |
| 196C | Left IO Register to Left Memory Buffer Register | BI-2 |
| 196D | Right IO Register to Right Memory Buffer Register | BI-2 |
| 196E | Inhibit Sample | BI-2 |
| 199 | BI-11 | BI-11 |

In response to the command 59 (Clear Memory Controls), the command 195A (Start Memory), and the Command 196E (Inhibit Sample), the Memory Element 34 performs the previous noted write memory operation. The word written into memory is the first word accepted from the drum since commands 196C and 196D are generated at BI–2 time and these commands cause the signals stored in the Left and Right IO Registers 170, 171 to be transferred to the Left and Right Memory Buffer Registers 43 and 44 by way of the conductors of cables 200 and 201, respectively. The memory location into which this word is written is the location specified by the contents of the IO Address Counter since the command 195B (IO Address Counter to Memory Address Register) is generated at BI–1 time.

The command 196A (Add One to IO Address Counter) is delivered to the IO Address Counter 158 which in response to this pulse causes the number stored therein to be increased by One so that the second word read from the drum will be stored in the next higher address in memory.

During the time period BI–1 through BI–5, the fact is stored in the Selection and IO Control Element 49, that the IO Register status has been made empty (commands 196C and 196D having been generated). As previously mentioned, the fact that the IO Buffer Register now contains the second accepted word is also stored therein. These two facts cause the Selection and IO Control Element 49 to generate a pulse on conductor 187 (IO Buffer Registers to IO Registers and Clear IO Buffer Registers) and also causes the fact (called Break Request) to be stored, thus initiating another "Break in" operation when the next pulse on conductor 192 (Sense Break Request Flip-Flop) is received.

In this manner words read from the drum are stored in memory and this operation of reading words from the drum, comparing and storing accepted words in memory continues until either the IO Word Counter 169 produces a pulse on the conductor 175 (IO Word Counter End Carry) or the Read Control Circuit 178 generates a pulse on a conductor 202 (Read disconnect). The pulse is generated on the conductor 202 if the drum has made a complete revolution since the Read Control Circuit 178 received a pulse on the conductor 177 (Start Read Drum).

The pulse on conductor 202 is delivered through an OR circuit 203 and by way of a conductor 204 (Drum Disconnect) to the Selection and IO Control Element 49. A pulse on either the conductor 204 (Drum Disconnect) or the conductor 175 (IO Word Counter End Carry) causes the Selection and IO Control Element to generate a pulse on a conductor 205 (Clear IO Interlock). The primary result of the command 205 (Clear IO Interlock), which is delivered to the Cycle Control Circuit 52 (FIG. 10*b*) is to allow subsequent Input Output class instructions or a Program Stop Instruction to be executed.

*Clear and subtract word counter instruction.*—Before instructions are executed to process the words read from the drum, it is important that the exact number of words which were read, be stored in the Memory Element 34. In actual use, it is sometimes desirable to inspect the contents of the IO Word Counter and if the contents are Zero (indicating that the drum may still have words stored thereon which would compare as to source identification), to perform a Branch operation in the program back to the same read sequence of instructions (Load Address Counter, Select Drums and Read) described above. Conditional Branch operations (conditional upon the sign of the word in the accumulator register of the computer) are well known in the art and one form of such a data processing machine is described in the above mentioned copending application Serial Number 471,002. When it is desired to inspect the contents of the IO Word Counter, the instruction called Clear and Subtract Word Counter is executed.

Referring back now to FIG. 11*b*, besides the Common Commands described with respect to Table 6 above, the following commands are generated by the Instruction Control Element 51 in response to the instruction Clear and Subtract Word Counter.

TABLE 20

| Command (Conductor) number | Name | Time |
|---|---|---|
| 89 | Set 2nd csw FF | PT-9 |
| 121 | Clear Right Accumulator Register | PT-9 |
| 90 | IO Word Counter to Right Accumulator Register. | PT-1 |
| 91 | 1st csw Transfer | PT-1 |
| 90 | IO Word Counter to Right Accumulator Register. | PT-5 |

At PT–9 time the command 121 causes the Right Accumulator Register to be cleared. At this same time the command 89 is generated and this command is delivered to the Cycle Control Circuit 54 (FIG. 10*b*) where it causes the conductor labeled 2nd csw FF ON to be made positive. At PT–1 time the commands 90 and 91 are generated provided that the conductor from the Cycle Control Circuit labeled 1st csw Flip-Flop ON is positive. As previously stated, each time that the IO Word Counter 169 is stepped, the Selection and IO Control Element 49 generates the command 197A (Set 1st csw Flip-Flop ON) and after a suitable delay it generates the command 198 (Clear 1st csw Flip-Flop). These two commands are delivered to the Cycle Control Circuit 54 (FIG. 10*b*) where in response to these commands, the conductor labeled 1st csw FF ON is first made negative (command 197A) and then returned to a normally positive potential (command 198). As a result of these commands, the conductor labeled 1st csw Flip-Flop ON is made negative during the time that the IO Word Counter 169 is being stepped.

Referring back now to Table 20 above, if the IO Word Counter is being stepped at PT–1 time, the commands 90 and 91 will not be generated at PT–1 time; however, the command 90, under this condition, will be generated at PT–5 time since command 89 was generated at PT–9 time and command 91 was not generated at PT–1 time. If the IO Word Counter is not being stepped at PT–1, then the output conductor of the Cycle Control Circuit 54 will be positive and for this reason the commands 90 and 91 are generated at this time. The command 91 is delivered to the Cycle Control Circuit 54 where it causes a negative potential to be produced on the conductor 2nd csw Flip-Flop ON. This negative potential prevents the command 90 from being generated at PT–5 time.

This command 90 is delivered to the IO Word Counter where, in response to this command, signals are delivered by way of the conductors of a cable 210 to the Right Accumulator Register of the Right Arithmetic Element.

From this description of the Clear and Subtract Word Counter Instruction, it will be evident that this instruction may be performed while the IO Interlock is still on and that the contents of the IO Word Counter are stored in the Right Accumulator Register at the completion of this instruction. It will also be noted that the number represented by the contents of the IO Word Counter is the complement of the number of words specified by the Read instruction plus One plus the number of words which have been transferred. By suitable subsequent instructions, this number may be converted, for example, to the actual number of words which have been transferred.

*Determining age of input words.*—From the above description it will be seen that all input words or messages were time tagged and at the conclusion of reading operations these time tagged messages were stored in the high speed memory element 34. In certain read time applications it is entirely possible that due to the length of the program or for any one of numerous other reasons, certain input words or messages may be such an age that they are no longer useful and further processing would be unnecessary. It is therefore sometimes desirable even before processing of input words begins to discard all input words which are too old. For this reason operations are performed to permit the present contents of the clock register to be transferred to the high speed memory or to the arithmetic elements where processing of that time information and the input words can take place to determine which of the input words are beyond a predetermined age. As mentioned previously the time tagging of input words was accomplished by means of the equipment in the Time Tag Section 10, FIG. 3*e*, and this Time Tag section was essentially a counter which counts the number of pulses received on the conductor labeled 1 Pulse Every 0.25 Second and this counter is reset, if required, by pulses on the conductor labeled 1 Pulse Every 8 Seconds. The pulses on the conductors labeled 1 Pulse Every 0.25 Second and 1 Pulse Every 8 Seconds are produced by the equipment shown as block 211 in FIG. 3*h* and labeled Clock Register. The equipment within block 211 essentially includes a very accurate source of timed pulses and a register for counting the number of pulses produced; therefore effectively this equipment is a clock. This clock preferably has a capacity for indicating time up to approximately 34 minutes, 8 seconds, which time can be specified by binary signals having 16 orders. Therefore the clock register is a 16 stage register.

When it is desired to transfer the contents of the clock register to the arithmetic element where the information may be either used directly or subsequently stored in memory, the instruction Clear and Add is performed and this Clear and Add instruction in its address part has a binary number which in the 3 highest orders specifies the clock register rather than the high speed memory element 34. When this address part of the Clear and Add instruction has been received by the address register 155 (FIG. 3*b*) and the operation part of this Clear and Add instruction has been decoded by the Instruction Control Element 51, the command Address Register to Memory Address Register (68) is delivered to the address register 155 where in response to this pulse the binary code in the 3 highest orders of the address causes a pulse to be delivered to the memory unit selection circuit 58 (FIG. 10*c*) whereupon that circuit causes a positive potential to be delivered to the conductor labeled Time Clock. This positive potential on the conductor labeled Time Clock causes the command 77 (Clock Register to Memory Buffer Register) to be generated and this command is generated at OT–3 time. The normal commands of the Clear and Add instruction are also performed during this instruction of Clear and Add the Clock Register and therefore at the conclusion of the Clear and Add the Clock Register instruction, the contents of the clock register are stored in the right accumulators. Since the present time as indicated by the contents of the clock register is now available to the programmer it is a mere matter of suitable programming instructions to determined which of the input words are of such age that they can be disregarded.

*Generation of moving object control signals.*—In the particular application of the apparatus shown and described herein the incoming messages indicate in polar form the instantaneous position or positions of various moving objects. By suitable programming of the computer this information in polar form may be converted into rectangular form and the various instantaneous positions of a given moving object can be correlated into a track of that object so that its past and its present position can be used to predict its future position by the computer. It is for this reason that each of the incoming messages has attached thereto identity tags so that the computer can identify this particular instantaneous position with previous instantaneous positions of the same moving object. If the past, present, as well as probable future positions of a given object are known it is merely a problem of suitable programming to generate binary signals representative of the turn required for the moving object to arrive at a predetermined position. However, as mentioned above and as will be more fully described hereinafter, any such control signals which are computed would have to be delivered without time delay to the moving object. Since the delivery of control signals from the computer to the moving object does involve time delay and furthermore since this time delay is variable, it will be necessary for information to be made available to the machine program as to precisely how much delay will be involved in any given control signal which is to be generated.

*Writing operation on the output drum.*—In order to effect a writing operation on the Output Drum, the program must include a sequence of three instructions. These three instructions, which are Load Address Counter (ldc), Select Drums (sdr) and Write (wrt) are preferably performed in the order as stated.

Drum Writing operations are normally performed on a block basis, that is, the sequence of three instructions merely establishes that the word stored in a specified memory register (whose address is indicated by the Load Address Counter instruction) is the first word to be written on the drum, subsequent words are to be taken from successively higher order addresses in memory, that words are to be transferred from Memory to the Output Drum (the Select Drums instruction) and that a specified maximum number of words are to be written on the drum (the maximum number of words being specified by the Write instruction).

The Load Address Counter instruction and the Select Drums instruction, during a Drum writing operation, perform exactly the same results as previously described with respect to the above drum reading operation except that during a writing operation the index interval part of the Select Drums instruction specifies the binary code 011 000 to write in odd numbered registers of the output drum or 011 001 to write in even numbered registers.

As indicated in FIG. 11y, the Write (wrt) instruction causes the following commands, besides the Common Commands described with respect to Table 6 above, to be generated:

TABLE 21

| Conductor (Command) number | Name | Time |
|---|---|---|
| 96 | Pause | PT-10 |
| 80A | Clear IO Word Counter | PT-1 |
| 80B | Set IO Interlock ON | PT-1 |
| 81A | Clear Left IO Register | PT-2 |
| 81B | Clear Right IO Register | PT-2 |
| 79 | Address Register Complement to IO Word Counter. | PT-2 |
| 82 | Sense IO Word Counter | PT-3 |
| 87 | PT-6 on Write | PT-6 |

The operation performed by these commands is substantially identical to that described with respect to Table 18 above, except that at PT-6 time the command 87 (PT-6 on Write) is generated instead of 86 (PT-6 on Read).

In the event that the write instruction specifies a zero number of words to be transferred, then essentially the same results are obtained as those produced during the read zero instruction except that during a write zero instruction the Selection and IO Control Element 49 does not produce a pulse on a conductor 212 labeled Start Write.

In the event that the write instruction specifies a number of words to be written on the drum which is greater than zero, the command PT-6 on Write (87) being delivered to the Selection and IO Control Element 49 causes the generation of the command 212 Start Write Drums by the Selection and IO Control Element with substantially no time delay and a fact which is called 1st Break Request is stored in the Selection and IO Control Element and another fact called 2nd Break Request is stored. This Start Write command 212 is delivered to the CD Write Control circuit 161. As mentioned above during the select drums instruction the index interval part of that instruction specifies by means of a binary code that the words to be written are to be written in even numbered registers or in odd numbered registers of the drum. This binary code being delivered from the Selection and IO Control Element to the Drum Selection Register 160 and being decoded causes a conductor 213 (Select OB Even) or a conductor 214 (Select OB Odd) to be accordingly made positive. The positive potentials on the conductors 213 or 214 are delivered to the CD Write Control Circuit 161 which in response to this positive D.C. level, in response to the Deselect pulse (93) which is generated at OT-5 time of the select drums instruction and in response to the Start Write command 212, produces a positive D.C. level on conductor 215 (Write) after a pulse is received on conductor 219C which indicates that the Write Register is full. The manner in which the words are delivered to the Write Register 166 will now be described.

As mentioned above at the end of the Write instruction the Selection and IO Control Element 49 has stored therein the fact called 1st Break Request as well as the fact called 2nd Break Request. With these facts stored and in response to a pulse on a conductor 192 Sense Break Request (Sense Break Request is generated at TP-11 time as well as at a 2 megacycle rate during pause) the Selection and IO Control Element generates the command 194—Set Break Flip-Flop—with substantially no time delay. The Selection and IO Control Element then generates the following commands at the times indicated.

TABLE 22

| Command number | Name | Time |
|---|---|---|
| 195B | IO Address Counter to Memory Address Register. | BO-1 |
| 195A | Clear Break Request Flip-Flop | BO-1 |
| 195A | Start Memory | BO-2 |
| 196A | Add One to IO Address Counter | BO-2 |
| 217A | Set IO Register Status Flip-Flop To Full | BO-7 |
| 217B | Right Memory Buffer to Right IO Register | BO-7 |
| 217C | Left Memory Buffer to Left IO Register | BO-7 |
| 218 | BO-11 | BO-11 |

Since the memory controls are cleared with TP-0 pulses and since Start memory is generated at BO-2 time and no inhibit sample pulse is generated the memory element produces the above noted read operations and the word stored in the memory, location specified by the IO address counter is delivered to the Left and Right Memory buffers since the contents of the IO address counter is transferred to the memory address register at BO-1 time. The command 195A Clear Break Request Flip-Flop being generated at BO-1 time causes the previously noted fact called 1st Break Request to be destroyed. At BO-7 time the signals stored in the left and right memory buffers are transferred by way of the conductors of cables 43A and 44A to the left and right IO registers 170 and 171 respectively and the fact is stored in the Selection and IO Control Element that the IO Register Status is now full. The Selection and IO Control Element further includes a Status Flip-Flop for storing information as to the status of the Write Register 166. That flip-flop for remembering the status of the Write Register is always set to indicate an empty status during the Select Drums instruction in response to the Deselect command 155. Since the Selection and IO Control Element now has stored therein the fact that the Write Register is empty, the IO Register is full, and further has stored the fact that the drums have been selected, the Selection and IO Control Element now generates a command 219A (Right IO Register to the Write Register), 219B (Left IO Register to Write Register), and both of these commands also clear the respective IO Registers.

When the commands 219A and 219B are delivered to the Right and Left IO Registers 171 and 170, respectively, those registers deliver the signals stored therein to the Write Register 166 by way of the conductors of cables 171A and 170A.

When commands 219A and 219B are generated, the command 219C (IO Register to Write Register) is delivered to the CD Write Control Circuit 161 (FIG. 3*f*). Following this time of BO-7, since the fact called 2nd Break Request is now stored a fact called Break Request is stored and the fact called 2nd Break Request is destroyed. The Selection and IO Control Element receives TP-11 pulses and if the above noted fact called Break Request is stored, a pulse is produced by the Selection and IO Control Element on the conductor 194 labeled Set Break Flip-Flop and in this manner the second memory cycle is devoted to a break out operation. The commands of Table 22 are again generated resulting in the word stored in the next higher address in memory being delivered to the IO registers and of course the facts are now stored in the Selection and IO Control Element that the IO Register and the Write Register are now both full. It will be recalled that the CD Write Control circuit 161 caused the conductor 215 (Write) to be made positive after the Write Register has received the first word to be written on the drum. This positive D.C. level on conductor 215 sets the CD Write Status Control section into operation, that is, that circuit now receives signals from a read head 250 which reads the status signals recorded in the OB-CD status control channel. Therefore if a binary One signal is received by the CD Write Status Control section indicating that the register is full, that circuit delivers a Write a One signal to a Write head 251 causing a binary One to be written in the OB-OD status control channel. In the event that a binary Zero is read from the OB-CD status control channel then the CD Write Status Control section 216 delivers a pulse to a conductor 252 which causes a CD Write Section 253 to be sampled, the signals which were previously stored in the Write register are written into the register in the drum which was empty and the CD Write Status control section 216 delivers a binary One signal to the Write head 251 to store in the OB-OD status control channel the information that this register is now full. The CD Write Status control section delivers a pulse to a conductor 254 2½ microseconds after each time that it samples the write circuits 253. This pulse on conductor 254 is delivered through an OR circuit 255 to the reset input of the Write register. The pulse on conductor 252 which as previously mentioned samples the write circuits 253 is also delivered on the conductor labeled Word Demand to the Selection and IO Control Element 49. In response to this pulse on conductor 252 the IO register contents will be transferred to the Write register and if the IO word counter has not gone to Zero another break out operation as above described will be performed wherein the 3rd word is transferred from memory to the IO register and this operation continues, that is, the words placed in the Write register are written on the drum and another word is taken from memory until such time as the IO word counter goes to Zero or one complete revolution of the drum has been made in which event the CD write control circuit 161 delivers a pulse to a conductor 256. This pulse on conductor 256 is delivered through an OR circuit 203 to the Selection and IO Control element where various control flip-flops are reset in response to this pulse and a pulse is delivered to the conductor 174 (Clear IO Interlock).

*Reading from output drum*

Words delivered by the computer to the output drum each consist of a left half and a right half word. The right half word of each word is the actual data to be transmitted to some load device whereas the left half word includes various binary coded tags. Reference is now made to FIG. 12 which illustrates the bit assignments of a drum word. Bits left sign through left 2 are a binary code which specifies to which of several output transmission systems the word is to be sent. Although in a preferred embodiment of this invention there are 3 distinct output sections for words read from the drum, only that output section hereinafter referred to as section 1 will be described. In order to cause a drum word to be delivered to that section, the binary code 100 is placed in bit positions left sign through left 2 of the drum word. Bits left 3 through left 7 of the left half word of each drum word are a binary code specifying which one of a possible 26 addresses of a core memory array the particular word is to be temporarily stored in. Bits left 8 through left 15 of the left hand word of each drum word are a binary code which specifies the order in which this word with respect to all other drum words is to be taken from the output drum. The entire right half word, right sign and right 1 through right 15 are binary signals which are to be actually transmitted to the load device which in the assumed instance is the device or devices to be controlled.

Referring now to FIGS. 3*a* through 3*h* and more particularly to FIG. 3*e*, a read head 300 is positioned adjacent to the OB-OD status channel and signals induced in that read head are delivered to an OD read status control section 301. When a binary One is read from the OB-OD status channel the OD read status control section 301 delivers a pulse to a conductor 302 thereby causing sampling of OD read circuits 303. That same pulse on conductor 302 is also delivered to a parity generator 307 where in response to this pulse a pulse is delivered to a conductor 308 which is delayed in time by a suitable amount (delayed long enough to insure that the word read from the drum is actually stored in the drum word register). This pulse on conductor 308 inspects each bit of the word read from the drum and determines whether there was an odd or an even number of binary Ones in the word which was delivered from the OD read circuits 303 in response to the read sample pulse and those signals read from the drum are stored in the various registers 309 through 313 of the Drum Word Register. If there was an odd number of binary Ones in the word read from the drum, a pulse is delivered to a conductor 314 labeled Parity OK whereas if the word has an even number of binary Ones then a pulse is delivered to a conductor 315 labeled Parity No Good. In response to this pulse on conductor 308 the data register 309 as well as the various other storage circuits of the drum word register were inspected to determine the total number of binary Ones and if the total number of binary Ones stored in the data register 309 is odd, a pulse is delivered to a conductor 316 which when received by the parity generator 307 causes a positive D.C. level to be established on a conductor labeled Parity. As will be apparent hereinafter the timing and control is such that immediately prior to reading a drum word the drum word register is cleared, that is, all storage circuits in the drum word register are set in their binary Zero state and therefore only those circuits receiving a binary One signal (a pulse) from their corresponding read heads of the drum will be set to their binary One state. The D.C. levels representative of the bits stored in the section address register 312 are delivered by way of the conductors of a cable 320 to a section decoder 321 where these D.C. levels on the conductors of cable 320 cause a selected one of the conductors of a cable 322 to be made positive. The D.C. levels representative of the bits stored in the array address register 311 are delivered by way of the conductors of a cable 323 to an address decoder 324 where the particular code causes a selected one of the conductors of a cable 325 to be made positive provided that the signals received from the conductors of cable 323 represent a binary number between 0 and 26. In the event that the binary number represented by the signals on the conductor of cable 323 is a number greater than 26 then a positive D.C. level will be established on one of the conductors of a cable 326 labeled Address Too High.

*Section 1 control.*—Before proceeding with a further description of FIGS. 3*a* through 3*h*, a detailed description will be made of the Section 1 Control which is shown as block 327 in FIGS. 3*c* and 3*d*.

Referring now to FIGS. 13*a* and 13*b*, OD–1 pulses are delivered through a delay unit 400 to a conductor 401 labeled OD–1+1.0 microsecond as well as to another delay unit 402 whose output conductor 403 is labeled OD–1+1.9 microseconds. OD–4 pulses are delivered through a delay unit 404 to a conductor 405 labeled OD–4+0.4 microseconds. The Section 1 Control circuit further includes a source of 1300 pulses per second which is derived from a tuning fork oscillator 406 whose output is applied through a Schmitt Trigger 407 and a pulse generator 408. These 1300 pulses per second appear on a conductor 409 and each of these pulses causes a flip-flop 410 to be set in its binary One state. The flip-flop 410, when in the binary One state, conditions a gate 411 to pass a pulse received from the delay unit 404. The OD–4+0.4 μsec. pulses which are passed by gate 411 cause a flip-flop 412 to be set in the binary One state thereby conditioning each of the gates 413, 414, and 415. Gate 413, when conditioned, passes a pulse from the conductor labeled OD–2 to a conductor 416 labeled OD–2–13. A pulse on the conductor 416 causes the flip-flop 410 to be cleared. Gate 414, when conditioned, passes a pulse received from the conductor labeled OD–3 to a conductor 417 labeled OD–3–13 and gate 415 when conditioned passes a pulse received from the conductor labeled OD–4 to a conductor 418 labeled OD–4–13. A pulse on conductor 418 causes flip-flop 412 to be cleared. OD–3–13 pulses on conductor 417 are delivered to a conductor labeled Timing as well as to various other circuits within the Section 1 Control circuit. From the above description it will be seen that each pulse on conductor 409 causes first a pulse to be delivered to the conductor labeled OD–2–13 followed by a pulse on conductor labeled OD–3–13 followed by a pulse on conductor labeled OD–4–13. Pulses on those conductors are therefore pulses which occur at a 1300 pulse per second rate and the OD–2–13 pulses precede the OD–3–13 pulses by 2½ microseconds and the OD–3–13 pulses precede the OD–4–13 pulses by 2½ microseconds.

The delayed OD pulses and the 1300 pulses thus far described are delivered to various control circuits as will be described hereinafter. The Section 1 Control further includes a circuit outlined by dotted lines 419 to be referred to hereinafter as a 13 counter. This Section 1 Control further includes a circuit outlined by dotted lines 420 which will be referred to hereinafter as a 25 counter.

Assuming for purposes of illustration that the 1st stage 421 of the 13 counter is in its binary One state, having been primed into that state in a manner which will be subsequently described, and furthermore assuming that a flip-flop 422 is in its binary Zero state, each OD–2–13 pulse on conductor 416 is passed by a gate 423 since that gate is conditioned when flip-flop 422 is in the binary Zero state. Pulses passed by gate 423 to a conductor 424 are delivered through an OR circuit 425 to cause a flip-flop 426 to be set in its binary One state and this flip-flop 426 is cleared to its Zero state by each OD–3 pulse. In this manner, as long as flip-flop 422 is in its binary Zero state flip-flop 426 will be set in its One state at a 1300 cycle rate and will remain in that state for 2½ microseconds. The one output of flip-flop 426 on conductor 427 is applied to the shift windings of each stage of the 13 counter. Under the above assumed condition that the 1st stage 421 of the 13 counter is in its binary One state a first shift pulse on conductor 427 will cause that binary One state to be transferred to the 2nd stage of that register, a second shift pulse will cause the binary One state to be transferred from the 2nd stage to the 3rd stage, and so forth. When the binary One state is transferred from the 13th stage of the 13 counter a gate 428 is conditioned to pass an OD–3–13 pulse to a conductor 429. A pulse on conductor 429 causes a flip-flop 430 to be set in its One state. Further assuming that a gate circuit 431 is conditioned, OD–4–13 pulses are passed by that gate through an OR circuit 432 to cause the flip-flop 430 to be cleared. In this way when the 13 counter produces an end carry, flip-flop 430 is turned on for 2½ microseconds and the output of flip-flop 430 on conductor 433 is applied to the shift winding of each stage of the 25 counter. Further assuming that the 1st stage 434 of the 25 counter has been primed, the first shift pulse on conductor 433 will cause the binary One state to be transferred from the 1st stage 434 of the 25 counter to the 2nd stage. This operation of shifting the 13 counter at a 1300 cycle rate and shifting the 25 counter in response to the end carry of the 13 counter continues until such time as the 25th stage of the 25 counter produces an output on conductor 435. A pulse on conductor 435 is applied to the conditioning input of a gate 436 which is sampled by OD–4–13 pulses and delivers an OD–4–13 pulse to its output conductor 437 under the condition that the binary One state has been shifted out of the 25th stage of the 25 counter. Pulses on conductor 437 are delivered through the previously mentioned OR circuit 425 to cause the flip-flop 426 to be set in its One state. Pulses on the conductor 437 are also delivered to cause the previously mentioned flip-flop 422 as well as another flip-flop 438 to be set in their binary One states. Since flip-flop 422 is set in its One state under the 25 counter end carry condition, and since flip-flop 426 is set in its binary One state at this time, flip-flop 426 will remain in its binary One state for approximately 7½ microseconds since this flip-flop is cleared with OD–3 pulses. Since flip-flop 426 remains in its binary One state for 7½ microseconds under the condition of the 25 counter end carry, the 13 counter will be cleared due to this long shift. A pulse on conductor 435 in addition to being applied to the gate 436 to perform the above mentioned operation is also applied through an inverter 439 to the conditioning input of the previously mentioned gate 431 and therefore under the condition that the binary One state is being transferred from the 25th stage of the 25 counter, gate 431 will not be conditioned and therefore will not pass an OD–4–13 pulse to clear the flip-flop 430. Since flip-flop 430 remains in its binary One state under this 25 counter end carry condition, its output conductor 433 which is now positive conditions a gate 440 to pass the next following OD–3 pulse through the previously mentioned OR circuit 432 to clear the flip-flop 430. Since the flip-flop 430 is set by OD–3–13 pulses and under the 25 counter end carry condition is cleared with an OD–3 pulse, that flip-flop remains in its binary One state for substantially 10 microseconds which is a sufficiently long time to cause a clearing operation of the 25 counter. The pulse passed by gate 440 during the above described 25 counter end carry condition, in addition to being applied to the OR circuit 432 to clear the flip-flop 430, is also applied to the input of a single shot 441 which in response to this .1 microsecond pulse delivers a pulse 2½ microseconds in duration to a conductor 442 which is applied to the input winding of the 1st stage 421 of the 13 counter as well as to the input winding of the 1st stage 434 of the 25 counter thereby causing the 1st stages of those 2 counters to be primed with a binary One. From the above described operation it will be seen that the 13 counter end carry causes a count of one to be entered into the 25 counter until such time as the 25 counter produces an end carry and at that time both the 13 counter and the 25 counter are cleared and subsequently primed with a One in their lowest order stages. It should be noted that the 13 counter is a closed ring in its normal operation since the pulse on the output of the 13th stage is applied the input of its 1st stage.

When the binary One state is transferred from the 1st stage to the 2nd stage of the 25 counter a pulse is delivered to a conductor 443 which is applied to the input of a thyratron core driver circuit 444 which in response to this pulse delivers a current pulse to a conductor 445 which as will be subsequently described causes one column of a core array to be read out. When the binary One state is transferred from the 2nd stage 446 of the 25 counter to the 3rd stage 447, a pulse is delivered to a conductor 448 which causes another thyratron core driver 449 to produce a current pulse on its output conductor 450. In this manner each of the stages 1 through 18 of the 25 counter causes its associated thyratron core driver circuit to produce a current pulse on its output conductor when the binary One state is transferred from that stage. When the binary One state is transferred from the 19th stage 451 of the 25 counter, a gate 452 is conditioned to pass the next received OD–4–13 pulse to its output conductor 453. A pulse on the output conductor 453 causes a flip-flop 454 to be set in its binary One state and also causes a flip-flop 455 to be set in its binary Zero state. When the binary One state is transferred from the 1st stage 434 of the 25 counter, the pulse produced on the conductor 443 besides being applied to the thyratron core driver 444 as above described is also applied to the conditioning input of a gate 456 to permit that gate to pass the next received OD–4–13 pulse to cause the previously mentioned flip-flop 455 to be set in its binary One state. When the binary One state is transferred from the 2nd stage of the 25 counter the pulse on conductor 448 causes a gate 457 to be conditioned to pass the next received OD–4–13 pulse, thereby causing the flip-flop 458 to be set in its binary Zero state. When the 7th stage 459 of the 13 counter transfers its binary One state to the 8th stage of the 13 counter a gate 460 is conditioned to pass the next received OD–3–13 pulse to sample a gate 461. When the binary One state is transferred from the 12th stage 462 of the 13 counter a gate 463 is conditioned to pass the next received OD–3–13 pulse to sample a gate 464. When the 25 counter end carry is produced, the flip-flop 438 is set in its binary One state as above described and when in that state, gates 461 and 464 are conditioned. Gate 461 then passes the pulse produced by gate 460 when the 13 counter equals 7 to cause the previously mentioned flip-flop 454 to be set in its binary Zero state. When flip-flop 438 conditions the gate 464 it passes the pulse produced by gate 463 under the 13 counter equals 12 condition, to clear the flip-flop 438 and also deliver that .1 microsecond pulse to a conductor labeled Sync. When the 25 counter equals 1 and the previously mentioned gate 456 passes the OD–4–13 pulse to set the shift flip-flop 455 in the One state, this pulse passed by gate 456 samples a gate 465 which, if conditioned, passes the pulse to set the flip-flop 458 in its One state. Gate 465 is conditioned by the output of an AND circuit 466 whose inputs 467 and 468 are from a burst counter to be subsequently described. Flip-flop 458 when in the binary One state conditions a gate 469 to pass the next received OD–3–13 pulse to its output conductor 470 labeled Automatic Busy Bit. When flip-flop 455 is in the binary One state it conditions a gate 471 to pass the next received OD–2–13 pulse to set a flip-flop 472 in its binary One state. Flip-flop 472 is cleared by OD–3–13 pulses. Since flip-flop 455 is turned on when the 25 counter equals 1 and is not turned off until the 25 counter equals 19, gate 471 is conditioned during this period and will result in flip-flop 472 producing 2½ microsecond pulses on its output conductor 473 labeled Shift the Output Shift Register and these pulses will be equidistantly spaced in time and there will be 5 of these pulses after each thyratron core driver delivers an output.

Briefly summarizing the above, the Section 1 Control first delivers a positive D.C. level on its output conductor labeled Search which is actually the One output of flip-flop 454 and this positive D.C. level stays up from the time that the 25 counter equals 19 until the 13 counter equals 7 after the 25 counter equals 25. When the positive D.C. level ceases on the conductor labeled Search then the positive D.C. level is produced on the conductor labeled Not Search which is actually the Zero output of the flip-flop 454 and this positive D.C. level will remain until the flip-flop 454 is returned to its One state. During the time that the positive D.C. level is maintained on the conductor labeled Not Search the 25 counter causes the thyratron core drivers to be sequentially pulsed and as will be apparent subsequently these thyratron core drivers thereby cause the columns of a core array to be sequentially read out of and after each thyratron core driver has produced a pulse, 5 successive 2½ microsecond pulses will be delivered to the conductor 473 labeled Shift the Output Shift Register.

Referring back now to FIGS. 3*c*, 3*d* and 3*e*, the Burst Number Register 310, which receives the bits Left 8 through Left 15 of each drum word, delivers that burst number signal by way of the conductors of a cable 480 to a burst time counter and compare circuit 481. The burst time counter and compare circuit is essentially two counters, one called a burst counter and the other called an elapsed time counter. The burst counter receives pulses from the conductor 453 labeled Step Burst Counter, and in response to each of these pulses, adds one to the contents of the burst counter and the contents of the burst counter are compared with the signals received from the conductors of cable 480. If the comparison is successful, one of the conductors of a cable 482 is made positive. The elapsed time counter in the burst time counter and compare circuit 481 receives pulses from the conductor 483 and each pulse received on that conductor causes the elapsed time counter to be reset to Zero. The elapsed time counter also receives pulses from the conductor 484 and in response to each pulse on that conductor causes a One to be added to the elapsed time counter. In order to synchronize the pulses on the conductor 484 with the drum system timing, OD–2 pulses are also delivered to the elapsed time counter of the burst time counter and compare circuit 481. As previously mentioned, the output system of a preferred embodiment of this invention includes three sections labeled Section 1 through Section 3. Section 1 and Section 2 each have independent control circuits, not shown, and each of the sections 2 through 3 also has a burst counter and therefore the other two conductors of cable 482 are provided for delivering a signal when a successful comparison between the signals in those burst counters and the burst number tag of the drum word has been made. The D.C. levels on the conductors of cable 482 as well as the D.C. levels on the conductors of cables 322 and 326 are delivered to an array read in control 485. The array read in control further receives D.C. levels on the conductors labeled Search, Not Search.

*Array read-in control.*—Reference is now made to FIGS. 14*a* and 14*b* which illustrate in logical block form the details of the array read in control indicated in FIG. 3*d* as block 485. One of the conductors of cable 322 will be made positive under the assumed conditions that the bits Left sign through Left 2 of the drum word specify the binary number 100 and this conductor is indicated in FIG. 14*a* as conductor 490 labeled Select Section 1. This positive D.C. level on conductor 490 is delivered to an AND circuit 491. The AND circuit 491 receives two additional inputs, one from the conductor 492 labeled Search Section 1 and the other being conductor 493 labeled Compare Section 1. AND circuit 491 will therefore produce a positive D.C. level on its output conductor under the condition that the Section 1 control circuit delivers a positive D.C. level to the conductor 492 labeled Search Section 1, that the burst number of the word read from the drum actually compared with the burst counter of Section 1 and that the bits Left sign through Left 2 specifies the binary number 100. This positive D.C. level from AND circuit 491 is delivered to the conditioning input of a gate 494 and an inverter 495.

There are two AND circuits 497 and 498 associated with the control of transmission of words destined for Section 2 and another AND circuit 499 for control of words destined for Section 3. Only one of these AND circuits 491, 497, 498 or 499 can produce an output D.C. level in response to a given drum word, therefore, under the assumed condition that AND circuit 491 produces a positive output, the other 3 AND circuits will necessarily produce a negative output. The output of AND circuit 497 is delivered to the conditioning input of a gate 500 and an inverter 501, the output of AND circuit 498 is delivered to the conditioning input of a gate 502 and an inverter 503 and the output of AND circuit 499 is delivered to the conditioning input of a gate 504 and an inverter 505.

The outputs of inverters 495, 501, 503 and 505 are applied to the conditioning inputs of gates 506, 507, 508 and 509, respectively.

The outputs of AND circuits 491, 497, 498 and 499 are applied to an OR circuit 510 whose output is applied to each of two gate circuits 511 and 512 and with this arrangement gates 511 and 512 will be conditioned when any one of the AND circuits 491, 497, 498 or 499 produces a positive output potential. Gates 494, 500, 502 and 504 are each sampled with an OD–4+0.4 microsecond pulse whereas gates 502, 507, 508 and 509 are sampled by an OD–2 pulse passed by the gate 511. A pulse passed by gate 494 or 506 causes a flip-flop 513 to be set in its One state, likewise gates 500 and 507 set a flip-flop 514, gates 502 and 508 set a flip-flop 515 and gates 504 and 509 set a flip-flop 516.

Flip-flops 513 through 516 are each set to their ZERO states by a pulse on the conductor OD1+1.0. The ZERO outputs of flip-flops 513 through 516 are respectively connected to Reset and Inhibit drivers 517 through 520. These reset and inhibit drivers are so constructed that in response to a positive potential they produce substantially no output current on their respective output conductors 521 through 524 whereas in response to a negative input potential they produce relatively large output currents.

As noted previously in the description of the operation of the drum word register in FIG. 3*e*, in the event that the total number of binary Ones in the word read from the drum was odd, a pulse is delivered to the conductor 314 labeled Parity O.K. This pulse is delivered to the Array Read-In control of FIGS. 14*a* and 14*b* where it is applied through a delay unit 525 to the previously mentioned gate 512 and the timing of this pulse by proper adjustment of the delay unit 525 is such that this pulse arrives at the gate 512 at substantially OD–2+1.2 microseconds and in the event that gate 512 is conditioned, a pulse is passed to cause a flip-flop 526 to be set in its One state. This flip-flop is cleared by OD–4 pulses. Flip-flop 526, when in the One state, produces a positive output on its conductor 527, labeled Sample Set Drivers.

The operation of the Array Read-In Control thus far described will be explained with reference to FIG. 15 which is a family of curves illustrating in idealized form the potentials on various identified conductors. For the purpose of this description, it will be assumed that AND circuit 491 produces a positive output potential and therefore all of the other AND circuits, namely, 497, 498 and 499, will produce a negative output. This positive output produced by AND circuit 491 causes the gate 494 to be conditioned and gate 506 to be non-conditioned. AND circuit 497 producing a negative output causes gate 500 to be non-conditioned and gate 507 to be conditioned. Likewise, AND circuit 498 causes gate 502 to be non-conditioned and gate 508 to be conditioned, and AND circuit 499 causes gate 504 to be non-conditioned and gate 509 to be conditioned. At OD–1+1.0 time the selected flip-flop 513 as well as the non-selected flip-flops 514 through 516 are cleared. At OD–2 time gates 507, 508 and 509 pass the OD–2 pulse to cause flip-flops 514, 515 and 516 to produce a negative output. At OD–2+1.2 time gate 512 passes a pulse to cause flip-flop 526 to produce a positive output. At OD–4 time flip-flop 526 is cleared thereby producing a negative output. The output of flip-flop 526 therefore is a positive pulse whenever the word read from the drum has good parity and the word is accepted by one of the AND circuits 491, 497, 498 or 499. This positive pulse begins at OD–2+1.2 time and ceases at OD–4 time. At OD–4+0.4 time, gate 494 passes a pulse to cause the selected flip-flop 513 to be set in its binary One state thereby producing a negative output and at the next following OD–1+1.0 time, flip-flops 513 through 516 will be cleared.

*Half-write current generator.*—Referring back to FIGS. 14*a* and 14*b* and FIGS. 3*d* and 3*e*, conductors 521 through 524 form a cable group indicated in FIG. 3*d* as cable 530 and signals on those conductors are delivered to a Half-Write Current Generator 531. The previously described signals on the conductor 527, labeled Sample Set Drivers, are also delivered to the Half-Write Current Generator 531. The D.C. levels from the data register 309 are also delivered to the Half-Write Current Generator by way of the conductors of a cable 533 as well as the parity conductor 534.

As mentioned previously with respect to FIG. 3*d*, the address bits of the drum word are decoded in address decoder 324 to cause one of the conductors of cable 325 to be made positive and these conductors of cable 325 are also delivered to the Half-Write Current Generator 531.

Referring now to FIGS. 16*a* and 16*b*, the conductors of cable 533 (data), the conductor 534 (parity) and the conductors of cable 325 (address) are connected to respective circuits labeled STD and these circuits are known as Set Drivers. Essentially a set driver is a circuit which responds to a positive conditioning input potential and a positive sample pulse to produce a relatively heavy current pulse on its output conductor. These set drivers are so constructed that they will produce sufficient current on their ouput, in response to positive conditioning input and a sample pulse, to cause one of the four cores associated with that output conductor to assume a binary One state provided that the core is not inhibited. More specifically, set driver 540, for example, has associated with its output conductor 541 four cores 542 through 545. Core 542 is associated with another conductor 521 which is one of the conductors previously described with reference to FIG. 14*b*. Cores 543, 544 and 545 are likewise respectively associated with conductors 522 through 524. It will be understood that each of the conductors of cables 533 and 325 as well as conductor 534 has an associated set driver, the output of which is associated with a row of four cores. Conductor 521 in addition to being associated with core 542 as above described is also associated with a core in each of the rows of the array. Conductors 522 through 524 are likewise associated with a core in each of the rows of the array.

Reviewing the operation thus far described, the drum word is read and stored in the Drum Word Register by sampling the read circuit at OD–1 time and therefore shortly thereafter the conductors of cables 533 and 325 will arrive at their states representative of the data and address respectively identified by the drum word. The parity conductor 534 will arrive at its steady state representative of the parity of the 16 bit data word shortly before OD–2 time. As mentioned previously with reference to FIGS. 14*a*, 14*b* and 15, all of the reset and inhibit drivers 517 through 520 receive a positive potential beginning at substantially OD–1+1.0 time and therefore produce substantially no current to conductors 521 through 524. Beginning at OD–2 time the unselected conductors (as above assumed, conductors 522, 523 and 524 are unselected whereas conductor 521 is selected) produce a relatively heavy current and these currents are of such magnitude as to cause the cores associated with those conductors to be driven to their saturated state representative of a binary Zero. Beginning at OD–2+1.2 time and ending OD–4 time a positive potential is delivered to conductor 527 labeled Sample Set Drivers and this potential causes those set drivers which have been conditioned in response to the drum word to produce a current on their output conductors. This current is of sufficient magnitude to cause the selected core to be set in its binary One state but is not of sufficient magnitude to set the unselected cores since those cores are inhibited by the current from their respective reset inhibit drivers. At substantially OD–4 time those cores which are to be set in their binary One state have been so set and therefore the positive potential on conductor 527 ceases and this is immediately followed by the selected reset and inhibit driver producing a relatively heavy current. The current from the selected reset and inhibit driver causes those cores which were previously set in their binary One state to be reset to their binary Zero state thereby producing a pulse in the sense windings associated with those cores.

The sense windings associated with Column 1 cores which receive data and parity signals form a cable group 550. The remaining cores of Column 1 which receive address signals have their sense windings form a cable group 551. The other three columns have their sense windings similarly grouped, that is, column 2 sense windings form cables 552 and 553, column 3 sense windings form cables 554 and 555, and column 4 sense windings form cables 556 and 557. These sense windings in response to a change in binary state from binary One to Zero in their respective cores, receive an induced current of sufficient magnitude to produce what is known in the art as a half-write current.

Referring back to FIGS. 3c, 3d and 3e, the conductors of cable 550 (data) and the conductors of cable 551 (address) are applied to a Section 1 Array 560. The conductors of cable 552 (data) and cable 553 (address) are applied to a Section 2 Array A, cables 554, 555 to a Section 2 Array B and cables 556 and 557 to a Section 3 Array. The construction of the Section 2 and Section 3 Arrays and a description of the control circuits associated with those arrays to cause reading and writing operations in those arrays will be found in the above referred to copending application "C."

*Section 1 Array*.—Reference is now made to FIG. 17 which illustrates in simplified schematic form the Section 1 Array shown as block 560 in FIG. 3c.

The data conductors from the Half-Write Current Generators are so arranged that each conductor is associated with a column of cores in the Array and those data conductors when energized furnish what is known as a half-write current to each of the cores in their respective column. This half-write current by itself is ineffective to change the state of the magnetic cores associated therewith. The conductors from the half-write current generator previously identified as address conductors are each associated with a row of cores in the array. In this way when the data conductors are energized with half-write currents representative of data, those bits of data will be written into the particular row of cores which receives a half-write current from its associated address conductor and therefore the cores of that row will be set in their binary One state or remain in their binary Zero state in accordance with the particular bit of data that the core received. The cores of a given row, into which data is written, are labeled in FIG. 17 "S," and 1 through 15 (only cores 1 and 15 being shown in the figure). The core of a given row, into which the parity bit is written, is labeled "P." One core in each row of the array is labeled "BB" and is known as the "Busy Bit" core. These busy bit cores have sufficient number of turns on their windings which are energized by the address conductors of cable 551 that when an address conductor is energized, the busy bit core will be set in its One state.

As thus far described, the 16 bits of data of the drum word together with the parity bit of the word are written into the particular address of the array which was specified by the address tag of the drum word. The foregoing description in which given data is written in a chosen address of a selected array is also described and claimed in the above referred to copending application "E."

As previously mentioned with reference to the description of FIGS. 13a and 13b, the 25 counter causes the conductors of cable 561 to be sequentially pulsed. Those conductors of cable 561 are the reset or read-out conductors for the Section 1 Array. As shown in FIG. 7, those read-out conductors of cable 561 are arranged such that each conductor is associated with a column of the array and, when energized, a conductor causes each of the cores of its associated column to be set in its binary Zero state. If, for example, conductor 445 which is associated with the column of busy bit cores is pulsed, all of the cores of that column which were in their binary One state will cause signals to be introduced in their corresponding sense windings.

The array is so divided that 13 rows of cores form a logical group, thereby making 2 logical groups in the array. The rows of the array having addresses 0 through 12 form one group, whereas the rows of the array having addresses 13 through 25 form the other group (shown as block 564 in FIG. 17). The sense windings of the first group of rows form a conductor group 565 whereas the sense windings of the other group of rows form a conductor group 566.

*Reading words from Section 1 Array*.—Referring back to FIG. 3c, the signals induced in the sense windings of the Section 1 Array 560 are delivered to a 13 Stage Register 567 and another 13 Stage Register 568. These 13 Stage Registers are preferably of the magnetic core shifting register type and are constructed such that each stage has its individual input winding energized by its associated conductors from the array so that the 13 bits read from the array are stored in that shift register. Subsequent to the time that one column of the array is read out and prior to the time that the next column is read from the array, each of the 13 stage registers receives 13 pulses on the conductor 473 labeled Shift output shift registers. The output winding of the last stage of shift 567 is applied to the conditioning input of a gate 570 whereas the output winding of the last stage of shift register 568 is applied to the conditioning input of a gate 571. Gates 570 and 571 are sampled by OD–3–13 so that if a binary One signal is received by those gates they will deliver a pulse through their respective OR circuits 572 and 573 to the Transmission Channels 1 and 2 respectively.

Referring back to FIGS. 13a and 13b, pulses on conductor 417 previously referred to as OD–3–13 pulses are delivered by way of the conductor labeled Timing to the Transmission Channels 1 and 2 (FIG. 3c). Signals on this conductor are therefore a continuous succession of pulses which occur at a 1300 cycle repetition rate.

A pulse is passed by gate 464 (FIG. 13a) to a conductor 580 labeled Sync (Sec. 1) under the condition that the 25 counter is equal to 25 and the 13 counter is equal to 12, or stated in a different way, a pulse is delivered to the conductor 580 labeled Sync approximately 770 μseconds before stage 1 of the 25 counter initiates the read-out operation of the first column of cores in the Section 1 Array. Although OD–3–13 pulses sample the gates 570 and 571 (FIG. 3c), the OD–3–13 pulse coincident in time with the sync pulse and the OD–3–13 pulse immediately following the sync pulse will not be passed by those gates neither of those gates is conditioned at those times. The second OD–3–13 timing pulse following the sync pulse will be accompanied by data pulses from the output of OR circuits 572 and 573 provided that registers of the array having address 0 and 13 have a One stored in the "busy bit" cores.

When the 25 counter (FIG. 13b) is equal to 19, gate 452 (FIG. 13a) is conditioned to pass the next OD–4–13 pulse to the conductor 453 labeled Step Burst Counter. Every fourth one of the pulses on conductor 453, when received by the Burst Counter causes that counter to deliver a positive D.C. level on conductors 467 and 468. The positive D.C. levels on these conductors cause the output of AND circuit 466 to condition gate 465 which passes the pulse received from gate 456 to set flip-flop 458 in the One state. When flip-flop 458 is in the One state it conditions the gate 464 to pass the next received OD–3–13 pulse to conductor 470 labeled Automatic Busy Bit. This automatic busy bit is delivered to the Transmission Channels 1 and 2 through OR circuits 572 and 573, respectively. In this manner busy bits are periodically (approximately one per second) applied to those transmission channels even if there are no words being delivered from the drum to those channels. The purpose of those automatic busy bits is to ensure that automatic volume control circuits in the receivers of the controlled devices are properly adjusted.

*Summary of output system operation*.—Reference is now made to FIG. 18 which is a family of curves which illustrates relative timing of operation in the Output System. Briefly summarizing the operation of the Output System as thus far described, the flip-flop 454 (FIG. 13a) controls the search-not search operation of the Output System, that is, from the time shortly preceding the 25 counter equals 1 time, to the time that the 25 counter equals 19, the not-search time is provided, whereas from the time that the 25 counter equals 19 until a short time after the 25 counter equals 25, the search time is provided. This search-not search cycle (shown by the curve so labeled in FIG. 18) is approximately .25 second in duration. During the search period the words read from the drum if acceptable as to parity, burst number, etc., are written into the array. During the not search period, words stored in the array during the preceding search period are delivered from the array to the output shift registers for ultimate delivery to the transmission channels. The curve labeled Shift Output Shift Register illustrates that shortly after the beginning of not search period the output shift register is shifted at a 1300 cycle rate. The curve labeled Automatic Busy Bit illustrates that an automatic busy bit is generated every fourth burst period when the 25 counter equals 1. The curve labeled Sync illustrates that a sync signal is generated immediately before the 25 counter equals 1. The curves labeled 25 counter and 13 counter show that those counters are cleared when the 25 counter equals 25, they are primed shortly after being cleared, the 25 counter is shifted at a 100 cycles per sec. rate and that the 13 counter is shifted at a 1300 cycle per sec. rate.

Reference is now made to FIG. 19 which is a timing diagram showing the relationship between Timing, Sync and Data signals. This diagram shows that those signals, when they occur, are synchronous and that the first data signal occurs in time coincidence with the second timing signal following the sync signal. The data signals are labeled as to the register of the array in which they were stored as well as the bit number of the word. From FIGURE 19 it will be seen that the bits of the words are interleaved, that is, between successive bits of a given word, the bits of the other words are sent. The advantages of and detailed description of a system employing interleaving is described in the previously mentioned copending application "C."

*Retaining "full" status of drum registers.*—The above description of the operation of the output system has assumed that a word is always "read" from the drum, that is, each full drum register has its status changed to empty and the words are delivered to a transmission channel. In actual operation a full drum register remains full until all of the conditions have been met to deliver the word to a transmission channel or some error has been detected. As previously mentioned, when a full drum register comes under the read heads, the word in that drum register is delivered to the Drum Word Register. The status of that register is changed to empty by the OD Read Status Control section 301 (FIG. 3*e*) unless a pulse is received on a conductor 600 labeled No Compare. Pulses are produced on the conductor 600 by the Array Read-In Control 485 (FIG. 3*d*).

Referring back to FIGS. 14*a* and 14*b*, pulses are delivered to the conductor 600 (FIG. 14*b*) by a gate 601. Gate 601 is sampled by pulses passed by a gate 602 which in turn is sampled by pulses on conductor 314 labeled Parity O.K. As previously mentioned, a pulse is not delivered to the conductor 314 (Parity O.K.) by the parity register 313 (FIG. 3*e*) unless the word read from the drum has good parity. Therefore if the drum word has a parity error, then no pulse will be delivered to conductor 600 (no compare) and since the OD Read Status Control Section 301 does not receive a pulse on conductor 600, the word on the drum is effectively destroyed, that is, its status is changed to empty. When gate 602 is not conditioned pulses are not delivered to conductor 600 (no compare). Gate 602 is conditioned from the output of OR circuit 510 through an inverter 603.

If the drum word is acceptable for storage in one of the Section Arrays, that is, the burst number of the drum word compares with the burst counter identified by the section address of the drum word and that section's control circuit is in the search period, then OR circuit 510 will produce a positive output which through inverter 603 causes gate 602 to be non-conditioned and no pulse is delivered to the conductor 600 (no compare) and the drum register's status is changed to empty.

If the drum word is not acceptable for storage in one of the Section Arrays and the drum word has good parity, then gate 602 passes the parity O.K. pulse to the sample input of gate 601. Gate 601 is conditioned from the output of an OR circuit 604 through an inverter 605. OR circuit 604 produces a negative output to cause gate 601 to be conditioned except under the conditions that (1) the Section tag (bits LS–L2) of the drum word identifies a non-existent output section, (2) the address tag (bits L3–L7) of the drum word identifies a non-existent address in the selected Section Array, or (3) the burst number of the drum word (bits L8–L15) compares with the burst counter during the not-search period. The logical circuits associated with the inputs of OR circuit 604 to accomplish the recited functions are shown in the drawings however, for a detailed description of those circuits, reference is made to the above referred to copending application "F."

*Reading the burst counter and elapsed time counter*

From the previous description of the Output System it will be recalled that a word on the drum will be delivered to the transmission channel when its burst number compares with the contents of the burst counter which has a One added to it when a search period begins. It will further be recalled that the elapsed time counter is reset to zero when the first column of the array is read out and has a One added to it every 1/32 second.

Knowing the contents of the burst counter and the elapsed time counter, a word can be delivered to a transmission channel at a known time. When it is known at what time a word will be delivered to the transmission channel, the magnitude of the control signal represented by the word can be predicted so that the correct course of action will be taken.

The program stored in the Memory Element 34 (FIG. 3*a*) for reading the contents of the burst counter and the elapsed time counter into memory is similar to the previously described program for reading from the drum. To read the contents of those counters three instructions (1) Load Address Counter (LDC), (2) Select, and (3) Read, are preferably performed in that order. The Select instruction, in order to select the Burst Counters, includes in its index interval portion (bits 10 through 15) the binary code 010 001 (octal 21).

The Load Address Counter instruction causes operations as previously described to set the IO Address Counter to the address in memory into which the first word from the Burst Counter is to be stored.

The Select instruction causes the commands shown in FIG. 11*w* to be generated at the times indicated. The Select instruction, besides causing the common commands described with reference to Table 14 and Table 15 to be generated, causes generation of the following commands:

TABLE 23

| Command number | Name | Time |
|---|---|---|
| 96 | Pause | PT-10 |
| 95 | Set PT-OT Flip-Flop to OT | PT-11 |
| 93 | Deselect Pulse | OT-5 |
| 94 | Clear Drum Control Register | PT-2 |
| 92 | Address Register to Drum Control Register | PT-3 |
| 85 | Select Pulse | PT-5 |

The commands 92 through 96 cause operations to be performed as described with reference to Table 17 above. At PT-5 time the command 85 (Select Pulse) is delivered to the Selection and IO Control Element 49 (FIG. 3*g*) where in response to this pulse and in response to the previously mentioned index interval code 010 001 the fact is stored that the Burst counters have been selected.

The Read instruction causes the generation of the commands previously described with reference to FIG. 11*x*, Table 14 and Table 18. The command PT-6 on Read (86), when received by the Selection and IO Control Element 49, will cause a pulse to be delivered to a conductor 610 (Start Read BTC) when the Select instruction has selected the Burst Counters and the number of words to be read, as specified by the right half-word of the read instruction, is not zero. This pulse on conductor 610 (Start Read BTC) is delivered to a Burst Counter interrogator 611 (FIG. 3*d*) which also receives signals from the burst counter associated with each section of the output system as well as of the Elapsed Time Counter which is associated with the Section 1 as previously mentioned. In response to the pulse on conductor 610 (Start Read BTC), the Burst Counter Interrogator 611 delivers signals to certain of the conductors of a cable 612 representative of the contents of one of the burst counters and also delivers a pulse to a conductor 613 (Request Break Burst Time Counter), and repeats this operation for each of the burst counters. When the signals representative of the contents of the Section 1 Burst Counter are delivered to certain of the conductors of cable 612, signals representative of the contents of the Elapsed Time Counter are delivered to the other conductors of the cable 612.

Each time the Burst Counter Interrogator 611 delivers pulses to the conductors of cable 612 and a pulse to the conductor 613, the signals on the conductors of cable 612 are temporarily stored in the Left IO Buffer Register 164 and the pulse on conductor 613 is delivered to the Selection and IO Control Element where it initiates a "Break In" operation. The "break in" operation, as previously described, causes the signals on the Left IO Buffer Register 164 (as well as the signals in the Right IO Buffer Register 165) to be stored in the Memory Element 34.

*Calculation of burst number and delay for output messages*

Certain of the output messages generated by the computer contain signals indicating "time to go" as of the time that the message is received by the receiver, that is, the message indicates at what time with reference to the time of receipt of the message, a given course of action is to take place. Thus the "real-time" delay between computation by the computer and reception by the receiver must be calculable.

Reference is made to FIG. 20 which is a timing chart (not to scale) that illustrates the various delays in the control system. As previously described, after several messages have been delivered to the computer, the computer can, by suitable programming, determine the present course of the moving object and furthermore, by the use of the time tag on the input words the delay since reception of raw data, representing the last observed position of the moving object, can be determined.

The time required to complete the calculation is insignificant and can be neglected. The transmission delay is constant for any given transmission channel. In order to compute the delay between time of computation and the beginning of transmission from the output system, a burst number must be assigned. A way in which the burst number assignment may be made is as follows using the listed symbols:

$A$=Burst Counter reading now,
$B$=Elapsed Time Counter reading now,
$C$=RTC reading now,
$D$=last burst number assigned,
$k$=maximum time to get through drum,
$T$=burst period,
$U(\ )$=the next highest integer of ( ),
$N_D$=reading of the Burst Counter at the time that the last assigned burst number was assigned,
$t_D$=contents of the real time clock when the last assigned burst number was assigned,
$M$=maximum count of the Burst Counter.

Compute the burst number $N_1$ which if assigned would cause the message to be sent at the earliest possible time.

$$N_1=A+1 \text{ (modulus of Burst Counter)}$$

Compute the time $t_N$ at which a message having the burst number $N_1$ would be sent.

$$t_{N_1}=C+T-B \text{ (modulus of Real Time Clock)}$$

Is there enough time that would allow a message with that burst number to be written on drum, read from drum, and written into array?

Is $t_{N_1}>C+k$ (modulus of Real Time Clock)?

- Yes: Has the burst number $N_1$ already been assigned? Is $N_1<D$?
  - No: Assign $n=N_1$ to this message.
  - Yes: Assign $n=D+1$ to this message.
- No: Compute the burst number $N_2$ which if assigned there would be enough time and yet it would cause the message to be sent at the earliest possible time after $N_1$.

$$N_2=U\left(\frac{B+k}{T}\right)+A$$

Has the burst number $N^2$ already been assigned? Is $N_2<D$?
  - No: Assign $n=N_2$ to this message.
  - Yes: Assign $n=D+1$ to this message.

Reference is now made to FIG. 23 which is a flow chart that illustrates an example of various steps which may be employed to determine the burst number which if assigned to a message placed in the buffer storage would cause that message to be delivered to the receiver at the earliest possible time.

The first step is to determine whether or not the last assigned burst number was a number which when computed exceeded the modulus of the burst counter. This is determined by comparing the last burst number assigned with the burst counter reading at the time that the last burst number was assigned. If the number assigned was greater, then that burst number when computed did not exceed the modulus of the burst counter.

This comparison is illustrated in FIG. 23 as determining whether or not the burst counter reading when the assignment was made is greater than the last assigned burst number. If so, then the last assigned burst number exceeded the modulus of the burst counter.

The next step, if the result of the first was yes or no, is to determine if the last assigned burst number has actually beent sent. This step is illustrated in FIG. 23, whether the result of the first step is yes or no, by asking the question: Is the present time minus the time at which the last assignment was made greater than the time required to transmit all of the bursts which were yet to be transmitted at the time that the last assigned burst was made? If the answer to the second step is yes, then the next step is to determine whether or not there is sufficient time to get a message having the earliest possible burst number to the drum. This is illustrated in FIG. 23 by asking the correct question for each of the possible results of the second step.

If the result of the second step is yes, the next step is to determine whether or not there is sufficient time remaining in the present burst period to permit a message to be placed in storage before the beginning of the next burst period. This step is illustrated in FIG. 23 by asking the question: Is the burst period minus the elasped time counter reading greater than the amount of time required to send a message to the storage? If so, the burst number to be assigned is one greater than the present reading of the burst counter. If not, the burst number $N_2$ is computed, $N_2$ being the burst number which is the earliest possible burst number which may be assigned. This is illustrated in FIG. 23 by solving the equation for $N_2$ which is equal to the burst counter reading now plus the next highest integer of the value resulting from subtracting the time remaining in the present burst period from the time required to get a message in storage and dividing by the burst period. The flow chart of FIG. 23 is a general flow chart which takes into account that the time required to get a message into storage ($k$) may take any value. If ($k$) is known and fixed the flow chart can be simplified and becomes very simple when ($k$) is fixed and known to be less than a burst period.

In the cases where the control signal to be transmitted is a control signal indicating the course correction necessary to be executed in order to arrive at a destination (as discussed with reference to FIG. 2), the time at which the signal will arrive is illustrated in FIGS. 20 and 22 and may be determined as follows:

$$t_n+K=C+T-B+T[n-(A+1)]$$

where ($k$) is the transmission delay time.

In certain control systems the message delivered to the receiver indicates the "time to go" from the time of receipt of the message. This "time to go" indicates the time at which an agreed upon action is to take place. The "time to go" to be sent in the message is as illustrated in FIG. 20 and may be determined as follows:

$$g=G-K-(t_n-C)$$
$$t_n-C=T-B+T[n-(A+1)]$$
$$g=G-K-T+B-T[n-(A+1)]$$

where $g$="time to go" in message.
$G$="time to go" from present time C.

Reference is made to FIG. 23 which is a flow chart illustrating a possible way in which the calculation of ($n$) might be programmed.

*Computer instructions for data processing*

Those instructions listed in Table 2 above as being Input-Output Class instructions as well as the Clear and Subtract Word Counter instruction have been described in detail above.

The operations performed in response to the following instructions which are listed in Table 2 above as well as operations performed in response to still other instructions are described in the above referred to copending application "D":

TABLE 24

| Class | Binary code | Variation | Binary code | Abbrev. |
|---|---|---|---|---|
| Add | 001 | Clear and Add | 0000 | CAD. |
| | | Add | 0001 | ADD. |
| | | Clear and Subtract | 0110 | CSU. |
| | | Subtract | 0111 | SUB. |
| Multiply | 010 | Multiply | 1010 | MUL. |
| | | Divide | 1100 | DVD. |
| Store | 011 | Store | 0101 | FST. |
| | | Right Store | 0111 | RST. |
| | | Store Address | 1000 | STA. |

*Program stop instruction* (*HLT*).—For various reasons it is desirable that the program include an instruction which will stop the computer program when the instruction has been reached in the program. It is also desirable that a manual control be provided so that after the program has been stopped by the instruction, the program can be caused to continue.

From FIG. 11*a* it will be seen that the Program Stop instruction, besides causing the generation of the common commands described with reference to Tables 14 and 15 above, causes the command 117 (Clear Continue flip-flop) to be generated. This command causes a continue flip-flop to be cleared to its Zero state. The One output of this continue flip-flop is applied as one input of an AND circuit whose other input is the One output of the flip-flop of the TP–7 stage of the Time Pulse Distributor. This AND circuit has its output connected to the conditioning input of the TP–7 stage gate of the Time Pulse Distributor. Therefore, the command 117 (Clear Continue flip-flop) causes the Time Pulse Distributor to cease the generation of TP pulses after PT–7 of the Program Stop instruction. The Continue flip-flop can be manually reset to its One state to cause the program to be resumed. The manual reset circuit may include a synchronizing circuit such as that used to set and clear the TPD control flip-flop 1255 (FIG. 37).

*Twin and Add instruction* (*TAD*).—It is sometimes desirable to cause each of two factors to have a third factor added to them. This operation may be performed in a minimum of time in accordance with the principles of this invention. From FIG. 11*e*, it will be seen that the Twin and Add instruction, besides causing the generation of the common commands described with reference to Tables 14 and 15 above, causes the following commands to be generated at the times indicated:

TABLE A

| Command number | Name | Time |
|---|---|---|
| 95 | Set PT-OT Flip-Flop to OT | PT-11 |
| 98 | Clear Left A Register | OT-1 |
| 99 | Clear Right A Register | OT-1 |
| 75 | Left Memory Buffer Register to Left A Register | OT-7 |
| 116 | Left Memory Buffer Register to Right A Register. | OT-7 |
| 110A | Left Carry Zreo | OT-10 |
| 110B | Right Carry Zero | OT-10 |
| 98 | Clear the Left A Register | PT-1 |
| 99 | Clear the Right A Register | PT-1 |
| 127 | Left Divide Shift Left | PT-1 |
| 128 | Right Divide Shift Left | PT-1 |
| 71A | Left End Carry | PT-2 |
| 71B | Right End Carry | PT-2 |
| 101A | Left Accumulator Conditional Shift Left | PT-5 |
| 101B | Right Accumulator Conditional Shift Left | PT-5 |

The command 95, Set PT–OT flip-flop to OT, is generated to provide the OT cycle. The commands 98 and 99 are generated at OT–1 time to clear the Left and Right A registers so that those registers are prepared to receive the third factor which is delivered from memory to the Left Memory Buffer Register from whence it is transferred to the Left and Right A Registers at OT–7 time in response to commands 75 and 116. The remaining commands of Table A above cause the number stored in the Left and Right A Registers to be added to the numbers previously stored in the Left and Right Accumulators. From the previously mentioned copending application "H" above it will be seen that these commands when delivered to their respective arithmetic elements cause such an add operation in each of those arithmetic elements. It will thus be seen that in a single add instruction cycle, two separate and distinct add operations are performed simultaneously in which the first factor in the left arithmetic element and the second factor in the right arithmetic element each have added to them the third factor which is received from the memory location specified by the address part of the Twin and Add instruction.

*Twin and Subtract instruction* (*TSU*).—It is sometimes desirable in data processing operations to cause each of a first and a second factor to have subtracted from them a third factor. In accordance with one of the principles of this invention such an operation may be performed in a minimum of time. From FIG. 11*h* it will be seen that the Twin and Subtract instruction besides causing the common commands described with reference to Tables 14 and 15 above, causes the following commands to be generated at the times indicated:

TABLE B

| Command number | Name | Time |
|---|---|---|
| 95 | Set PT-OT Flip-Flop to OT | PT-11 |
| 98 | Clear Left A Register | OT-1 |
| 99 | Clear Right A Register | OT-1 |
| 75 | Left Memory Buffer Register to Left A Register | OT-7 |
| 116 | Left Memory Buffer Register to Right A Register. | OT-7 |
| 118A | Complement Left A Register | OT-9 |
| 118B | Complement Right A Register | OT-9 |
| 110A | Left Carry Zero | OT-10 |
| 110B | Right Carry Zero | OT-10 |
| 98 | Clear the Left A Register | PT-1 |
| 99 | Clear the Right A Register | PT-1 |
| 127 | Left Divide Shift Left | PT-1 |
| 128 | Right Divide Shift Left | PT-1 |
| 71A | Left End Carry | PT-2 |
| 71B | Right End Carry | PT-2 |
| 101A | Left Accumulator Conditional Shift Left | PT-5 |
| 101B | Right Accumulator Conditional Shift Left | PT-5 |

It will be seen that Table B differs from Table A above only in that the commands 118A and 118B, which are Complement the Left A Register and Complement the Right A Register, respectively, are generated at OT–9 time. Therefore the Twin and Add operation as above described is performed; however, the third factor which is contained in the Left and Right A Registers is complemented and therefore the add operation of the complement of the third factor results in a subtraction of the third factor from each of the first and second factors which were previously stored in the accumulators of the Left and Right arithmetic elements.

*Clear and Add Magnitude instruction* (*CAM*).—It is oftentimes desirable to place the magnitude of a number into the accumulator and neglect the sign. Negative numbers in the computing system above described are stored and transferred as the complement of the number with a minus (or binary One) in the sign position. Therefore, to place the magnitude of the number into the accumulator, the number should be inspected and if the sign is minus, then the number should be complemented before placing it in the accumulator. The Clear and Add Magnitude instruction is identical in all respects to the Clear and Add instruction above described with the exception that the commands 119A (Make Left A Register Positive) and 119B (Make Right A Register Positive) are generated at OT–8 time of the instruction. These two commands, as described in more detail in the above mentioned copending application "H," cause the number in the A Register to be complemented provided that the sign of the number is minus. Therefore at the completion of the Clear and Add Magnitude instruction the number is placed into the accumulator and this number is in true form even though the number as read from memory was in complement form.

*Difference Magnitude instruction* (*DIM*).—It is sometimes desirable in data processing systems to determine the difference in magnitude of two numbers irrespective of their signs. The Difference Magnitude instruction permits such an operation to be performed in the computer system above described. In FIG. 11*j* it will be seen that the commands which are generated during the Difference Magnitude instruction differ from the commands generated during the subtract instruction as shown in FIG. 11*g* in that the following commands are generated at the times indicated:

TABLE C

| Command number | Name | Time |
|---|---|---|
| 122 | Clear Left B Register | OT-6 |
| 126 | Clear Right B Register | OT-6 |
| 115A | Left Accumulator Register to Left B Register | OT-8 |
| 115B | Right Accumulator Register to Right B Register. | OT-8 |
| 119A | Make Left A Register Positive | OT-8 |
| 119B | Make Right A Register Positive | OT-8 |

The commands 122 and 126 cause the Left and Right B Registers to be cleared at OT–6 time so that the contents of the accumulator registers can be transferred to the B Registers by commands 115A and 115B which occur at OT–8 time. In this way the original contents of the accumulators can be retained for future reference by the program. At OT–8 time the commands 119A and 119B are generated in order that the contents of the A Registers will be complemented if those numbers are negative numbers. The normal commands of the Subtract instruction are also generated during the Difference Magnitude instruction and therefore at the completion of this instruction the original contents of the accumulator registers are stored in the B Registers and the accumulators at the completion of the command contain the difference in the magnitude of the numbers originally in the accumulators and the numbers read from memory at the address specified by the address part of the Difference Magnitude instruction.

*Twin and Multiply instruction* (*TMU*).—As stated previously it is oftentimes desirable to be able to multiply each of two factors by a third factor. In accordance with another principle of this invention this operation may be performed in a minimum of time. The commands generated during the Twin and Multiply instruction as indicated in FIG. 11*l* differ from the commands generated during the Multiply instruction as indicated in FIG. 11*k* in that the command 116 (Left Memory Buffer Register to the Right A Register) is generated at OT–7 time instead of the command 105 (Right Memory Buffer to the Right A Register). It will therefore be seen that the normal Multiply instruction is performed during the Twin and Multiply instruction; however, during the Twin and Multiply instruction the third factor which is obtained from memory at the address specified by the address part of the Twin and Multiply instruction is multiplied by the first factor in the Left B Register and the second factor which is in the Right B Register. A more detailed description of the operation during Multiply will be found in the above mentioned copending applications "H" and "D."

*Right Add One instruction* (*AOR*).—It is oftentimes desirable in the operation of computing equipment to add one to the contents of a selected memory register. This particular instruction about to be described causes a binary One to be added to the least significant digit of the right half-word which is stored in the memory register specified by the address part of the Right Add One instruction. The commands generated during the Right Add One instruction, as indicated in FIG. 11*s*, differ from the commands generated during the Right Store instruction as indicated in FIG. 11*q* in that the following commands are generated at the times indicated:

TABLE D

| Command number | Name | Time |
|---|---|---|
| 121 | Clear Right Accumulator Register | OTA-6 |
| 105 | Right Memory Buffer Register to Right A Register. | OTA-7 |
| 129 | Parity Count | OTA-7 |
| 100 | Right Carry One | OTA-8 |
| 128 | Right Division Shift Left | OTA-11 |
| 104 | Right End Carry After Add One | OTB-1 |

As described more fully in the above referred to copending application "D," in the Right Store instruction the contents of the Right Accumulator is stored in the right half of the memory register specified by the address part of the instruction. During the Right Add One instruction that same operation is performed; however, the right accumulator contents which are stored in memory at the end of the instruction is the number stored in the memory address register specified by the address part of the instruction increased by a binary One in the least significant digit. In order to effect increasing the lowest order digit of the number in the memory register specified by the address part of the instruction, the accumulator register is cleared by the command 121 at OTA–6 time, the right half-word which is in the Right Memory Buffer Register is transferred (command 105) to the Right A Register which is cleared before the transfer by command 99. That number in the A Register is increased by One in the low order digit and the sum placed in the accumulator by the command 100 (Right Carry One) which of course must be followed by the commands 128 and 104 to account for a possible End Carry and to correct for the inherent right shift during the Add operation.

*Exchange instruction* (*ECH*).—It is oftentimes desirable in the operation of a data processing machine to be able to interchange the contents of an accumulator register and the contents of a specified memory register. The Exchange instruction is provided in the computer system above described in order to effect that operation. The commands generated during the Exchange instruction, as indicated in FIG. 11*t*, differ from the commands generated during the Add One instruction, which are indicated in FIG. 11*s* in that during the Exchange instruction the commands 121, 100 and 104 are not generated as they are in the Add One instruction and furthermore the commands 120 and 121 are generated at OTB–6 time and the commands 110A and 110B are generated at OBT–10 time during the Exchange instruction and those commands are not generated during the Add One instruction. Since the commands 121, 100, 128 and 104 are not generated, the right half-word stored in the memory register specified by the address part of this instruction does not have a One added to it and the sum placed in the accumulator; however, since the commands 120 and 121 are generated at OTB–6 time the accumulators are cleared, their contents having been previously transferred to the memory buffer register by the commands 102 and 103 which occur at OTB–2 time. Previous to this time however, the contents of the memory buffer registers were transferred to their respective A Registers by the commands 105 and 75. At OTB–10 time the commands 110A and 110B cause the half-words in the A Registers to be added into the accumulator registers which were previously cleared. These commands are followed by the commands 127 and 128 (Division Shift Left) in order to correct for the inherent shift.

DETAILED DESCRIPTION OF COMPONENTS

A detailed description of examples of circuits suitable for use as the following components will be found in the identified copending applications:

TABLE 25

| Component | Copending application | |
|---|---|---|
| | Reference number | Figures |
| Range, Theta and Identity Section 9 (Fig. 3*e*) | B | 10. |
| Time Tag Section 10 (Fig. 3*e*) | B | 15. |
| OD Drum Write Element 27 (Fig. 3*e*) | G | 12 and 13. |
| OD Write Status Control Section 26 (Fig. 3*e*) | G | 5. |
| Drum and Drum Head Assembly | A | 3 through 7. |
| CD Read Section 31 (Fig. 3*f*) | A | 14. |
| OD Read Section 303 (Fig. 3*e*) | A | 14. |
| Write Register 166 (Fig. 3*f*) | A | 12. |
| CD Write Section 253 (Fig. 3*f*) | A | 12. |
| Memory Element 34 (Figs. 3*a* and 3*b*) | D | 23 through 36. |
| Operation Register 47 (Fig. 3*a*) | D | 39. |
| Program Counter 150 (Fig. 3*b*) | D | 41. |
| Address Register 155 (Fig. 3*b*) | D | 42. |
| Left or Right Arithmetic Elements (Figs. 3*a*, 3*b*). | H | 1 through 20. |
| Drum Word Register (Fig. 3*e*) | C | 20*a* and 20*b*. |
| Parity Generator and Delay 307 (Fig. 3*e*) | C | Do. |
| 13 Stage Registers 567 and 568 (Fig. 3*c*) | C | 24. |
| 13 Counter and 25 Counter (Fig. 13*b*) | J | 2. |

*Read status control circuits*

Reference is now made to FIG. 24 which shows, in logical block form, the CD Read Status Control Section shown as block 30 in FIG. 3*f*. The signals induced in the read head 25 (FIG. 3*f*), which are the CD Status Channel signals, are delivered through a Read Circuit 620 to the conditioning input of a gate 621. Gate 621 is is sampled by CD–1 pulses and will therefore produce a pulse on its output conductor when a binray One signal is received from the CD Status Channel and will not deliver a pulse on its output conductor when a binary Zero signal is received from the CD Status Channel. Pulses passed by gate 621 are delivered to the sample input of a gate 622 and a gate 623. Gate 622 has its conditioning input energized by signals on the conductor labeled Read (output of Read Control Section 178 of FIG. 3*f*), whereas gate 623 has its conditioning input energized by signals on the conductor labeled Read through an inverter 624. When a positive D.C. level is applied to the conductor labeled Read, gate 622 will be conditioned whereas, when a negative D.C. level is applied to that conductor gate 623 will be conditioned.

A pulse passed by gate 622 causes the read circuits 33 (FIG. 3*f*) to be sampled thereby delivering the word, stored in the register of the drum indicated as being full by a One in the CD Status Channel, to the IO Buffer Registers. A flip-flop 625 is set to its Zero state by CD–4 pulses and set in its One state by pulses on the conductor 186 (no compare) which are passed by a gate 626, when conditioned, through an OR circuit 627. Flip-flop 625 is also set in its One state by pulses passed by gate 623 through OR circuit 627. Flip-flop 625 has its One and Zero outputs applied to the conditioning input of a Drum Writer 628 which is sampled by pulses on the conductor labeled Status Write Sample. The output of Drum Writer 628 is delivered to the write head 23 (FIG. 3*f*) to record signals in the OD Status Channel.

When the CD Read Status Control circuit is instructed to read (a positive potential is received on the conductor labeled Read) each binary One signal (indicating a full register is passing beneath the read heads of the drum) causes a pulse to be delivered to the conductor labeled Read Sample at substantially OD–1 time. Flip-flop 625 is set to its Zero state at every CD–4 time to condition the Drum Writer 628 to write a Zero when sampled by the Status Write Sample pulse which begins at CD–3 time and stops at substantially CD–3+1.7 μsec. When a positive potential is received on the conductor labeled Read, inverter 624 prevents gate 623 from being conditioned and therefore the Drum Writer 628 will cause a binary Zero to be written on the OD Status Channel for indicating that each drum register which passes under the Read Heads is empty unless a no compare pulse is received on conductor 186 for a given rigister. A pulse on conductor 186 must arrive at the CD Read Status Control Section a predetermined time before CD–3 time. This predetermined time is sufficient to permit the no compare pulse to cause the Drum Writer 628 to be conditioned to generate a "Write a One" signal before it is sampled by the Status Write Sample pulse.

When the CD Read Status Control Section is not instructed to Read (a negative potential is received on the conductor labeled Read) gate 623 passes pulses received from gate 621 and therefore when a binary One signal is read in the CD Status Channel a binary One is recorded in the OD Status Channel and when a binary Zero is read in the CD Status Channel a binary Zero is recorded in the OD Status Channel.

The circuit shown in FIG. 24 may also be employed as the OD Read Status Control Section 253 (FIG. 3*e*).

*Read control circuit*

Reference is now made to FIG. 25 which is a logical block diagram of the Read Control Circuit shown as block 178 in FIG. 3*f*. A pulse on the conductor 177 (Start Read) causes a flip-flop 650 to be set in its One state. Flip-flop 650 is cleared to its Zero state by pulses on the conductor labeled Read-Write reset which also causes a flip-flop 651 to be cleared to its Zero state and a disconnect counter 652 to be cleared. When the flip-flop 650 is in its One state, it delivers a positive D.C. potential to the conductor 179 (Read Drum FF ON) and flip-flop 650 also conditions one leg of a two-input AND circuit 653, the other input of which is conditioned by a positive D.C. level on the conductor 180 (Sync flop-flop ON). The output of AND circuit 653 therefore becomes positive when a start read pulse has been received and the drum head diode switches have had time to complete the switching operation (Sync FF ON). A positive output from AND circuit 653 is delivered by way of the conductor labeled Read to the CD Read Status Control Section 30 (FIG. 3*f*). The output of AND circuit 653 is also delivered to a three-input AND circuit 654 which receives a positive potential on conductor 160*c* (Select input drum) from Decoder 160B (FIG. 3*f*) when the input drum has been selected to read and also receives a positive potential from a flip-flop 655 when in the One state. Flip-flop 655 is set in its One state by CD Index pulses and complemented by CD–3 pulses. Flip-flop 655, when in the One state, also conditions a gate 656 which is sampled by Read Sample pulses. Gate 656 therefore passes a pulse to conductor 182 (compare) when the drum has ben instructed to read and the first register of a two register slot is being sensed by the Drum Read Heads 31*a* (FIG. 3*f*). The output of AND circuit 654, when positive, conditions a gate 657 which is sampled by CD–1 pulses. Gate 657 will therefore pass a pulse to set a flip-flop 658 in the One state the first time that the register of a two register slot passes beneath the Drum Read Heads 31*a* (FIG. 3*f*) following the time that a positive D.C. level is established on the conductor labeled Read. Flip-flop 658, when in the One state, conditions a gate 659 which is sampled by CD–4 pulses. Pulses passed by gate 659 cause stepping of the disconnect counter 652 which will produce a pulse on its output conductor 202 (Read Disconnect) when 2048 pulses have been received at its input (the drum has made a complete revolution).

*CD write control circuit*

Reference is made to FIG. 26 which is a logical block diagram of the CD Write Control Circuit shown as block 161 in FIG. 3*f*. During the Select Drums instruction the CD Write Control Circuit receives a pulse on the conductor 93 (Deselect) and a positive D.C. level on the conductor labeled Select OB Odd or the conductor labeled Select OB Even if the output drum is selected. The pulse on conductor 93 (Deselect) causes a Write Register Status flip-flop 670, a Sync flip-flop 671, and a Write Drum flip-flop 672 to be cleared and through an OR circuit 673 the deselect pulse is delivered to the conductor 163 (Read-Write Reset). The deselect pulse on conductor 93 is also delivered to a Single Shot 674 where in response to this pulse a negative D.C. level is applied to its output conductor for a period of time sufficient to permit drum head switching as above described. A positive D.C. level on the conductor labeled Select OB Odd conditions one input of a two input AND circuit whereas a positive D.C. level on the conductor labeled Select OB Even conditions one input of a two-input AND circuit 676. A positive D.C. level on either the conductor Select OB Odd or the conductor Select OB Even is delivered through an OR circuit 677 to condition one input of a two-input AND circuit 678.

A pulse received on the conductor 212 (Start Write) causes a Disconnect flip-flop 679 to be cleared and also causes the Write Drum flip-flop 672 to be set in its One state. When flip-flop 672 is in the One state it conditions one input of a two-input AND circuit 680, the other input of which is the One output of flip-flop 671. When flip-flop 672 is in the One state it also conditions one input of a three-input AND circuit 681 which receives as its other inputs the output of single shot 674 and the One output of the Write Register Status flip-flop 670. AND circuit 681 will therefore condition a gate 682, through an OR circuit 683, to pass a CD–4 pulse when the command 212 (Start Write) has been received, the single shot 674 has permitted the drum head switching operation to take place and the Write Register is full. A pulse passed by gate 682 causes the flip-flop 671 to be set in its One state thereby delivering a positive D.C. level to the conductor 180 (Sync FF ON) and also conditioning one of the inputs of AND circuit 680.

When the Selection and IO Control Element 49 (FIG. 3*g*) has caused a word to be transferred from Memory to the Write Register 166 (FIG. 3*f*) it delivers a pulse to the conductor 219*c* (IO Reg. to Write Reg.). This pulse on conductor 219*c* causes flip-flop 670 to be set in its One state. A positive D.C. level from the output of AND circuit 680 conditions one of the inputs of a two-input AND circuit 684 as well as one of the inputs of AND circuit 678. AND circuit 684 has its other input conditioned when AND circuit 675 or AND circuit 676 delivers a positive potential through an OR circuit 685.

AND circuit 675 has as one of its inputs the One output of a flip-flop 686 whereas AND circuit 676 has as one of its inputs the One output of that flip-flop. Flip-flop 686 is cleared to its Zero state by CD index pulses and is complemented by CD–4 pulses. In this way flip-flop 686 will be in its Zero state during the time that all even numbered registers (0, 2, 4, etc.) are under the drum write heads and will be in its One state during the time that all odd numbered registers (1, 3, 5, etc.) are under the drum write heads.

AND circuit 684 will therefore deliver a positive D.C. level to conductor 215 (write) under the following conditions:

After the Start Write command (212) has been received and the drum head switching operation has been completed (single shot 674 causes its output to return to a positive potential) a positive potential will be delivered each time that the Write register is full and either (*a*) the drum is selected to write Odd and an odd number register is under the drum write heads, or (*b*) the drum is selected to write Even and an even number register is under the drum write heads.

The output of AND circuit 678, when positive, causes a gate 690 to be conditioned to pass CD Index pulses. The first pulse passed by gate 690 sets flip-flop 679 in its One state to thereby condition a gate 691. The second CD Index pulse passed by gate 690 will be passed by gate 691 to the conductor 256 (OB disconnect) and also through OR circuit 673 causes the various control flip-flops to be cleared.

During drum reading operations a positive potential is received on conductor 179 (Read Drum FF ON) from the CD Read Control circuit (FIG. 3*f*). This positive D.C. level conditions one input of a two-input AND circuit, the other input of which is conditioned after the drum head switching operation is complete (single shot 674 causes its output to return to a positive level). When the output of AND circuit 692 is positive, through OR circuit 683, it causes the Sync flip-flop 671 to be turned on in the manner previously described.

*CD write status control section*

Reference is now made to FIG. 27 which is a logical block diagram of the CD Write Status Control Section shown as block 216 in FIG. 3*f*.

The Read head 250, which responds to signals recorded in the CD Status Channel causes a gate 700 to be conditioned at CD–1 time through a Read circuit 701 when a binary One is sensed. Since gate 700 is sampled by CD–1 pulses it passes a pulse to cause a flip-flop 703 to be set in its One state when a binary One (indicating that the register about to come under the write heads of the output drum is full) is sensed by read head 250. When flip-flop 703 is in the One state it conditions a gate 704 through an OR circuit 705. Gate 704 is sampled by CD–2 pulses and therefore if the read head 250 senses a binary One a flip-flop 707 is set in its One state shortly after CD–2 time. When flip-flop 707 is in the One state it conditions a Drum Writer 708 to deliver a "Write a One" signal to the write head 251 when sampled by a pulse on the conductor labeled Status Write Sample which is a pulse approximately 1.7$\mu$ sec. in duration beginning at CD–3 time. In this manner, a binary One signal sensed by read head 250 causes a binary One to be written in the OD Status Channel by the write head 251. Flip-flops 703 and 707 are cleared to their Zero state by CD–4 pulses.

When a binary Zero (indicating that the register about to come under the drum write heads is empty) is sensed by read head 250, gate 700 does not pass the CD–1 pulse and therefore flip-flop 703 remains in its Zero state. When flip-flop 703 is in its Zero state it conditions one input of an AND circuit 709. The other input of AND circuit 709 is the conductor 215 which is made positive under the conditions stated with reference to the description of the CD Write Control Circuit.

AND circuit 709 has its output connected to the conditioning input of a gate 710 so that when that gate is conditioned it delivers a CD–3 pulse to conductor 252. A pulse on conductor 252 causes the write circuits to be sampled and this pulse is also delivered through a suitable delay circuit 711 to the conductor 254 (Clear write register).

When the output of AND circuit 709 causes gate 710 to be conditioned it also, through OR circuit 705, causes gate 704 to be conditioned. In this manner a binary One is written by write head 251 in the OD Status Channel when the contents of the write register are written on the drum.

It will be recalled that one of the conditions under which a positive potential is established on conductor 215 is that the write register is full. The Selection and IO Control Circuits are so constructed that the write register status is made "full" between CD–1 and CD–2 time so that if the word in the write register is to be written on the drum, a CD–2 pulse will be passed by gate 704 and a binary One will be written in the OD Status Channel.

IO *buffer registers*

Reference is made to FIG. 28 which is a logical block diagram of the Left IO Buffer Register shown as block 164 in FIG. 3*h*. As previously mentioned, the Selection and IO Control Element 49 (FIG. 3*g*) delivers a pulse to conductor 162 (Clear IO Buffer Registers) before a reading operation from the drum or the Burst Counters begins. The pulse is delivered through an OR circuit 750 to the Clear input of each of the flip-flops of the Left IO Buffer Register. Only flip-flops 751 through 753 (associated with the Parity, Left Sign, and Left 15 bits respectively) have been shown in FIG. 28, it being understood that in the preferred embodiment a flip-flop is provided for each bit of the word to be stored. Signals representative of the left half-word read from the drum are received by way of the conductors of cable 32 and delivered through OR circuits 754 through 756 to the set input of flip-flops 751 through 753. Signals representative of the burst counter and elapsed time counter contents are received by way of the conductors of cable 757 and delivered through OR circuits 754 through 756 to the set input of flips-flops 751 through 753.

When the Selection and IO Control Element delivers a pulse to conductor 187 (Left IO Buffer Register to Left IO Register) the pulse samples each of gates 758 through 760 and also through OR circuit 750 causes flip-flops 751 through 753 to be cleared. Gates 758 through 760 have their conditioning input connected to the One output of flip-flops 751 through 753 respectively, through cathode followers 761 through 763 respectively. In this way signals received from the drum or the burst counter and elapsed time counter are temporarily stored and in response to a pulse on conductor 187, the stored signals are delivered by way of the conductors of cable 189 to the Left IO Register 170 (FIG. 3*g*).

Reference is now made to FIG. 29 which is a logical block diagram of the Right IO Buffer Register shown as block 165 in FIG. 3*h*. The Right IO Buffer Register is similar to the Left IO Buffer Register and differs therefrom in the following respects:

(1) It receives signals representative of the right-half word read from the drum by way of the conductors of cable 33.

(2) It receives only 16 bits, Right sign through Right 15 (parity of a drum word being considered as a part of the Left half-word).

(3) D.C. levels from the One and Zero outputs of flip-flops 770 through 722 (Right sign, Right 1 and Right 15 bits respectively) are delivered through cathode followers 773 through 778 and by way of the conductors of cable 184 to the drum control Register 167 (FIG. 3*h*).

(4) In response to the command 187 (IO Buffer Registers to IO Registers) gates 779 through 781 are sampled to deliver signals stored in the register to the conductors of cable 190.

IO *registers*

Reference is now made to FIG. 30 which is a logical block diagram of the Left IO Register which is shown as block 170 in FIG. 3*g*. As mentioned previously, a pulse is delivered to the conductor 81A (Clear the Left IO Register) at PT–2 time of each Read or Write instruction. A pulse on conductor 81A is delivered through an OR circuit 800 to cause each of flip-flops 801 through 804 to be cleared. Signals delivered from the Left IO Buffer Register 164 (FIG. 3*h*) by way of the conductors of cable 189 are delivered through OR circuits 805 through 808 to the set input of flip-flops 801 through 804 for storage therein. Signals delivered from the Left Memory Buffer Register 43 (FIG. 3*a*) by way of the conductors of cable 43A are delivered through OR circuits 805 through 808 to the set input of flip-flops 801 through 804.

A pulse received on conductor 196C (Left IO Register to Left Memory Buffer Register) causes each of gates 809 through 812 to be sampled and also is delivered through OR circuit 800 to clear the Left IO Register. In this way the signals stored in the register are delivered by way of the conductors of cable 200 to the Left Memory Buffer Register 43 (FIG. 3*a*). A pulse received on conductor 219B causes each of gates 813 through 816 to be sampled and is also delivered through OR circuit 800 to clear the Left IO Register. In this way the signals stored in the register are delivered by way of the conductors of cable 170A to the Write register 170 (FIG. 3*f*). Although only flip-flops 801 through 804 for storage of the parity, left sign, left 1 and left 15 bits are illustrated in FIG. 30 it will be understood that flip-flops for storage of the remaining bits of the left half-word are provided in the preferred embodiment.

The Right IO Register 171 (FIG. 3*h*) may be substantially identical to the Left IO Register as shown in FIG. 30, but differs in that the number of stages of the register need only be sufficient to store the 16 bits of the right half-words.

IO *address counter*

Reference is now made to FIG. 31 which is a logical block diagram of the IO Address Counter shown as block 158 in FIG. 3*h*. A pulse on conductor 84 (Clear IO Address Counter) causes each of flip-flops 820 through 823 to be cleared. Although FIG. 31 shows only the least significant and three highest orders of the IO Address Counter, the construction and operation of the remaining orders will be obvious from the following description. As mentioned previously, the Memory Element 34 (FIGS. 3*a* and 3*b*) in the preferred embodiment provides for storage of 33 bit words in a selected one of 4096 registers whose addresses can be specified by 12 binary orders. It will be understood, however, that the number of addresses in a memory element as well as the number of memory elements is a matter of choice and in the preferred embodiment, all registers used for addressing memory were provided with 16 stages in order to permit expansion of the number of memory registers.

Signals received on the conductors of cable 173 from the Address Register 155 (FIG. 3*b*) are stored in the various flip-flops of the IO Address Counter. A pulse received on conductor 196A (Add 1 to IO Address Counter) causes a gate 824 to be sampled and also causes flip-flop 820 to be complemented. Gate 824 is conditioned by the One output of flip-flop 820 and will therefore pass the pulse to the input of the next higher order stage of the counter when flip-flop 820 is in the One state. The remaining orders of the counter operate in a like binary counting fashion so that each pulse received on conductor 196A causes the number stored in the register of the counter to be increased by one.

A pulse received on conductor 195B (IO Address Counter to Memory Address Register) causes each of gate 825 through 828 to be sampled. Gates 825 through 828 are conditioned by the One output of flip-flops 820 through 823, respectively, and therefore a pulse received on conductor 195B causes signals representative of the number stored in the IO Address Counter to be delivered to the conductors of cable 158A.

*IO word counter*

Reference is now made to FIG. 32 which is a logical block diagram of the IO Word Counter which is shown as block 169 in FIG. 3*h*. A pulse on conductor 89A (Clear IO Word Counter) causes each of flip-flops 850 through 853 to be cleared. Signals received by way of the conductors of cable 173 from the Address Register 155 (FIG. 3*b*) are delivered to the set inputs of flip-flops 850 through 853. A pulse on conductor 82 (Sense IO Word Counter) or conductor 176 (Add 1 to IO Word Counter) is delivered through an OR circuit 854 to sample a gate 855 and to complement flip-flop 850. Gate 855 is conditioned by the One output of flip-flop 850 and will therefore pass the pulse from OR circuit 854, when flip-flop 850 is in the One state, to the input of the next higher order stage of the counter. In this way the various stages of the counter operate in binary counting fashion to cause the number stored in the counter register to be increased by one in response to a pulse passed by OR circuit 854. When all flip-flops of the counter are in their One state, a pulse passed by OR circuit 854 will cause a pulse to be delivered to conductor 175 (IO Word Counter End Carry).

A pulse received on conductor 90 (IO Word Counter to Right Accumulator) causes each of gates 856 through 859 to be sensed. Gates 856 through 859 are conditioned by the One outputs of flip-flops 850 through 853 and therefore in response to a pulse on conductor 90, signals are delivered to the conductors of cable 210 which are representative of the number stored in the register of the counter.

*Drum control register*

Reference is now made to FIG. 33 which is a logical block diagram of the Drum Control Register which is shown as block 167 in FIG. 3*h*. A pulse on conductor 94 (Clear Drum Control Register) causes each of flip-flops 870 through 874 to be cleared. Although only five flip-flops, for storing Right sign, Right 1 through Right 3 and Right 15 bits, are shown in FIG. 33 it will be understood that additional flip-flops are provided for storing the rest of the bits of the right half-word. Signals received by way of the conductors of cable 168 from the Address register 155 (FIG. 3*b*) are stored in the flip-flops of the drum control register. The One outputs of flip-flops 871 through 873 are applied as one of the inputs of AND circuits 875 through 877, respectively, and the Zero outputs of those flip-flops are applied as one of the inputs of AND circuits 878 through 880, respectively. AND circuits 875 through 877 receive at their other input, by way of some of the conductors of cable 184, the Zero outputs of those flip-flops of the Right IO Buffer Register which store R1 through R3 bits. AND circuits 878 through 880 receive at their other input, by way of some of the conductors of cable 184, the One outputs of those flip-flops of the Right IO Buffer Register which store R1 through R3 bits. If any one of the R1 through R3 bits stored in the Right IO Buffer Register fails to compare with the corresponding bits stored in the Drum Control Register, a positive D.C. level will be delivered through an OR circuit 881 to the conditioning input of a gate 882. Gate 882 is sampled by pulses on conductor 183 (compare by identity 1 through 3) and will therefore pass a pulse to conductor 185 (no compare) when a comparison does not exist.

In a preferred embodiment, the drum control register is provided with 16 stages (RS and R1 through R15) since that register is so constructed as to perform many operations other than comparing bits R1 through R3. It is not essential to an understanding of this invention what other operations may be performed by the Drum Control Register. For this reason, the various other circuits associated with the Drum Control Register are not illustrated in the FIG. 33.

*Memory buffer registers*

Reference is now made to FIGS. 34 and 35 which are logical block diagrams of the Left Memory Buffer Register and Right Memory Buffer Register which are indicated by blocks 43 and 44, respectively, in FIGS. 3*a* and 3*b*.

In FIG. 34, a pulse received on conductor 60A causes flip-flops 900 through 906 to be cleared. In the interest of simplifying the description of the Left Memory Buffer Register only those stages of the Register for storing bits Parity, Left Sign, Left 1, Left 9 through Left 11 and Left 15 have been shown in the drawing. The construction and operation of the remaining stages will be obvious from the following description.

Pulses received on the conductors of cables 38, 200 or 907 are delivered through OR circuits 908 through 914 to cause flip-flops 900 through 906 to be set in their One state. In this way, signals received from Memory, the Left IO Register or the Left Arithmetic Element may be stored in the Left Memory Buffer Register.

A pulse received on conductor 217A (Left Memory Buffer Register to Left IO Register) causes gates 915 through 921 to be sampled. Those gates are conditioned by their corresponding one of the flip-flops 900 through 906 and pulses passed by those gates are delivered to the conductors of cable 43A. In this way the entire Left Half Word together with the Parity Bit which is stored in the Left Memory Buffer Register may be transferred to the Left IO Register.

A pulse received on conductor 116 (Left Memory Buffer Register to Right A Register) causes gates 922 through 927 to be sampled. Gates 922 through 927 are conditioned by flip-flops 901 through 906, respectively, and pulses passed by those gates are delivered to the conductors of cable 928. In this way bits Left Sign and Left 1 through Left 15 of the Left Half Word stored in the Left Memory Buffer Register may be transferred to the Right Arithmetic Element.

In response to a pulse on conductor 75 (Left Memory Buffer to Left A Register), gates 930 through 935 are sampled. Those gates are conditioned by their corresponding one of flip-flops 901 through 906 and pulses passed by those gates are delivered to the conductors of cable 936. In this way the left half-word stored in the Left Memory Buffer Register may be transferred to the Left A Register.

Pulses received on conductor 67A cause gates 937 through 941 to be sampled. Those gates are conditioned by their corresponding one of flip-flops 852 through 856. Pulses passed by gates 937 and 938 are delivered to the conductors of cable 46, pulses passed by gates 940 and 941 are delivered to the conductors of cable 48, and pulses passed by gate 939 are delivered to one of the conductors of cable 48 and also to one of the conductors of cable 46. In this way a pulse received on conductor 67A causes bits Left 1 through Left 10 of the word stored in the Left Memory Buffer Register to be delivered to the conductors of cable 46 and causes bits Left 10 through Left 15 to be delivered to the conductors of cable 48.

The Zero outputs of flip-flops 901 through 906 are connected to the Memory Element by way of the conductors of cable 41.

In FIG. 35, a pulse received on conductor 60B causes flip-flops 942 through 945 to be cleared. In the interest of simplifying the description of the Right Memory Buffer Register only those stages of the Right Memory Buffer Register for storing bits Right Sign and Right 13 through Right 15 have been shown in the drawings. The construction and operation of the remaining stages will be obvious from the following description.

Pulses received on the conductors of cables 39, 201, 946 and 947 are delivered through OR circuits 948 through 951 to cause flip-flops 942 through 945 to be set in their One state. In this way signals received from Memory, the Right IO Register, the Right Arithmetic Element or from the Clock Register may be stored in the Right Memory Buffer Register.

A pulse received on conductor 105 causes gates 952 through 955 to be sampled. Those gates are conditioned by their corresponding one of flip-flops 942 through 945 and deliver their outputs to the conductors of cable 956. In this way the signals stored in the Right Memory Buffer Register may be delivered to the Right Arithmetic Element.

A pulse received on conductor 67B causes gates 957 through 960 to be sampled. Those gates are conditioned by their corresponding one of flip-flops 942 through 945 and deliver their outputs to the conductors of cable 156. In this way the signals stored in the Right Memory Buffer Register may be transferred to the Address Register.

A pulse received on conductor 217B causes gates 961 through 964 to be sampled. Those gates are conditioned by their corresponding one of flip-flops 942 through 945 and deliver their outputs to the conductors of cable 44A. In this way the signals stored in the Right Memory Buffer Register may be transferred to the Right IO Register.

Flip-flops 942 to 945 have their Zero outputs delivered to the Memory Element by way of the conductors of cable 42.

*Parity count and parity check.*—It is desirable that a parity check be made at certain times on the word stored in the Left and Right Memory Buffer Registers. It is also desirable at times that a parity writing operation be performed on the word stored in those registers.

A parity check operation is one in which a count is made of the number of binary Ones in the word and a signal is produced if the count does not correspond to a predetermined value. More specifically, if a word stored in those registers has an odd number of binary Ones, then the parity bit of the word is a Zero whereas if it has an even number of binary Ones, then the parity bit is a One. The word and its parity bit are inspected and if there is an even number of binary Ones in the word and its parity bit, then an alarm signal is generated.

A parity writing operation is one in which the word stored in the Memory Buffer Register has no effective parity bit yet assigned and the effect of the operation is to assign the proper parity to the word. More specifically, the word stored in the register is examined and if there is an even number of binary Ones in the word the parity stage flip-flop is set in its One state whereas if the word has an odd number of binary Ones then the parity stage flip-flop is left in its Zero state.

Referring now to FIG. 35, a pulse received from conductor 129 (Parity Count from Instruction Control) or a pulse received from conductor 941A (Parity Count from Selection and IO Control) is delivered through an OR circuit 965 to sample gates 966 and 967. If bit Right 15 of the word stored in the register is a One, gate 966 will pass the pulse to conductor 968 (Odd) whereas if the bit is a Zero, gate 967 will pass the pulse to conductor 969 (Even). A pulse on conductor 968 samples a gate 970 and a gate 971 and will be delivered to conductor 972 (Even) if the bit Right 14 is a One whereas it will be delivered to conductor 973 (Odd) if the bit Right 14 is a Zero. In a like manner a pulse on conductor 969 (Even) will be delivered to a conductor 974 (Odd) if the bit Right 14 is a One whereas it will be delivered to a conductor 975 (Even) if the bit Right 14 is a Zero. The Even conductors 972 and 975 are OR'ed together by OR circuits 976 and 977 whereas the Odd conductors 973 and 974 are OR'ed together by OR circuits 978 and 979. A pulse will therefore be delivered to a conductor 980 or 981 if the number of binary Ones in R14 and R15 bits is an Odd number whereas a pulse will be delivered to a conductor 982 or conductor 983 if the number of binary Ones in the R14 and R15 bits is an Even number. The various other stages of the Right Memory Buffer Register are inspected in a like manner and the Odd output of the Right sign stage (conductors 984 and 985) and the Even output (conductors 986 and 987) are connected to the Left 15 bit stage of the Left Memory Buffer Register (FIG. 32). The parity gate circuits of the Left 1 through Left 15 stages of the Left Memory Buffer Register are constructed and operated in the same manner as those described with respect to the Right Memory Buffer Register. The Odd conductors 988, 989 and the Even conductors 990, 991 from the Left 1 stage are OR'ed together by OR circuits 992 and 993, respectively. The output of OR circuit 992 samples a gate 994 whereas the output of OR circuit 993 samples a gate 995.

It will be apparent that if the total number of binary Ones in the stages Left sign through Left 15 and Right sign through Right 15 is an even number a pulse will be produced on conductor 996 (Even) or 997 (Even). If the word stored in the Memory Buffer Registers has a parity bit assigned, then flip-flop 900 as well as flip-flop 998 will have been set in the proper state to indicate the parity bit since when the word is placed in the register, the parity signal is delivered through OR circuit 908 to flip-flop 900 and also delivered through an OR circuit 999 to flip-flop 998. The conductor 996 (Even) and the conductor 997 (Even) are OR'ed together by OR circuits 1200 and 1201 whose outputs sample gates 1202 and 1203, respectively.

A pulse passed by gate 1203 causes flip-flops 998 and 900 to be set in the One state whereas a pulse passed by gate 1202 causes flip-flop 998 to be cleared to its Zero state.

Assuming now that a word has been placed in the Memory Buffer Registers which does not have a parity bit assigned and it is desired that a parity writing operation be performed so that the parity stage of the register will be set to its proper state to indicate the parity of the word. After the word has been transferred into the register, a pulse applied to conductor 129 (Parity Count, Instruction Control) or a pulse is applied to conductor 941A (Parity Count, Selection and IO Control). If the total number of binary Ones in the word is an Even number the pulse will appear on conductor 996 or 997 and will be passed by gate 1203 to cause flip-flops 998 and 900 to be set in their One states. If the total number of binary Ones in the word is an Odd number, flip-flops 900 and 998 will remain in their Zero states. Flip-flop 900 will therefore be in its proper state to indicate the correct parity.

Assuming now that word with all assigned parity bit has been transferred into the register and it is desired to check the word for parity. A pulse is applied to conductor 129 or 941A and if the total number of binary Ones in the word (not including the parity bit) is an even number, the pulse will appear on conductor 996 or 997. If the parity bit assignment was a One (which it should be if the word itself has an even number of binary Ones) the pulse will be passed by gate 1202 and flip-flop 998 will be cleared to its Zero state. The one output of flip-flop 998 conditions a gate 1204 and another gate 1205 which are sampled by pulses on conductors 1206 and 70, respectively. After the parity count command (129 or 941A) has been performed, the parity check command (70 or 1206) is performed and an alarm pulse will be delivered to conductor 1207 or 1208 if the parity assignment did not check with the total number of binary Ones in the word.

*Selection and IO control element*

The Selection and IO Control Element, as its name implies, is a group of logical circuits whose primary function is to select an input or an output device and to control the transfer of information between the selected device and the Memory Element of the computer system. Since those logical circuits are, for the most part, independent in operation they will be described separately according to the operations performed.

Reference is now made to FIGS. 36*a* through 36*d* which when arranged according to FIG. 36, illustrate in logical block form those circuits known as the Selection and IO Control Element.

During the Select drums instruction the following signals are received by the Selection and IO Control Element in the following time order:

TABLE 26

| | Conductor |
|---|---|
| Clear Index Interval Register | 63B. |
| Bits 10–15 of instruction | Conductors of cable 48. |
| Deselect | 93. |
| Select pulse for drums | 88. |

The Clear Index Interval Register command 63B followed by the bits 10–15 of the instruction word cause those bits to be stored in an index interval register 1000. The deselect command 93 causes various flip-flops in the Selection and IO Control Element to be cleared to their Zero state. The particular ones which are cleared by this command will be apparent from an inspection of the drawing. Bits 10–15 of the instruction which are stored in the index interval register are a code which indicates not only the input-output device to be selected but also in the case where a drum is selected to read, what type of reading is to take place. In the event that the index interval code is octal 35, this code being delivered from the index interval register 1000 by way of the conductors of a cable 1001 to a selection decoder 1002, causes the conductor labeled 011, 101 to be made positive. When that conductor is positive a gate 1003 is conditioned.

The command select pulse for drums (88) samples a group of gates 1004 thereby delivering signals in the form of pulses to the conductors of cable 160A and these signals are representative of the index interval part of the Select Drums instruction which is now stored in the index interval register 1000. This command 88 also causes a "drum operate" flip-flop 1005 and a "slot" flip-flop 1006 to each be set in their One state and also the gate 1003 is sampled which, if conditioned, passes the pulse to the set input of a flip-flop 1007.

During the Read instruction the Selection and IO Control Element receives the following commands in the order stated:

TABLE 27

| Command | Conductor |
|---|---|
| Set IO Interlock ON | 80B |
| Sense IO Word Counter | 82 |
| PT–6 on Read | 86 |

The Command Set IO Interlock ON (80B) causes an "IO Buffer Status" flip-flop 1008 to be set in its Zero state, an "IO Register Status" flip-flop 1009 to be set in its Zero state, an "IO Interlock" flip-flop 1010 to be set in its One state and this command is also delivered through an OR circuit 1042 to the conductor 162 (Clear IO Buffer Register).

The command "Sense IO Word Counter" (82) causes a "Sense Word Counter" flip-flop 1015 to be set in its One state. The command "PT–6 on Read" (86) causes flip-flop 1015 to be cleared to its Zero state. Flip-flop 1015 is therefore in its One state for the time period between the command "Sense IO Word Counter" (82) and the command "PT–6 on Read" (86). If during that time period a pulse is received on the conductor 175 (IO Word Counter End Carry) then a gate 1016 (conditioned by the One output of flip-flop 1015) will pass the pulse through an OR circuit 1017 whose output is passed through OR circuits 1153 and 1018 to the conductor 174 (Clear IO Interlock). The pulse passed by OR circuit 1017 also causes the "IO Interlock" flip-flop 1010 to be cleared to its Zero state. The command "PT–6 on Read" (86) samples a gate 1019 which is conditioned by the One output of an "IO Word Counter Status" flip-flop 1020. Flip-flop 1020 is set in the One state by the command "Set IO Interlock ON" (80B) and is cleared by a pulse on conductor 175 (IO Word Counter End Carry). A pulse passed by gate 1019 causes a "Read" flip-flop 1021 to be set in the One state and this flip-flop is cleared to the Zero state by the command "Set IO Interlock ON" (80B). If the IO Word Counter Status flip-flop 1020 is not set to its Zero state between the time period between the commands "Set IO Interlock ON" (80B) and "PT–6 on Read" (86) then the "Read" flip-flop will be set in its One state at the completion of the Read instruction.

The command "PT–6 on Read" (86) also samples another gate 1022 which is conditioned by the output of an AND circuit 1023. AND circuit 1023 receives the One output of the "IO Word Counter Status" flip-flop 1020 and the One output of the "Drum Operate" flip-flop 1005. The "PT–6 on Read" command 86 will therefore be delivered to the conductor 177 (Start Read Drums) if the IO Word Counter Status is not equal to Zero and the "Drum Operate" flip-flop is ON.

Word transfers from drum to memory may take place after the completion of the Select Drums and Read instructions. Each time a word is transferred from the drum to the IO Buffer Registers, a pulse is received on conductor 182 (compare) by the Selection and IO Control Element provided that the word read is the first word of a message. This pulse on conductor 182 causes an "accept" flip-flop 1024 to be set in the One state and this pulse is also delivered through a suitable delay circuit 1025 to sample a gate 1026 which is conditioned by the One output of flip-flop 1007. In the case that the index interval specifies the octal code 35 (011, 101), meaning that the read operation is to compare by identity of bits 1 through 3, then gate 1026 will pass the pulse to conductor 183 (compare by Identity 1–3). This pulse on conductor 183 is delayed by delay circuit 1025 long enough to insure that the flip-flops of the IO Buffer Register have had time to settle after having received the word read from the drum.

Each time that a word is delivered from the drums to the IO Buffer Register a pulse is received by the Selection and IO Control Element on the conductor labeled IO Buffer Loading. This pulse is received if the word read is the first or the second word of the message. This pulse is delivered through a delay circuit 1030 and an OR circuit 1031 to cause a flip-flop 1032 to be set in the One state thereby conditioning a gate 1033 to pass the next received pulse on the conductor labeled 2 mc. and set a flip-flop 1034 in the One state. Flip-flop 1034, when in the One state, conditions a gate 1035 to pass the next received 2 mc. pulse which clears flip-flops 1034 and 1032 and also samples a gate 1036 and another gate 1037. Flip-flops 1032, 1034 and gates 1033 and 1035 form a synchronizing circuit for synchronizing the IO Buffer Loading pulse, which occurs at drum timing, with the computer timing which is controlled by the 2 mc. pulses. Gate 1036 is not conditioned during drum reading operations; however, during a drum operation flip-flop 1005 is in its One state, as above described, conditioning gate 1037 and the synchronized IO Buffer Loading pulse is passed to sample a gate 1038 as well as a gate 1039.

Assuming that the first word being transferred from the drum to the IO Buffer Register is not the first word of a two word message, then the IO Buffer Loading pulse will not be accompanied by a pulse on the conductor 182 (compare). In that case the pulse passed by gate 1037 will be passed by gate 1038 to sample a gate 1040. Gate 1040 is conditioned by the One output of the previously mentioned flip-flop 1006 which is set in its One state during the Select Drums instruction. The pulse will therefore be passed by gate 1040 through an OR circuit 1041 to conductor 186 (no compare). The pulse passed by gate 1038 is also delivered through an OR circuit 1042 to conductor 162 (Clear IO Buffer Register).

If the word being transferred from the drum to the IO Buffer registers is the first word of a two-word message, then the IO Buffer Loading pulse will be accompanied by a pulse on conductor 182 (compare). The IO Buffer Loading pulse is delayed by the previously mentioned delay circuit 1030 for a suitable length of time to permit a comparison of the word with the drum control register. If the comparison is not successful, a pulse will be received on the conductor 185 (no compare) which will be delivered through an OR circuit 1043 to clear the Accept flip-flop 1024 and through the OR circuit 1041 to the conductor 186 (no compare). The delayed and synchronized IO Buffer Loading pulse, which is passed by gate 1037, is passed by gate 1038 when the comparison is not successful and this pulse is delivered through the OR circuit 1042 whose output is delivered to the conductor 162 (clear IO Buffer Register). If the comparison is successful, no pulse will be received on conductor 185 (no compare) and since the "accept" flip-flop 1024 is set in the One state by the pulse on conductor 182 (compare) the pulse passed by gate 1037 is passed by gate 1039 by way of a conductor 1044 (FIGS. 11*d*, 11*c*, 11*a*, 11*b*) and through an OR circuit 1045 to conductor 176 (Add One to IO Word Counter). The pulse passed by gate 1039 (FIG. 11*d*) is also delivered through an OR circuit 1046 to set the "IO Buffer Register Status" flip-flop 1008 to the One state.

The "IO Buffer Register Status" flip-flop 1008, when in the One state (indicating a full condition of the IO Buffer Register), conditions one leg of a two input AND circuit 1047 which has as its other input the Zero output of the "IO Register Status" flip-flop 1009. The output of AND circuit 1047 will therefore condition a gate 1048 when the IO Buffer Register is full and the IO Register is empty. Gate 1048 is sampled by 2 mc. pulses and, when conditioned, passes the first of these pulses to the conductor 187 (IO Buffer Registers to IO Registers and Clear IO Buffer Registers). This first pulse passed by gate 1048 is also delivered through an OR circuit 1049 to the Zero input of flip-flop 1008 and is also delivered through an OR circuit 1150 to the One input of the "IO Register Status" flip-flop 1009. This first pulse passed by gate 1048 is also delivered through an OR circuit 1051 to sample a gate 1052 which is conditioned by the One output of the "IO Word Counter Status" flip-flop 1020. The timing relationship is made such that a pulse which samples gate 1052 is bound to arrive at that gate before the "IO Word Counter Status" flip-flop 1020 can be changed to its One state in response to an "IO Word Counter End Carry" pulse on conductor 80B resulting from the pulse passed by gate 1039. A pulse passed by gate 1052 causes a "break request sync" flip-flop 1053 to be set in the One state to thereby condition a gate 1054 to pass 2 mc. pulses from delay circuit 1055. A pulse passed by gate 1054 causes a "break request" flip-flop 1056 to be set in the One state thereby conditioning a gate 1057. Gate 1057 is sampled by the command pusles "sense break request flip-flop" (192). A pulse passed by gate 1057 causes flip-flop 1053 to be cleared, a flip-flop 1058 to be set in the One state and also delivers the pulse to conductor 194 (Set break flip-flop). The One output of the "break" flip-flop 1058 conditions one leg of a two input AND circuit 1059, the other input of which is the One output of the "read" flip-flop 1021. The output of AND circuit 1059 is delivered by way of a conductor 1060 to the conditioning input of gates 1061, 1062, 1063 and 1064. Gate 1061, which is sampled by TP–1 pulses, delivers its output through an OR circuit 1065 to the Zero input of the "Break Request" flip-flop 1056 so that the next command pulse "Sense break request flip-flop" (192) will cause the "break" flip-flop 1058 to be turned off and also causes a pulse to be delivered to a conductor 1066 (Clear break flip-flop) unless another pulse causes the "Break Request" flip-flop to be turned on again before that time. A pulse passed by gate 1061 is also delivered through an OR circuit 1067 to the conductor 195B (IO Address Counter to Memory Address Register).

A pulse passed by gate 1062 is delivered to conductors 196A (Add One to IO Address Counter), 196B (Clear IO Register Status flip-flop), 196C (Left IO Register to Left Memory Buffer Register and Clear Left IO Register), 196D (Right IO Register to Right Memory Buffer and Clear Right IO Register) and 196E (Inhibit Sample). A pulse passed by gate 1062 is also delivered through an OR circuit 1062A to the conductor 195A (Start Memory).

A pulse passed by gate 1063 during a drum reading operation is ineffective as will be apparent subsequently.

A pulse passed by gate 1064 is delivered through an OR circuit 1070 to sample a gate 1071. The Zero output of the "IO Buffer Status" flip-flop 1008, the Zero output of the "IO Register Status" flip-flop 1009 and the Zero output of the "IO Word Counter Status" flip-flop 1020 are delivered through an AND circuit 1072 and an OR circuit 1073 to the conditioning input of gate 1071.

Gate 1071, which is sampled at BI–11 time, will therefore pass that pulse when the IO Buffer is empty and the word counter status is Zero. A pulse passed by gate 1071 is delivered through OR circuit 1017 to cause the "IO Interlock" flip-flop 1010 to be turned off and this pulse is also delivered by way of conductor 174 to the Instruction Control Element.

The One output of the Drum Operate flip-flop 1005 (FIG. 36*d*) is delivered to an AND circuit 1075 (FIG. 36*c*), the other input of which is the Zero output of the IO Word Counter Status flip-flop 1020. The output of AND circuit 1075 will therefore condition a gate 1076 to pass the next 2 mc. pulse to the conductor 1077 (Disconnect Drum) under the condition that the drum is selected and the IO Word Counter has gone to Zero.

If the drum has made a complete revolution after having been selected, a pulse is received by the Selection and IO Control Element on the conductor 204 (Disconnect). A pulse on conductor 204 sets an IO Interlock Sync flip-flop 1078 in the One state to thereby condition a gate 1079 to pass the next 2 mc. delayed pulse. A pulse passed by gate 1079 is delivered through OR circuit 1153 to turn off the IO Interlock 1010 and is also delivered through OR circuit 1018 to the conductor 174 (Clear IO Interlock).

*Parity check control of words read from drum*

When a word read from the drum is delivered to the Memory Buffer Register it is desirable to effect a parity checking operation on the word before it is placed in the Memory Element. When AND circuit 1059 produces a positive potential on conductor 1060 thereby causing a "Break-In" operation, a gate 1080 and a gate 1081 are conditioned. Gate 1080 is sampled by TP–3 pulses and a pulse passed by gate 1080 is delivered through an OR circuit 1082 to conductor 941A (Parity Count). Gate 1081 is sampled by TP–7 pulses and a pulse passed by gate 1081 samples a gate 1083 as well as a gate 1084. Gates 1083 and 1084 are conditioned by the One and Zero outputs, respectively, of a flip-flop 1085. Flip-flop 1085 is in the Zero state during a drum reading operation since it is cleared to its Zero state by the deselect command 93 of the Select or Select Drums instruction and no pulse will be delivered to its One input during a drum reading operation. A pulse passed by gate 1084 is delivered to conductor 1206 (Parity Check).

As will be recalled with respect to the description of FIGS. 34 and 35, a parity checking operation on a word placed in the Left and Right Memory Buffer Registers can be effected by a Parity Count command followed by a Parity Check command.

*Initiation of drum writing operations*

As described previously, three instructions: Load Address Counter, select Drums and Write, are programmed to effect drum writing operations on the output drum. The operation of the Selection and IO Control Element during the Load Address Counter (ldc) and Select Drums (sdr) instructions has been described and therefore this discussion will deal with the operations within the Selection and IO Control Element during and following the Write instruction.

Figure 36A:
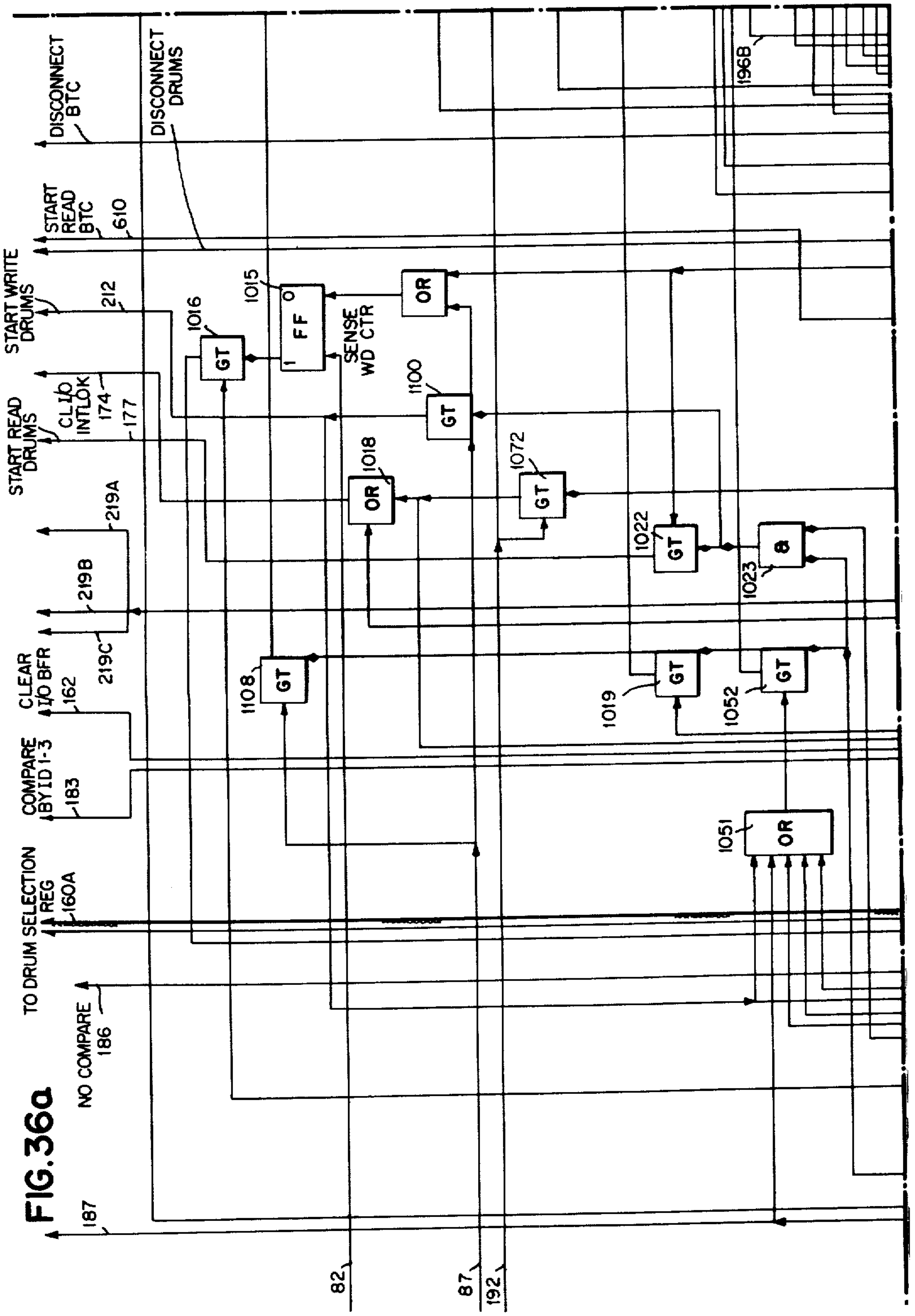

The command 87 (PT–6 on Write) is received by the Selection and IO Control Element where this command samples a gate 1100 (FIGS. 36*a*). Gate 1100 is conditioned by AND circuit 1023 which receives as inputs, the One output of the "IO Word Counter Status" flip-flop 1020 and the One output of the "Drum Operate" flip-flop 1005.

Gate 1100 therefore passes the pulse received from conductor 87 if the drum has been selected and the IO Word Counter is not Zero (the write instruction requested other than Zero words to be written). The pulse passed by gate 1100 is delivered to the conductor 212 (Start Write Drums), sets a "Not Read Drums" flip-flop 1102 (FIG. 36*c*) in the One state, sets a "Write Register Status" flip-flop 1103 (FIG. 36*d*) in the Zero state, sets a "Write Drums" flip-flop 1104 in the One state, sets a "2nd Break Request" flip-flop 1105 in the One state, and is also delivered through OR circuit 1051 (FIG. 36*a*) to sample the gate 1052. A pulse passed by gate 1052 results in the setting of the "Break Request" flip-flop 1056 in the previously described manner. When the "Break Request" flip-flop is in the One state, gate 1057 is conditioned to pass the next received Sense Break Request flip-flop command 192 to the One input of the "Break" flip-flop 1058.

The "Break" flip-flop 1058, when in the One state, conditions one leg of a two-input AND circuit 1106 which has its other input conditioned by the One output of a "Write" flip-flop 1107. Flip-flop 1107 is set in the One state by the output of a gate 1108 which is conditioned when the "IO Word Counter Status" flip-flop is in the One state. Gate 1108 is sampled by the command 87 (PT–6 on Write).

Figure 36B:
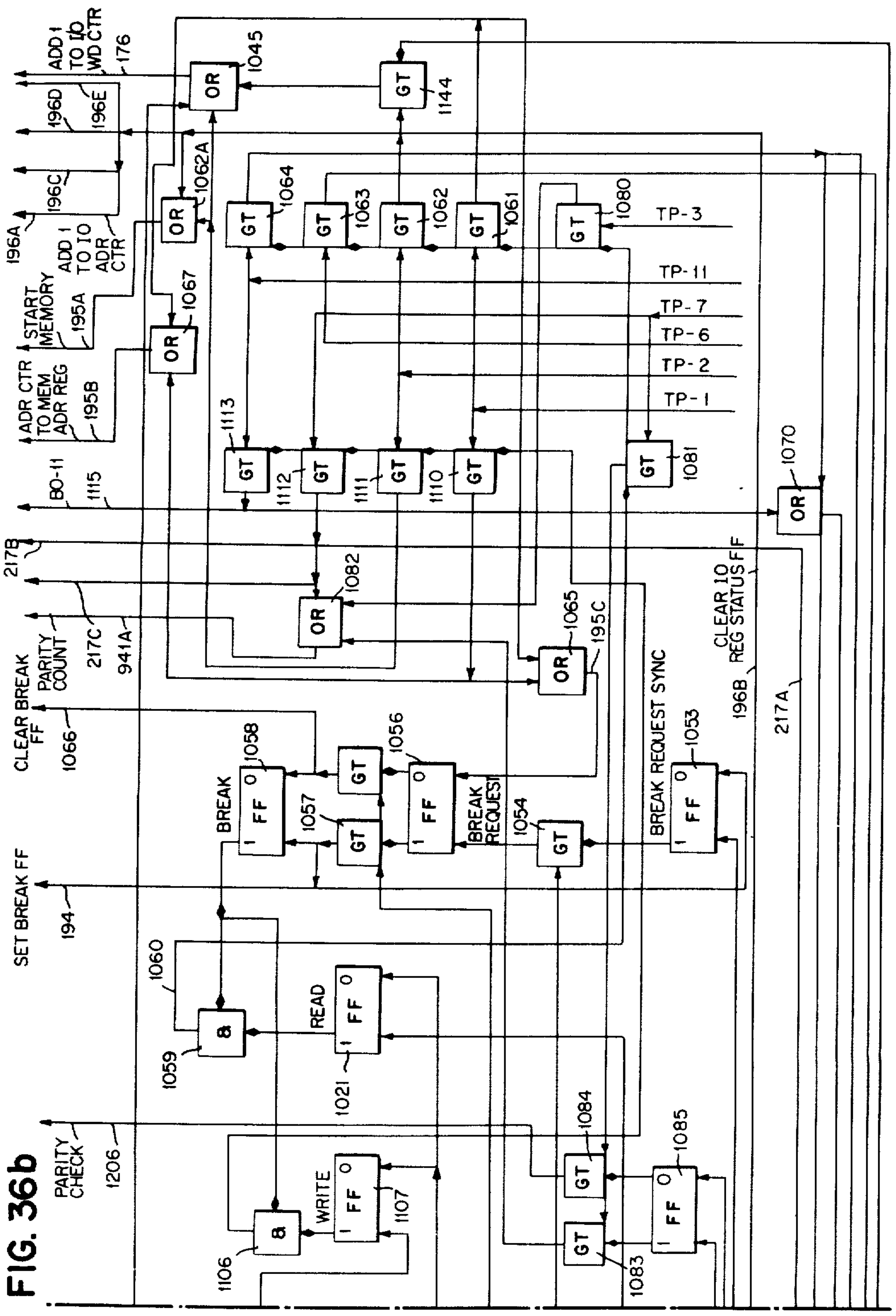
Figure 36C:
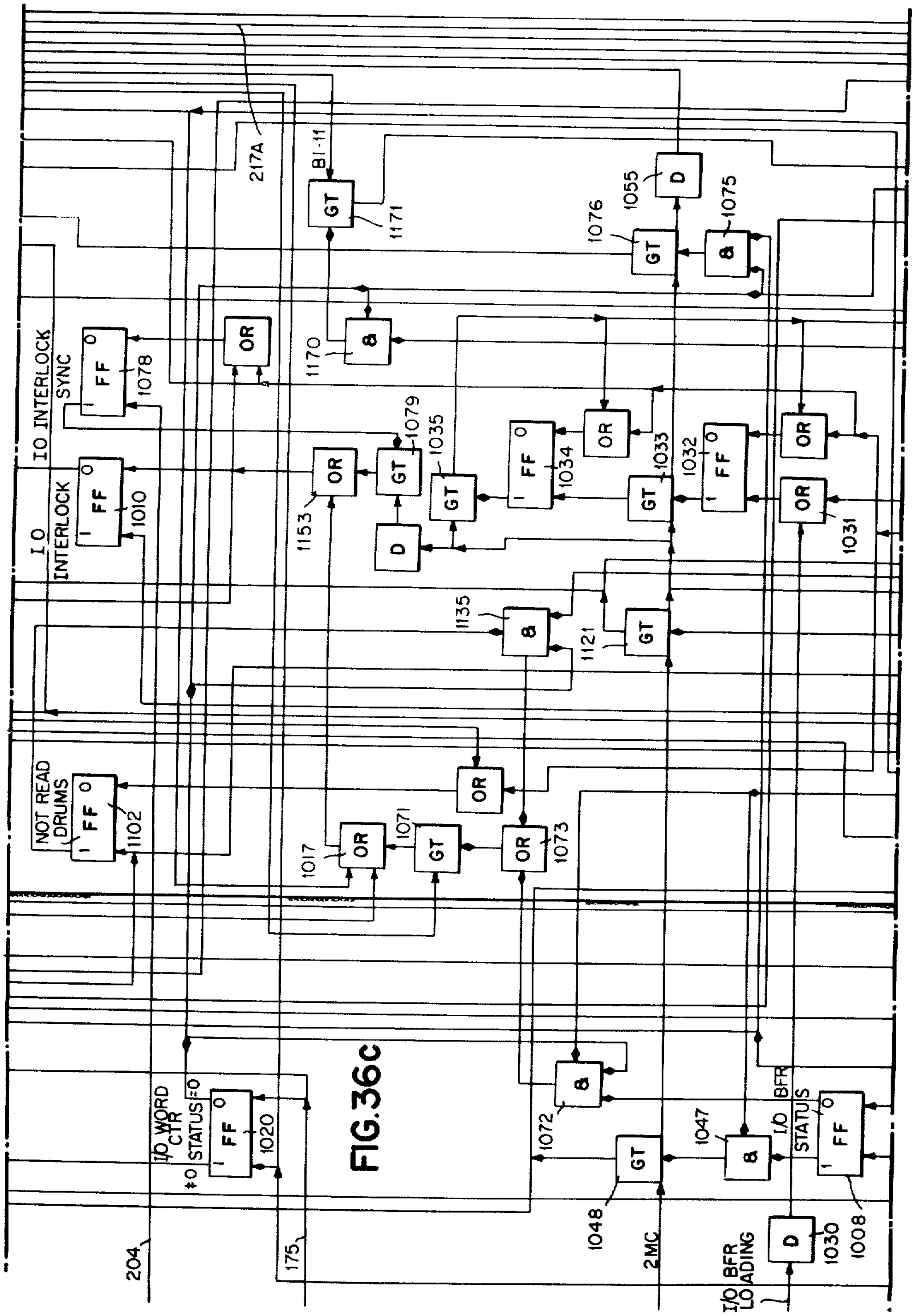
Figure 36D:
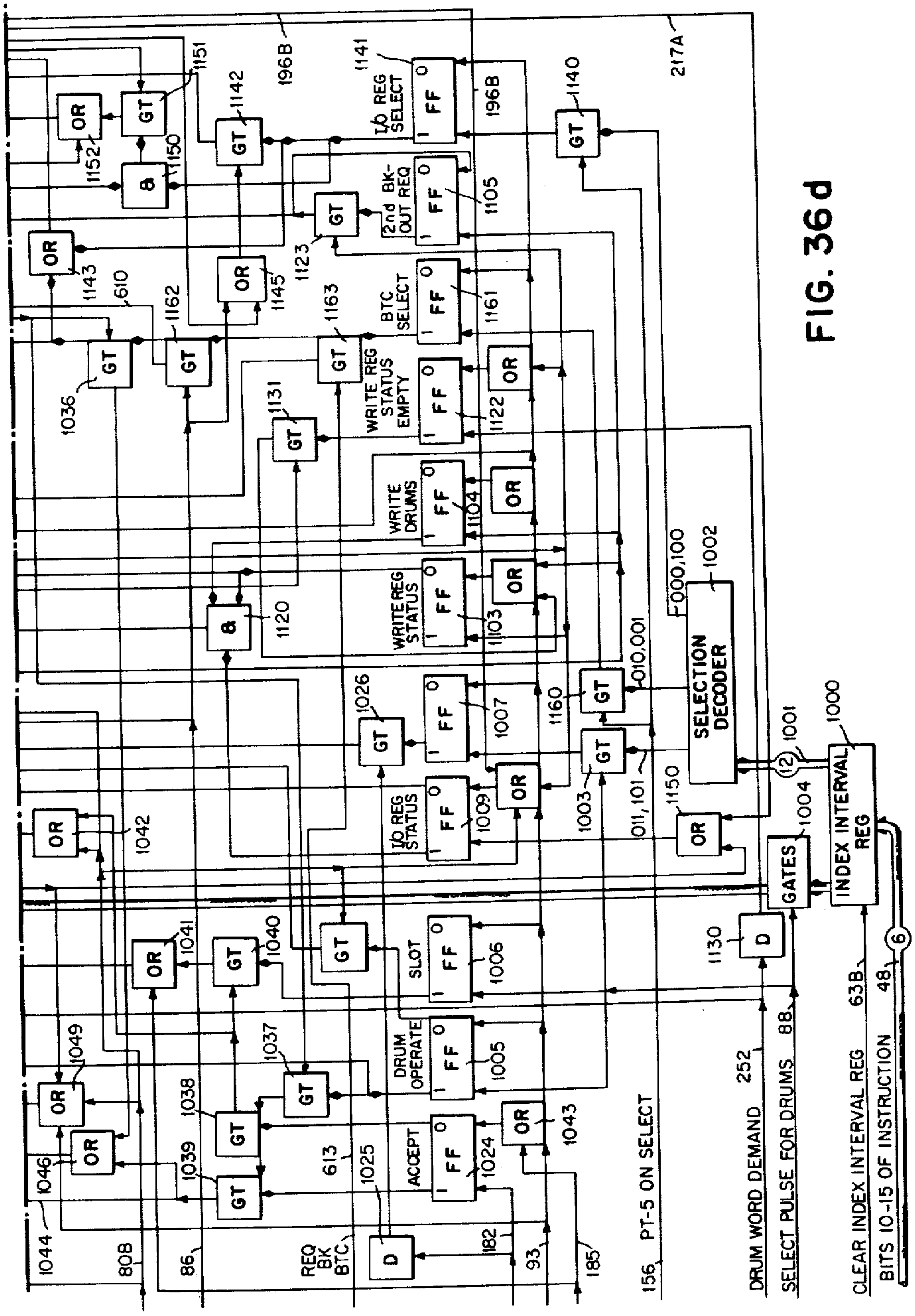

The output of AND circuit 1106, when positive, conditions gates 1110, 1111, 1112 and 1113. Gate 1110 is sample by TP–1 pulses and delivers its output through OR circuit 1067 to conductor 195B (Address Counter to Memory Address Register). A pulse passed by gate 1110 is also delivered through OR circuit 1065 to cause flip-flop 1056 to be cleared to its Zero state so that the next "Sense Break Request" command 192 will cause the Break flip-flop 1058 to return to its Zero state unless in the meantime another Break request is received at the Set input of flip-flop 1053. Gate 1111 is sampled by TP–2 pulses and delivers its output through OR circuit 1045 to conductor 176 (Add One to IO Word Counter). A pulse passed by gate 1111 is also delivered through OR circuit 1062A to the conductor 195A (Start Memory). Gate 1112 is sampled by TP–7 pulses and delivers its output to conductor 217B (Right Memory Buffer Register to Right IO Register) and conductor 217C (Left Memory Buffer Register to Left IO Register). A pulse passed by gate 1112 is also delivered by way of conductor 217A and through OR circuit 1050 to cause the IO Register Status flip-flop 1009 to be set to its One state. A pulse passed by gate 1112 is also delivered through OR circuit 1082 to conductor 941A labeled "Parity Count." Gate 1113 is sampled by TP–11 pulses and delivers its output through OR circuit 1070 to sample gate 1071 (FIG. 36*c*). A pulse passed by gate 1071 causes a pulse to be delivered to the conductor 174 (Clear the IO Interlock) under the conditions and in the manner previously described.

A pulse passed by gate 1113 is also delivered to conductor 1115 labeled BO–11. This pulse on conductor 1115 is delivered to the Left Memory Buffer Register where it inspects the parity alarm gate to generate an alarm if the word read from memory fails to parity check.

As previously mentioned, command 217A (Set IO Register Status flip-flop to Full) is generated at BO–7 time of the "Break-Out" cycle, thereby causing the IO Register Status flip-flop 1009 (FIG. 36*d*) to be set in its One state. When that flip-flop is in the One state, one leg of a three-input AND circuit 1120 is conditioned. The other two conditions on that AND circuit are that (1) the Write Register Status flip-flop 1103 is in its Zero state and (2) the Write Drums flip-flop 1104 is in its One state. The output of AND circuit 1120, when positive, conditions a gate 1121 to pass the next 2 mc. pulse. A pulse passed by gate 1121 is delivered to (1) conductor 219A (Right IO Register to Write Register and Clear Right IO Register), (2) conductor 219B (Left IO Register to Write Register and Clear Left IO Register), (3) conductor 219C (IO Register to Write Register), (4) the Zero input of the IO Register Status flip-flop 1009, (5) the One input of the Write Register Status flip-flop 1103, (6) the Zero input of the Write Register Status Empty flip-flop 1122, and (7) the sample input of a gate 1123 which is conditioned when the 2nd Break Request flip-flop 1105 is in its One state. A pulse passed by gate 1123 is delivered through OR circuit 1051 to sample gate 1052 which is conditioned when the IO Word Counter Status flip-flop 1020 is in the One state. A pulse passed by gate 1052 initiates another "Break-Out" cycle.

From the above description it will be seen that if the Drum writing operation instructions specify more than one word to be written on the drum, the Selection and IO Control Element causes the first word to be delivered from Memory to the Write Register and the second word to be delivered from Memory to the IO Register.

When the Drum Control circuits have caused the first word to be written on the drum the Selection and IO Control Element receives a pulse on conductor 252

(Drum Word Demand). A pulse on conductor 252 is delayed by a delay circuit 1130 and is then delivered to the One input of the Write Register Status Empty flip-flop 1122 to thereby cause a gate 1131 to be conditioned. When gate 1131 is conditioned it passes the next received 2 mc. pulse to the Zero input of the Write Register Status flip-flop 1103. Since flip-flop 1103 as well as flip-flops 1104 and 1009 now cause AND circuit 1120 to condition gate 121, that gate will pass the next 2 mc. pulse. As previously described, a pulse passed by gate 1121 causes the word in the IO Registers to be transferred to the Write Register and the various status flip-flops to be set in the appropriate state. A pulse passed by gate 1121 at this time is not passed by gate 1123, however, since the 2nd Break Request flip-flop 1105 is in its Zero state. The amount of delay afforded by delay circuit 1130 is sufficient to insure that the Write Register has been cleared before the word is transferred from the IO Registers to the Write Register. The pulse on conductor 252 (Drum Word Demand) is also delivered through OR circuit 1051 (FIG. 36*a*) to sample gate 1052. The pulse will be passed by that gate and initiate another "Break-Out" cycle provided that the IO Word Counter Status flip-flop 1020 indicates that the Word Counter has not gone to Zero.

Gate 1071 (FIG. 36*c*) is conditioned during a drum writing operation under the condition that IO Word Counter is equal to Zero and the Write Register is empty since an AND circuit 1135 has its inputs connected to the One output of the Not Read Drums flip-flop 1103, the Zero output of the IO Word Counter Status flip-flop 1020 and the Zero output of the Write Register Status flip-flop 1103. A pulse passed by gate 1071 causes clearing of the IO Interlock as above described.

*Read operation with IO register selected*

It is sometimes desirable to cause all or selected ones of the Memory Array registers to be cleared, that is, have all of the cores set in their Zero state. To effect this operation, the Load Address Counter instruction causes the Address Counter to be set with the number specifying the address of the first Memory Register to be cleared. The Select Instruction has the number 000,-100 (octal 04) in its Index Interval portion to select the IO Register and the Read Instruction has in its address part the number of registers to be cleared.

During the Select Instruction the contents of the Index Interval Register 1000 (binary number 000,100) is decoded by the Selection Decoder 1002 and causes a gate 1140 to be conditioned which is sampled at PT–5 on Select (pulse on conductor 156) to set an IO Register Select flip-flop 1141 in its One state. Flip-flop 1141, when in the One state, conditions a gate 1142 and through an OR circuit 1143 conditions another gate 1144. Gate 1142 is sampled by the output of an OR circuit 1145 which receives at one of its inputs pulses from conductor 86 (PT–6 on Read) and at the other of its inputs BI–6 pulses from gate 1063 (FIG. 36*b*). A pulse passed by gate 1142 is delivered through OR circuit 1051 (FIG. 36*a*) to sample gate 1052 which is conditioned when the IO Word Counter is not equal to Zero. A pulse passed by gate 1052 causes a "Break-In" cycle to be initiated since at PT–6 on Read (command 86) the Read flip-flop 1021 (FIG. 36*b*) is set in its One state.

When the IO Register Select flip-flop 1141 (FIG. 36*d*) is in the One state it also conditions one leg of a two-input AND circuit 1150, the input of which is positive when the IO Word Counter Status flip-flop 1020 (FIG. 36*c*) is indicating that the IO Word Counter equals Zero. Under this condition that the IO Word Counter is Zero and the IO Register is selected, AND circuit 1150 conditions a gate 1151 to pass the next BI–6 pulse through an OR circuit 1152, an OR circuit 1017 (FIG. 36*c*), another OR circuit 1153 and still another OR circuit 1018 (FIGS. 36*a*) to the conductor 174 (Clear IO Interlock). A pulse passed by OR circuit 1153 also clears flip-flop 1010 to thereby condition gate 1072 so that the next 2 mc. pulse will clear the Not Read Drums flip-flop 1102.

From the above circuit description it will be seen that if the IO Register is selected to read a given number of words into memory at some starting address, the contents of the IO Register (Zeros) will be read into the specified memory registers.

*Read operation with burst-time counters (BTC) selected*

When it is desired to read into Memory the contents of the Burst Counters and the Elapsed Time Counter, the Load Address Counter instruction specifies the first memory register to be involved in the transfer, the Select Instruction will select the Burst-Time counters if the Index Interval part of the instruction specifies the number 010,001 (octal 21) and the Read instruction address part specifies the number of words to be read from the counters. If there are three burst counters, one for each output section, and one elapsed time counter, only three words would be required to read those counters into the Memory Element since the elapsed time counter and the Section 1 Burst Counter can be read as one word.

If the Index Interval part of the Select instruction is the number 010,001, then the Selection Decoder 1002 (FIG. 36*d*) causes a gate 1160 to be conditioned to pass the pulse on conductor 156 (PT–5 on Select). A pulse passed by gate 1160 sets a BTC Select Flip-Flop 1161 in the One state. When the flip-flop 1161 is in the One state a gate 1162 is conditioned to pass a pulse on conductor 86 (PT–6 on Read) to the conductor 610 (Start Read BTC).

Each time that a BTC word is placed into the IO Buffer Register, the Selection and IO Control Element receives a pulse on conductor 613 (Request Break BTC) which will be passed by a gate 1163 since flip-flop 1161 is in the One state when the Burst-Time Counters have been selected. A pulse passed by gate 1163 is delivered through the OR circuit 1031 to the previously mentioned synchronizing circuit which includes flip-flop 1032, 1034 and their associated gates 1033, 1035. The output pulse from gate 1035 which is now a synchronized pulse samples gates 1036 and 1037 and since gate 1036 is conditioned the pulse will be delivered through OR circuit 1046 to set the IO Buffer Status flip-flop 1008 in its One state. When flip-flop 1008 is in the One state, it causes the word in the IO Buffer Register to be transferred to the Memory Element in the manner previously described with reference to Drum Reading operations with the following noted exceptions. When the BTC Select flip-flop 1161 (FIG. 36*d*) is in the One state, it conditions one input of a two-input AND circuit 1170, the other input of which is conditioned when the IO Word Counter equals Zero. Under those conditions, AND circuit 1170 causes a gate 1171 to be conditioned to pass the next BI–11 pulse through OR circuit 1152 to the conductor 1172 (Disconnect BTC). A pulse passed by OR circuit 1152 is also delivered through OR circuit 1017 to cause clearing of the IO Interlock as described previously. When the BTC Select flip-flop is in the One state, the positive potential of its One output is delivered through OR circuit 1143 to cause gate 1144 (FIG. 36*b*) to be conditioned to pass BI–2 pulses to the conductor 176 (Add One to IO Word Counter).

*Time pulse distributor control and special command generator of instruction control element*

The Time Pulse Distributor Control and Special Command Generator shown as block 1250 in FIG. 10*a* is shown in logical block form in FIG. 37. The circuit of FIG. 37, as its name implies, serves to control the Time Pulse Distributor and also serves to generate special commands.

A Master Control device 1251 is any suitable device capable of delivering pulses to its output conductors at selected times. This device conventionally includes circuits which respond to manually actuated switches. When it is desired to cause operation of the Central Computer System, a pulse is first delivered to the conductor labeled Clear TPD and then a pulse is delivered to the conductor labeled Start TP and IP Driver which causes a Set TPD Control Sync Flip-Flop 1252 to be set in its One state. When in the One state this flip-flop conditions a gate 1253 to pass the next 2 mc. pulse from a suitable source 1254. A pulse passed by gate 1253 sets a TPD Control Flip-Flop 1255 in the One state to condition a gate 1256. When gate 1256 is conditioned it passes 2 mc. pulses to the conductor labeled TP Driver which are delivered to the Time Pulse Distributor 52 (FIG. 10*a*), cause the Set TPD Control Sync Flip-Flop 1252 to be cleared, and also sample a gate 1257. The TPD Control Flip-Flop 1255 can be cleared in an obvious manner by delivering a pulse from the Master Control 1251 to the conductor labeled Stop TP and IP Driver. Gate 1257 is conditioned to pass TP driver pulses to the conductor labeled IP Driver under the condition that a Break flip-flop 1258 is in the "No Break" or Zero state.

*No Break and No Pause.*—When the Break flip-flop 1258 is in the "No Break" condition and a Pause flip-flop 1259 is in the "No Pause" or Zero condition, pulses are delivered to the conductor TP Driver and IP Driver and a positive D.C. level is delivered from the Zero output of the Pause flip-flop 1259 through an OR circuit 1260 to the conductor labeled Break or No Pause. The TP driver and IP driver pulses and the positive potential on the conductor labeled Break or No Pause are delivered to the Time Pulse Distributor 52 (FIG. 10*a*) where the TP conductors TP–0 through TP–11 and the IP conductors IP–1 through IP–11 are sequentially pulsed.

*Break and No Pause.*—When a pulse is received on conductor 194 (Set Break FF), the Break flip-flop 1258 causes gate 1257 to be de-conditioned; however, a positive potential is delivered to the conductor labeled Break or No Pause. Under these conditions the Time Pulse Distributor 52 (FIG. 10*a*) will cause the TP conductors to be sequentially pulse; however, the IP conductors are not sequentially pulsed.

*Pause and No Break.*—A pulse received on the conductor 96 (Set Pause Flip-Flop) causes flip-flop 1259 to condition one input of an AND circuit 1261, the other input of which is conditioned under the No Break condition. The output of AND circuit 1261, when positive, conditions a gate 1262 to pass TP drive pulses (2 mc. pulses with TPD on) to the conductor 193 [2 mc. (Pause and No Break)]. The Pause condition (flip-flop 1259 in the One state) can be either of the Arithmetic Pause type or the IO Pause type. The IO Pause is a name given the operation which occurs when an IO operation is still in process (IO interlock ON) when another IO class of instruction is arrived at in the Program. As mentioned earlier, the command 96 (Set Pause Flip-Flop) is conditionally generated at PT–10 time of any output class instruction (see FIGS. 11*u* through 11*y*). When the IO pause is effective, no further commands of the instruction are generated; however, pulses on conductor 193 [2 mc. (Pause and No Break)] are delivered through OR circuit 191 (FIG. 10*a*) so that the Break Request flip-flop of the Selection and IO Control Element is sensed at a 2 megacycle rate. The Arithmetic Pause is a name given to the operation which occurs when an arithmetic type of instruction generates the command 96 (Set Pause Flip-Flop). The arithmetic instructions which generate the command 96 are, for example, Multiply, Divide, Twin-Multiply and Twin-Divide. These instructions each require more time than a memory cycle does; therefore, the memory cycle is interrupted at a given time and repetitive type of commands are generated during the interruption. During this interruption, or pause, the Arithmetic Elements do not require access to or from the Memory Element; therefore, during this pause the Selection and IO Control Element has access to Memory in the event that an IO operation is in process and an actual transfer to or from Memory is ready to take place. This access is provided by delivering pulses to conductor 193 [2 mc. (Pause and No Break)]. It is to be understood that even though the Selection and IO Control Element is making a transfer to or from Memory, those repetitive commands of the Arithmetic instruction are generated concurrently with the transfer.

*Pause during Multiply or Twin-Multiply instructions.*—At OT–8 time of the Multiply or Twin-Multiply instructions a pulse is received on conductor 73 (Start 2 mc. Pulses) which through a synchronizing circuit, including a Sync Flip-Flop 1263 and gate 1264 causes a 2 mc. Operate Flip-Flop 1265 to be set in the One state. When flip-flop 1265 is in the One state, a gate 1266 is conditioned to pass 2 mc. pulses to sample a gate 1267 and another gate 1268. Those gates are both conditioned by the output of an OR circuit 1269 which receives a positive potential on one of its inputs during a multiply instruction and a positive potential on its other input during a twin-multiply instruction. A pulse passed by gate 1268 is delivered to conductor 1269 (Left Partial Product) and conductor 1270 (Right Partial Product). A pulse passed by gate 1267 is delivered through an OR circuit 1271 to the "Subtract 1" input of a Step Counter 1272.

At OT–7 time of either the multiply or the twin-multiply instruction a pulse is received on conductor 123 (Set Step Counter to 15). After having received a pulse on conductor 123 and 15 pulses on the conductor labeled Subtract 1, the Step Counter 1272 delivers an output pulse which causes the 2 mc. operate flip-flop 1265 to be returned to its Zero state and causes a Clear Pause Sync Flip-Flop 1273 to be set in its One state.

From the above description it will be seen that during the Pause Period of a Multiply or Twin-Multiply instruction, 15 pulses at a 2 mc. rate are delivered to the conductors 1269 (Left Partial Product) and 1270 (Right Partial Product).

*Pause during Divide or Twin-Divide instruction.*—At OT–8 time of the Divide or Twin-Divide instructions a pulse is received on conductor 73 (Start 2 mc. Pulses) which through the synchronizing circuit causes the 2 mc. operate flip-flop 1265 to be set in its One state. When that flip-flop is in the One state gate 1266 delivers 2 mc. pulses to a gate 1280 which is conditioned during the Divide or Twin-Divide instructions. Pulses passed by gate 1280 are delivered to a Divide Time Pulse Distributor 1281. The Divide Time Pulse Distributor 1281 as well as the Step Counter 1272 are cleared at PT–6 time since a gate 1282 is conditioned during PT time and it is sampled by IP–6 pulses.

The first pulse received from gate 1280 by the Divide Time Pulse Distributor 1281 causes a pulse to be delivered to each of the conductors 114A (Make Left A Register and Left Accumulator Signs Unlike), 114B (Make Right A Register and Right Accumulator Signs Unlike), 114C (Left Combined Shift Left), and 114D (Right Combined Shift Left). The next pulse received causes a pulse to be delivered to each of the conductors 1283A (Left Partial Quotient) and 1283B (Right Partial Quotient). The next pulse received by the Divide Time Pulse Distributor does not cause a pulse to be delivered to any output conductor; however, the fourth pulse received causes a pulse to be delivered through OR circuit 1271 to the Subtract 1 input of the Step Counter 1272. The fifth pulse received from gate 1280 causes the Divide Time Pulse Distributor to deliver a pulse to each of the conductors 127 (Left Division Shift Left) and 128 (Right Division Shift Left). Those first five received pulses cause a complete cycle of operation of the Divide Time Pulse Distributor 1281, the next five cause the cycle to be repeated, etc., until the Step Counter which was set to 17 at OT–7 time of the Divide or Twin-Divide instruction has received 16 pulses at its Subtract 1 input. When that number of pulses have been received at the Subtract 1 input, the Step Counter causes the 2 mc. Operate flip-flop 1265 to be cleared and sets the Clear Pause Sync flip-flop in its ONE state.

A circuit suitable for the Step Counter 1272 of FIG. 37 is shown and described in detail in the above mentioned copending application "D" with particular reference to FIG. 17 thereof.

A circuit suitable for the Divide Time Pulse Distributor of FIG. 37 is shown and described in detail in the above mentioned copending application "D" with particular reference to FIG. 18 thereof.

A circuit suitable for the Time Pulse Distributor 52 of FIG. 10*a* is shown and described in detail in the above mentioned copending application "D" with particular reference to FIG. 16*b* thereof.

*Command Generators*

Reference is now made to FIGS. 38*a* through 38*e* which, when arranged end to end in that order, show in logical block form the Command Generator 53 of FIGS. 10*a* through 10*c*.

The gate circuits of FIGS. 38*a* through 38*e* are not illustrated in accordance with the conventions above recited since the maze of lines to illustrate conductors would tend to confuse rather than clarify the operation of those circuits. Each gate is shown with a D.C. level input which conditions that gate when positive. The pulse which samples a given gate is indicated by a legend within the block symbol for the gate, for example, gate 1300 is sampled by IP–1 pulses, gate 1301 is sampled by IP–6 pulses, etc.

The operation of the Command Generator will be obvious from an inspection of FIGS. 38*a* through 38*e*. For example, a positive D.C. level received on the conductor labeled PT causes the following commands to be generated at the times indicated:

TABLE 28

| Command name | Conductor (Command) number | Time |
|---|---|---|
| Program Counter to Memory Address Register | 61 | PT-1 |
| Clear Address Register | 62 | PT-6 |
| Clear Left Operation Register | 63A | PT-6 |
| Clear Right Operation Register | 63B | PT-6 |
| Clear Step Counter and Divide TPD | 64 | PT-6 |
| Record Left Overflow | 65A | PT-6 |
| Record Right Overflow | 65B | PT-6 |
| Add One to Program Counter | 66 | PT-6 |
| Left Memory Buffer to Operation Register | 67A | PT-8 |
| Right Memory Buffer to Address Register | 67B | PT-8 |

From an inspection of FIGS. 38*a* through 38*e* it will be seen that in certain cases two or more gates are conditioned by the same D.C. level and those gates are sampled by the same pulse. From a logic circuit standpoint only one gate would have been required in such instances; however, for power considerations several gates are used. It will be understood that these power considerations may be satisfied in different ways, for example, one gate may be employed, the output of which could be suitably amplified by one or more pulse amplifiers. The duplication of gates as above indicated solves the logical and power considerations with fewer components and less space than when pulse amplifiers are employed.

*Cycle Control Circuit*

Reference is now made to FIG. 39 which illustrates in logical block form the Cycle Control Circuits shown as block 54 in FIG. 10*b*. The Cycle Control Circuit is a group of flip-flops for control of the instruction cycles. Each flip-flop has its input and output conductors appropriately labeled and therefore no further description is required.

*Memory Unit Selection*

Reference is now made to FIG. 40 which illustrates in logical block form the Memory Unit Selection Circuits shown as block 58 in FIG. 10*c*. The flip-flops 1310 and 1311 are both cleared by TP–0 pulses. When the Address Register 155 (FIG. 3*b*) receives a pulse on conductor 68 (Address Register to Memory Address Register) it delivers a pulse to conductor 1312 if the number stored in that register specifies one of the 4096 registers in the Memory Element, whereas it delivers a pulse to conductor 1313 if the number stored in the address register specifies the address of the Time Clock.

*Clock Register*

Reference is now made to FIG. 41 which shows, in logical block form, the Clock Register indicated as block 211 in FIG. 3*h*. Pulses 0.1 μsec. in duration at 32 pulses per second rate from source 1320 are synchronized with 2 mc. pulses by means of flip-flops 1321, 1322 and their associated gates 1323, 1324. The synchronized 32 p.p.s. pulses are delivered by way of conductor 1325 to the Elapsed Time Counter of the Output System and are also delivered to the Add One input of a 9 stage counter including flip-flops 1326 through 1334 and their associated gates 1335 through 1342. A pulse every .25 sec. is therefore passed by gate 1337 to the conductor 1343 and a pulse every 8 sec. is passed by gate 1342 to conductor 1344. Upon receipt of a pulse on conductor 77 (Clock Register to Right Memory Buffer Register) a set of transfer gates 1350 through 1358 delivers signals representative of the count in the counter to the conductors of cable 947.

*Burst Time Counter and Compare*

Reference is now made to FIG. 42 which is a functional block diagram of the Burst Time Counter and Compare Element shown as block 481 in FIG. 3*d*. The Burst Time Counter and Compare Element includes a Burst Counter and Compare Circuit for each of Sections 1 through 3, 1400, 1401 and 1402, respectively, an Elapsed Time Counter 1403 and a synchronizing circuit which includes flip-flops 1404, 1405 and their associated gates 1406, 1407. Each Burst Counter and Compare Circuit has a reset input which, upon receipt of a pulse, causes each stage of the Burst Counter to be reset to Zero. Each of those circuits also has another input labeled Step Burst Counter which, upon receipt of a pulse causes a One to be added to the previous count stored in the counter.

Each Burst Counter and Compare Circuit receives certain of the bits L8 through L15 (Burst Number Tag) of the drum words and when the contents of the counter of that Section compares with the Burst Number Tag a positive D.C. level is established on the conductor labeled Compare for that Section. As previously mentioned with reference to the Output System, a preferred embodiment includes three Output Sections. Since all Output Sections need not handle the same number of bursts, in a preferred embodiment the Section 1 Burst Counter and Compare Circuit has only six stages, the Section 2 Burst Counter and Compare Circuit has 8 stages and that for Section 3 has only 5 stages. Each Burst Counter and Compare Circuit also has provisions for delivering as outputs, D.C. levels indicating the instantaneous count stored in the Burst Counter.

The Elapsed Time Counter 1403 is a four-stage counter which, in response to a pulse on conductor 483 (Reset Elapsed-Time Counter), has each of its stages reset to Zero. A pulse received on conductor 484 (32 p.p.s.) is synchronized with drum timing by means of flip-flops 1404, 1405 and gates 1406, 1407 to cause stepping of the Elapsed Time Counter 1403. The Elapsed Time Counter 1403 delivers at its outputs D.C. levels representative of the count stored in the counter. The output representative of the count stored in the Elapsed Time Counter and the output of the Section 1 Burst Counter representative of the Burst Count are delivered by way of the conductors of cable 1408 to the Burst Counter Interrogator 611 (FIG. 3*d*). The outputs representative of the Section 2 Burst Count and the Section 3 Burst Count are also delivered, by way of the conductors of cables 1409 and 1410, to the Burst Count Interrogator 611 (FIG. 3*d*).

*Section 1 Bust Counter and Compare Circuit.*—Reference is now made to FIG. 43 which illustrates in logical block form the Section 1 Burst Counter and Compare Circuit shown as block 1400 in FIG. 42. As previously noted with reference to the Output System, both the One and Zero signals stored in the Burst Number Register (FIG. 3*e*) are delivered to the Burst Counter and Compare Circuit. In FIG. 43 the signals from the Burst Number Register bits L10 through L15 are applied as inputs to AND circuits 1420 through 1431. These conductors are labeled $\overline{L10}$, L10, $\overline{L11}$, L11 etc. This labeling is a convention employed to indicate under what condition the conductor receives a positive potential. If the left half-word of the drum word in its bit position Left 10 has a binary Zero, then the conductor labeled $\overline{L10}$ is positive. If this bit position has a binary One, then the conductor labeled L10 is positive. With this convention of labeling it will be apparent under what condition a given one of those conductors is positive.

The other input to each of the AND circuits 1420 through 1431 is from a six-stage binary counter comprising flip-flops 1432 through 1437 and their associated gates 1438 through 1442. This six-stage binary counter receives reset commands in the form of pulses on the conductor labeled Clear. As indicated in FIG. 43 a pulse on the conductor labeled Clear causes each of the flip-flops 1432 through 1437 to assume its Zero state. Pulses are applied to the conductor labeled Clear in any suitable manner. Since this counter as will be apparent from the subsequent description automatically resets during normal operation, it is only necessary to apply a pulse to the conductor labeled Clear when the counter is initially put into operation or during operational testing. A pulse received from conductor 453 causes the counter to be advanced since this pulse is applied to the complement input of flip-flop 1437 as well as to the gate 1442. Each pulse causes flip-flop 1437 to change its existing state, every second input pulse causes flip-flop 1436 to change its existing state (since gate 1442 only passes pulses when flip-flop 1437 is in its binary One state), every fourth input pulse causes flip-flop 1435 to change its existing state and so forth. When a sufficient number of pulses have been received to cause all of the flip-flops to assume their binary One state the next received pulse will cause all the flip-flops to return to the reset state (all set to binary Zero). As indicated in FIG. 43 the low order stage flip-flop 1437 of the counter has its One output applied to AND circuit 1430 and its Zero output applied to AND circuit 1431. Those AND circuits receive the low order output of the Burst Number Register (bit 15); however, AND circuit 1430 receives the Zero signal whereas AND circuit 1431 receives the One signal. In this way, if the low order bit (bit L15) of the drum word compares with the low order bit (output of flip-flop 1437) of the counter, then neither of the AND circuits 1430 or 1431 will produce a positive output.

In a like manner the remaining orders of the drum word are compared to their corresponding order of the counter and if each order compares then all of the AND circuits 1420 through 1431 deliver negative potentials through OR circuits 1450 through 1453 to an inverter 1454 which in response to this negative signal delivers a positive signal to the conductor labeled Compare Section 1.

If any bit of the drum word fails to compare with the corresponding order of the counter then one or more of the AND circuits 1420 through 1431 will deliver a positive potential to the inverter 1454 which will in turn deliver a negative potential to the conductor label Compare Section 1. Signals representative of the count stored in the Burst Counter are delivered to the Burst Time Count Interrogator 611 (FIG. 3*d*) by having the One output of each of the flip-flops 1432 through 1437 connected thereto.

*Burst Counter Interrogator*

Reference is now made to FIG. 44 which shows in logical and functional block form the Burst Counter Interrogator identified as block 611 in FIG. 3*d*. Upon receipt of a pulse on conductor 610 (Start Read BTC) a flip-flop 1500 is set in its One state. When flip-flop 1500 is in its One state a gate 1501 is conditioned to pass the next received OD–3 pulse to set another flip-flop 1502 in its One state to thereby condition a gate 1503 to pass OD–1 pulses. Pulses passed by gate 1503 are delivered as stepping pulses to a selecting counter for BTC words 1504 and are also delivered as sample pulses to a set of gates 1505. Flip-flop 1502 is in its Zero state when the Burst Time Counters have not been selected and therefore prior to the pulse received on conductor 610, flip-flop 1502 was in its binary Zero state thereby conditioning a gate 1506 which passes OD–1 pulses to the Clear input of the selecting counter for BTC words, 1504. When the selecting counter 1504 is in the Zero state, one input of each of 10 AND circuits 1507 is conditioned. The other inputs of those AND circuits are the signals indicative of the contents of the Section 1 Burst Counter and the Elapsed Time Counter. The outputs of AND circuits 1507 are delivered through OR circuits 1508 to the conditioning input of gates 1505. Therefore those gates of gates 1505 corresponding to the stages of the Section 1 Burst Counter and Elapsed Time Counter which contain a binary One are conditioned when the first pulse is passed by gate 1503. Therefore the first words of the BTC reading operation is delivered and the selecting counter 1504 is advanced to indicate a count of one. When the selecting counter 1504 indicates a count of one, another group of AND circuits 1509 each have one of their inputs conditioned and the other inputs of those AND circuits are the signals representative of the contents of the Section 2 Burst Counter. The outputs of AND circuits 1509 are delivered through OR circuits 1508 to the conditioning input of gates 1505 thereby conditioning those gates associated with the stages of the Section 2 Burst Counter which contain a binary One. The second pulse passed by gate 1503 therefore samples gates 1505 to produce a second BTC word and to set the Selecting Counter 1504 to indicate a count of two. When the Selecting Counter 1504 indicates a count of two, one input of each of the AND circuits 1510 is conditioned. The other inputs of those AND circuits 1510 are conditioned by signals representative of the count stored in the Section 3 Burst Counter. The output of AND circuits 1510 is delivered through OR circuits 1508 to the conditioning input of gates 1505 and therefore the third pulse passed by gate 1503 causes gates 1505 to be sampled to generate the third BTC word. Each time that gate 1503 passes a pulse to sample gates 1505 a pulse is delivered also to conductor 613 labeled Request Break BTC. This pulse is delivered to the Selection and IO Control Element to effect the Break-In operation previously described. Whenever the Selecting Counter 1504 produces an end carry or whenever a pulse is received on conductor 1172 labeled Disconnect BTC, flip-flop 1500 is cleared thereby conditioning a gate 1511 to pass the next OD–3 pulse to clear the flip-flop 1502.

A preferred Burst Time Counter Word Bit assignment for each of the three words is as follows:

TABLE 29

| Word | Bit | Counter information |
|---|---|---|
| 1 | L15 | Section 1 Burst Counter $2^0$. |
| | L14 | Section 1 Burst Counter $2^1$. |
| | L13 | Section 1 Burst Counter $2^2$. |
| | L12 | Section 1 Burst Counter $2^3$. |
| | L11 | Section 1 Burst Counter $2^4$. |
| | L10 | Section 1 Burst Counter $2^5$. |
| | R15 | Elapsed Time Counter $2^0$. |
| | R14 | Elapsed Time Counter $2^1$. |
| | R13 | Elapsed Time Counter $2^2$. |
| | R12 | Elapsed Time Counter $2^3$. |
| 2 | L15 | Section 2 Burst Counter $2^0$. |
| | L14 | Section 2 Burst Counter $2^1$. |
| | L13 | Section 2 Burst Counter $2^2$. |
| | L12 | Section 2 Burst Counter $2^3$. |
| | L11 | Section 2 Burst Counter $2^4$. |
| | L10 | Section 2 burst Counter $2^5$. |
| | L9 | Section 2 Burst Counter $2^6$. |
| | L8 | Section 2 Burst Counter $2^7$. |
| 3 | L15 | Section 3 Burst Counter $2^0$. |
| | L14 | Section 3 Burst Counter $2^1$. |
| | L13 | Section 3 Burst Counter $2^2$. |
| | L12 | Section 3 Burst Counter $2^3$. |
| | L11 | Section 3 Burst Counter $2^4$. |

*Timing and Index Circuit*

Reference is now made to FIG. 45 which is a block schematic diagram of the Timing and Index Circuit shown as a block and accordingly labeled in FIG. 3*f*.

The signals of the timing channel of the drum 17 are sensed by the read head 19 whose output is delivered to a timing pulse generator 1550. The timing pulse generator 1550 is essentially a circuit which generates a 0.1 μsec. pulse on the conductor labeled DTP–1 at each positive-going zero crossing of the sine wave input signal and a 0.1 μsec. pulse on the conductor labeled DTP–3 at each negative-going zero crossing of the sine wave input signal.

The signals recorded in the Index Channel are sensed by read heads 20 and 21 whose outputs are delivered through read circuits 1551 and 1552, respectively, to the conditioning inputs of gates 1553 and 1554, respectively. When the index signal in the Index Channel is sensed by read head 20 it causes gate 1553 to be conditioned at such a time that a DTP–1 pulse is passed to the conductor labeled CD-IX. When the index signal in the Index Channel is sensed by read head 21 it causes gate 1554 to be conditioned at such a time that a DTP–3 pulse is passed to the conductor labeled OD-IX.

DTP–2 pulses are obtained by passing DTP–1 pulses through a 2.5 μsec. delay circuit 1555 and DTP–4 pulses are obtained by passing DPT–3 pulses through a 2.5 μsec. delay circuit 1556. Each DTP–3 pulse causes a flip-flop 1557 to be set in its One state and through a 1.7 μsec. delay circuit 1558 causes that flip-flop to return to its Zero state. The negative pulse thereby produced at the Zero output of flip-flop 1557 is delivered through a drum write driver 1559 to the conductor labeled Status Write Sample.

The various component circuits shown in FIG. 45 are shown and described in the above referred to copending application "A."

Throughout the above description and in the drawings, very little reference has been given with respect to passive circuits in component circuits. Passive circuits such as cathode followers, pulse amplifiers, level setters and the like, must obviously be included between various of the component circuits. However, the characteristics of those passive circuits will largely be determined not only by the load component circuits but also by the length of conductors coupling a given logical circuit to its load logical circuit. For example, the various core stages illustrated and described herein require that sufficient current be supplied to the shift windings of those cores for a length of time sufficient to transfer signals from one stage to the next or for reading out the information in a given stage. Since core circuits respond to four conditions, that is, (1) number of turns on the core, (2) the current through the winding, (3) the length of time that the current flows and (4) the rate of change of current, it will be obvious that in a specific design of an equipment constructed in accordance with the principles of this invention, the designer may use these variables in any way that he finds desirable. Furthermore, as described in the preceding section entitled "Conventions Employed" the various logical circuits respond to standard D.C. voltage levels of +10 and −30 volts and respond to pulse levels 20 to 40 volts in magnitude, and it will be obvious that various passive circuits will be required to attain these voltage requirements. These voltage requirements may be met by the use of conventional passive circuits such as level setters, cathode followers, current drivers and the like.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A computing device comprising a memory element having a plurality of signal storage registers and responsive to memory control signals for delivering signals from the signal storage register identified by received memory address signals, a first arithmetic element and a second arithmetic element each being responsive to received signals representative of data for producing signals representative of the result of an arithmetic operation performed on said received signals representative of data, time pulse generating and distributing means for producing a plurality of time pulses, memory control means responsive to said time pulses and signals received from said memory element for producing said memory control signals, memory address signal producing means responsive to said time pulses and signals received from said memory element for producing said memory address signals, command generating means responsive to said time pulses and signals received from said memory element for generating commands causing a first signal representative of a first function and a second signal representative of a second function to be delivered respectively to said first arithmetic element and to said second arithmetic element and causing a third signal representative of a third function to be delivered to each of said first arithmetic element and said second arithmetic element whereby said first arithmetic element and said second arithmetic element produce respectively a first arithmetic result and a second arithmetic result.

2. A computing device comprising a memory element having a plurality of signal storage registers and responsive to memory control signals for delivering signals from the signal storage register identified by received memory address signals, a first arithmetic element and a second arithmetic element each being responsive to received signals representative of data for producing signals representative of the result of an arithmetic operation performed on said received signals representative of data, time pulse generating and distributing means for producing a plurality of time pulses, memory control means responsive to said time pulses and signals received from said memory element for producing said memory control signals, memory address signal producing means responsive to said time pulses and signals received from said memory element for producing said memory address signals, command generating means responsive to said time pulses and signals received from said memory element for generating commands causing a first signal representative of a first augend and a second signal representative of a second augend to be delivered respectively to said first arithmetic element and to said second arithmetic element and causing a third signal representative of an addend to be delivered to each of said first arithmetic element and said second arithmetic element whereby said first arithmetic element and said second arithmetic element produce respectively a first sum and a second sum.

3. A computing device comprising a memory element having a plurality of signal storage registers and responsive to memory control signals for delivering signals from the signal storage register identified by received memory address signals, a first arithmetic element and a second arithmetic element each being responsive to received signals representative of data for producing signals representative of the result of an arithmetic operation performed on said received signals representative of data, time pulse generating and distributing means for producing a plurality of time pulses, memory control means responsive to said time pulses and signals received from said memory element for producing said memory control signals, memory address signal producing means responsive to said time pulses and signals received from said memory element for producing said memory address signals, command generating means responsive to said time pulses and signals received from said memory element for generating commands causing a first signal representative of a first minuend and a second signal representative of a second minuend to be delivered respectively to said first arithmetic element and to said second arithmetic element and causing a third signal representative of a subtrahend to be delivered to each of said first arithmetic element and said second arithmetic element whereby said first arithmetic element and said second arithmetic element produce respectively a first difference and a second difference.

4. A computing device comprising a memory element having a plurality of signal storage registers and responsive to memory control signals for delivering signals from the signal storage register identified by received memory address signals, a first arithmetic element and a second arithmetic element each being responsive to received signals representative of data for producing signals representative of the result of an arithmetic operation performed on said received signals representative of data, time pulse generating and distributing means for producing a plurality of time pulses, memory control means responsive to said time pulses and signals received from said memory element for producing said memory control signals, memory address signal producing means responsive to said time pulses and signals received from said memory element for producing said memory address signals, command generating means responsive to said time pulses and signals received from said memory element for generating commands causing a first signal representative of a first multiplier and a second signal representative of a second multiplier to be delivered respectively to said first arithmetic element and to said second arithmetic element and causing a third signal representative of a multiplicand to be delivered to each of said first arithmetic element and said second arithmetic element whereby said first arithmetic element and said second arithmetic element produce respectively a first product and a second product.

5. A computing device comprising a memory element having a plurality of signal storage registers and responsive to memory control signals for delivering signals from the signal storage register identified by received memory address signals, a first arithmetic elment and a second arithmetic element each being responsive to received signals representative of data for producing signals representative of the result of an arithmetic operation performed on said received signals representative of data, time pulse generating and distributing means for producing a plurality of time pulses, memory control means responsive to said time pulses and signals received from said memory element for producing said memory control signals, memory address signal producing means responsive to said time pulses and signals received from said memory element for producing said memory address signals, command generating means responsive to said time pulses and signals received from said memory element for generating commands causing a first signal representative of a first divisor and a second signal representative of a second divisor to be delivered respectively to said first arithmetic element and to said second arithmetic element and causing a third signal representative of a dividend to be delivered to each of said first arithmetic element and said second arithmetic element whereby said first arithmetic element and said second arithmetic element produce respectively a first quotient and a second quotient.

6. A computing device comprising a memory element having a plurality of signal storage registers and responsive to memory control signals for delivering signals from the signal storage register identified by received memory address signals, a first arithmetic element and a second arithmetic element each being responsive to received signals representative of data for producing signals representative of the result of an arithmetic operation performed on said received signals representative of data, a signal producing instruction control element, means including said instruction control element responsive to signals received from said memory element for producing said memory control signals, means including said instruction control element responsive to signals received from said memory element for delivering said memory address signals to said memory element, and means including said instruction control element responsive to signals received from said memory element for causing a first signal representative of a first function and a second signal representative of a second function to be delivered respectively to said first arithmetic element and to said second arithmetic element and for causing a third signal representative of a third function to be delivered to each of said first arithmetic element and said second arithmetic element whereby said first arithmetic element and said second arithmetic element produce respectively a first arithmetic result and a second arithmetic result.

7. A computing device comprising a memory element having a plurality of signal storage registers and responsive to memory control signals for delivering signals from the signal storage register identified by received memory address signals, a first arithmetic element and a second arithmetic element each being responsive to received signals representative of data and responsive to arithmetic control signals for producing respectively signals representative of a first arithmetic result and of a second arithmetic result, a signal producing instruction control element, means including said instruction control element responsive to signals received from said memory element for delivering said memory address signals, means including said instruction control element responsive to signals received from said memory element for producing said memory control signals, means including said instruction control element responsive to signals received from said memory element for producing said arithmetic control signals, and means including said instruction control element for causing a first signal representative of a first function and a second signal representative of a second function to be delivered respectively to said first arithmetic element and to said second arithmetic element and for causing a third signal representative of a third function to be delivered to each of said first arithmetic element and said second arithmetic element.

References Cited in the file of this patent

A Functional Description of EDVAC, November 1, 1949, University of Pa. Research Div. Report.